US010784737B2

(12) United States Patent
Sakuma

(10) Patent No.: US 10,784,737 B2
(45) Date of Patent: Sep. 22, 2020

(54) ROTATING ELECTRICAL MACHINE AND METHOD FOR MANUFACTURING SAME

(71) Applicant: AISIN SEIKI KABUSHIKI KAISHA, Kariya-shi, Aichi-ken (JP)

(72) Inventor: Masafumi Sakuma, Chiryu (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 281 days.

(21) Appl. No.: 16/065,567

(22) PCT Filed: Dec. 19, 2016

(86) PCT No.: PCT/JP2016/087853

§ 371 (c)(1),
(2) Date: Jun. 22, 2018

(87) PCT Pub. No.: WO2017/110760

PCT Pub. Date: Jun. 29, 2017

(65) Prior Publication Data

US 2019/0140507 A1 May 9, 2019

(30) Foreign Application Priority Data

Dec. 25, 2015 (JP) ................................ 2015-255437

(51) Int. Cl.
*H02K 1/14* (2006.01)
*H02K 3/28* (2006.01)
(Continued)

(52) U.S. Cl.
CPC ................ *H02K 3/28* (2013.01); *H02K 1/14* (2013.01); *H02K 3/04* (2013.01); *H02K 3/18* (2013.01);
(Continued)

(58) Field of Classification Search
CPC .. H02K 3/28; H02K 1/14; H02K 3/18; H02K 15/095
(Continued)

(56) References Cited

U.S. PATENT DOCUMENTS

2002/0079772 A1 6/2002 Oohashi et al.
2004/0256942 A1 12/2004 Yokoyama et al.
(Continued)

FOREIGN PATENT DOCUMENTS

GB 2 202 170 A 9/1988
JP 59-86445 A 5/1984
(Continued)

OTHER PUBLICATIONS

International Search Report (PCT/ISA/210) dated Mar. 14, 2017, by the Japanese Patent Office as the International Searching Authority for International Application No. PCT/JP2016/087853.
(Continued)

*Primary Examiner* — Thienvu V Tran
*Assistant Examiner* — Lorena D Bruner
(74) *Attorney, Agent, or Firm* — Buchanan Ingersoll & Rooney PC

(57) ABSTRACT

A rotating electrical machine with a fractional slot structure includes concentrically wound stator coils, and a method of manufacturing the same. In a rotating electrical machine, a plurality of unit coils included in the stator coil are allocated into a first pole coil and a second pole coil in units of slots that oppose a pair of movable element magnetic poles. Further, each pole pair coil forming a plurality of phase coils is provided with two types of the unit coils, namely a full-coil and a half-coil. In addition, in each pole pair coil, the coil pitches between pairs of coil sides of the plurality of
(Continued)

unit coils forming said pole pair coil are different from one another, and each pole pair coil is provided with one half-coil.

17 Claims, 68 Drawing Sheets

(51) Int. Cl.

| | |
|---|---|
| ***H02K 3/04*** | (2006.01) |
| ***H02K 15/085*** | (2006.01) |
| ***H02K 3/18*** | (2006.01) |
| ***H02K 15/095*** | (2006.01) |
| *H02K 3/12* | (2006.01) |

(52) U.S. Cl.
CPC ......... *H02K 15/085* (2013.01); *H02K 15/095* (2013.01); *H02K 3/12* (2013.01)

(58) Field of Classification Search
USPC .................................................. 310/179–210
See application file for complete search history.

(56) References Cited

U.S. PATENT DOCUMENTS

| | | | | |
|---|---|---|---|---|
| 2013/0154429 | A1 | 6/2013 | Schönbauer et al. | |
| 2016/0285336 | A1* | 9/2016 | Sakuma | H02K 3/28 |

FOREIGN PATENT DOCUMENTS

| | | | |
|---|---|---|---|
| JP | 63-194543 | A | 8/1988 |
| JP | 7-163074 | A | 6/1995 |
| JP | 2005-6487 | A | 1/2005 |
| JP | 2015-35836 | A | 2/2015 |

OTHER PUBLICATIONS

"University Course Electrical Machine Designing (second revised version" at pp. 43 through 44, Originally Written by Jutaro Takeuchi, issued by Ohm Co., Ltd on Feb. 25, 1993, 2 pages, with partial translation.

* cited by examiner

ROTATING ELECTRICAL MACHINE AND METHOD FOR MANUFACTURING SAME

TECHNICAL FIELD

This invention relates to a rotating electrical machine equipped with a concentrically wound stator coil and the method for manufacturing the same.

BACKGROUND ART

As an invention associated with a rotating electrical machine, the invention disclosed in Patent Literature 1 can be exampled. The rotating electrical machine according to the Patent Literature 1 includes a unit coil provided inside of a stator iron core in a radial direction. The length in a circumferential direction of the unit coil is set to be shorter than the length in the circumferential direction of the unit coil provided outside of the stator iron core in the radial direction. Therefore, the rotating electrical machine according to the Patent Literature 1 tries to reduce the entire length of the coil end of a group of coils including a plurality of unit coils, compared to the rotating electrical machine in which the length in the circumferential direction of all unit coils is the same.

CITATION LIST

Patent Literature

[Patent Literature 1] JP2015-035836 A

Non-Patent Literature

[Non-Patent Literature 1] "University Course Electrical Machine Designing (second revised version)" at Pages 43 through 44, Originally Written by Jutaro Takeuchi, Issued by Ohm Co. Ltd on Feb. 25, 1993

SUMMARY OF INVENTION

Technical Problem(s)

However, according to the invention described in the Patent Literature 1, a three-phase rotating electrical machine with four-poles, twenty-four slots structure, four-poles, thirty-six slots structure or four-poles forty-eight slots structure, etc. is the subject of the invention. In other words, the invention of Patent Literature 1 relates to a rotating electrical machine with an integer number of slots structure, where the number of slots per every pole and every phase is an integer value and the rotating electrical machine recited in the Patent Literature 1 does not relate to a fractional slot structure in which the number of slots is not the integer value. The rotating electrical machine with the fractional slot structure has less torque ripples compared to the rotating electrical machine with the integer slot structure and the distribution of magneto motive force becomes closer to the sine wave distribution. Therefore, the rotating electrical machine with the fractional slot structure can be improved to have a higher performance than the rotating electrical machine with the integer slot structure.

However, according to the rotating electrical machine with the fractional slot structure, as like the three-phase armature winding described in the Non-Patent Literature 1, many of such structure have the stator coils wound with double layer. The stator coil wound with double layer is necessary to adjust the order of assembling of the coil sides inserted through the slots upon assembling to the stator iron core. This may lead to a complex assembling work of the stator coil. As explained, the conventionally structured rotating electrical machine with a fractional slot structure is difficult to assemble the stator coil per phase coil unit as the stator coil wound concentrically and the efficiency of assembling work for assembling the stator coil is worsened.

This invention was made to solve the above problems and the object of the invention is to provide a rotating electrical machine with a fractional slot structure equipped with a stator coil wound concentrically and the method for manufacturing the rotating electrical machine with the fractional slot structure.

Solution to Problem(s)

In order to solve the above problems, the rotating electrical machine with a fractional slot structure having a number of slots per every pole and every phase being fractions with decimal places of 0.5 includes a stator which includes a stator iron core provided with a plurality of slots and a stator coil including a plurality of unit coils wound between one pair of slots among the plurality of slots and including a pair of coil sides accommodated in the one pair of slots and a pair of coil ends formed integrally with the pair of coil sides and connecting respective same side end portions of the pair of coil sides and a mover including a mover iron core movably supported relative to the stator and at least a pair of mover magnetic poles provided at the mover iron core. The plurality of unit coils included in the stator coil is apportioned, per slot unit opposing to the pair of mover magnetic poles, into a first pole coil having one of the plurality of unit coils or the plurality of unit coils which coil pitch between the pair of coil sides is different from one another and the one of the plurality of unit coils or the plurality of unit coils being concentrically wound and electrically connected in series and a second pole coil having one of the plurality of unit coils or the plurality of unit coils which coil pitch between the pair of coil sides is different from one another and the one of the plurality of unit coils or the plurality of unit coils being concentrically wound and electrically connected in series; wherein, when the first pole coil opposes to one polarity of one of the pair of mover magnetic poles, the second pole coil opposes to the other polarity of the other of the pair of mover magnetic poles and wherein adjacently arranged said first pole coil and said second pole coil opposing to the pair of mover magnetic poles are electrically connected in series to form a pole paired coil and the stator coil includes a plurality of phase coils which has one pole paired coil or a plurality of the pole paired coils which is electrically connected by at least one of an in-series connection and a parallel connection. With respect to an occupying state of the plurality of slots, each of the pole paired coils forming the plurality of phase coils includes two types of the unit coils which are a full-coil in which when the pair of coil sides of the one of the plurality of unit coils is accommodated in the pair of slots, the pair of coil sides occupies an entirety of the pair of slots and a half-coil in which when the pair of coil sides of the one of the plurality of unit coils is accommodated in the pair of slots, one coil side of the pair of coil sides occupies a half of the one of the pair of slots and the other coil side of the pair of coil sides occupies a half of the other of the pair of slots, wherein in said each of the pole paired coils, a coil pitch between the pair of coil sides of the plurality of unit coils which forms the pole paired coil is different from one another and said each of the pole paired coils includes one said half-coil.

Advantageous Effect of Invention

According to the rotating electrical machine associated with the invention, the plurality of unit coils included in the stator coil is apportioned per slot unit opposing to the pair of mover magnetic poles into the first pole coil and the second pole coil. Further, each pole paired coil includes a full-coil and a half-coil with respect to the occupying state of the plurality of slots. Further, each paired pole coil has a different coil pitch between the pair of coil sides of the plurality of unit coils forming the pole paired coils. Thus, the rotating electrical machine with a fractional slot structure having the number of slots per each pole and each phase being fractions with the decimal places of 0.5 can provide a stator coil wound concentrically. Accordingly, according to the rotating electrical machine associated with the invention can assemble the stator coils per phase coil unit and the efficiency of assembling work can be improved compared to the structure of the rotating electrical machine with the stator coil wound with double layer.

PREFERRED EMBODIMENTS IMPLEMENTED BY INVENTION

Embodiments of the invention will be explained hereinafter with reference to the attached drawings. The portions common to or similar to respective embodiments and modified embodiments are designated as the same numerals or symbols and overlapping explanations thereof are omitted. Further, the explanation made to one embodiment can be appropriately applicable to other embodiments or the modified embodiments. Further, it is noted that the drawings are conceptually illustrated, and sizes of portions and/or components of the detail structure are not precisely defined.

First Embodiment (Outline of Rotating Electrical Machine 100)

Figure 1:
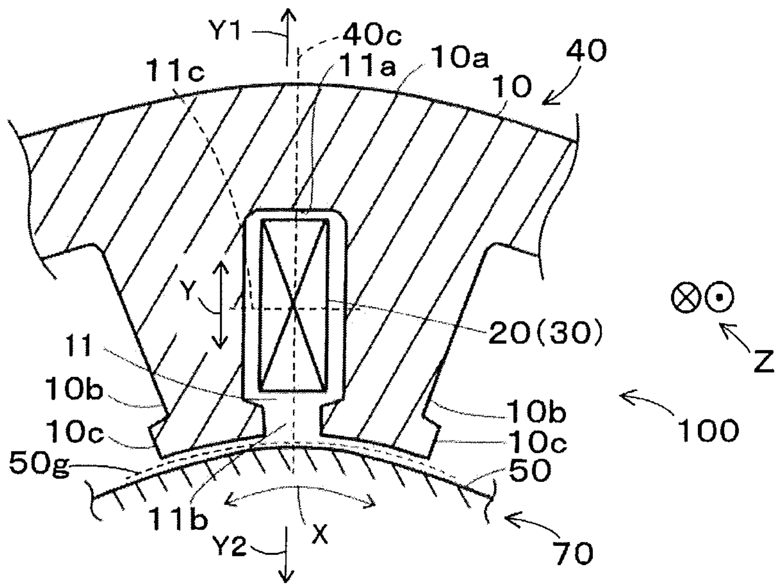
FIG. 1 is a cross-sectional end plan view showing a part of the cut end surface of the rotating electrical machine 100 associated with a first embodiment and showing a plan view vertical to a third direction (Z-arrow direction)

As shown in FIG. 1, the rotating electrical machine 100 includes a stator 40 and a mover 70. The stator 40 includes a stator iron core 10 which is provided with a plurality of slots 11 and a stator coil 30 including a plurality of unit coils 20. The mover 70 includes a mover iron core 50 which is relatively movably supported on the stator 40 and at least a pair of mover magnetic poles 61, 62 provided at the mover iron core 50.

According to the embodiment, the stator iron core 10 is provided with sixty (60) slots 11 and the stator coil 30 includes twelve (12) unit coils 20 in each phase of three-phase coil, totaling of thirty-six (36) unit coils 20. Further, according to the embodiment, the mover iron core 50 includes four pairs of mover magnetic poles 61, 62. As explained, according to the embodiment, the rotating electrical machine 100 is an eight (8) pole, sixty (60) slot structured three-phase rotating electrical machine (namely, the three-phase rotating electrical machine having the basic structure of the mover 70 with two magnetic poles and the stator 40 with fifteen slots). The number of slots at each pole and each phase is 2.5. In other words, the rotating electrical machine 100 according to the embodiment is a fractional slot structure type rotating electrical machine with the number of slots per each pole and each slot being fractions with the decimal places of 0.5. Still further, the rotating electrical machine 100 according to the embodiment is a cylindrical rotating electrical machine having a radial void surface in which the stator 40 and the mover 70 are co-axially disposed. Further, the mover 70 is disposed inward of the stator 40 (axial center side of the rotational electric motor 100).

It is assumed here that the movement direction of the mover 70 relative to the stator 40 is defined to be the first direction (X-arrow direction). Further, it is assumed that the depth direction of the slot 11 is defined to be the second direction (Y-arrow direction) and the direction that is orthogonal to both of the first direction and the second direction is defined to be the third direction (Z-arrow direction). In the cylindrical rotating electrical machine, the first direction (X-arrow direction) corresponds to the direction along in the circumferential direction relative to the rotating electrical machine 100 and corresponds to the rotational direction of the mover 70. The second direction (Y-arrow direction) corresponds to the direction along in the radial direction relative to the rotating electrical machine 100 and the third direction (Z-arrow direction) corresponds to the axial line direction relative to the rotating electrical machine 100.

The stator iron core 10 is provided with a plurality of layers of a thin plate electromagnetic steel sheet (for example, a silicon steel sheet) in the third direction (Z-arrow direction). The stator iron core 10 is provided with a back-yoke portion 10*a*, and a plurality of (in the embodiment, sixty (60)) stator magnetic pole portions 10*b* formed integrally with the back-yoke portion 10*a*. The back-yoke portion 10*a* is formed along in the first direction (X-arrow direction) and each stator magnetic pole portion 10*b* is formed to be projecting from the back-yoke portion 10*a* in the second direction (Y-arrow direction) (i.e., axial center direction of the rotating electrical machine 100).

The slots 11 are provided between the mutually adjacently arranged stator magnetic pole portions 10*b*, 10*b* positioned in the first direction (X-arrow direction) and the stator iron core 10 is provided with a plurality of (sixty) slots 11. One pair of slots 11 among the plurality of (sixty) slots 11, is wound by the unit coil 20. As will be explained later, combination of one pair of slots 11, 11 on which the plurality of (twelve in each phase of three-phase coil, totaling of thirty-six) unit coils 20 is wound is different from one another. It is noted that the tip end portion 10*c* of each stator magnetic pole portion 10*b* is formed widely in width direction in the first direction (X-arrow direction).

As shown in FIG. 1, a direction towards the slot bottom portion 11*a* side from the slot opening portion 11*b* side in the second direction (Y-arrow direction) is defined to be the second direction slot bottom portion side (Y1-arrow direction) and opposite direction towards the slot opening portion 11*b* side from the slot bottom portion 11*a* side in the second direction (Y-arrow direction) is defined to be the second direction slot opening portion side (Y2-arrow direction). Further, a portion of the slot 11 which extends in the first direction (X-arrow direction) is defined as a slot central portion 11*c* such that the slot area of the portion in which the stator coil 30 is mounted is approximately evenly divided into two portions in the second direction (Y-arrow direction).

The mover 70 is provided with the mover iron core 50. The mover iron core 50 is formed in a columnar shape being layered in plural layers by a thin plate electromagnetic steel sheet (such as, a silicon steel sheet) in the third direction (Z-arrow direction). The mover iron core 50 is provided with a shaft (not shown) which penetrates the axial center of the mover iron core 50 in the third direction (Z-arrow direction). Both ends of the shaft in the third direction (Z-arrow direction) are rotatably supported on the mover iron core 50 through bearing member (not shown). Therefore, the mover iron core 50 is movable (rotatable) relative to the stator 40.

Four paired mover magnetic poles 61, 62 are embedded in the mover iron core 50. In more detail, a plurality of magnet accommodating portions (not shown) is provided in the mover iron core 50 with an equal interval to one another in the first direction (X-arrow direction). In the plurality of magnet accommodating portions, the permanent magnets corresponding to a predetermined number of pairs of the magnetic poles (in the embodiment, four paired magnetic poles) are embedded. The mover 70 is movable (rotatable) relative to the stator 40 by the magnets and the rotational magnetic field which is generated in the stator 40.

Regarding to the permanent magnet, a well-known ferrite system magnet or the rare earth system magnet can be applicable. Further, the manufacturing method for the magnet is not limited for this invention and for example, as the permanent magnet, the resin bonded magnet or sintered magnet can be applicable for this invention. The resin bonded magnet is for example, formed by mixing the ferrite system raw material magnet powder and resin or the like and casting into the mover iron core 50 by injection or the like. The sintered magnet is for example, formed by press-forming the rare earth system raw material magnet powder in the magnetic field and burning and sintering under a high temperature. It is also noted that the pair of mover magnetic poles 61 and 62 is formed to be a surface magnet shape in which the permanent magnet is provided on the surface (outer circumferential surface) of the mover iron core 50 opposing to the tip end portion 10*c* of each stator magnetic pole portion 10*b*. According to the specification of this application, a mover magnetic pole having one polarity (for example, N-polarity) of one of the pair of mover magnetic poles 61, 62 is indicated as the mover magnetic pole 61 and a mover magnetic pole having the other polarity (for example, S-polarity) of the other one of the pair of mover magnetic poles 61, 62 is indicated as the mover magnetic pole 62.

The stator coil 30 includes a plurality of (twelve in each phase of three-phase coil, totaling of thirty-six) unit coils 20. Each unit coil 20 is formed by winding a conducting body (coil) such as copper and is covered by an insulating layer such as enamel layer on the surface of the conducting body. The shape in cross-section of the unit coil 20 is not limited to any specific shape and any randomly formed cross-section may be acceptable. Various cross sectional conducting bodies (coils), such as for example, a round wire in circular cross section, or polygonal wire in polygonal cross section may be used. Further, a parallel lined fine wire which is formed by the combination of a plurality of finer coil wires may be used for the unit coil 20. When the parallel lined fine wire is used, comparing the use of single wire, the generation of overcurrent loss at the unit coil 20 can be reduced to thereby improve the efficiency of the rotating electrical machine 100. Further, since the force needed for forming the coil can be reduced, the productivity of forming the coil can be improved and the coil can be easily manufactured thereby.

Figure 2:
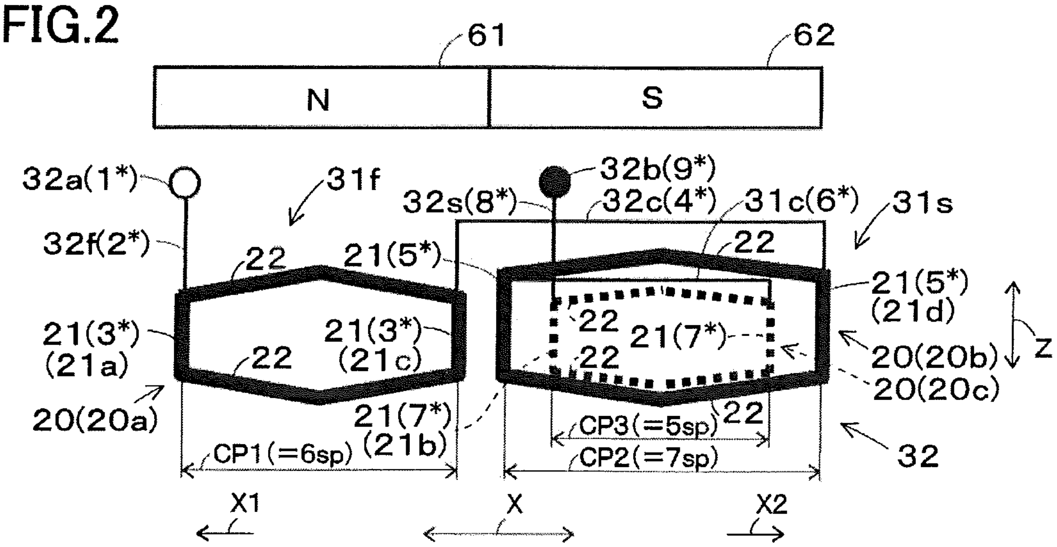
FIG. 2 is a schematic view of an example of structure of the pole paired coil 32 associated with the first embodiment, seen from the slot opening portion 11*b* side in the second direction (Y-arrow direction)

As shown in FIG. 2, each unit coil 20 includes a pair of coil sides 21, 21 and a pair of coil ends 22, 22. Each unit coil 20 is wound between one pair of slots 11, 11 among the plurality of (sixty (60)) slots 11 and the pair of coil sides 21, 21 and the pair of coil ends 22, 22 are formed integrally with each other. The pair of coil sides 21, 21 corresponds to the portion of one unit coil 20 that is accommodated in the pair of slots 11, 11. Further, the pair of coil ends 22, 22 corresponds to the portion of the one unit coil 20 that connects the same side end portions of the pair of coil sides 21, 21. It is noted here that in FIG. 2, three unit coils 20 are illustrated together with one pair of mover magnetic poles 61, 62.

The plurality of (twelve in each phase of three-phase coil, totaling of thirty-six) unit coils 20 included in the stator coil 30 is the slot unit opposing to the pair of mover magnetic poles 61, 62 and is apportioned into a first pole coil 31*f* and a second pole coil 31*s*. The rotating electrical machine 100 according to the embodiment is a three-phase rotating electrical machine with eight (8) poles and sixty (60) slots structure and accordingly, the plurality of (twelve in each phase of three-phase coil, totaling of thirty-six) unit coils 20 is apportioned into the first pole coil 31*f* and the second pole coil 31*s* per unit of fifteen slots.

In concrete, the first pole coil 31*f* includes one unit coil 20 and the one unit coil 20 is referred to as the first unit coil 20*a*. The coil pitch CP1 between the pair of coil sides 21, 21 of the first unit coil 20*a* is set to be the six slot pitches (6 sp). The first unit coil 20*a* is concentrically wound to form the first pole coil 31*f*.

The second pole coil 31*s* includes a plurality of (two) unit coils 20, 20 and the two unit coils 20, 20 are respectively referred to as the second unit coil 20*b* and the third unit coil 20*c*. The coil pitch CP2 between the pair of coil sides 21, 21 of the second unit coil 20*b* is set to be the seven slot pitches (7 sp) and the coil pitch CP3 between the pair of coil sides 21, 21 of the third unit coil 20*c* is set to be the five slot pitches (5 sp). Thus, the values of the coil pitches CP1 through CP3 are different from one another. The second unit coil 20*b* and the third unit coil 20*c* are concentrically wound and are connected with each other in series by a unit coil connecting portion 31*c* thereby to form the second pole coil 31*s*. When the first pole coil 31*f* opposes to one polarity (in FIG. 2, N-pole) of one mover magnetic pole 61 of the pair of magnetic poles 61, 62, the second pole coil 31*s* opposes to the other polarity (in FIG. 2, S-pole) of the other mover magnetic pole 62 of the pair of magnetic poles 61, 62.

The adjacently arranged first pole coil 31*f* and the second pole coil 31*s* opposing to the pair of mover magnetic poles 61, 62 are electrically connected with each other in series to form a pole paired coil 32. The pole paired coil 32 is preferably wound continuously through the pole coil connecting portion 32*c* which leads or guides the winding from the first pole coil 31*f* at the winding start side to the second pole coil 31*s* at the winding end side. Thus, the one unit coil 20 (first unit coil 20*a*) forming the first pole coil 31*f* and the plurality of (two) unit coils 20, 20 (second unit coil 20*b* and third unit coil 20*c*) forming the second pole coil 31*s* are easily connected in series. According to the embodiment, the first unit coil 20*a*, the second unit coil 20*b* and third unit coil 20*c* are connected in series in this order.

Further, it is preferable for each pole paired coil 32 to have a pair of coil leading portions 32*f* and 32*s* formed by a first coil leading portion 32*f* and a second coil leading portion 32*s*. The first coil leading portion 32*f* corresponds to the one unit coil 20 which forms the first pole coil 31*f* and is led out from the one coil side 21 of the winding start unit coil 20 (in the embodiment, first unit coil 20*a*). This coil side 21 is referred to as the first coil side 21*a*. The second coil leading portion 32*s* corresponds to one unit coil 20 which forms the second pole coil 31*s* and is led out from the one coil side 21 of the winding end unit coil 20 (in the embodiment, third unit coil 20*c*). This coil side 21 is referred to as the second coil side 21*b*.

It is noted that the first pole coil 31*f* side coil side 21 connected by the pole coil connecting portion 32*c* is referred to as the third coil side 21*c*. It is also noted that the second coil 31*s* side coil side 21 connected by the pole coil connecting portion 32*c* is referred to as the fourth coil side 21*d*. In the drawing, the order of winding from the winding start portion 32*a* to the winding end portion 32*b* is indicated with the "numeral with symbol *". Since the first pole coil 31*f* and the second pole coil 31*s* are respectively wound concentrically, the pair of coil sides 21, 21 of each unit coil 20 is indicated with the same "numeral with symbol *"

Figure 3:
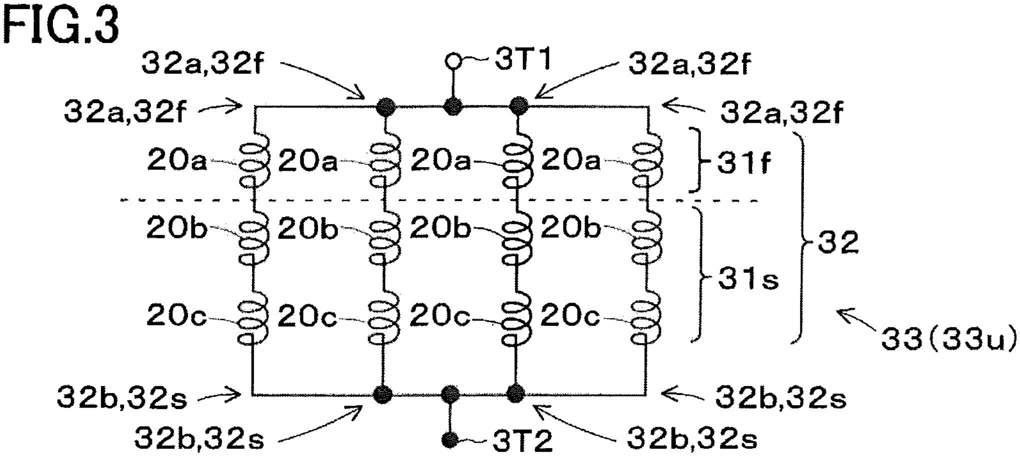
FIG. 3 is a schematic view of an example of structure of U-phase coil 33*u* associated with the first embodiment.

As shown in FIG. 3, the plurality of (four) pole paired coils 32 is electrically connected in parallel via each pair of coil leading portions 32*f*, 32*s* to form the U-phase coil 33*u*. In detail, the winding start portions 32*a* of each pole paired coil 32 are electrically connected to one another and are connected to the first phase terminal 3T1. Further, the winding end portions 32*b* of each pole paired coil 32 are electrically connected to one another and are connected to the second phase terminal 3T2. The V-phase coil 33*v* and the W-phase coil 33*w* are formed similarly to the U-phase coil 33*u*.

The stator coil 30 includes a plurality of (three) phase coils 33 (U-phase coil 33*u*, V-phase coil 33*v* and W-phase coil 33*w*). In other words, the rotating electrical machine 100 according to the embodiment is a three-phase rotating electrical machine and each phase of the U-phase coil 33*u*, the V-phase coil 33*v* and the W-phase coil 33*w* is shifted by the electric angle of 120 degrees. In this specification, the phases of the U-phase coil 33*u*, the V-phase coil 33*v* and the W-phase coil 33*w* are retarded in this order.

As shown in FIG. 2, one direction towards the first pole coil 31*f* side from the second pole coil 31*s* side in the first direction (X-arrow direction) is defined to be the first direction first pole coil side (X1-arrow direction) and the other (opposite) direction towards the second pole coil 31*s* side from the first pole coil 31*f* side in the first direction (X-arrow direction) is defined to be the first direction second pole side (X2-arrow direction). The phase order direction of the three-phase phase coil 33 (U-phase coil 33*u*, V-phase coil 33*v* and W-phase coil 33*w*) is the direction of the first direction second pole coil side (X2-arrow direction).

Figure 4:
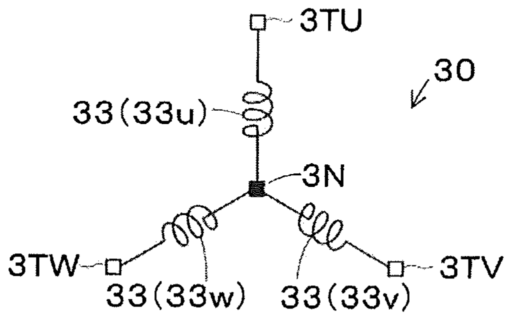
FIG. 4 is a schematic view of an example of structure of three-phase phase-coil 33 (U-phase coil 33*u*, V-phase coil 33*v* and W-phase coil 33*w*) associated with the first embodiment.

As shown in FIG. 4, the three-phase phase coil 33 (U-phase coil 33*u*, V-phase coil 33*v* and W-phase coil 33*w*) can be electrically connected by Y-connection. In FIG. 4, the phase terminal of the U-phase is indicated with the U-phase terminal 3TU, the phase terminal of the V-phase is indicated with the V-phase terminal 3TV and the phase terminal of the W-phase is indicated with the W-phase terminal 3TW. The phase terminal (U-phase terminal 3TU, V-phase terminal 3TV and W-phase terminal 3TW) corresponds to one of the first phase terminal 3T1 and the second phase terminal 3T2 and the center point 3N corresponds to the other of the first phase terminal 3T1 and the second phase terminal 3T2. According to the embodiment and the modified embodiment, the three-phase phase coil 33 (U-phase coil 33*u*, V-phase coil 33*v* and W-phase coil 33*w*) is electrically connected such that the half-coil 23*h*, which will be explained later, is arranged at the phase terminal (U-phase terminal 3TU, V-phase terminal 3TV and W-phase terminal 3TW) side. It is noted here that the three-phase phase coil 33 (U-phase coil 33*u*, V-phase coil 33*v* and W-phase coil 33*w*) is electrically connected by triangle connection.

Figure 5:
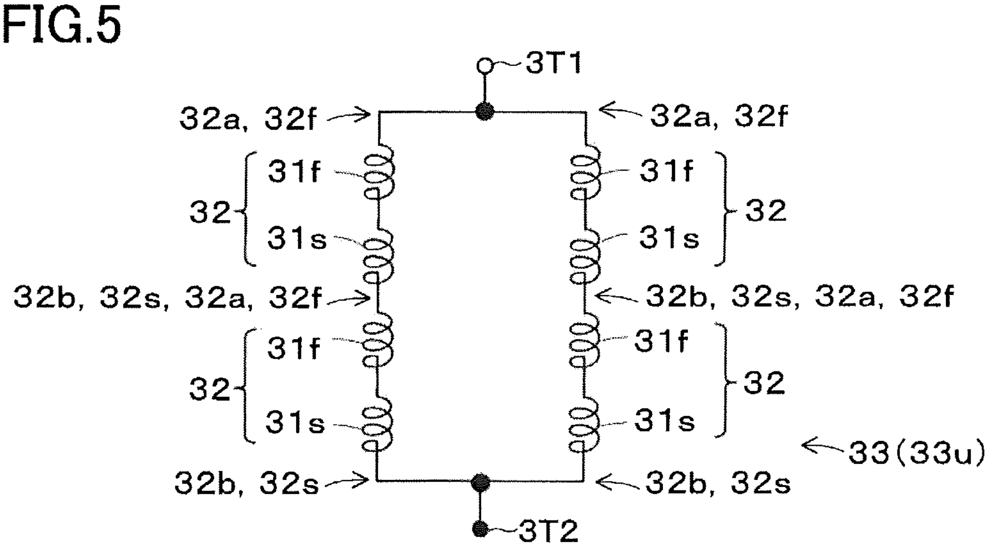
FIG. 5 is a schematic view of another example of structure of U-phase coil 33*u* associated with the first modified embodiment.

Each phase coil 33 can be formed by a plurality of (four) pole paired coils 32 which is connected in series. Further, as shown in FIG. 5, the U-phase coil 33*u* can be connected by arranging a plurality of (two) pole paired coils 32, 32 among the four pole paired coils arranged adjacently or at every other magnetic pole pairs by connecting the two pairs in series in the first direction (X-arrow direction) and the remaining two pole paired coils 32, 32 arranged adjacently or at every other magnetic pole pairs by connecting the two pairs in series in the first direction (X-arrow direction) in parallel (first modified embodiment). The arrangement is applicable to the V-phase phase coil 33*v* and the W-phase phase coil 33*w*. In other words, it can be said that each phase coil 33 includes a plurality of (four) pole paired coil 32 electrically connected by both in-series connection and in parallel connection.

As explained above, the three-phase phase coil 33 (U-phase coil 33*u*, V-phase coil 33*v* and W-phase coil 33*w*) is formed by electrically connected plurality of (four) pole paired coils 32 connected at least by one of the in-series connection and parallel connection. The number of plurality of (four) pole paired coils 32 in each phase coil 33 corresponds to the number of pole pairs of the mover 70. The mover 70 according to the embodiment includes the eight poles and four paired poles. Therefore, each phase coil 33 (U-phase coil 33*u*, V-phase coil 33*v* and W-phase coil 33*w*) is formed by four pole paired coils 32. It is noted that the rotating electrical machine with the mover 70 having two magnetic poles includes each phase coil 33 (U-phase coil 33*u*, V-phase coil 33*v* and W-phase coil 33*w*) formed by one pole paired coil 32.

According to the rotating electrical machine 100 of the embodiment, each pole paired coil 32 is wound in advancing direction continuously through the pole coil connecting portion 32*c* which leads the winding from the first pole coil 31*f* at the winding start side to the second pole coil 31*s* at the winding end side. Thus, the one unit coil 20 (first unit coil 20*a*) forming the first pole coil 31*f* and the plurality of (two) unit coils 20, 20 (second unit coil 20*b* and third unit coil 20*c*) forming the second pole coil 31*s* are connected in series. Accordingly, comparing with the case where the first pole coil 31*f* and the second pole coil 31*s* are connected separately, after concentrically winding the first pole coil 31*f* and the second pole coil 31 respectively, the winding work of the stator coil 30 can be improved. When the plurality of (four) pole paired coils 32 forming the phase coil 33 (U-phase coil 33*u*, V-phase coil 33*v* and W-phase coil 33*w*) is connected in series, it may be possible to form each phase coil 33 by winding the plurality of (four) pole paired coils 32 in advancing direction consecutively.

Further, according to the rotating electrical machine 100 of the embodiment, each pole paired coil 32 includes a pair of coil leading portion 32*f*, 32*s* formed by the first coil leading portion 32*f* and the second coil leading portion 32*s*. Further, in each phase coil 33 (U-phase coil 33*u*, V-phase coil 33*v* and W-phase coil 33*w*), the plurality of (four) pole paired coils 32 forming each phase coil 33 is electrically connected through each pair of coil leading portions 32*f* and 32*s*. Thus, in the rotating electrical machine 100 according to the embodiment, connection between each pole paired coils 32 (particularly, in the case of mixed connection of parallel connection and in-series connection) can be easily made.

(Type of Unit Coil 20)

Figure 6A:
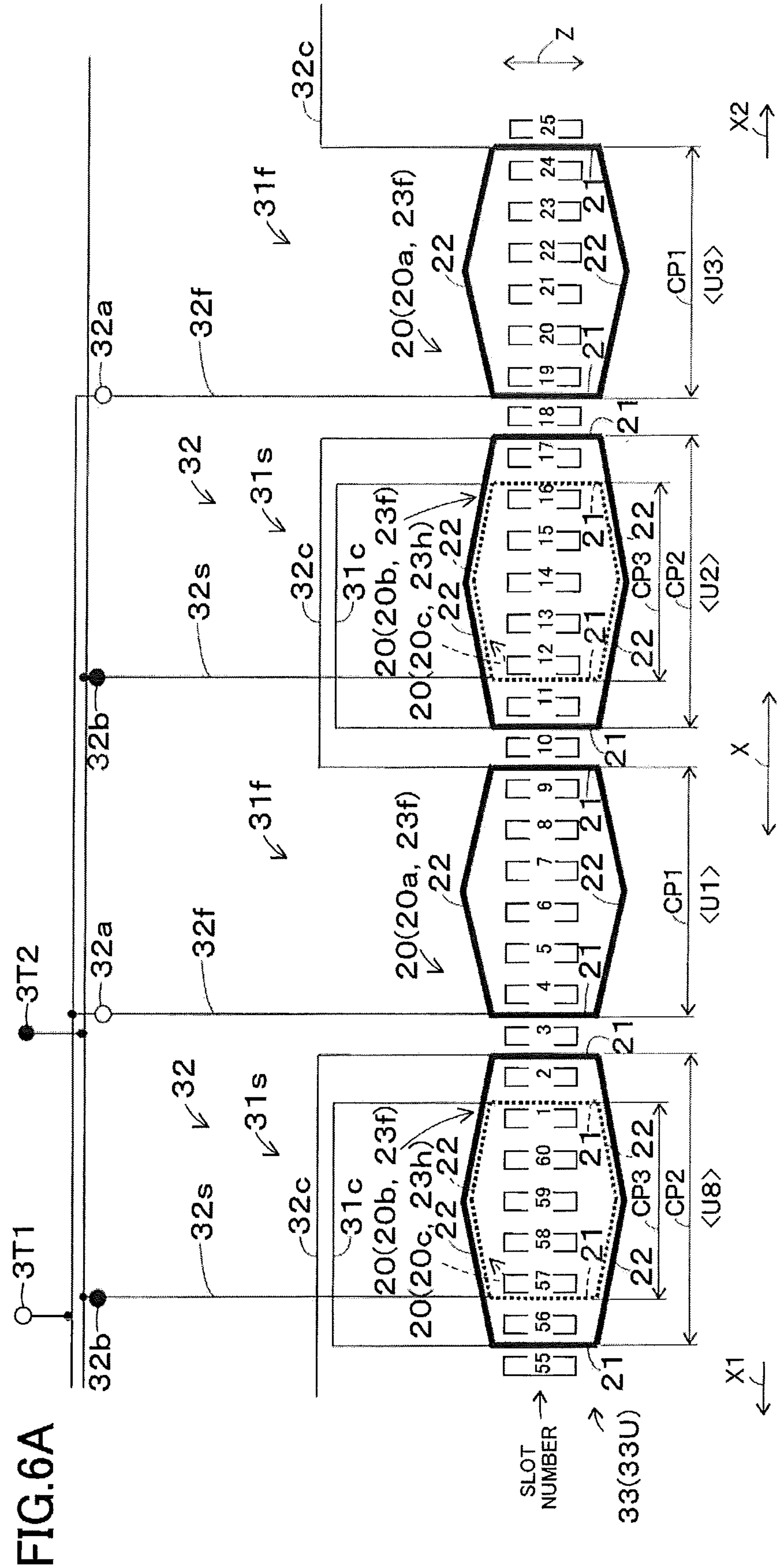
FIG. 6A is a schematic view of an example of connection line structure of the U-phase coil 33*u* associated with the first embodiment, seen from the slot opening portion 11*b* side in the second direction (Y-arrow direction)
Figure 6B:
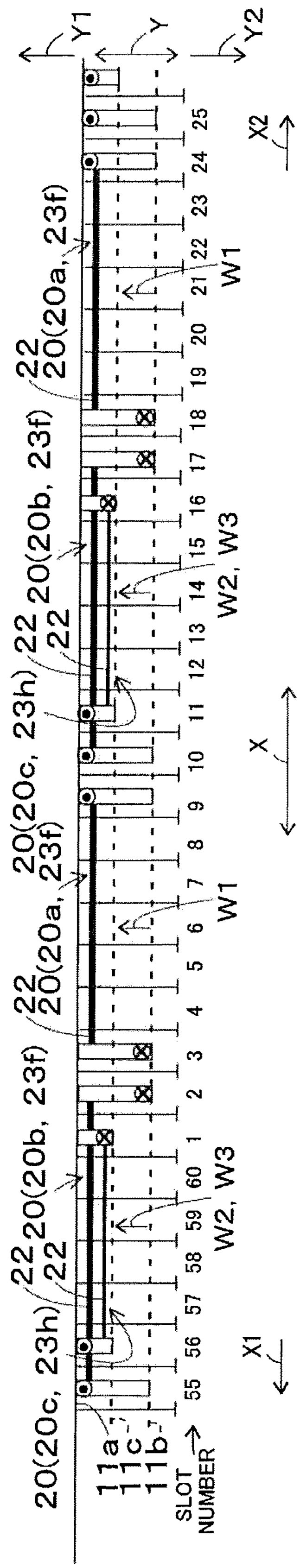
FIG. 6B is a schematic view of the U-phase coil 33*u* indicated in FIG. 6A being mounted in the plurality of slots 11 seen from the pair of coil leading portions 32*f*, 32*s* side in the third direction (Z-arrow direction) associated with the first embodiment.

Next, the type or the kind of unit coil 20 will be explained hereinafter. FIGS. 6A and 6B indicate the state that each pole paired coil 32 forming the U-phase coil 33*u* is mounted in the plurality of slots 11 and each pole paired coil 32 is electrically connected in parallel with one another. According to the state illustrated in FIGS. 6A and 6B, the pole paired coils 32, 32 of the four magnetic poles (two magnetic pole pairs) of the U-phase coil 33*u* are shown. In FIG. 6A, the first pole coil 31*f* and the second pole coil 31*s* are referenced as <U8> and <U1>~<U3> for explanation purpose.

In FIG. 6B, it is noted that the illustration of unit coil connecting portion 31*c*, pole coil connecting portion 32*c* and the pair of coil leading portions 32*f* and 32*s* (first coil leading portion 32*f* and second coil leading portion 32*s*) is omitted. Further, in FIG. 6B, the winding direction of each unit coil 20 is indicated with the symbols “cross in circle” and “dot in circle”. The symbol “cross in circle” means that the coil (coil side 21) is wound in a direction from the front surface side to the back surface side of the paper in the third direction (Z-arrow direction). The symbol “dot in circle” means that the coil (coil side 21) is wound in a direction from the back surface side to the front surface side of the paper in the third direction (Z-arrow direction). The explanations made for the illustration of FIGS. 6A and 6B are the same for the illustrations of FIGS. 7A and 7B. It is also noted that the winding direction of each unit coil 20 is the same as illustrated in the schematic view showing the state that the pole paired coil 32 seen from the pair of coil leading portions 32*f* and 32*s* side in the third direction (Z-arrow direction) is mounted in the plurality of slots 11.

For example, the unit coil 20 (first unit coil 20*a*) illustrated as <U1> in FIG. 6A starts winding from the slot opening portion 11*b* side of slot number 3 from which the first coil leading portion 32*f* is led out. The first unit coil 20*a* starts winding between the pair of slots 11, 11 (slot numbers 3 and 9) and ends the winding at the slot bottom portion 11*a* side of the slot number 9 at the one end side of the pole coil connecting portion 32*c*. The winding advancing direction W1 of the first unit coil 20*a* under this state is the second direction slot bottom portion side (Y1-arrow direction) and the winding direction seen from the winding advancing direction W1 of the first unit coil 20*a* is a counterclockwise direction. The pole coil connecting portion 32*c* is wound from the slot bottom portion 11*a* side of the slot number 9 to the slot opening portion 11*b* side of the slot number 17.

The unit coil 20 (second unit coil 20*b*) illustrated as <U2> starts winding from the slot opening portion 11*b* side of the slot number 17 at the other end side of the pole coil connecting portion 32*c*. The second unit coil 20*b* starts winding between the pair of slots 11, 11 (slot numbers 10 and 17) and ends the winding at the slot bottom portion 11*a* side of the slot number 10 at the one end side of the unit coil connecting portion 31*c*. The winding advancing direction W2 of the second unit coil 20*b* under this situation is the second direction slot bottom portion side (Y1-arrow direction) and the winding direction seen from the winding advancing direction W2 of the second unit coil 20*b* is a clockwise direction. The unit coil connecting portion 31*c* is wound from the slot bottom portion 11*a* side of the slot number 10 to the slot opening portion 11*b* side of the slot number 16.

The unit coil 20 (third unit coil 20*c*) illustrated as <U2> starts winding from the slot central portion 11*c* side of slot number 16 at the other end side of the unit coil connecting portion 31*c*. The third unit coil 20*c* starts winding between the pair of slots 11, 11 (slot numbers 11 and 16) and ends the winding at the slot bottom portion 11*a* side of the slot number 11 from which the second coil leading portion 32*s* is led out. The winding advancing direction W3 of the third unit coil 20*c* under this state is the second direction slot bottom portion side (Y1-arrow direction) and the winding direction seen from the winding advancing direction W3 of the third unit coil 20*c* is a clockwise direction. It is noted that the winding order corresponds to the winding order illustrated in FIG. 2 as the "numeral with symbol f".

Each pole paired coil 32 forming the U-phase coil 33*u* includes two types of unit coil 20, which are the full-coil 23*f* and the half-coil 23*h* with respect to the occupying state of the plurality of slots 11. The first unit coil 20*a* and the second unit coil 20*b* are the type of full-coil 23*f* and the third unit coil 20*c* is the type of half-coil 23*h*. In FIG. 6A, the full-coil 23*f* is illustrated with the solid line hexagonal shape, whereas the half-coil 23*h* is illustrated with the fine broken line hexagonal shape.

The full-coil 23*f* is a unit coil 20 in which a pair of coil sides 21, 21 of one unit coil 20 (for example, first unit coil 20*a*) occupies the entire portion of the pair of slots 11, 11 (slot number 3 and slot number 9) when the pair of coil sides 21, 21 of the one unit coil 20 is accommodated in the pair of slots 11, 11 (for example, slot number 3 and slot number 9). This may be the same with the case when the first unit coil 20*a* is accommodated in the pair of slots 11, 11 (slot numbers 18 and 24) and also is the same with the pole paired coils 32, 32 of non-illustrated remaining four magnetic poles (two magnetic pole pairs).

Further, the above structure is the same with the case of the second unit coil 20*b* and the second unit coil 20*b* occupies the entire portion of the pair of slots 11, 11 (slot numbers 10 and 17). It is also the same with the case where the second unit coil 20*b* is accommodated in the pair of slots 11, 11 (slot numbers 55 and 2) and also is the same with the pole paired coils 32, 32 of non-illustrated remaining four magnetic poles (two magnetic pole pairs).

On the other hand, the half-coil 23*h* in which one of the coil sides 21 of the pair of coil sides 21, 21 of the one unit coil 20 (in the embodiment, the third unit coil 20*c*) occupies the half of the one (slot number 11) of the slots 11 of the pair of slots 11, 11 (for example, slot numbers 11 and 16), when the pair of coil sides 21, 21 of the one unit coil 20 (third unit coil 20*c*) is accommodated in the pair of slots 11, 11. Further, the other of the coil sides 21 of the pair of coil sides 21, 21 occupies the half of the other slot 11 (slot number 16) of the pair of slots 11, 11 (slot numbers 11 and 16). This is the same with the case where the third unit coil 20*c* is accommodated in the pair of slots (slot numbers 56 and 1) and also is the same with the pole paired coils 32, 32 of non-illustrated remaining four magnetic poles (two magnetic pole pairs).

It is noted that in FIG. 6B, the occupying state of the slot 11 is indicated with the size of a rectangular shape. The larger rectangular shape indicates the occupation of the entire slot 11 by the coil side 21 of the full-coil 23*f*. On the other hand, the smaller rectangular shape indicates the occupation of the half of the slot 11 by the coil side 21 of the half-coil 23*h*. These illustrations are the same with the case in which the schematic view indicating the state that the pole paired coil 32 seen from the pair of coil leading portions 32*f* and 32*s* side in the third direction (Z-arrow direction) is accommodated in the plurality of slots 11.

Figure 7A:
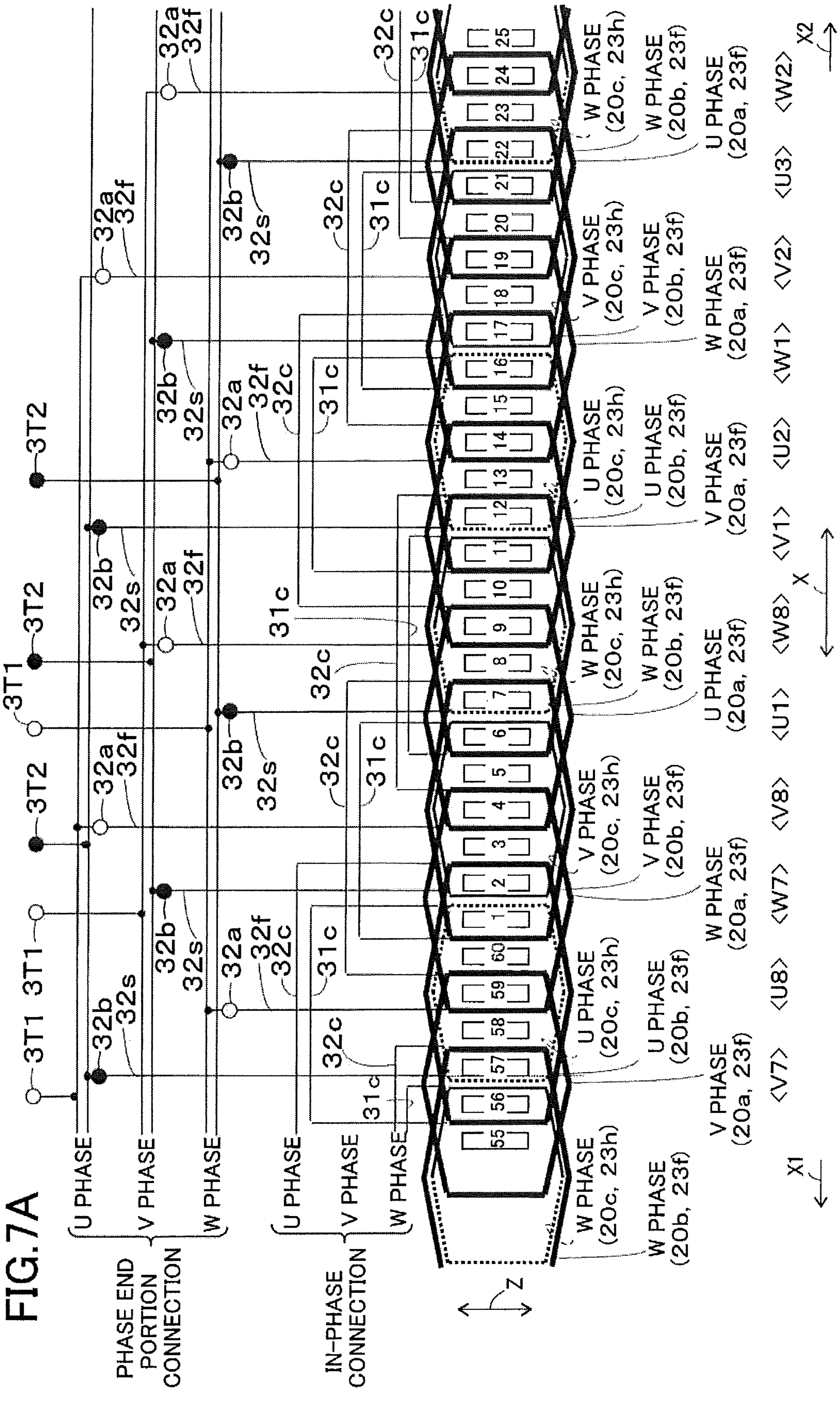
FIG. 7A is a connection line view of an example of connection line of three-phase phase-coil 33 (U-phase coil 33*u*, V-phase coil 33*v* and W-phase coil 33*w*), seen from the slot opening portion 11*b* side in the second direction (Y-arrow direction) associated with the first embodiment.
Figure 7B:
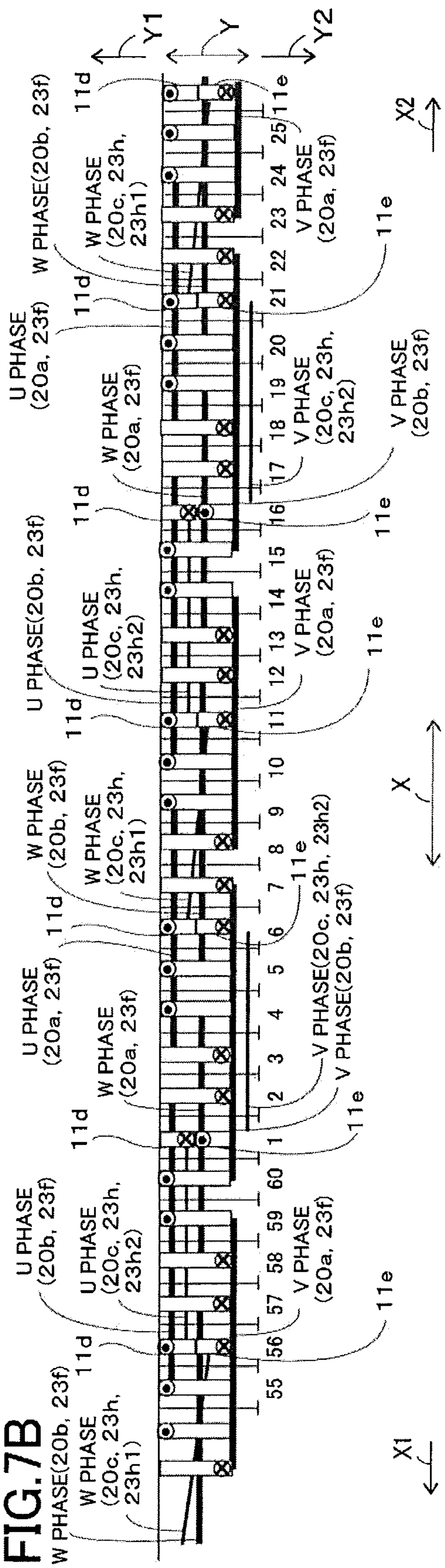
FIG. 7B is a schematic view of the state of three-phase phase-coil 33 shown in FIG. 7A (U-phase coil 33*u*, V-phase coil 33*v* and W-phase coil 33*w*) being mounted in the plurality of slots 11, seen from the pair of coil leading portions 32*f*, 32*s* side in the third direction (Z-arrow direction) associated with the first embodiment.

As shown in FIGS. 7A and 7B, the explanation for each pole paired coil 32 forming the U-phase coil 33*u* can be applicable to the cases of the V-phase coil 33*v* and W-phase coil 33*w*. FIG. 7A is similarly illustrated with FIG. 6A and FIG. 7B is similarly illustrated with FIG. 6B. As explained, each pole paired coil 32 forming the plurality of (three) phase coils 33 (U-phase coil 33*u*, V-phase coil 33*v* and W-phase coil 33*w*) includes two types of unit coil 20, which are, the full-coil 23*f* and the half-coil 23*h* with respect to the occupying state of the plurality of slots 11.

It is noted here that a portion of a slot corresponding to the half thereof occupied by one coil side 21 of the pair of coil sides 21, 21 of the half-coil 23*h* which is arranged at the slot bottom portion 11*a* side is defined to be a first half slot portion 11*d*. Further, it is also noted that a portion of a slot corresponding to the half thereof occupied by the other coil side 21 of the pair of coil sides 21, 21 of the half-coil 23*h* which is arranged at the slot opening portion 11*b* side is defined to be the second half slot portion 11*e*. The half-coil 23*h* of the W-phase coil 33*w* includes both of the first half slot portion 11*d* and the second half slot portion 11*e*. Thus, the half-coil 23*h* which includes both of the first half slot portion 11*d* and the second half slot portion 11*e* is defined to be the both-side occupying half-coil 23*h*1.

On the other hand, the U-phase coil 33*u* has the first half slot portion 11*d* but does not have the second half slot portion 11*e*. The V-phase coil 33*v* has the second half slot portion 11*e* but does not have the first half slot portion 11*d*. The half-coil 23*h* which includes one of the first half slot portion 11*d* and the second half slot portion 11*e* is defined to be the one-side occupying half-coil 23*h*2.

In FIG. 7A, the portion of one of the pair of coil sides 21, 21 and the pair of coil ends 22, 22 of the half-coil 23*h* provided at the slot bottom portion 11*a* side is indicated with the fine broken line. Further, the portions of the pair of coil sides 21, 21 and the pair of coil ends 22, 22 of the half-coil 23*h* provided at the slot opening portion 11*b* side are indicated with the fine solid line. In other words, the half-coil 23*h* of the W-phase coil 33*w* is indicated with both fine solid line and fine broken line in the hexagonal shape. Further, the half-coil 23*h* of the U-phase coil 33*u* is indicated with all fine broken line in the hexagonal shape. Further, the half-coil 23*h* of the V-phase coil 33*v* is indicated with all fine solid line in the hexagonal shape.

(Winding Advancing Direction of Each Unit Coil 20)

Figure 8:
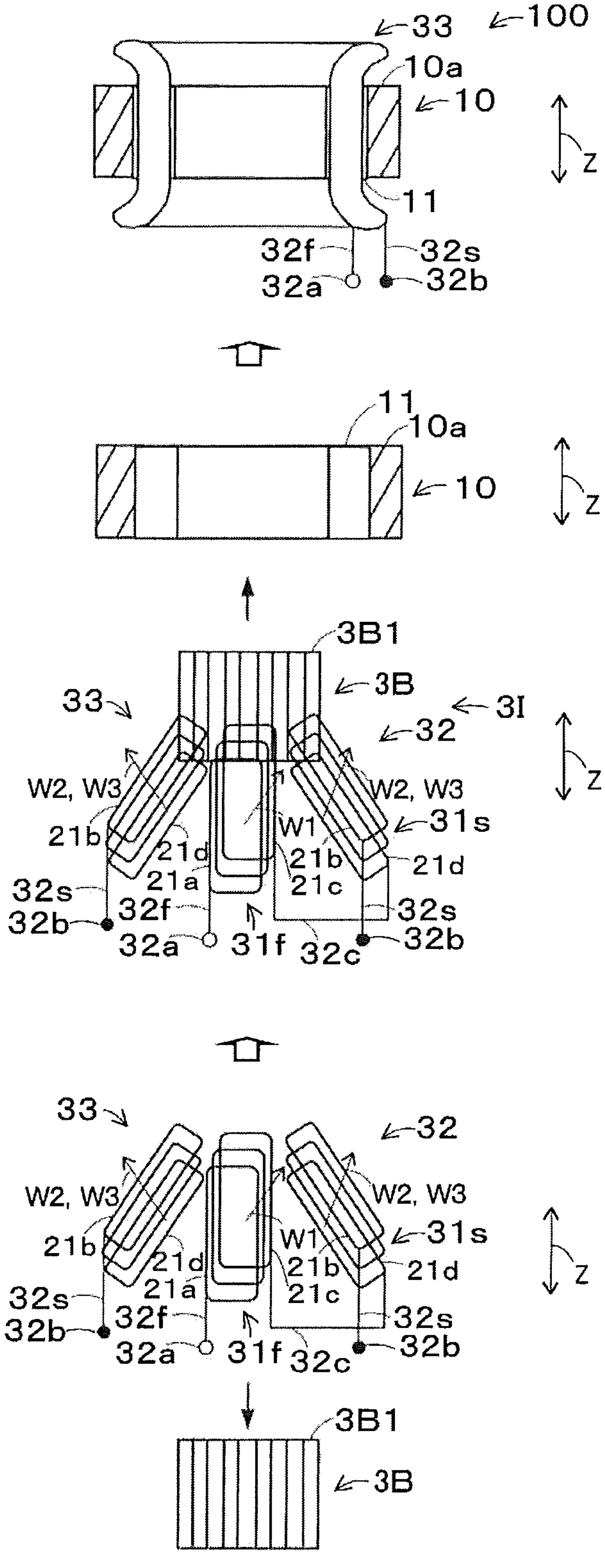
FIG. 8 is a schematic view of one of the three-phase coils 33 (U-phase coil 33*u*, V-phase coil 33*v* and W-phase coil 33*w*) being mounted in the plurality of slots 11 by the coil inserting machine 31 associated with the first embodiment.

First, the method for assembling the stator coil 30 according to the embodiment will be explained, and then the winding advancing direction of each unit coil 20 according to the embodiment will be explained. As shown in FIG. 8, a well-known coil inserting machine (inserting tool) can be used for assembling of the stator coil 30 (mounting in the slot 11). The coil inserting machine 31 can mount, for example, a plurality of (in this embodiment, four) pole paired coils 32 in the plurality of (in this embodiment, twenty-four) slots 11 per phase coil 33 unit (U-phase coil 33*u*, V-phase coil 33*v* and W-phase coil 33*w*).

First, using a bobbin (not shown), each unit coil 20 (first unit coil 20*a*, second unit coil 20*b* and third unit coil 20*c*) forming the plurality of (four) pole paired coils 32 which forms the U-phase coil 33*u* is wound around the bobbin. The winding pitch of the bobbin is set to the pitch corresponding to each coil pitch CP1 through CP3 of each unit coil 20. Each coil pitch CP1 through CP3 of each unit coil 20 is different from one another and accordingly, three types of bobbin are necessary. A plurality of bobbins with different pitch coaxially arranged may be also used.

As shown in FIG. 8, the first pole coil 31*f* taken out from the bobbin is disposed so that the first coil side 21*a* from which the first coil leading portion 32*f* is led out is positioned in the back side of the paper (lower side) and the third coil side 21*c* at the one end side of the pole coil connecting portion 32*c* is positioned in the front side of the paper (upper side). In this situation, the winding direction of the first unit coil 20*a* seen from the winding advancing direction W1 of the first unit coil 20*a* is a counterclockwise direction. Further, the second pole coil 31*s* taken out from the bobbin is disposed so that the fourth coil side 21*d* at the other end of the pole coil connecting portion 32*c* is positioned in the back side of the paper (lower side) and the second coil side 21*b* from which the second coil leading portion 32*s* is led out is positioned in the front side (upper side) of the paper. In this situation, the winding direction of the second unit coil 20*b* seen from the winding advancing direction W2 of the second unit coil 20*b* is a clockwise direction. Similarly, the winding direction of the third unit coil 20*c* seen from the winding advancing direction W3 of the third unit coil 20*c* is a clockwise direction.

As shown in FIG. 8, the coil inserting machine 31 includes an inserter blade 3B which holds the stator coil 30. The inserter blade 3B includes a plurality of supporting portions 3B1 having comb teeth corresponding to the slot pitches between the slots 11, 11. The (four) pole paired coils 32 forming the U-phase coil 33*u* are dropped in the supporting portions 3B1 of the inserter blade 3B and the (four) paired coils 32 forming the U-phase coil 33*u* are held thereon. Then, the inserter blade 3B is inserted inwardly into the stator iron core 10 to have the four pole paired coils 32 forming the U-phase coil 33*u* to be mounted in the slots 11 at one time.

When the first unit coil 20*a* of the pole paired coil 32 is mounted in the slots 11, 11, the winding advancing direction W1 of the first unit coil 20*a* corresponds to the second direction slot bottom portion side (Y1-arrow direction). At this time, the winding direction of the first unit coil 20*a* seen from the winding advancing direction W1 of the first unit coil 20*a* is a counterclockwise direction. Further, when the second unit coil 20*b* of the pole paired coil 32 is mounted in the slots 11, 11, the winding advancing direction W2 of the second unit coil 20*b* corresponds to the second direction slot bottom portion side (Y1-arrow direction). At this time, the winding direction of the second unit coil 20*b* seen from the winding advancing direction W2 of the second unit coil 20*b* is a clockwise direction. Similarly, the winding advancing direction W3 of the third unit coil 20*c* corresponds to the second direction slot bottom portion side (Y1-arrow direction). At this time, the winding direction of the third unit coil 20*c* seen from the winding advancing direction W3 of the third unit coil 20*c* is a clockwise direction. It is noted that the winding start portion 32*a* of each pole paired coil 32 is provided in the slot opening portion 11*b* side and the winding end portion 32*b* of each pole paired coil 32 is provided in the slot bottom portion 11*a* side.

The explanation regarding to the plurality of (four) pole paired coils 32 forming the U-phase coil 33*u* is similar to the plurality of (four) pole paired coils 32 forming the V-phase coil 33*v* and also similar to the plurality of (four) pole paired coils 32 forming the W-phase coil 33*w*. As explained above, in this embodiment, winding advancing directions (W1 arrow direction, W2 arrow direction and W3 arrow direction) of the plurality of (three) unit coils 20 (first unit coil 20*a*, second unit coil 20*b* and third unit coil 20*c*) forming each pole paired coils 32 are the second direction slot bottom portion side direction (Y1-arrow direction).

It is noted here that in this embodiment, as will be explained later, the stator coil 30 is assembled in order of U-phase coil 33*u*, W-phase coil 33*w* and V-phase coil 33*v* and then, wiring and connection between the pole paired coils 32 are performed to thereby form the phase coil 33 (U-phase coil 33*u*, V-phase coil 33*v* and W-phase coil 33*w*). Under this situation, each phase terminal (3TU, 3TV and 3TW) and the central point 3N are connected. Further, after lacing binding of the pair of coil ends 22, 22 of the unit coil 20, the unit coil connecting portion 31*c*, the pole coil connecting portion 32*c* and the pair of coil leading portions 32*f*, 32*s* (first coil leading portion 32*f* and second coil leading portion 32*s*), the stator coil 30 is fixed to the stator iron core 10 by varnish impregnation, resin molding, etc.

According to the rotating electrical machine 100 of the embodiment, each winding advancing direction (W1-arrow direction, W2-arrow direction and W3-arrow direction) of the plurality of (three) unit coils 20 (first unit coil 20*a*, second unit coil 20*b* and third unit coil 20*c*) forming the pole paired coil 32 is the second direction slot bottom portion side (Y1-arrow direction). Therefore, the rotating electrical machine 100 according to the embodiment can mount the plurality of (four) pole paired coils 32 in the plurality of (twenty-four) slots 11, for example, per each phase coil 33 unit (U-phase coil 33*u*, V-phase coil 33*v* and W-phase coil 33*w*) by using the coil inserting machine 31 (inserter tool). In more detail, the plurality of (four) pole paired coils 32 forming the phase coil 33 is dropped in the supporting portion 3B1 of the inserter blade 3B to hold the four pole coils 32 thereby and thus held four pole coils 32 are mounted in each slot 11 at one time thereby to perform installation. In other words, the rotating electrical machine 100 according to the embodiment can maintain the performance of the rotating electrical machine at the same level with a double layered generally used fractional slot structure rotating electrical machine (the installation per each phase coil 33 unit is difficult in this type) and at the same time necessary working labor hour for assembling the stator coil 30 can be shortened.

(Arrangement of Half-Coil 23*h* and a Pair of Coil Leading Portions 32*f*, 32*s*)

Next, a preferable arrangement of the half-coil 23*h* and a pair of coil leading portions 32*f*, 32*s* of the pole paired coil 32 will be explained. The pole paired coil 32 is preferably equipped with the half-coil 23*h* at the second pole coil 31*s*. Under this state, the first coil leading portion 32*f* is preferably led out from the coil side 21 of the first direction first pole coil side (X1-arrow direction) of the unit coil 20 which coil pitch between the pair of coil sides 21, 21 is the minimum among the one or the plurality of unit coils 20 forming the first pole coil 31*f*. Further, the second coil leading portion 32*s* is preferably led out from the coil side 21 of the first direction first pole coil side (X1-arrow direction) of the unit coil 20 which coil pitch between the pair of coil sides 21, 21 is the minimum among the one or the plurality of unit coils 20 forming the second pole coil 31*s*.

Figure 9:
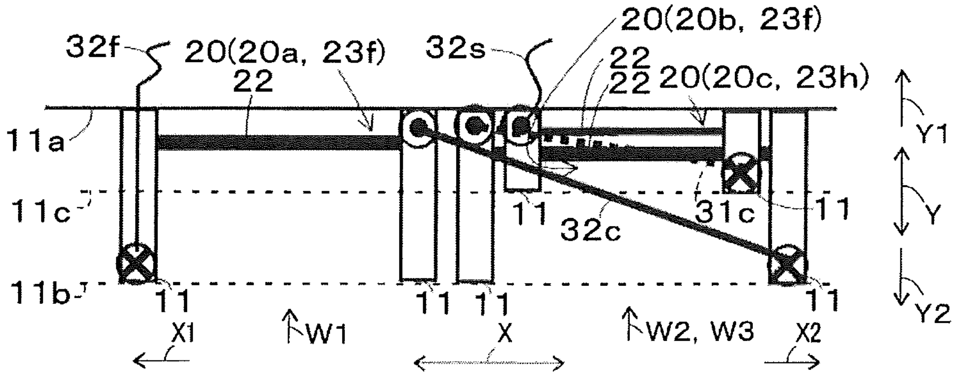
FIG. 9 is a schematic view of the pole paired coil 32 shown in FIG. 2 being mounted in the plurality of (six) slots 11, seen from the pair of coil leading portions 32*f*, 32*s* side in the third direction (Z-arrow direction) associated with the first embodiment.

FIG. 9 is a schematic view of the pole paired coil 32 shown in FIG. 2 being mounted in the plurality of (six) slots 11, seen from the pair of coil leading portions 32*f*, 32*s* side in the third direction (Z-arrow direction). FIG. 9 illustrates similar to the illustrations shown in FIGS. 6B and 7B. However, it is noted that in FIG. 9, the unit coil connecting portion 31*c*, the pole coil connecting portion 32*c* and the pair of coil leading portions 32*f*, 32*s* (first coil leading portion 32*f* and second coil leading portion 32*s*) are illustrated.

As shown in FIGS. 2 and 9, according to this embodiment, each pole paired coil 32 is equipped with the half-coil 23*h* at the second pole coil 31*s*. Further, the first coil leading portion 32*f* is led out from the coil side 21 (first coil side 21*a*) of the first direction first pole coil side (X1-arrow direction) of the one single unit coil 20 (first unit coil 20*a*) which forms the first pole coil 31*f*. Further, the second coil leading portion 32*s* is led out from the coil side 21 (second coil side 21*b*) of the first direction first pole coil side (X1-arrow direction) of the unit coil 20 (third unit coil 20*c*) which coil pitch between the pair of coil sides 21, 21 is the minimum among the plurality of (two) unit coils 20 (second unit coil 20*b* and third unit coil 20*c*) forming the second pole coil 31*s*. It is noted that in FIG. 9, the first coil leading portion 32*f* is led out from the most slot opening portion 11*b* side and the second coil leading portion 32*s* is led out from the most slot bottom portion 11*a* side.

As shown in FIG. 9, according to the embodiment, both of the pole coil connecting portion 32*c* and the unit coil connecting portion 31*c* are not intersecting with the pair of coil leading portions 32*f*, 32*s*. Accordingly, it can easily avoid interference with the adjacent portions thereof. In more detail, these adjacent portions may be led around with a necessary distance assuring for avoiding interference therewith. The necessary distance can be derived from the energization voltage between the adjacent portions at these portions and is set to assure the electric insulation therebetween. These structures can be also applicable to the case where the each connecting wire of the pole paired coil 32 and the pair of coil leading portions 32*f*, 32*s* are not intersecting with each other. It is noted here that the pole coil connecting portion 32*c* can be extended further outside (front side of the paper) of the coil end 22 of the second unit coil 20*b* in the third direction (Z-arrow direction). Further, it is possible to accommodate the unit coil connecting portion 31*c* between the coil ends 22, 22 provided between the second unit coil 20*b* and the third unit coil 20*c*.

Figure 10:
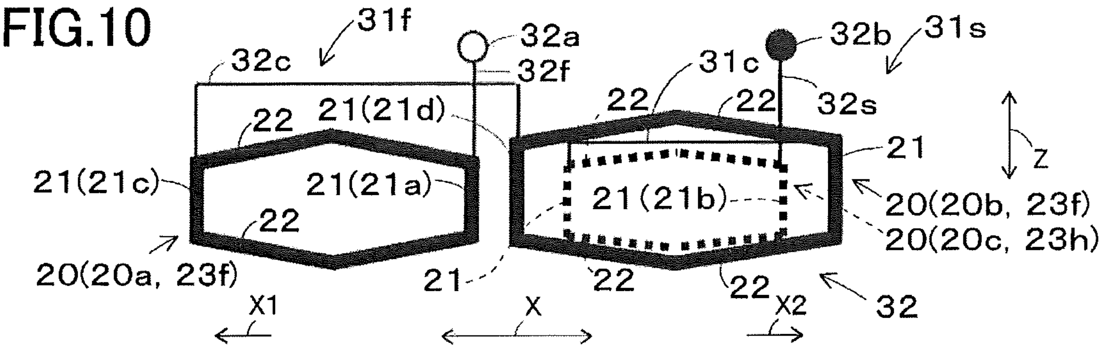
FIG. 10 is a schematic view of an example of structure of the pole paired coil 32 associated with the second modified embodiment, seen from the slot opening portion 11*b* side in the second direction (Y-arrow direction)
Figure 11A:
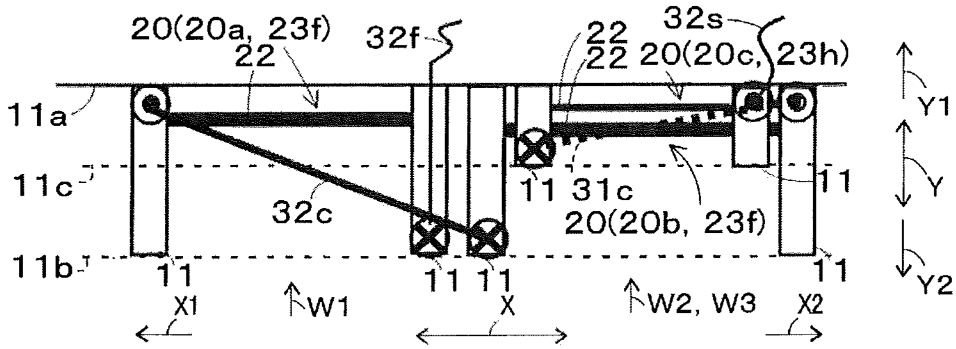
FIG. 11A is a schematic view of an example of the pole paired coil 32 being mounted in the plurality of (six) slots 11 shown in FIG. 10, seen from the pair of coil leading portions 32*f*, 32*s* side in the third direction (Z-arrow direction) associated with the second modified embodiment.

On the other hand, as shown in FIGS. 10 and 11 A and 11B, in the second modified embodiment, the first coil leading portion 32*f* is led out from the coil side 21 (first coil side 21*a*) of the first direction second pole coil side (X2-arrow direction) of the unit coil 20 (first unit coil 20*a*) forming the first pole coil 31*f*. The second coil leading portion 32*s* is led out from the coil side 21 (second coil side 21*b*) of the second direction second pole coil side (X2-arrow direction) of the unit coil 20 (third unit coil 20*c*) which coil pitch between the pair of coil sides 21, 21 is the minimum among the plurality of (two) unit coils 20 (second unit coil 20*b* and third unit coil 20*c*) forming the second pole coil 31*s*. It is noted that in these Figures, the first coil leading portion 32*f* is led out from the most slot opening portion 11*b* side and the second coil leading portion 32*s* is led out from the most slot bottom portion 11*a* side.

In the above modified embodiment, each pole paired coil 32 includes the half-coil 23*h* at the second pole coil 31*s*. The winding advancing direction W1 of the first unit coil 20*a*, the winding advancing direction W2 of the second unit coil 20*b* and the winding advancing direction W3 of the third unit coil 20*c* are the second direction slot bottom portion side (Y1-arrow direction). However, the winding direction of the first unit coil 20*a* seen from the winding advancing direction W1 of the first unit coil 20*a* is a clockwise direction. The winding direction of the second unit coil 20*b* seen from the winding advancing direction W2 of the second unit coil 20*b* is a counterclockwise direction and the winding direction of the third unit coil 20*c* seen from the winding advancing direction W3 of the third unit coil 20*c* is a counterclockwise direction.

According to the modified embodiment, the pole coil connecting portion 32*c* and the first coil leading portion 32*f* are brought into contact with and intersecting with each other. Therefore, in FIG. 11A, the first coil leading portion 32*f* is wound around further outside (front side surface of the paper) of the pole coil connecting portion 32*c* and the coil end 22 of the first unit coil 20*a* in the third direction (Z-arrow direction). In this situation, compared with the embodiment, each pole coil 32 of the modified embodiment is oversized outside in the third direction (Z-arrow direction).

Figure 11B:
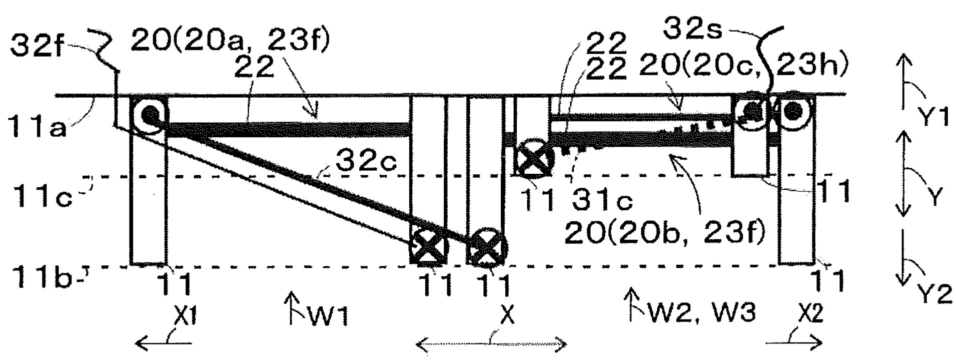
FIG. 11B is a schematic view of another example of the pole paired coil 32 being mounted in the plurality of (six) slots 11 shown in FIG. 10, seen from the pair of coil leading portions 32*f*, 32*s* side in the third direction (Z-arrow direction) associated with the second modified embodiment.

On the other hand, in FIG. 11B, the first coil leading portion 32*f* is wound around along in the wiring direction of the pole coil connecting portion 32*c* and led out from the vicinity of the slot bottom portion 11*a* side portion from which the second coil leading portion 32*s* of adjacently arranged another pole paired coil 32 is led out in order to avoid intersection explained above. Therefore, the first coil leading portion 32*f* and the second coil leading portion 32*s* are arranged adjacently to each other and this arrangement may lead to a reduction of efficiency in wiring work and pole paired coil 32 connecting work.

Figure 12:
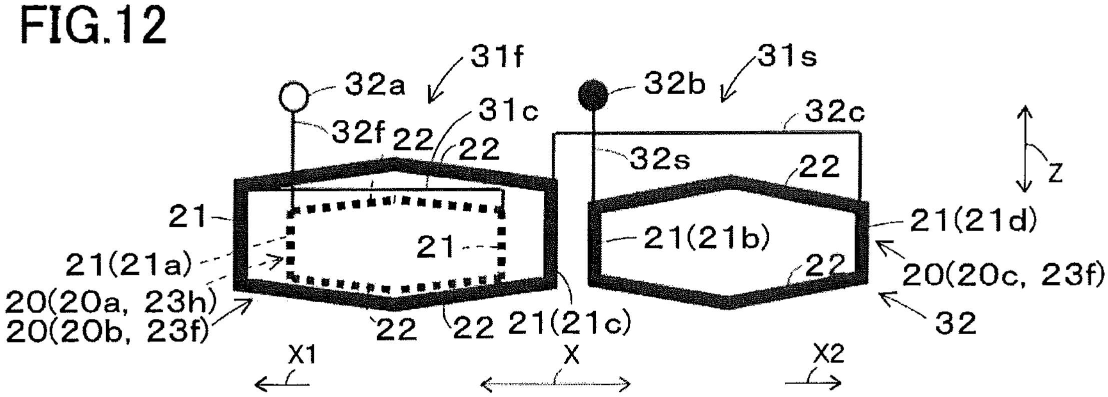
FIG. 12 is a schematic view of an example of structure of the pole paired coil 32 associated with the third modified embodiment, seen from the slot opening portion 11*b* side in the second direction (Y-arrow direction)
Figure 13A:
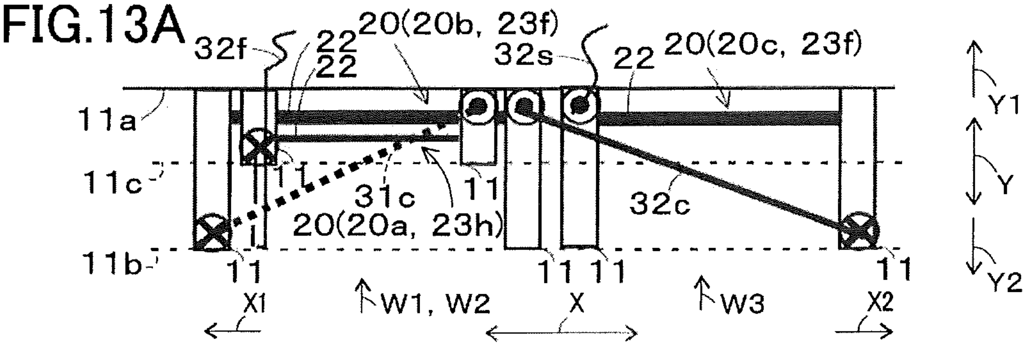
FIG. 13A is a schematic view of an example of the pole paired coil 32 being mounted in the plurality of (six) slots 11 shown in FIG. 12, seen from the pair of coil leading portions 32*f*, 32*s* side in the third direction (Z-arrow direction) associated with the third modified embodiment.
Figure 13B:
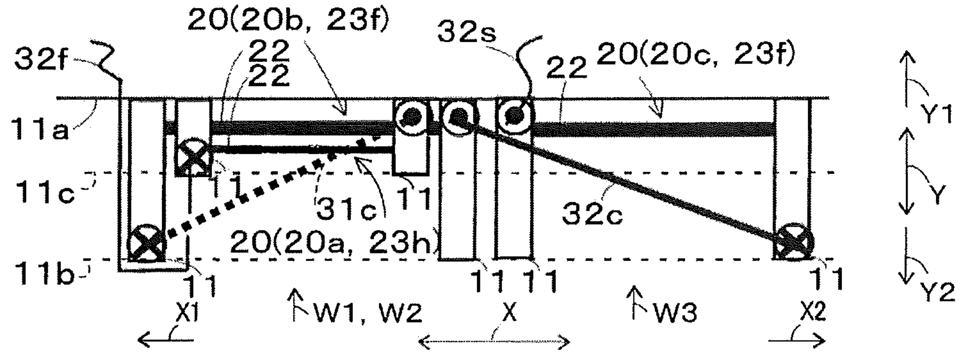
FIG. 13B is a schematic view of another example of the pole paired coil 32 being mounted in the plurality of (six) slots 11 shown in FIG. 12, seen from the pair of coil leading portions 32*f*, 32*s* side in the third direction (Z-arrow direction) associated with the third modified embodiment.

The arrangement of the half-coil 23*h* of the pole paired coil 32 and the pair of coil leading portions 32*f*, 32*s* can be changed as shown in the third modified embodiment. As shown in FIG. 12 and FIGS. 13A and 13B, according to the third modified embodiment, the pole paired coil 32 includes the half-coil 23*h* at the first pole coil 31*f*. The first pole coil 31*f* includes a plurality of (in this modified embodiment, two) unit coils 20 and the two unit coils 20 are the first unit coil 20*a* and the second unit coil 20*b*. The coil pitch between the pair of coil sides 21, 21 of the first unit coil 20*a* is set to be five slot pitches, whereas the coil pitch between the pair of coil sides 21, 21 of the second unit coil 20*b* is set to be seven slot pitches. The first unit coil 20*a* and the second unit coil 20*b* are concentrically wound and connected in series by the unit coil connecting portion 31*c* to form the first pole coil 31*f*.

The second pole coil 31*s* includes one single unit coil 20 and the single unit coil 20 is assumed to be the third unit coil 20*c*. The coil pitch between the pair of coil sides 21, 21 of the third unit coil 20*c* is set to be six slot pitches and the third unit coil 20*c* is wound concentrically and the second pole coil 31*s* is provided at the third unit coil 20*c*. In this modified embodiment, the first unit coil 20*a* is the half-coil 23*h*, whereas the second unit coil 20*b* and the third unit coil 20*c* are the full-coil 23*f*.

The winding advancing direction W1 of the first unit coil 20*a*, the winding advancing direction W2 of the second unit coil 20*b* and the winding advancing direction W3 of the third unit coil 20*c* are all second direction slot bottom portion sides (Y1-arrow direction). Further, the winding direction of the first unit coil 20*a* seen from the winding advancing direction W1 of the first unit coil 20*a* is a counterclockwise direction. The winding direction of the second unit coil 20*b* seen from the winding advancing direction W2 of the second unit coil 20*b* is a counterclockwise direction and the winding direction of the third unit coil 20*c* seen from the winding advancing direction W3 of the third unit coil 20*c* is a clockwise direction.

The first coil leading portion 32*f* is led out from the coil side 21 (first coil side 21*a*) of the first direction first pole coil side (X1-arrow direction) of the unit coil 20 (first unit coil 20*a*) which coil pitch between the pair of coil sides 21, 21 is the minimum among the plurality of (two) unit coils 20 (second unit coil 20*b* and third unit coil 20*c*) forming the first pole coil 311. The second coil leading portion 32*s* is led out from the coil side 21 (second coil side 21*b*) of the first direction first pole coil side (X1-arrow direction) of the unit coil 20 (second unit coil 20*a*) of one single unit coil 20 (third unit coil 20*c*) forming the second pole coil 31*s*. It is noted that in these drawings, the first coil leading portion 32*f* is led out from the slot central portion 11*c* and the second coil leading portion 32*s* is led out from the most slot bottom portion 11*a* side.

According to the modified embodiment, in the first pole coil 31*f*, the first unit coil 20*a* is arranged in the innermost side and the second unit coil 20*b* is arranged outside of the first unit coil 20*a*. The first unit coil 20*a* and the second unit coil 20*b* are wound in series in this order and when the first unit coil 20*a* and the second unit coil 20*b* are assembled into the plurality of slots 11 of the stator iron core 10 by the coil inserting machine 31 (inserter tool), the first coil leading portion 32*f* is led out to the slot opening portion 11*b* side. Accordingly, the unit coil connecting portion 31*c* and the first coil leading portion 32*f* are brought into contact and intersecting with each other. In FIG. 13A, once the first coil leading portion 32*f* is wound around up to the slot opening portion 11*b* in the second direction slot opening portion side (Y2-arrow direction) and thereafter the first coil leading portion 32*f* is wound in the second direction slot bottom portion side (Y1-arrow direction). The first coil leading portion 32*f* once passes through the stator iron core 10 side (back side of the paper) of the third direction (Z-arrow direction) of the unit coil connecting portion 31*c* and wound around further outside (front side of the paper) of the unit coil connecting portion 31*c* and the coil ends 22 of the first and the second unit coils 20*a* and 20*b* in the third direction (Z-arrow direction). In this situation, compared to the embodiment, each pole coil 32 of the modified embodiment is oversized outside in the third direction (Z-arrow direction).

On the other hand, in FIG. 13B, the first coil leading portion 32*f* is wound around such that the first coil leading portion 32*f* avoids interference with the up-right portion of the coil end 22 of the second unit coil 20*b* within approximately the same vertical plane in the third direction (Z-arrow direction). The modified embodiment shown in FIG. 13B can suppress the oversizing in the third direction (Z-arrow direction) compared to the case shown in FIG. 13A. However, according to the structure shown in FIG. 13B, it is necessary to perform wiring work to avoid extending towards the second direction slot opening portion side (Y2-arrow direction) and further, the workability in connecting of the pole paired coil 32 may possibly be worsened.

Figure 14:
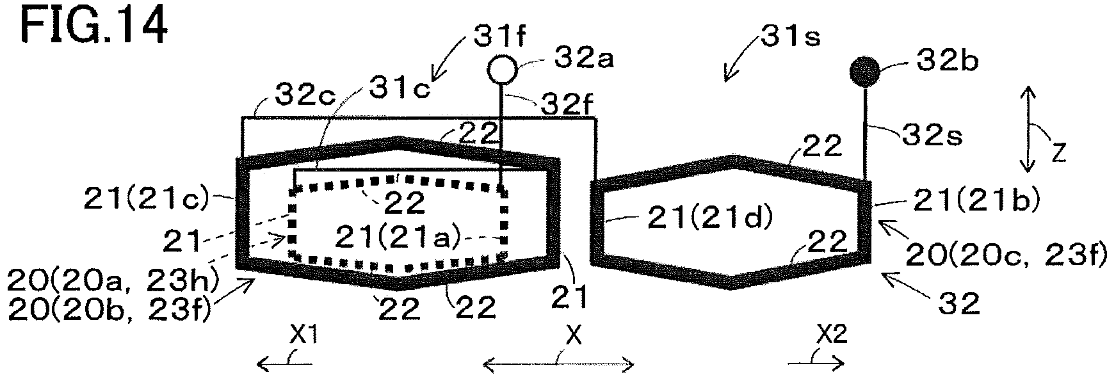
FIG. 14 is a schematic view of an example of structure of the pole paired coil 32 associated with the fourth modified embodiment, seen from the slot opening portion 11*b* side in the second direction (Y-arrow direction)
Figure 15A:
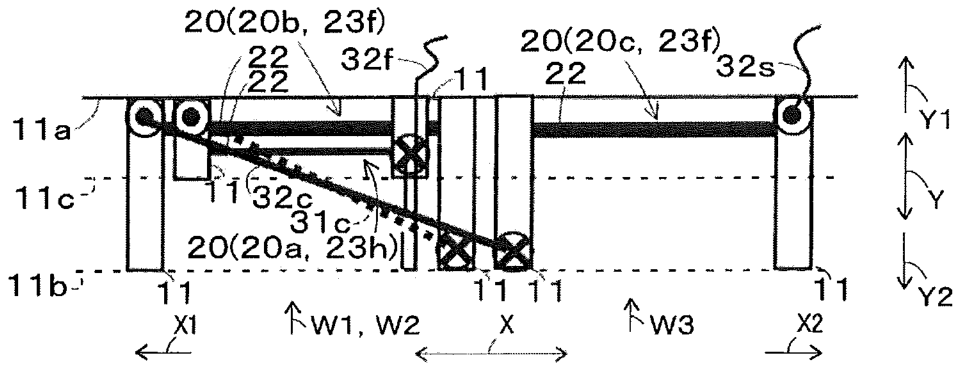
FIG. 15A is a schematic view of an example of the pole paired coil 32 being mounted in the plurality of (six) slots 11 shown in FIG. 14, seen from the pair of coil leading portions 32*f*, 32*s* side in the third direction (Z-arrow direction) associated with the fourth modified embodiment.
Figure 15B:
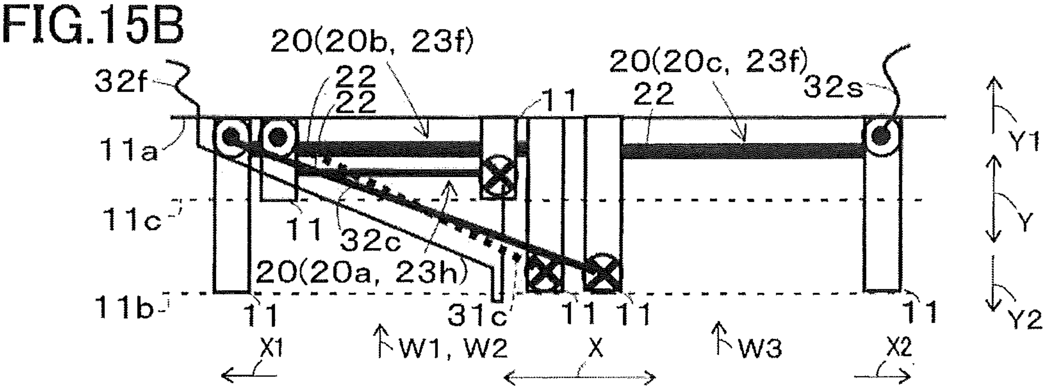
FIG. 15B is a schematic view of another example of the pole paired coil 32 being mounted in the plurality of (six) slots 11 shown in FIG. 14, seen from the pair of coil leading portions 32*f*, 32*s* side in the third direction (Z-arrow direction) associated with the fourth modified embodiment.

Further, the arrangement of the half-coil 23*h* of the pole paired coil 32 and the pair of coil leading portions 32*f*, 32*s* can be changed as shown in the fourth modified embodiment. As shown in FIG. 14 and FIGS. 15A and 15B, according to the fourth modified embodiment, the arrangement of the pair of coil leading portions 32*f*, 32*s* is different from the arrangement shown in the third modified embodiment.

The first coil leading portion 32*f* is led out from the coil side 21 (first coil side 21*a*) of the first direction second pole coil side (X2-arrow direction) of the unit coil 20 (first unit coil 20*a*) which coil pitch between the pair of coil sides 21, 21 is the minimum among the plurality of (two) unit coils 20 (first unit coil 20*a* and second unit coil 20*b*) forming the first pole coil 31*f*. The second coil leading portion 32*s* is led out from the coil side 21 (second coil side 21*b*) of the first direction second pole coil side (X2-arrow direction) of the unit coil 20 (third unit coil 20*c*) of one unit coil 20 (third unit coil 20*c*) forming the second pole coil 31*s*. It is noted that in these drawings, the first coil leading portion 32*f* is led out from the slot central portion 11*c* and the second coil leading portion 32*s* is led out from the most slot bottom portion 11*a* side.

It is noted that each pole paired coil 32 includes the half-coil 23*h* at the first pole coil 31*f*. Further, the winding advancing direction W1 of the first unit coil 20*a*, the winding advancing direction W2 of the second unit coil 20*b* and the winding advancing direction W3 of the third unit coil 20*c* are the second direction slot bottom portion side (Y1-arrow direction). Further, the winding direction of the first unit coil 20*a* seen from the winding advancing direction W1 of the first unit coil 20*a* is a clockwise direction, the winding direction of the second unit coil 20*b* seen from the winding advancing direction W2 of the second unit coil 20*b* is a clockwise direction and the winding direction of the third unit coil 20*c* seen from the winding advancing direction W3 of the third unit coil 20*c* is a counterclockwise direction.

According to the modified embodiment, the pole coil connecting portion 32*c* and the first coil leading portion 32*f* are brought into contact and intersecting with each other, and the unit coil connecting portion 31*c* and the first coil leading portion 32*f* are brought into contact and intersecting with each other. In FIG. 15A, once the first coil leading portion 32*f* is wound around up to the slot opening portion 11*b* in the second direction slot opening portion side (Y2-arrow direction) and thereafter wound in the second direction slot bottom portion side (Y1-arrow direction). The first coil leading portion 32*f* once passes through the stator iron core 10 side (back side of the paper) of the third direction (Z-arrow direction) of the unit coil connecting portion 31*c* and wound around further outside (front side of the paper) of the unit coil connecting portion 31*c* and the pole coil connecting portion 32*c* and the coil ends 22 of the first and the second unit coils 20*a* and 20*b* in the third direction (Z-arrow direction). In this situation, compared to the embodiment, each pole coil 32 of the modified embodiment is oversized outside in the third direction (Z-arrow direction).

On the other hand, in FIG. 15B, the first coil leading portion 32*f* is wound around along in the wiring direction of the pole coil connecting portion 32*c* and the unit coil connecting portion 31*c* in order to avoid the intersection explained above and led out from the vicinity of slot bottom portion 11*a* side portion from which the second coil leading portion 32*s* of adjacently arranged another pole paired coil 32 is led out. Therefore, the first coil leading portion 32*f* and the second coil leading portion 32*s* are arranged adjacently to each other and this arrangement may lead to a reduction of efficiency in wiring work and connecting work of the pole paired coil 32.

According to the rotating electrical machine 100 of the embodiment, the pole paired coil 32 includes the half-coil 23*h* at the second pole coil 31*s*. Further, the first coil leading portion 32*f* is led out from the coil side 21 (first coil side 21*a*) of the first direction first pole coil side (X1-arrow direction) of one single unit coil 20 (first unit coil 20*a*) forming the first pole coil 31*f*. Further, the second coil leading portion 32*s* is led out from the coil side 21 (second coil side 21*b*) of the first direction first coil side (X1-arrow direction) of the unit coil 20 (third unit coil 20*c*) which coil pitch between the pair of coil sides 21, 21 is the minimum among the plurality of (two) unit coils 20 (second unit coil 20*b* and third unit coil 20*c*) forming the second pole coil 31*s*.

Thus, either of the pole coil connecting portion 32*c* and the unit coil connecting portion 31*c* is not intersecting with the pair of coil leading portions 32*f*, 32*s*. Accordingly, as a result, comparing the arrangement illustrated in the modified embodiments (second modified embodiment to fourth modified embodiment) in which at least one of the arrangements of the half-coil 23*h* in the pole paired coil 32 and the pair of coil leading portions 32*f*, 32*s* is different from the embodiment, the coil end 22 at the pair of coil leading portions 32*f*, 32*s* of the pole paired coil 32 in the third direction (Z-arrow direction) can be reduced in size and the wiring arrangement thereof can be simplified. These advantageous effects can be similarly achieved, comparing to the modified embodiments in which each of the winding advancing directions of plurality of unit coils 20 forming the pole paired coil 32 is the second direction slot opening portion side (Y2-arrow direction).

Figure 16:
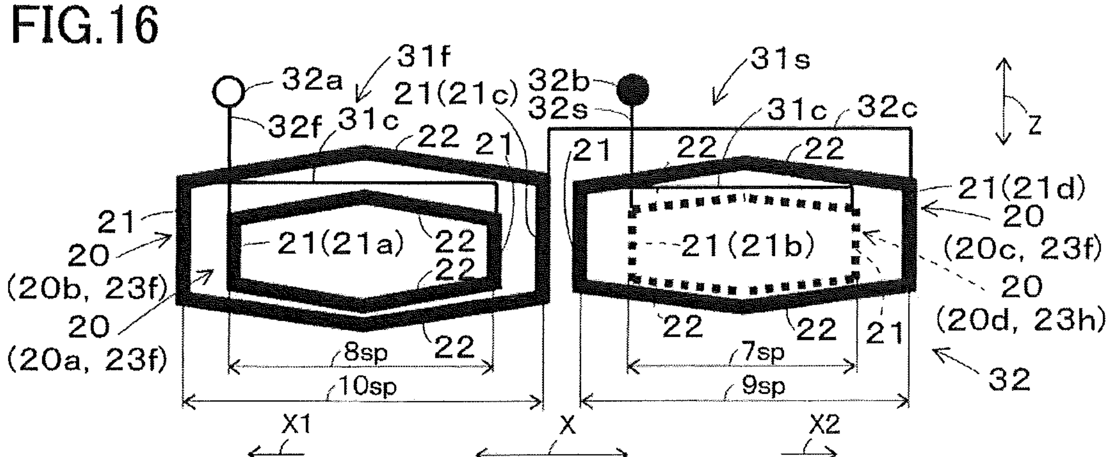
FIG. 16 is a schematic view of an example of structure of the pole paired coil 32 seen from the slot opening 11*b* side in the second direction (Y-arrow direction) associated with the fifth modified embodiment.
Figure 17:
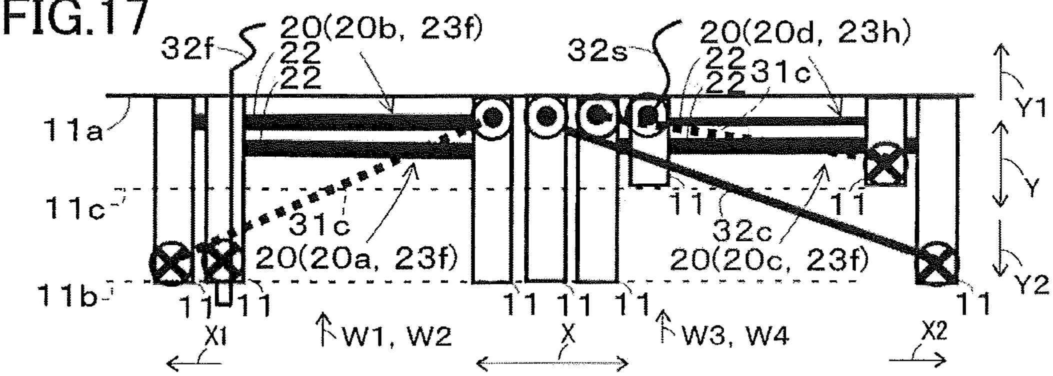
FIG. 17 is a schematic view of an example of the pole paired coil 32 being mounted in the plurality of (eight) slots 11 shown in FIG. 16, seen from the pair of coil leading portions 32*f*, 32*s* side in the third direction (Z-arrow direction) associated with the fifth modified embodiment.

Regarding to the arrangement of the half-coil 23*h* and the pair of coil leading portions 32*f*, 32*s* in the pole paired coil 32, the same tendency is seen with the case that the number of slots per every pole and every phase is 3.5. The rotating electrical machine 100 of the fifth modified embodiment is the three-phase rotating electrical machine with eight poles and eighty-four (84) slots structure having the number of slots per every pole and every phase being 3.5. As shown in FIGS. 16 and 17, the first pole coil 31*f* includes a plurality of (in this modified embodiment, two) unit coils 20 and the two of the unit coils 20, 20 are the first unit coil 20*a* and the second unit coil 20*b*. The coil pitch of the first unit coil 20*a* between the pair of coil sides 21, 21 is set to be 8 (8 sp) slot pitches and the coil pitch of the second unit coil 20*b* between the pair of coil sides 21, 21 is set to be 10 (10 sp) slot pitches. The first unit coil 20*a* and the second unit coil 20*b* are wound concentrically and arranged in series by the unit coil connecting portion 31*c* to form the first pole coil 31*f*.

The second pole coil 31*s* includes a plurality of (in this modified embodiment, two) unit coils 20 and the two of the unit coils 20, 20 are the third unit coil 20*c* and the fourth unit coil 20*d*. The coil pitch of the third unit coil 20*c* between the pair of coil sides 21, 21 is set to be 9 (9 sp) slot pitches and the coil pitch of the fourth unit coil 20*d* between the pair of coil sides 21, 21 is set to be 7 (7 sp) slot pitches. The third unit coil 20*c* and the fourth unit coil 20*d* are wound concentrically and arranged in series by the unit coil connecting portion 31*c* to form the second pole coil 31*s*.

According to the modified embodiment, the fourth unit coil 20*d* is the half-coil 23*h* and the first unit coil 20*a*, the second unit coil 20*b* and the third unit coil 20*c* are the full-coils 23*f*. In other words, according to the modified embodiment, the pole paired coil 32 includes the half-coil 23*h* at the second pole coil 31*s*.

The winding advancing direction W1 of the first unit coil 20*a*, the winding advancing direction W2 of the second unit coil 20*b*, the winding advancing direction W3 of the third unit coil 20*c* and the winding advancing direction W4 of the fourth unit coil 20*d* are all second direction slot bottom portion sides (Y1-arrow direction). Further, the winding direction of the first unit coil 20*a* seen from the winding advancing direction W1 of the first unit coil 20*a* is a counterclockwise direction, the winding direction of the second unit coil 20*b* seen from the winding advancing direction W2 of the second unit coil 20*b* is a counterclockwise direction and the winding direction of the third unit coil 20*c* seen from the winding advancing direction W3 of the third unit coil 20*c* is a clockwise direction. Further, the winding direction of the fourth unit coil 20*d* seen from the winding advancing direction W4 of the fourth unit coil 20*d* is a clockwise direction.

The first coil leading portion 32*f* is led out from the coil side 21 (first coil side 21*a*) of the first direction first pole coil side (X1-arrow direction) of the unit coil 20 (first unit coil 20*a*) which coil pitch between the pair of coil sides 21, 21 is the minimum among the plurality of (two) unit coils 20 (first unit coil 20*a* and second unit coil 20*b*) forming the first pole coil 31*f*. The second coil leading portion 32*s* is led out from the coil side 21 (second coil side 21*b*) of the first direction first pole coil side (X1-arrow direction) of the unit coil 20 (fourth unit coil 20*d*) which coil pitch between the pair of coil sides 21, 21 is the minimum among the plurality of (two) unit coils 20 (third unit coil 20*c* and fourth unit coil 20*d*) forming the second pole coil 31*s*. It is noted that in FIG. 17, the first coil leading portion 32*f* is led out from the most slot opening portion 11*b* side and the second coil leading portion 32*s* is led out from the most slot bottom portion 11*a* side.

As shown in FIG. 17, according to the modified embodiment, the first coil leading portion 32*f* somewhat extends over in the second direction slot opening portion side (Y2-arrow direction). The first coil leading portion 32*f* is wound around further outside (front side of the paper) of the unit coil connecting portion 31*c* and the coil end 22 of the first unit coil 20*a* and the second unit coil 20*b* in the third direction (Z-arrow direction) towards the second direction slot bottom portion side (Y1-arrow direction).

It is noted here that the unit coil connecting portion 31*c* of the first pole coil 31*f* can be accommodated between the coil ends 22, 22 provided between the first unit coil 20*a* and the second unit coil 20*b*. Further, the unit coil connecting portion 31*c* of the second pole coil 31*s* can be accommodated between the coil ends 22, 22 provided between the third unit coil 20*c* and the fourth unit coil 20*d*. Further, the pole coil connecting portion 32*c* can be extended further outside (front side of the paper) of the coil end 22 of the third unit coil 20*c* in the third direction (Z-arrow direction).

Figure 18:
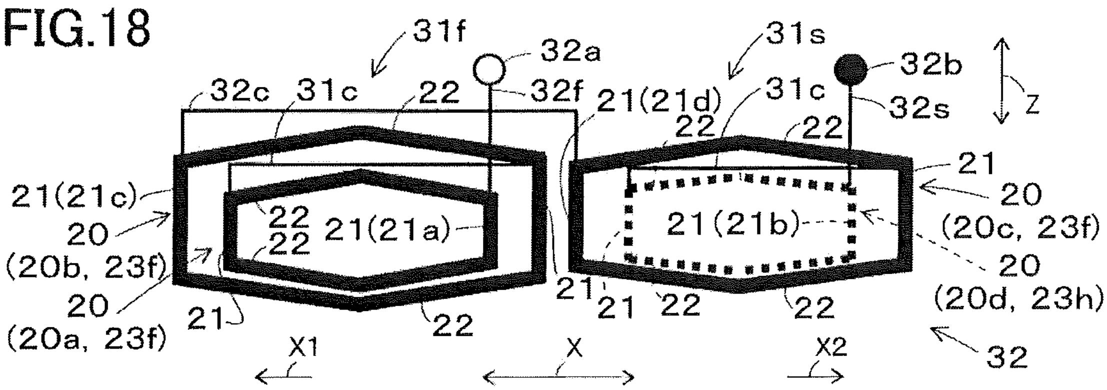
FIG. 18 is a schematic view of an example of structure of the pole paired coil 32 seen from the slot opening portion 11*b* side in the second direction (Y-arrow direction) associated with the sixth modified embodiment.
Figure 19A:
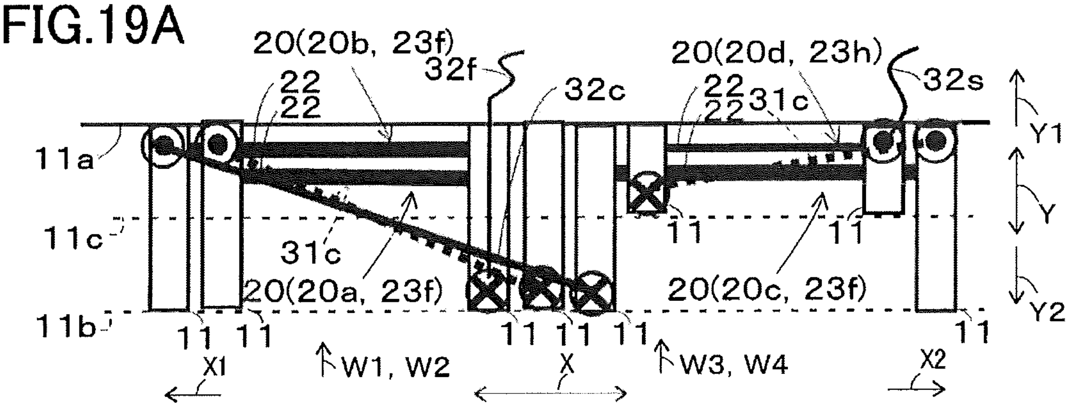
FIG. 19A is a schematic view of an example of the pole paired coil 32 being mounted in the plurality of (eight) slots 11 shown in FIG. 18, seen from the pair of coil leading portions 32*f*, 32*s* side in the third direction (Z-arrow direction) associated with the sixth modified embodiment.
Figure 19B:
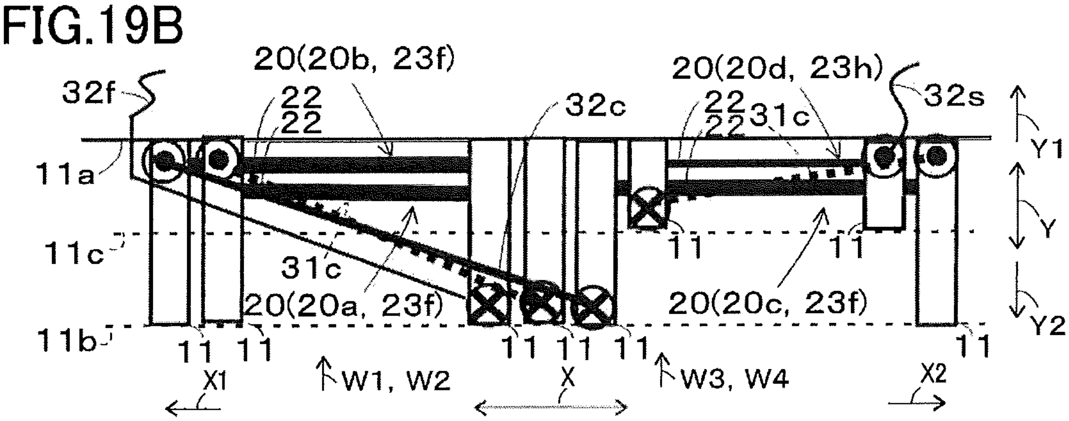
FIG. 19B is a schematic view of another example of the pole paired coil 32 being mounted in the plurality of (eight) slots 11 shown in FIG. 18, seen from the pair of coil leading portions 32*f*, 32*s* side in the third direction (Z-arrow direction) associated with the sixth modified embodiment.

The arrangement of the pair of coil leading portions 32*f*, 32*s* of the pole paired coil 32 can be changed to the arrangement shown in the sixth modified embodiment. As shown in FIG. 18 and FIGS. 19A and 19B, according to the sixth modified embodiment, compared to that of the fifth modified embodiment, the arrangement of the pair of coil leading portions 32*f*, 32*s* is different. The arrangement of the half-coil 23*h* of the pole paired coil 32 is the same with the arrangement in the fifth modified embodiment (half-coil 23*h* is provided at the second pole coil 31*s*).

The first coil leading portion 32*f* is led out from the coil side 21 (first coil side 21*a*) of the first direction second pole coil side (X2-arrow direction) of the unit coil 20 (first unit coil 20*a*) which coil pitch between the pair of coil sides 21, 21 is the minimum among the plurality of (two) unit coils 20 (first unit coil 20*a* and second unit coil 20*b*) forming the first pole coil 31*f*. The second coil leading portion 32*s* is led out from the coil side 21 (second coil side 21*b*) of the first direction second pole coil side (X2-arrow direction) of the unit coil 20 (fourth unit coil 20*d*) which coil pitch between the pair of coil sides 21, 21 is the minimum among the plurality of (two) unit coils 20 (third unit coil 20*c* and fourth unit coil 20*d*) forming the second pole coil 31*s*. It is noted that in these drawings, the first coil leading portion 32*f* is led out from the most slot opening portion 11*b* side and the second coil leading portion 32*s* is led out from the most slot bottom portion 11*a* side.

The winding advancing direction W1 of the first unit coil 20*a*, the winding advancing direction W2 of the second unit coil 20*b*, the winding advancing direction W3 of the third unit coil 20*c* and the winding advancing direction W4 of the fourth unit coil 20*d* are all second direction slot bottom portion sides (Y1-arrow direction). This is the same with the structure of fifth modified embodiment. However, the winding direction of the first unit coil 20*a* seen from the winding advancing direction W1 of the first unit coil 20*a* is a clockwise direction, the winding direction of the second unit coil 20*b* seen from the winding advancing direction W2 of the second unit coil 20*b* is a clockwise direction and the winding direction of the third unit coil 20*c* seen from the winding advancing direction W3 of the third unit coil 20*c* is a counterclockwise direction. Further, the winding direction of the fourth unit coil 20*d* seen from the winding advancing direction W4 of the fourth unit coil 20*d* is a counterclockwise direction.

According to the modified embodiment, the pole coil connecting portion 32*c* and the first coil leading portion 32*f* are brought into contact with and intersecting with each other and the unit coil connecting portion 31*c* and the first coil leading portion 32*f* are brought into contact with and intersecting with each other. In FIG. 19A, the first coil leading portion 32*f* is wound around further outside (front side of the paper) of the pole coil connecting portion 32*c* and the unit coil connecting portion 31*c* and the coil ends 22 of the first unit coil 20*a* and the second unit coil 20*b* in the third direction (Z-arrow direction), extending towards the second direction slot bottom portion side (Y1-arrow direction). In this situation, compared to the fifth modified embodiment, each pole coil 32 is oversized outside in the third direction (Z-arrow direction).

On the other hand, in FIG. 19B, the first coil leading portion 32*f* is wound around along in the wiring direction of the pole coil connecting portion 32*c* in order to avoid the intersection explained above and is led out from the vicinity of slot bottom portion 11*a* side portion from which the second coil leading portion 32*s* of adjacently arranged another pole paired coil 32 is led out. Therefore, the first coil leading portion 32*f* and the second coil leading portion 32*s* are arranged adjacently to each other and this arrangement may lead to a reduction of efficiency in wiring work and connecting work of the pole paired coil 32.

Accordingly, comparing the pole paired coil 32 of the fifth modified embodiment with that of sixth modified embodiment, the coil ends 22 of the pair of coil leading portions 32*f*, 32*s* side in the third direction (Z-arrow direction) can be reduced in size and the wiring arrangement thereof can be simplified. These advantageous effects can be similarly achieved by the modified embodiments in which the arrangement of the half-coil 23*h* in the pole paired coil 32 is changed (arrangement in which the half-coil 23*h* is provided in the first pole coil 31*f*). Regarding to the arrangement of the half-coil 23*h* and the pair of coil leading portions 32*f*, 32*s* of the pole paired coil 32, the structure with the number of slots per every pole and every phase being 4.5 or more has the similar tendency.

In the embodiment, the number of slots per every pole and every phase is 2.5 and the pole paired coil 32 has three unit coils 20 (first unit coil 20*a*, second unit coil 20*b* and third unit coil 20*c*). The first unit coil 20*a* and the second unit coil 20*b* are the full-coils 23*f* and the third unit coil 20*c* is the half-coil 23*h*. Accordingly, another modified embodiment in which the half-coil 23*h* is provided at one of the first pole coil 31*f* and the second pole coil 31*s* and only the full-coil 23*f* is provided at the other of the first pole coil 31*f* and the second pole coil 31*s* can be implemented according to the invention.

Figure 20:
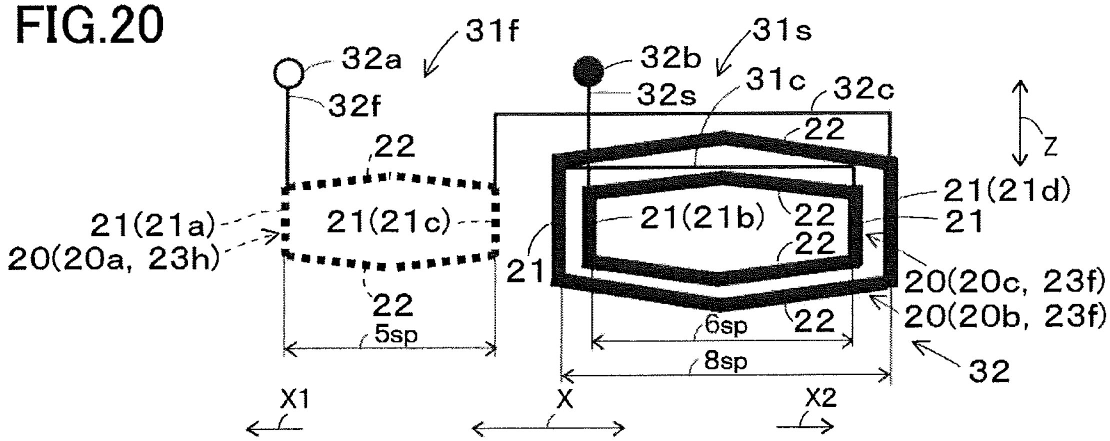
FIG. 20 is a schematic view of an example of structure of the pole paired coil 32, seen from the slot opening portion 11*b* side in the second direction (Y-arrow direction) associated with the seventh modified embodiment.

As shown in FIG. 20, according to the seventh modified embodiment, each pole paired coil 32 includes only the half-coil 23*h* at the first pole coil 31*f* and only the full-coil 23*f* at the second pole coil 31*s*. In detail, the first pole coil 31*f* has one unit coil 20 and the one unit coil 20 is defined to be the first unit coil 20*a*. The coil pitch between the pair of coil sides 21, 21 of the first unit coil 20*a* is set to be 5 slot pitches (5 sp). The first unit coil 20*a* is wound concentrically to form the first pole coil 31*f*. The first unit coil 20*a* is the half-coil 23*h*.

The second pole coil 31*s* has a plurality of (in the modified embodiment, two) unit coils 20 and the two unit coils 20 are defined as the second unit coil 20*b* and the third unit coil 20*c*. The coil pitch between the pair of coil sides 21, 21 of the second unit coil 20*b* is set to be 8 slot pitches (8 sp). The coil pitch between the pair of coil sides 21, 21 of the third unit coil 20*c* is set to be 6 slot pitches (6 sp). The second unit coil 20*b* and the third unit coil 20*c* are wound concentrically and arranged in series by the unit coil connecting portion 31*c* to form the second pole coil 31*s*. The second unit coil 20*b* and the third unit coil 20*c* are the full-coils 23*f*.

Assuming that the number of windings of the full-coil 23*f* is 1, the number of windings of the half-coil 23*h* is one-half (½) (winding ratio: 1/2). Here, the coil end length ratio of the pole paired coil 32 is calculated with reference to the coil lend length per slot pitch unit per number of winding unit of the full coil 23*f* (one side length worth of the pair of coil ends 22, 22). According to the modified embodiment, the coil end length ratio (slot pitch unit) of the pole paired coil 32 becomes 16.5 ($=5\times1/2+6+8$). On the other hand, according to the embodiment, the coil end length ratio (slot pitch unit) of the pole paired coil 32 becomes 15.5 (=5×1/2+7+6). As explained above, the coil end length ratio of the pole paired coil 32 according to the embodiment becomes small compared to that of the seventh modified embodiment.

According to the rotating electrical machine 100 of the embodiment, the number of slots per every pole and every phase is 2.5. The half-coil 23*h* (third unit coil 20*c*) is wound concentrically together with another one of full-coil 23*f* to form the second pole coil 31*s*. Therefore, according to the rotating electrical machine 100 of the embodiment, the coil end length can be shortened, and the pair of coil ends 22, 22 of the pair of unit coils 20 is reduced in size, compared to the case where the first pole coil 31*f* or the second pole coil 31*s* is structured by the half-coil 23*h* only.

These can be said to the case where the half-coil 23*h* is provided in the first pole coil 31*f* and also can be said to the case where the number of slots per every pole and every phase is equal to or more than 3.5. Further, the above explanation can be said to the structures of other embodiments and other modified embodiments. In other words, when the number of slots per every pole and every phase is 2.5 or more, the half-coil 23*h* is preferably wound concentrically together with another one or plurality of full-coils 23*f* to thereby form the first pole coil 31*f* or the second pole coil 31*s*.

(Arrangement of Phase Coil 33)

It is preferable that the plurality of (in the embodiment, three) phase coils 33 (U-phase coil 33*u*, V-phase coil 33*v* and W-phase coil 33*w*) is mounted in the plurality of (sixty (60)) slots 11 by the manufacturing method of the rotating electrical machine 100 including the first mounting process, the second phase advance mounting process and the third phase advance mounting process. Thus, according to the embodiment, the plurality of (three) phase coils 33 is assembled in order of U-phase coil 33*u*, V-phase coil 33*v* and W-phase coil 33*w* and as explained before, each phase of the plurality of (three) phase coils 33 is retarded in order of U-phase coil 33*u*, V-phase coil 33*v* and W-phase coil 33*w*. Further, the plurality of (three) phase coils 33 is provided in order of phase, i.e., U-phase coil 33*u*, V-phase coil 33*v* and W-phase coil 33*w* in the first direction second pole coil side (X2-arrow direction).

Figure 21A:
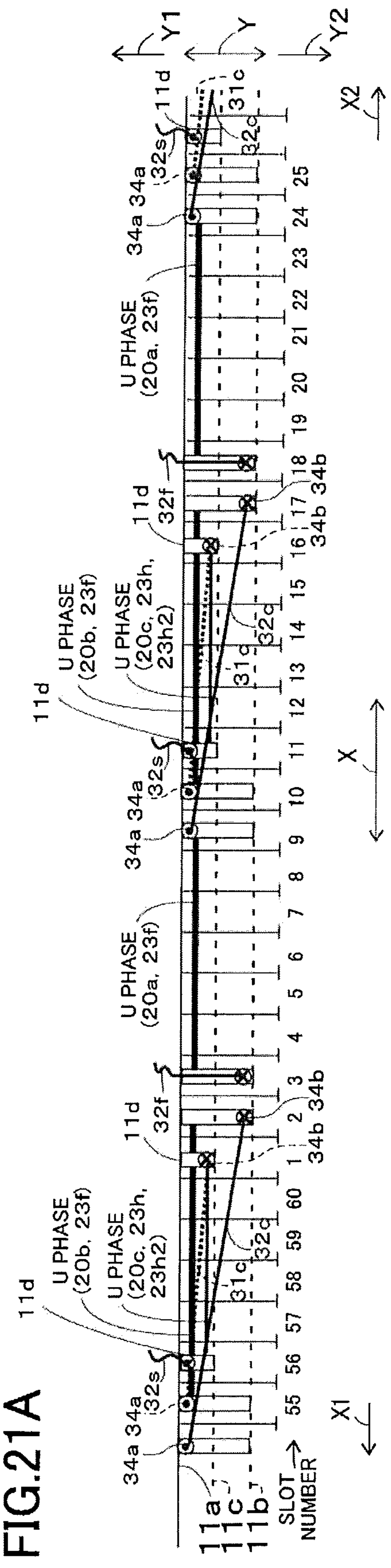
FIG. 21A is a schematic view of the U-phase coil 33*u* being mounted in the plurality of slots 11, seen from the pair of coil leading portions 32*f*, 32*s* side in the third direction (Z-arrow direction) associated with the first embodiment.

As shown in FIG. 21A, the first mounting process is the process for mounting one (in this embodiment, U-phase coil 33*u*) of the plurality of (three) phase coils 33 of the plurality of (twenty-four (24)) slots 11. In FIG. 21A, the pole paired coil 32 worth of four magnetic poles (two pole pairs) forming the U-phase coil 33*u* is shown and the pole paired coil 32 worth of the remaining four magnetic poles (two pole pairs) is omitted from the drawing. This is the same to the illustrations of FIGS. 21B through 21D. This is also the same to the schematic view showing the state of the phase coil 33 seen from the pair of coil leading portions 32*f*, 32*s* side of the third direction (Z-arrow direction) being mounted in the plurality of slots 11.

As shown in FIG. 21A, the first coil leading portion 32*f* of the U-phase coil 33*u* is led out from the slot opening portion 11*b* side and wound around in the second direction slot bottom portion side (Y1-arrow direction). The first coil leading portion 32*f* of the U-phase coil 33*u* can be wound around further outside (front side of the paper) of the coil end 22 of the first unit coil 20*a* of the U-phase coil 33*u* in the third direction (Z-arrow direction). The second coil leading portion 32*s* of the U-phase coil 33*u* is led out from the slot bottom portion 11*a* side.

As explained, the pair of coil leading portions 32*f*, 32*s* and the crossover lines (unit coil connecting portion 31*c* and the pole coil connecting portion 32*c*) in the pole paired coil 32 of the U-phase coil 33*u* are not intersecting with each other and further, since the U-phase coil 33*u* is mounted first, the U-phase coil 33*u* is not influenced by the other phase coils 33 (V-phase coil 33*v* and W-phase coil 33*w*) when each of the pair of coil sides 21, 21 of the half-coil 23*h* is arranged at the slot bottom portion 11*a* side. In other words, the U-phase half-coil 23*h* is the one-side occupying half-coil 23*h*2.

The second phase advance mounting process is the process for mounting the remaining one phase coil 33 among the plurality of (three) phase coils 33 in the plurality of (twenty-four (24)) slots 11 by deviating the remaining phase coil 33 by the in-between phase minimum difference worth in the first direction first pole coil side (X1-arrow direction) relative to the phase coil 33 (U-phase coil 33*u*) which has been mounted at the first mounting process. The in-between phase minimum difference is the minimum phase difference (electric angle of 120 degrees) between the phases which is obtained by dividing the electric angle of 360 degrees by the number of phases (in this embodiment, three). Further, the remaining one phase coil 33 is the phase coil 33 (in this embodiment, W-phase coil 33*w*) which phase advances by the in-between phase minimum difference worth (electric angle of 120 degrees), compared to the phase coil 33 (U-phase coil 33*u*) which has been mounted at the first mounting process. The rotating electrical machine 100 of the embodiment is the rotating electrical machine with eight poles sixty slots structure and the in-between phase minimum difference (electric angle of 120 degrees) corresponds to the five slot pitches worth.

Figure 21B:
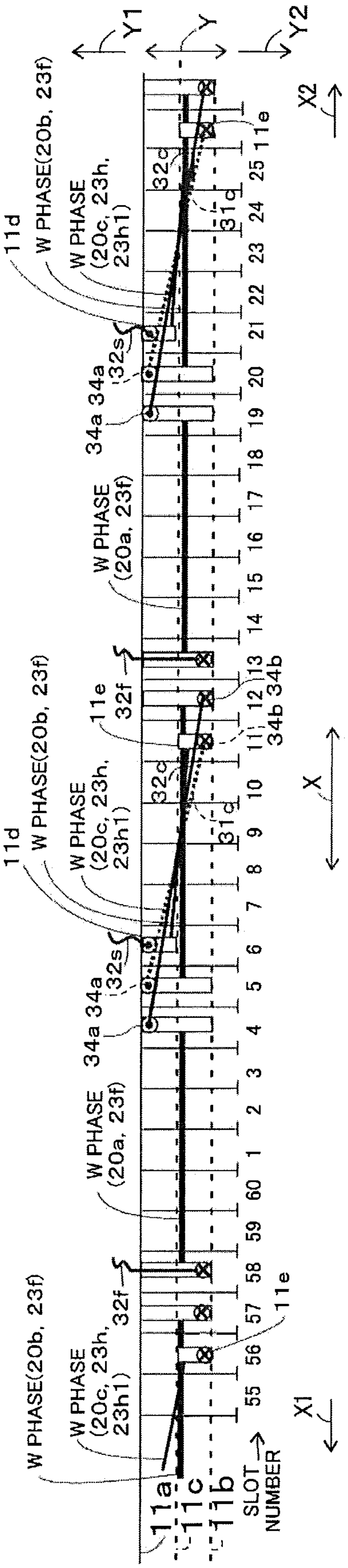
FIG. 21B is a schematic view of the W-phase coil 33*w* being mounted in the plurality of slots 11, seen from the pair of coil leading portions 32*f*, 32*s* side in the third direction (Z-arrow direction) associated with the first embodiment.

As shown in FIG. 21B, the first coil leading portion 32*f* of the W-phase coil 33*w* is led out from the slot opening portion 11*b* side and is wound around in the second direction slot bottom portion side (Y1-arrow direction). The first coil leading portion 32*f* of the W-phase coil 33*w* can be wound further outside (front side of the paper) of the coil end 22 of the first unit coil 20*a* of the W-phase coil 33*w* in the third direction (Z-arrow direction). It is noted that the second coil leading portion 32*s* of the W-phase coil 33*w* is led out from the slot bottom portion 11*a* side.

As explained, according to the W-phase coil 33*w*, the pair of coil leading portions 32*f*, 32*s* and said each crossover line (unit coil connecting portion 31*c* and the pole coil connecting portion 32*c*) of the pole paired coil 32 are not intersecting with each other. Since the W-phase coil 33*w* is mounted after mounting of the U-phase coil 33*u*, one of the coil sides 21 of the pair of coil sides 21, 21 of the half-coil 23*h* is arranged at the slot bottom portion 11*a* side and the other of the coil sides 21 of the pair of coil sides 21, 21 of the half-coil 23*h* is arranged at the slot opening portion 11*b* side. In other words, the W-phase half-coil 23*h* is the both side occupying half-coil 23*h*1.

The third phase advance mounting process is the process for mounting the phase coil 33 which phase advances by the in-between phase minimum difference worth (electric angle of 120 degrees) compared to the phase coil most recently mounted, by deviating in the first direction first coil side (X1-arrow direction) by the in-between phase minimum difference worth (electric angle of 120 degrees) relative to the most recently mounted phase coil of the plurality of (twenty-four) slots 11 until the plurality of (three) phase coils 33 (U-phase coil 33*u*, V-phase coil 33*v* and W-phase coil 33*w*) has been mounted in all of the plurality of (sixty) slots 11. According to the embodiment, at the end of the second phase advance mounting process, the V-phase coil 33$v$ is not mounted yet. Therefore, in the third phase advance mounting process, the V-phase coil 33$v$ is mounted in the plurality of (twenty-four) slots 11 by deviating in the first direction first pole coil side (X1-arrow direction) by the in-between phase minimum difference worth (electric angle of 120 degrees) relative to the most recently mounted phase coil 33 (W-phase coil 33$w$). Thus, all of the plurality of (three) phase coils 33 (U-phase coil 33$u$, V-phase coil 33$v$ and W-phase coil 33$w$) are mounted in the plurality of (sixty) slots 11. Then the third phase advance mounting process ends.

Figure 21C:
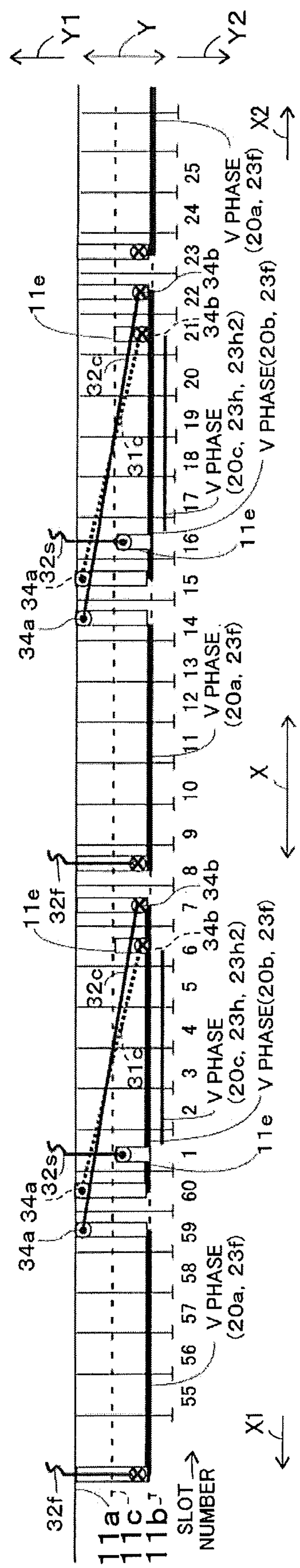
FIG. 21C is a schematic view of the V-phase coil 33*v* being mounted in the plurality of slots 11 seen from the pair of coil leading portions 32*f*, 32*s* side in the third direction (Z-arrow direction) associated with the first embodiment.
Figure 21D:
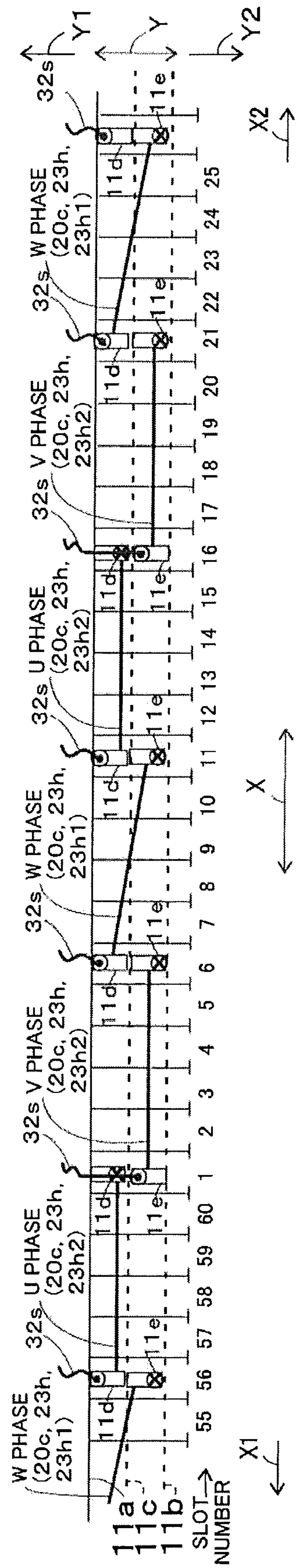
FIG. 21D is a schematic view of each half-coil 23*h* of the three-phase phase-coil 33 (U-phase coil 33*u*, V-phase coil 33*v* and W-phase coil 33*w*) seen from the pair of coil leading portions 32*f*, 32*s* side in the third direction (Z-arrow direction) being mounted in the plurality of slots 11 associated with the first embodiment.

As shown in FIG. 21C, the first coil leading portion 32$f$ of the V-phase coil 33$v$ is led out from the slot opening portion 11$b$ side and is wound around in the second direction slot bottom portion side (Y1-arrow direction). The first coil leading portion 32$f$ of the V-phase coil 33$v$ can be wound further outside (front side of the paper) of the coil end 22 of the first unit coil 20$a$ of the V-phase coil 33$v$ in the third direction (Z-arrow direction).

The second coil leading portion 32$s$ of the V-phase coil 33$v$ is led out from the slot central portion 11$c$. According to the V-phase coil 33$v$, the second coil leading portion 32$s$ and the crossover line (unit coil connecting portion 31$c$) in the pole paired coil 32 are brought into contact with and intersecting with each other. Therefore, at the intersecting portion, it is necessary to secure an electrical insulation. However, since the pole coil connecting portion 32$c$ is not intersecting with the second coil leading portion 32$s$, no securing of the insulation is necessary. As the result of assembling work using the coil inserting machine 31 (inserter tool), the second coil leading portion 32$s$ of the V-phase coil 33$v$ passes the stator iron core 10 side (front side of the paper) of the third direction (Z-arrow direction) of each crossover line (unit coil connecting portion 31$c$ and the pole coil connecting portion 32$c$) in the pole paired coil 32 of V-phase coil 33$v$. Further, the second coil leading portion 32$s$ of the V-phase coil 33$v$ passes further outside (back side of the paper) of the coil end 22 of the third unit coil 20$c$ of the U-phase coil 33$u$ in the third direction (Z-arrow direction). It is noted that since the V-phase coil 33$v$ is mounted last, each coil side of the pair of coil sides 21, 21 of the half-coil 23$h$ is provided at the slot opening portion 11$b$ side. In other words, the V-phase half-coil 23$h$ is the one side occupying half-coil 23$h$2.

As shown in FIGS. 22A through 22D, the plurality of (three) phase coils 33 (U-phase coil 33$u$, V-phase coil 33$v$ and W-phase coil 33$w$) is mounted in the plurality of (sixty) slots 11 in order of U-phase coil 33$u$, V-phase coil 33$v$ and W-phase coil 33$w$ (same with the phase order) (eight modified embodiment). According to the eighth modified embodiment, the V-phase coil 33$v$ is mounted in the plurality of (twenty-four) slots 11 deviated in the first direction second pole coil side (X2-arrow direction) by the in-between phase minimum difference worth (electric angle of 120 degrees) relative to the U-phase coil 33$u$. The W-phase coil 33$w$ is mounted in the plurality of (twenty-four) slots 11 deviated in the first direction second pole coil side (X2-arrow direction) by the in-between phase minimum difference worth (electric angle of 120 degrees) relative to the V-phase coil 33$v$. This method is the same with the manufacturing method of the rotating electrical machine 100 having the first mounting process, the second phase retard mounting process and the third phase retard mounting process mounting described in the third embodiment.

Figure 22A:
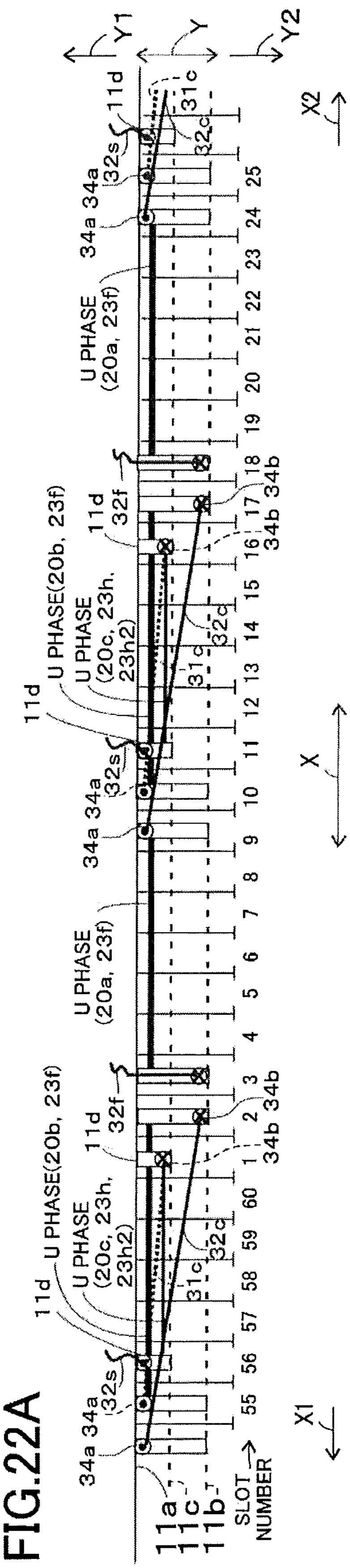
FIG. 22A is a schematic view of the U-phase coil 33*u* being mounted in the plurality of slots 11, seen from the pair of coil leading portions 32*f*, 32*s* side in the third direction (Z-arrow direction) associated with the eighth modified embodiment.
Figure 22B:
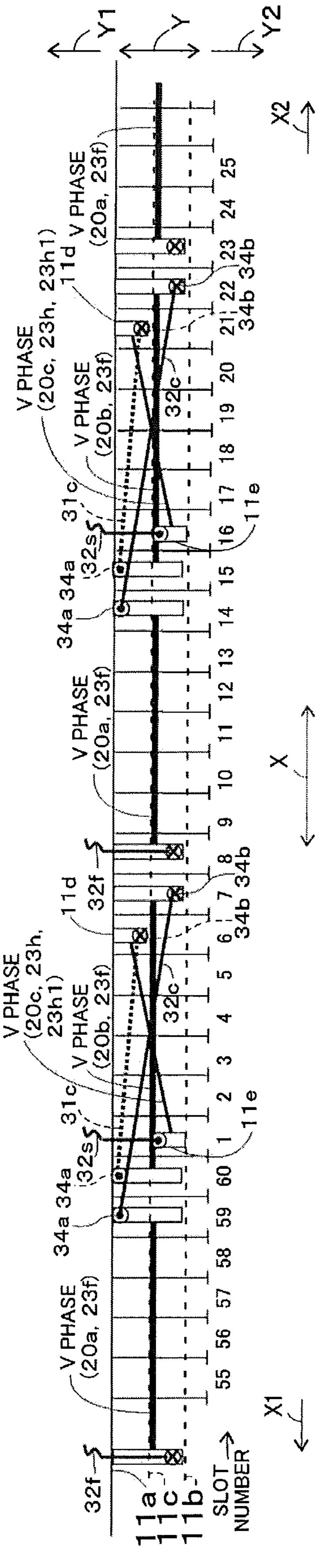
FIG. 22B is a schematic view of the V-phase coil 33*v* being mounted in the plurality of slots 11 seen from the pair of coil leading portions 32*f*, 32*s* side in the third direction (Z-arrow direction) associated with the eighth modified embodiment.

As shown in FIG. 22A, the state after the U-phase coil 33$u$ of the eighth modified embodiment was mounted is the same with the state after the U-phase coil 33$u$ of the embodiment was mounted shown in FIG. 21A. As shown in FIG. 22B, the first coil leading portion 32$f$ of the V-phase coil 33$v$ is led out from the slot opening portion 11$b$ side and wound around in the second direction slot bottom portion side (Y1-arrow direction). The first coil leading portion 32$f$ of the V-phase coil 33$v$ is wound around further outside (front side of the paper) of the coil end 22 of the first unit coil 20$a$ of the V-phase coil 33$v$ in the third direction (Z-arrow direction).

The second coil leading portion 32$s$ of the V-phase coil 33$v$ is led out from the slot central portion 11$c$. According to the V-phase coil 33$v$, the second coil leading portion 32$s$ and the crossover line (unit coil connecting portion 31$c$) of the pole paired coil 32 are brought into contact with and intersecting with each other. Therefore, at the intersecting portion, it is necessary to secure an electrical insulation. However, since the pole coil connecting portion 32$c$ is not intersecting with the second coil leading portion 32$s$, no securing of the insulation is necessary. As the result of assembling work using the coil inserting machine 31 (inserter tool), the second coil leading portion 32$s$ of the V-phase coil 33$v$ passes the stator iron core 10 side (back side of the paper) of the third direction (Z-arrow direction) of each crossover line (unit coil connecting portion 31$c$ and the pole coil connecting portion 32$c$) of the pole paired coil 32 of V-phase coil 33$v$. Further, the second coil leading portion 32$s$ of the V-phase coil 33$v$ passes further outside (front side of the paper) of the coil end 22 of the third unit coil 20$c$ of the U-phase coil 33$u$ in the third direction (Z-arrow direction). It is noted that since the V-phase coil 33$v$ is mounted after the mounting of the U-phase coil 33$u$, one coil side 21 of the pair of coil sides 21, 21 of the half-coil 23$h$ is provided at the slot bottom portion 11$a$ side and the other coil side 21 of the pair of coil sides 21, 21 is provided at the slot opening portion 11$b$ side. In other words, the V-phase half-coil 23$h$ is the both side occupying half-coil 23$h$1.

Figure 22C:
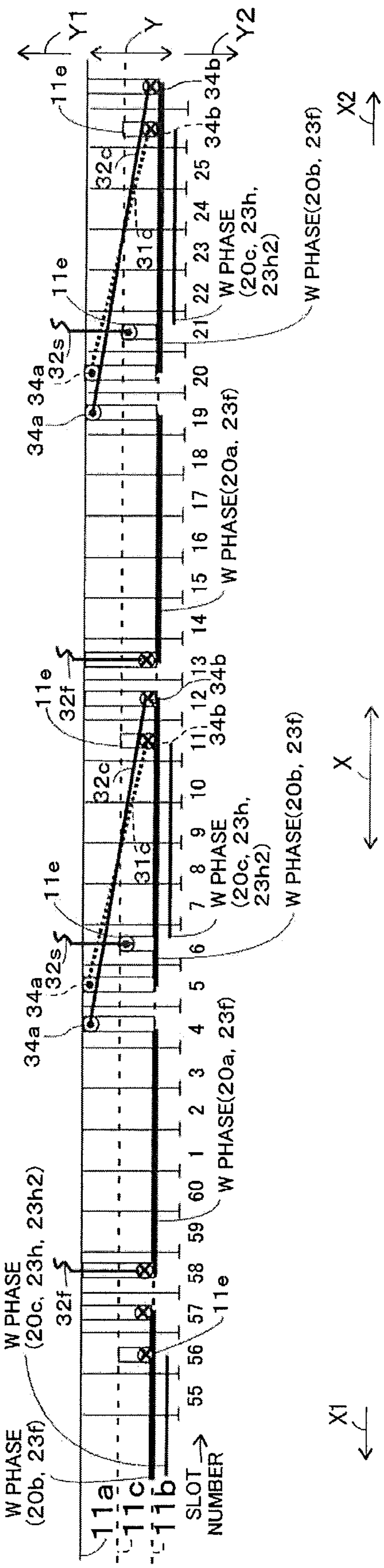
FIG. 22C is a schematic view of the W-phase coil 33*w* being mounted in the plurality of slots 11, seen from the pair of coil leading portions 32*f*, 32*s* side in the third direction (Z-arrow direction) associated with the eighth modified embodiment.
Figure 22D:
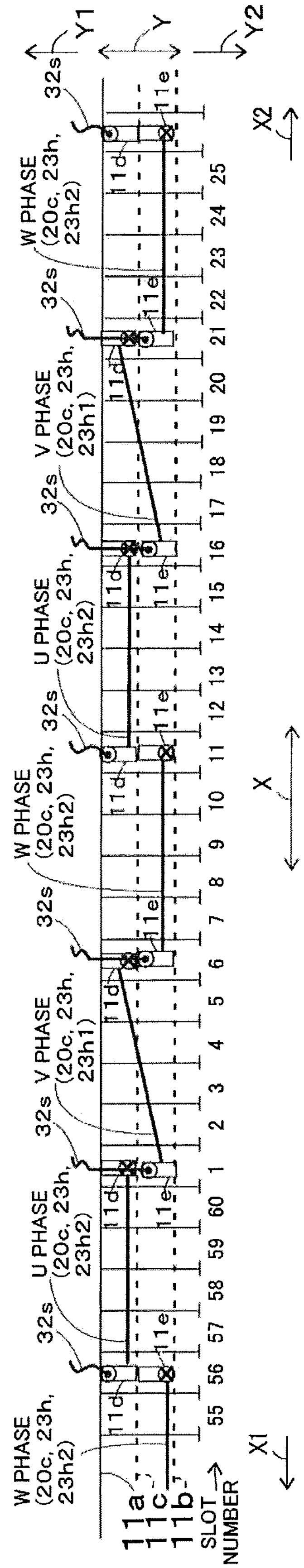
FIG. 22D is a schematic view of each half-coil 23*h* of the three-phase phase-coil 33 (U-phase coil 33*u*, V-phase coil 33*v* and W-phase coil 33*w*) seen from the pair of coil leading portions 32*f*, 32*s* side in the third direction (Z-arrow direction) being mounted in the plurality of slots 11 associated with the eighth modified embodiment.

As shown in FIG. 22C, the first coil leading portion 32$f$ of the W-phase coil 33$w$ is led out from the slot opening portion 11$b$ side and is wound around in the second direction slot bottom portion side (Y1-arrow direction). The first coil leading portion 32$f$ of the W-phase coil 33$w$ can be wound further outside (front side of the paper) of the coil end 22 of the first unit coil 20$a$ of the W-phase coil 33$w$ in the third direction (Z-arrow direction).

The second coil leading portion 32$s$ of the W-phase coil 33$w$ is led out from the slot central portion 11$c$. According to the W-phase coil 33$w$, the second coil leading portion 32$s$ and the crossover line (unit coil connecting portion 31$c$) in the pole paired coil 32 are brought into contact with and intersecting with each other. Therefore, at the intersecting portion, it is necessary to secure an electrical insulation. However, since the pole coil connecting portion 32$c$ is not intersecting with the second coil leading portion 32$s$, no securing of the insulation is necessary. As the result of assembling work using the coil inserting machine 31 (inserter tool), the second coil leading portion 32$s$ of the W-phase coil 33$w$ passes the stator iron core 10 side (back side of the paper) of the third direction (Z-arrow direction) of each crossover line (unit coil connecting portion 31$c$ and the pole coil connecting portion 32$c$) of the pole paired coil 32 of W-phase coil 33$w$. Further, the second coil leading portion 32$s$ of the W-phase coil 33$w$ passes further outside (front side of the paper) of the coil end 22 of the third unit coil 20$c$ of the V-phase coil 33$v$ in the third direction (Z-arrow direction). It is noted that since the W-phase coil 33$w$ is mounted last, each of the pair of coil sides 21, 21 of the half-coil 23*h* is provided at the slot opening portion 11*b* side. In other words, the W-phase half-coil 23*h* is the one side occupying half-coil 23*h*2.

According to the eighth modified embodiment, the second coil leading portion 32*s* of the V-phase coil 33*v* is led out from the slot central portion 11*c*. According to the V-phase coil 33*v*, the second coil leading portion 32*s* and the crossover line (unit coil connecting portion 31*c*) of the pole paired coil 32 are brought into contact with and intersecting with each other. Therefore, at the intersecting portion, it is necessary to secure an electrical insulation. These are the same with the W-phase coil 33*w*. As explained, according to the eighth modified embodiment, in two phases (V-phase and W-phase) among the plurality of (three) phase coils 33 (U-phase coil 33*u*, V-phase coil 33*v* and W-phase coil 33*w*) the second coil leading portion 32*s* and the crossover line (unit coil connecting portion 31*c*) of the pole paired coil 32 are brought into contact with and intersecting with each other.

On the other hand, according to the embodiment, in one phase (V-phase) among the plurality of (three) phase coils 33 (U-phase coil 33*u*, V-phase coil 33*v* and W-phase coil 33*w*), the second coil leading portion 32*s* and the crossover line (unit coil connecting portion 31*c*) in the pole paired coil 32 are brought into contact with and intersecting with each other. As explained, the rotating electrical machine 100 of the embodiment has less number of phases in which the pair of coil leading portions 32*f*, 32*s* and crossover line (unit coil connecting portion 31*c*) of the pole paired coil 32 are brought into contact with and intersecting with each other, compared to the rotating electrical machine 100 according to the eighth modified embodiment. Accordingly, the coil end 22 at the pair of coil leading portions 32*f*, 32*s* of the third direction (Z-arrow direction) can be reduced in size and the wiring thereof can be simplified compared to the pole paired coil 32 of the eighth modified embodiment. Further, according to the pole paired coil 32 of the embodiment, the number of necessary electric insulation portions for securing at the intersecting portion can be reduced compared to the pole paired coil 32 of the eighth modified embodiment.

It is noted here that one end side portion of each crossover line (unit coil connecting portion 31*c* and the pole coil connecting portion 32*c*) which connects between the plurality of (three) unit coils 20 forming said each of the pole paired coils 32 and which is the end portion provided at the slot bottom portion 11*a* side is defined to be the first crossover line end portion 34*a*. Further, the other end side portion which is the other end portion provided at the slot opening portion 11*b* side is defined to be the second crossover line end portion 34*b*. Further, the vector which has a start point which is a point within the first half slot portion 11*d* of the both side occupying half-coil 23*h*1 and an end point which is a point within the second half slot portion 11*e* is defined to be the first vector 35*a*. Further, the vector which has the first crossover line end 34*a* of each crossover line (unit coil connecting portion 31*c* and the pole coil connecting portion 32*c*) of the pole paired coil 32 as a start point and the second crossover line end portion 34*b* as the end point is defined to be the second vector 35*b*.

Figure 22E:
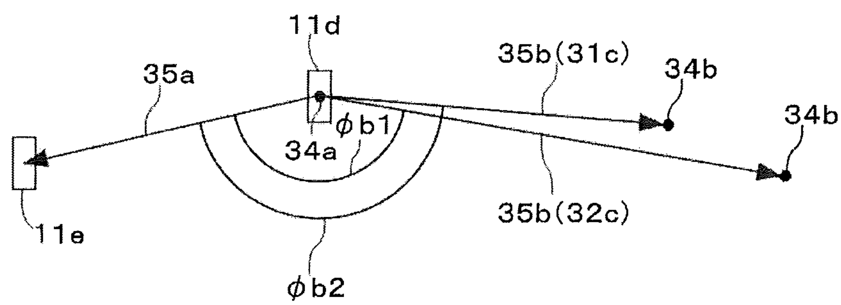
FIG. 22E is a schematic view of angles φb1, φb2 formed by the first vector 35*a* and the second vectors 35*b*, 35*b* associated with the eighth modified embodiment.

As shown in FIG. 22E, according to the eighth modified embodiment, the angle φb1 formed by the first vector 35*a* and the second vector 35*b* of the pole coil connecting portion 32*c* is an obtuse angle larger than the mechanical angle of 90 degrees. This is similar to the angle φb2 formed by the first vector 35*a* and the second vector 35*b* of the unit coil connecting portion 31*c*. In other words, according to the eighth modified embodiment, angles φb1 and φb2 formed by the first vector 35*a* and the second vectors 35*b* and the 35*b* are the obtuse angles both being larger than the mechanical angle of 90 degrees. In FIG. 22E, the first vector 35*a* and the second vectors 35*b*, 35*b* are formed on the same plane (on the paper of FIG. 22E) vertical to the third direction (Z-arrow direction). It is noted that each crossover line (unit coil connecting portion 31*c* and the pole coil connecting portion 32*c*) of the pole paired coil 32 of the U-phase coil 33*u* shown in FIG. 22A is illustrated. However, this can be said to the case of V-phase coil 33*v* and the W-phase coil 33*w*.

Figure 21E:
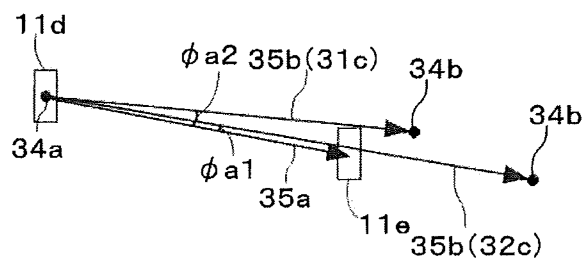
FIG. 21E is a schematic view of angles φa1, φa2 formed by the first vector 35*a* and the second vectors 35*b*, 35*b* associated with the first embodiment.

As shown in FIG. 21E, according to the embodiment, the angle φa1 formed by the first vector 35*a* and the second vector 35*b* of the pole coil connecting portion 32*c* is an acute angle smaller than the mechanical angle of 90 degrees. This is similar to the angle φa2 formed by the first vector 35*a* and the second vector 35*b* of the unit coil connecting portion 31*c*. In other words, according to the embodiment, angles φa1 and φa2 formed by the first vector 35*a* and the second vectors 35*b* and the 35*b* are the acute angles both being smaller than the mechanical angle of 90 degrees. In FIG. 21E, the first vector 35*a* and the second vectors 35*b*, 35*b* are formed on the same plane (on the paper plane of FIG. 21E) vertical to the third direction (Z-arrow direction). It is noted that each crossover line (unit coil connecting portion 31*c* and the pole coil connecting portion 32*c*) of the pole paired coil 32 of the U-phase coil 33*u* shown in FIG. 21A is illustrated. However, this can be said to the cases of both V-phase coil 33*v* and the W-phase coil 33*w*.

According to the rotating electrical machine 100 of the embodiment, angles φa1 and φa2 formed by the first vector 35*a* and the second vectors 35*b* and the 35*b* are the acute angles both being smaller than the mechanical angle of 90 degrees. Therefore, the rotating electrical machine 100 according to the embodiment can reduce the interference intersection (contact intersecting state) of the coil end 22 of the both side occupying half-coil 23*h*1, each crossover line (unit coil connecting portion 31*c* and the pole coil connecting portion 32*c*) of the pole paired coil 32 and the pair of coil leading portions 32*f*, 32*s* and can reduce the number of other phase crossing leading lines. Thus, according to the embodiment, the coil end 22 of the pair of coil leading portions 32*f*, 32*s* of the third direction (Z-arrow direction) of the pole paired coil 32 can be reduced and the wiring thereof can be simplified, compared to those of the eighth modified embodiment.

(Relationship Between Concentric Winding and Double Layered Winding)

Figure 23:
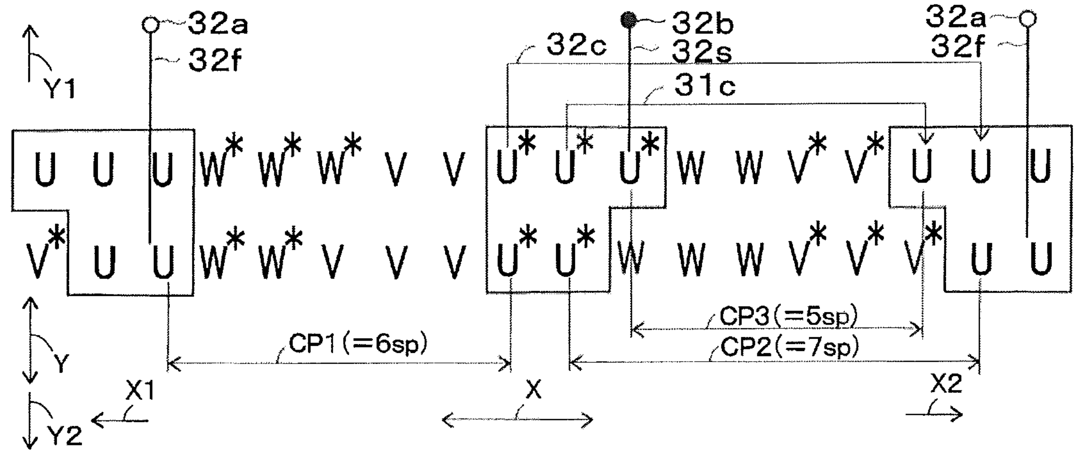
FIG. 23 is a view of an example of a phase position of the plurality of slots 11 associated with the first embodiment.

Next, the relationship between the concentrically wound pole paired coil 32 and double layered wound pole paired coil 832 will be explained. FIG. 23 shows the phase arrangement of the rotating electrical machine 100 of the embodiment seen from the pair of coil leading portions 32*f*, 32*s* side of the third direction (Z-arrow direction). FIG. 23 shows approximately two magnetic poles worth slot 11 phase arrangement of the plurality of slots 11 shown in FIGS. 7A and 7B.

In FIG. 23, as similar to FIGS. 2 and 6A, the connecting state in the U-phase pole paired coil 32 is also shown. Further, in FIG. 23, the coil pitches CP1 through CP3 between the pair of coil sides 21, 21 of U-phase of each unit coil 20 (first unit coil 20*a*, second unit coil 20*b* and third unit coil 20*c*) are illustrated. Still further, in FIG. 23, the area of the U-phase enclosed by the solid line is shown. The "phase with symbol *" means the reverse direction energization of the coil side 21, comparing the "phase without symbol *" which means the forward direction energization of the coil side 21. U-phase has the area of forward direction energization indicated with "U" (continuous 2.5 slot worth area) and the area of reverse direction energization indicated with "U*" (continuous 2.5 slot worth area) alternatively repeated. This can be said similarly to the V-phase and W-phase.

Figure 24:
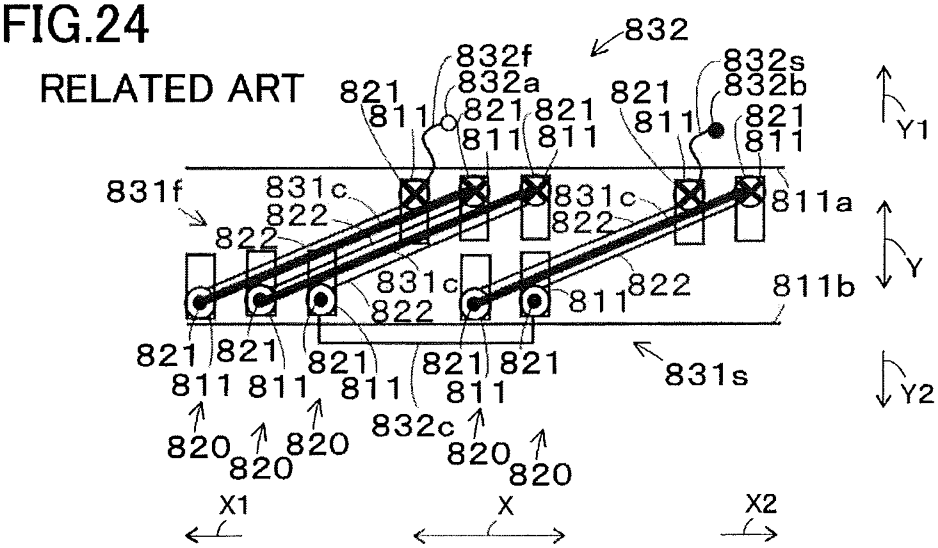
FIG. 24 is a view of double layered wound pole paired coil 832, seen from the pair of coil leading portions 832*f*, 832*s* side in the third direction (Z-arrow direction) associated with a first reference embodiment.
Figure 25:
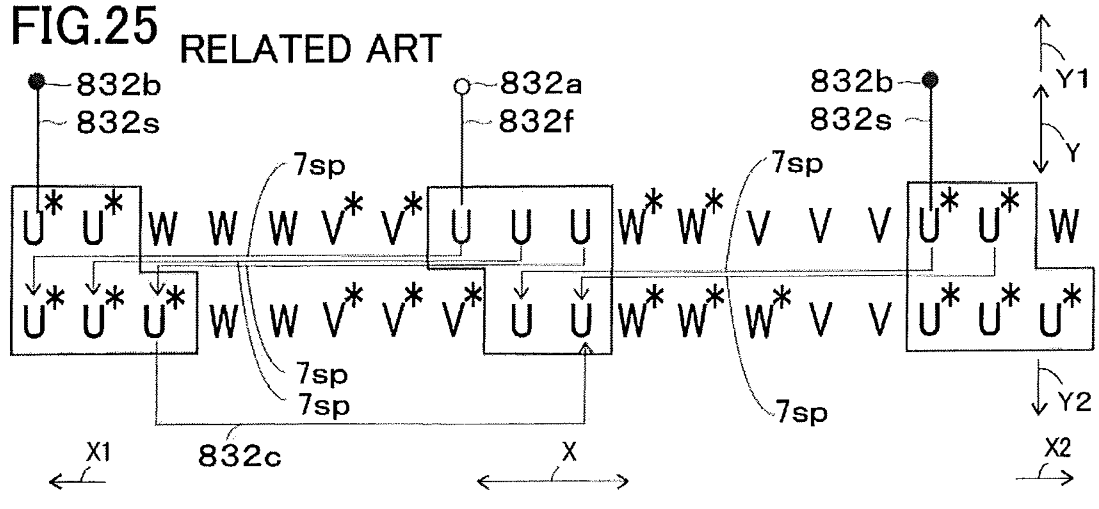
FIG. 25 is a schematic view of an example of a phase position of the plurality of slots 11 with double layered winding shown in FIG. 24 associated with the first reference embodiment.

A double layered winding stator coil will be studied here as a first reference embodiment. As shown in FIGS. 24 and 25, in the first reference embodiment, the numerals corresponding to the members or the components explained in the embodiment are designated as the same numerals prefixing with "8" at the top of each numeral and overlapped explanation will be omitted. For example, the pair of coil sides 21, 21 of the embodiment is indicated as the pair of coil sides 821, 821 in the reference embodiment. It is noted here that the "corresponding to the members or the components" does not means the "electromagnetic equivalence" and merely indicates the structural correspondence.

As shown in FIG. 24, the double layered winding pole paired coil 832 is formed by a plurality of (in this reference embodiment, five) unit coils 820 having the same winding direction and same coil pitch. Each unit coil 820 is wound between the half of the slots 811 at the slot bottom portion 811*a* side and the half of the slots 811 at the slot opening portion 811*b* side. Further, the plurality of (in this reference embodiment, three) unit coils 820 adjacently arranged in the first direction (X-arrow direction) is connected in series by the unit coil connecting portion 831*c* to form the first pole coil 831*f*.

Further, the plurality of (in this reference embodiment, two) unit coils 820 adjacently arranged in the first direction (X-arrow direction) is connected in series by the unit coil connecting portion 831*c* to form the second pole coil 831*s*. When the first pole coil 831*f* opposes to one polarity of the pair of mover magnetic poles, the second pole coil 831*s* opposes to the other polarity of the pair of mover magnetic poles. Both the first and the second pole coils 831*f* and 831*s* are connected by the pole coil connecting portion 832*c* in series to form the pole paired coil 832.

Each pole paired coil 832 is continuously wound from the winding start side first pole coil 831*f* to the winding end side second pole coil 831*s* via the pole coil connecting portion 832*c*. Thus, the plurality of (three) unit coils 820 forming the first pole coil 831*f* and the plurality of (two) unit coils 820 forming the second pole coil 831*s* are connected in series. It is noted here that the winding start point of the pole paired coil 832 is defined to be the winding start portion 832*a* and the winding end point of the pole paired coil 832 is defined to be the winding end portion 832*b*.

Further, each pole paired coil 832 includes a pair of coil leading portions 832*f* and 832*s*. The pair of coil leading portions 832*f* and 832*s* are formed by the first coil leading portion 832*f* and the second coil leading portion 832*s*. The first coil leading portion 832*f* is led out from one of the coil sides 821 of the winding start point of one of the unit coils 820 forming the first pole coil 831*f*. The second coil leading portion 832*s* is led out from one of the coil sides 821 of the winding end point of the one of the unit coils 820 forming the second pole coil 831*s*.

The stator coil includes a plurality of (in the reference embodiment, three) phase coils in which a plurality of (in the reference embodiment, four) pole paired coils 832 is electrically connected in parallel with each other. In each phase coil, a plurality of (in the reference embodiment, four) pole paired coils 832 forming the phase coil is electrically connected via the pair of coil leading portions 832*f* and 832*s*. The rotating electrical machine according to the reference embodiment is the three-phase rotating electrical machine with eight poles sixty slots structure as similar to the rotating electrical machine 100 according to the embodiment.

FIG. 25 shows the phase arrangement seen from the pair of coil leading portions 832*f* and 832*s* side of the third direction (Z-arrow direction). FIG. 25 shows the phase arrangement similar to that of FIG. 23. As shown in FIG. 25, in the stator coil of double layered winding, U-phase has the area of forward direction energization indicated with "U" (continuous 2.5 slot worth area) and the area of reverse direction energization indicated with "U*" (continuous 2.5 slot worth area) alternatively repeated. This arrangement can be the same with the V-phase and W-phase.

As explained, in either of the embodiment and the first reference embodiment, the U-phase area is formed by the 2.5 slot worth area in which the energization is consecutively performed in the forward direction and the 2.5 slot worth area in which the energization is consecutively performed in the reverse direction and these areas are alternatively repeated. This can be said similar to the energization of the V-phase and W-phase. Accordingly, the electric current distribution of the stator coil 30 of the embodiment is approximately the same equivalence value with the stator coil with double layered winding.

Further, according to the double layered winding pole paired coil 832 of the first reference embodiment, the number of unit coils 820 forming the pole paired coil 832 is five (5). These unit coils 820 have the same coil pitch (as shown in FIG. 25, seven slot pitches 7 ps). In other words, the type (number) of coil pitch is only one type and the type of the unit coil 820 is also one type only. Further, each unit coil 820 is wound around between the half of the slots 811 at the slot bottom portion 11*a* side and the half of the slots 811 at the slot opening portion 11*b* side. Therefore, assuming that the number of windings of the full-coil 23*f* according to the embodiment is one (1), the number of windings of each unit coil 820 according to the first reference embodiment becomes one half (½) (winding ratio: 1/2). The type of the coil according to the first reference embodiment is only one type.

On the other hand, according to the concentrically wound pole paired coil 32 of the embodiment, the number of unit coils 20 forming the pole paired coil 32 is three (first unit coil 20*a*, second unit coil 20*b* and third unit coil 20*c*). The coil pitches CP1 through CP3 of these unit coils 20 are all different from one another. In other words, the number of types of coil pitches is three and the number of types of unit coil 20 is three. Further, the coil pitch CP3 of the third coil 20*c* which is the half coil 23*h* is five slot pitches (5 sp) and this coil pitch is the minimum among the three types of unit coil 20. Still further, assuming that the number of coil winding of the first unit coil 20*a* and the second unit coil 20*b* which are the full coil 23*f* is defined to be one (1), the winding of the third unit coil 20*c* which is the half coil 23*h* becomes one half (winding ratio: 1/2). The number of types of winding of the coil according to the embodiment is two.

According to the concentrically wound pole paired coil 32, the unit coils 20 are integrated to reduce the number of unit coils 20, compared to the double layered pole paired coil 832. On the other hand, according to the concentrically wound pole paired coil 32, the number of types of the unit coil 20 increases compared to the double layered pole paired coil 832. In the concentrically wound pole paired coil 32, each unit coil 20 of the pole paired coil 32 is different in slot arrangement, coil pitch and the number of windings from one another. Therefore, the plurality of (three) unit coils 20 forming the pole paired coil 32 is electrically connected with one another in series connection.

According to the rotating electrical machine 100 of the embodiment, the plurality of (twelve in each phase of three-phase, totaling of thirty-six) unit coils 20 included in the stator coil 30 is apportioned into the first pole coil 31*f* and the second pole coil 31*s* per slot unit (fifteen slots unit) opposing to the pair of mover magnetic poles 61, 62. Further, each pole paired coil 32 forming the plurality of (three) phase coils 33 (U-phase coil 33*u*, V-phase coil 33*v* and W-phase coil 33*w*) includes the full-coil 23*f* and the half-coil 23*h* with respect to the occupying state of the plurality of slots 11. Further, according to each pole paired coil 32, the coil pitches CP1 through CP3 between the pair of coil sides 21, 21 of the plurality of (three) unit coils 20 (first unit coil 20*a*, second unit coil 20*b* and third unit coil 20*c*) forming the respective pole paired coils 32 are different from one another and each of the pole paired coils 32 has one half-coil 23*h*. Thus, the rotating electrical machine 100 of the embodiment is shown as the rotating electrical machine 100 with the fractional slot structure having the number of slots per every pole and every phase being fractions with the decimal places of 0.5 and in this structure, a concentrically wound stator coil 30 can be provided. Therefore, according to the rotating electrical machine 100 of the embodiment, the stator coil 30 can be assembled per phase coil 33 unit and compared to the rotating electrical machine 100 with the double layered stator coil, assembling work therefor can be simplified to thereby improve the working efficiency.

(Comparison Between Apportioned Type Stator Coil & Integrated Type Stator Coil)

As the concentrically wound type stator coil, two types, an apportioned type stator coil and an integrated type stator coil are considered. The stator coil 30 according to the embodiment is the apportioned type stator coil and in more detail, the plurality of (twelve in each phase, totaling of thirty-six) unit coils 20 included in the stator coil 30 is apportioned into the first pole coil 31*f* and the second pole coil 31*s* per slot unit (in the embodiment, per fifteen slots unit) opposing to the pair of mover magnetic poles 61, 62. When the first pole coil 31*f* opposes to one polarity (mover magnetic pole 61) of the pair of mover magnetic poles 61, 62, the second pole coil 31*s* opposes to the other polarity (mover magnetic coil 62) of the pair of mover magnetic poles 61, 62.

Figure 26:
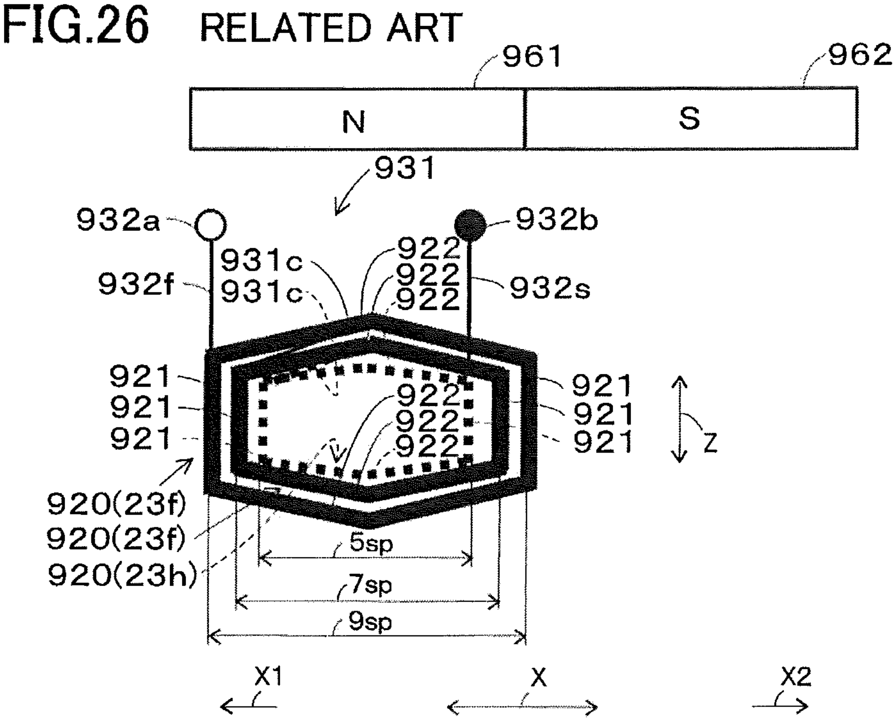
FIG. 26 is a schematic view of an example of the structure of the consolidated pole coil 931, seen from the slot opening portion 11*b* side in the second direction (Y-arrow direction) associated with the second reference embodiment.

On the other hand, as shown in FIG. 26, the stator coil according to the second reference embodiment is the integrated type stator coil. In more detail, the plurality of (twelve in each phase, totaling of thirty-six) unit coils 920 included in the stator coil is integrated per slot unit (in this reference embodiment, per fifteen slots unit) opposing to the pair of mover magnetic poles 961, 962 such that the plurality of unit coils 920 opposes to the same polarity of the mover magnetic pole (in this reference embodiment, the mover magnetic pole 961) between the pair of mover magnetic poles 961, 962. The plurality of unit coils 920 integrated per slot unit opposing to the pair of mover magnetic poles 961, 962 is wound concentrically by the plurality of (in this reference embodiment, three) unit coils 920 each of which coil pitch between the pair of coil sides 921, 921 is different from one another and is electrically connected in series to form the pole coil 931.

It is noted here that in the second reference embodiment, the members and components corresponding to those explained in the embodiment are indicated as the same numerals prefixing with "9" at the top of each numeral and overlapped explanation will be omitted. For example, the pair of coil sides of the reference embodiment corresponds to the pair of coil sides 21, 21 of the embodiment and according to the reference embodiment, indicated as the pair of coil sides 921, 921 in the reference embodiment. It is noted here that the "corresponding to the members or the components" does not means the "electromagnetic equivalence" and merely indicates the structural correspondence. This can be said to the case of third reference embodiment.

Each pole coil 931 is continuously wound forwardly from the winding start side unit coil 920 to the winding end side unit coil 920. It is noted here that the winding start of the pole coil 931 is defined to be the winding start portion 932*a* and the winding end of the pole coil 931 is defined to be the winding end portion 932*b*. Further, each pole coil 931 includes a pair of coil leading portions 932*f*, 932*s*. The pair of coil leading portions 932*f*, 932*s* is formed by the first coil leading portion 932*f* and the second leading portion 932*s*. The first coil leading portion 932*f* is led out from one of the coil sides 921 of the winding start unit coil 920 and the second coil leading portion 932*s* is led out from one of the coil sides 921 of the winding end unit coil 920. Further, the stator coil includes a plurality of (in the reference embodiment, three) phase coils to which a plurality of (in the reference embodiment, four) of the pole coils 931 is electrically connected in parallel with one another. The rotating electrical machine 100 of the reference embodiment is the three-phase rotating electrical machine with eight poles and sixty slots structure as similar to the rotating electrical machine 100 of the embodiment.

The pole coil 931 forming the plurality of (three) phase coils includes the two types of the unit coils 920, full-coil 23*f* and half-coil 23*h* with respect to the occupying state of the plurality of slots, as similar to that of the pole paired coil 32 according to the embodiment. The coil pitch between the pair of coil sides 921, 921 of the full-coil 23*f* is seven slot pitches (7 sp) and nine slot pitches (9 sp). The coil pitch between the pair of coil sides 921, 921 of the half-coil 23*s* is five slot pitches (5 sp). Thus, according to the reference embodiment, the coil pitch (five slot pitches) between the pair of coil sides 921, 921 of the half-coil 23*h* is the minimum among the plurality of (three) unit coils 920 forming the pole coil 931. Further, assuming that the number of windings of the full-coil 23*f* is one (1), the number of windings of the half-coil 23*h* becomes the half (one half (½): winding ratio 1/2), and accordingly, the coil end length ratio (slot pitch unit) of the pole coil 931 is calculated as 18.5 (=5×1/2+7+9).

Figure 27:
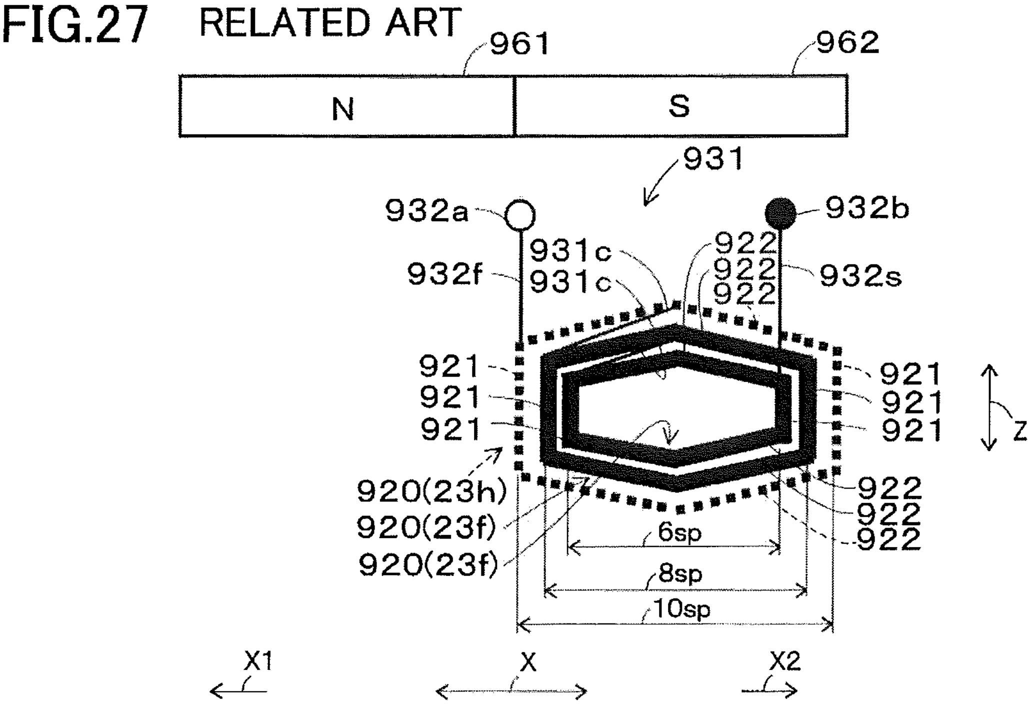
FIG. 27 is a schematic view of another example of the structure of the consolidated pole coil 931, seen from the slot opening portion 11*b* side in the second direction (Y-arrow direction) associated with the third reference embodiment.

As shown in FIG. 27, the coil pitch between the pair of coil sides 921, 921 of the half-coil 23*h* can be made maximum among the plurality of (three) unit coils 920 forming the pole coil 931. FIG. 27 shows the pole coil 931 forming the integrated stator coil according to the third reference embodiment. The pole coil 931 according to the reference embodiment opposes to the other polarity of the mover magnetic poles (mover magnetic pole 962 which is different from that of the second reference embodiment) between the pair of mover magnetic poles 961, 962. Further, the coil pitch between the pair of coil sides 921, 921 of the full-coil 23*f* is the six slot pitches (6 sp) and eight slot pitches (8 sp) and the coil pitch between the pair of coil sides 921, 921 of the half-coil 23*h* is ten slot pitches (10 sp). In this situation, the coil end length ratio (slot pitch unit) of the pole coil 931 is calculated as 19 (=6+8+10×1/2).

On the other hand, as shown in FIGS. 2 and 6A, according to the embodiment, the coil pitch between the pair of coil sides 21, 21 of the full-coil 23*f* is six slot pitches (6 sp) and seven slot pitches (7 sp) and the coil pitch between the pair of coil ends 21, 21 of the half-coil 23*h* is five slot pitches (5 sp). As explained, in the apportioned type stator coil 30, the coil pitch between the pair of coil sides 21, 21 which is five slot pitches (5 sp) is the minimum among the plurality of (three) unit coils 20 forming the pole paired coil 32. In this situation, the coil end length ratio of the pole paired coil 32 becomes 15.5 (=5×1/2+7+6). In other words, the coil end length ratio of the pole paired coil 32 according to the embodiment is maximally shortened compared to the coil end length ratios of the pole coils 931 of the second reference embodiment and the third reference embodiment.

According to the rotating electrical machine 100 of the embodiment, the coil pitch (five slot pitches (5 sp)) between the pair of coil sides 21, 21 of the half-coil 23*h* (third unit coil 20*c*) is the minimum among the plurality of (three) unit coils 20 (first unit coil 20*a*, second unit coil 20*b* and third unit coil 20*c*) forming the pole paired coil 32. Therefore, according to the rotating electrical machine 100 of the embodiment, the coil end length can be shortened, and each pair of coil ends 22, 22 of each unit coil 20 can be downsized, compared to the rotating electrical machine which is equipped with a so-called integrated stator coil which magnetic pole number of the mover 70 and the slot number of the stator 40 are the equivalent.

Each cross-sectional area of the pair of coil sides 21, 21 of the half-coil 23*h* is about half of each cross-sectional area of the pair of coil sides 21, 21 of the full-coil 23*f* and accordingly, compared to the space for accommodation of the full-coil 23*f*, the necessary space for accommodation for half-coil 23*h* is needed only half in size of the full-coil 23*f*. Further, the minimum bending radius (radius of curvature) and the bending deformation operation force of the half-coil 23*h* are small compared to those of the full-coil 23*f* and accordingly, the accommodation adjustment for the half-coil 23*h* is easily performed compared to that for the full-coil 23*f*. Accordingly, the inside empty space of the full-coil 23*f* can be effectively used by accommodating the pair of coil ends 22, 22 of the half-coil 23*h* inside of the pair of coil ends 22, 22 of the full-coil 23*f*, to thereby downsize the pair of coil ends 22, 22 of each unit coil 20.

(Connecting Order of Each Unit Coil 20 in Pole Paired Coil 32)

Next, a preferable order of connection for the plurality of (in the embodiment, three) unit coils 20 (first unit coil 20*a*, second unit coil 20*b* and third unit coil 20*c*) forming the pole paired coil 32 will be explained. It is preferable for the plurality of (three) unit coils 20 (first unit coil 20*a*, second unit coil 20*b* and third unit coil 20*c*) forming the pole paired coil 32 to electrically connect the most mutually adjacently arranged unit coils 20, 20.

As shown in FIG. 2, according to the embodiment, the plurality of (three) unit coils 20 (first unit coil 20*a*, second unit coil 20*b* and third unit coil 20*c*) forming the pole paired coil 32 are connected in order of the first unit coil 20*a*, the second unit coil 20*b* and the third unit coil 20*c*. In other words, the most adjacently arranged first unit coil 20*a* and the second unit coil 20*b* are electrically connected and most adjacently arranged second unit coil 20*b* and the third unit coil 20*c* are electrically connected.

As shown in FIG. 9, the pole coil connecting portion 32*c* can be crossed over further outside (front side of the paper) of the coil end 22 of the second unit coil 20*b* in the third direction (Z-arrow direction). Therefore, the wiring of the pole coil connecting portion 32*c* needs not detour the unit coil connecting portion 31*c* and another unit coil 20 (second unit coil 20*b* and third unit coil 20*c*). It is noted here that the unit coil connecting portion 31*c* can be accommodated between the coil ends 22, 22 provided between the second unit coil 20*b* and the third unit coil 20*c*.

Figure 28:
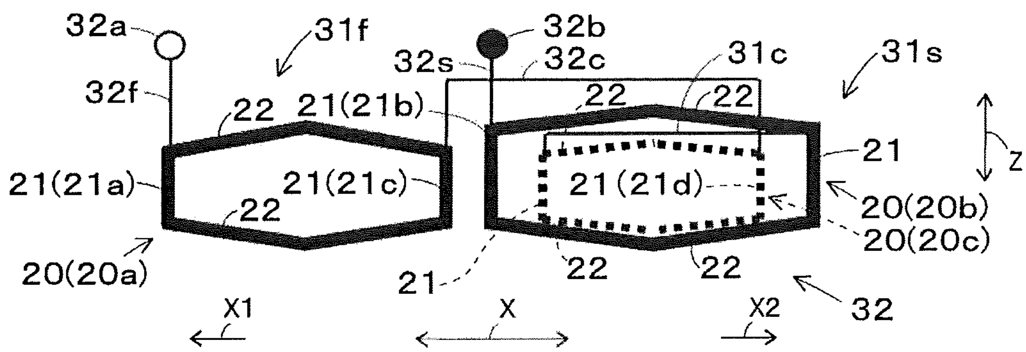
FIG. 28 is a schematic view of an example of the structure of the pole paired coil 32, seen from the slot opening portion 11*b* side in the second direction (Y-arrow direction) associated with the ninth modified embodiment.

On the other hand, as shown in FIG. 28, according to the ninth modified embodiment, the plurality of (three) unit coils 20 (first unit coil 20*a*, second unit coil 20*b* and third unit coil 20*c*) forming the pole paired coil 32 are connected in order of the first unit coil 20*a*, the third unit coil 20*c* and the second unit coil 20*b*. Therefore, the one end side of the pole coil connecting portion 32*c* is connected with the first unit coil 20*a* and the other end side of the pole coil connecting portion 32*c* is connected with the third unit coil 20*c*. Further, the one end side of the unit coil connecting portion 31*c* is connected with the third unit coil 20*c* and the other end side of the unit coil connecting portion 31*c* is connected with the second unit coil 2*b*.

Figure 29:
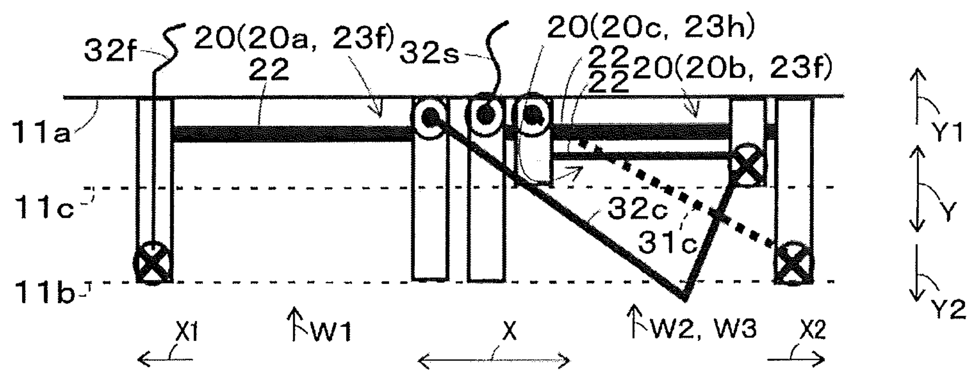
FIG. 29 is a schematic view of the pole paired coil 32, seen from the slot opening portion 11*b* side in the third direction (Z-arrow direction) shown in FIG. 28 being mounted in the plurality of slots (six) 11, associated with the ninth modified embodiment.

As shown in FIG. 29, in the second pole coil 31*s*, the third unit coil 20*c* is provided at the most inner side and the second unit coil 20*b* is provided outside of the third unit coil 20*c*. The third unit coil 20*c* and the second unit coil 20*b* are wound consecutively in this order and are assembled to the plurality of slots 11 of the stator coil iron core 10 using the coil inserting machine 31 (inserter tool). Then, the pole coil connecting portion 32*c* is led out to the slot opening portion 11*b* side. In other words, the wiring of the pole coil connecting portion 32*c* has to devour the unit coil connecting portion 31*c* and another unit coil 20 (second unit coil 20*b* and the third unit coil 20*c*) thereby to extend over towards the second direction slot opening portion side (Y2-arrow direction). It is noted that the unit coil connecting portion 31*c* can be accommodated in a space between the coil ends 22, 22 between the second unit coil 20*b* and the third unit coil 20*c*. It is further noted that the pole coil connecting portion 32*c* and the unit coil connecting portion 31*c* are not intersecting with the pair of coil leading portions 32*f*, 32*s*.

According to the rotating electrical machine 100 of the embodiment, in the plurality of (three) unit coils 20 (first unit coil 20*a*, second unit coil 20*b* and third unit coil 20*c*) forming the pole paired coil 32, the most mutually adjacently arranged unit coils 20, 20 (first unit coil 20*a* and second unit coil 20*b* and second unit coil 20*b* and third unit coil 20*c*) are electrically connected with each other. Therefore, the rotating electrical machine 100 of the embodiment can be wired without detouring the pole coil connecting portion 32*c* to thereby simplify the wiring of the pole coil connecting portion 32*c*.

(Embodiment Regarding a Pair of Coil Ends 22, 22 of Each Unit Coil 20)

Next, a preferable embodiment of the pair of coil ends 22, 22 of each unit coil 20 will be explained. It is preferable that each pair of coil ends 22, 22 of the plurality of (twelve in each phase of three-phase, totaling of thirty-six) unit coils 20 included in the stator coil 30 at both end portions in the third direction (Z-arrow direction) at every phase coil 33 (U-phase coil 33*u*, V-phase coil 33*v* and W-phase coil 33*w*) in the second direction (Y-arrow direction) or the third direction (Z-arrow direction) and is formed with a multi-layered winding.

Figure 30A:
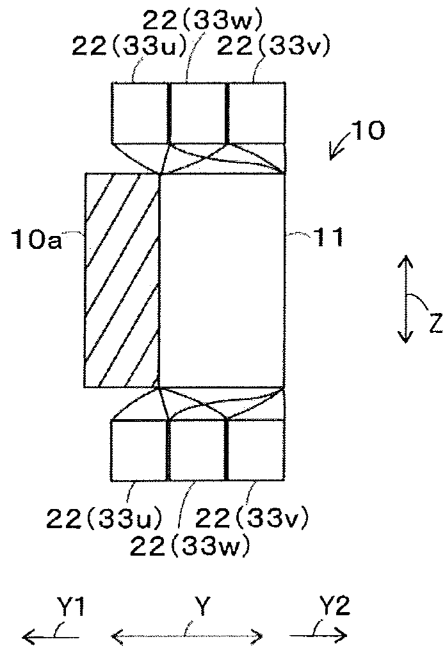
FIG. 30A is a cross-sectional end plan view of an example of the pair of coil ends 22, 22 of the unit coil 20 per each phase coil 33 unit (U-phase coil 33*u*, V-phase coil 33*v* and W-phase coil 33*w*) being arranged by cutting the stator 40 along in the second direction (Y-arrow direction) associated with the first embodiment.

As shown in FIG. 30A, each pair of coil ends 22, 22 of the plurality of (twelve in each phase of three-phase, totaling of thirty-six) unit coils 20 included in the stator coil 30 at both end portions in the third direction (Z-arrow direction) at every phase coil 33 (U-phase coil 33*u*, V-phase coil 33*v* and W-phase coil 33*w*) in the second direction (Y-arrow direction) is provided respectively. In detail, the pair of coil ends 22, 22 of the unit coil 20 of the firstly assembled U-phase coil 33*u* is provided at the most slot bottom portion 11*a* side. The pair of coil ends 22, 22 of the unit coil 20 of the secondly assembled W-phase coil 33*w* is provided at the slot opening portion 11*b* side compared to the provision of the pair of coil ends 22, 22 of the unit coil 20 of the U-phase coil 33*u*. The pair of coil ends 22, 22 of the unit coil 20 of the lastly assembled V-phase coil 33*v* is provided at the most slot opening portion 11*b* side.

Figure 30B:
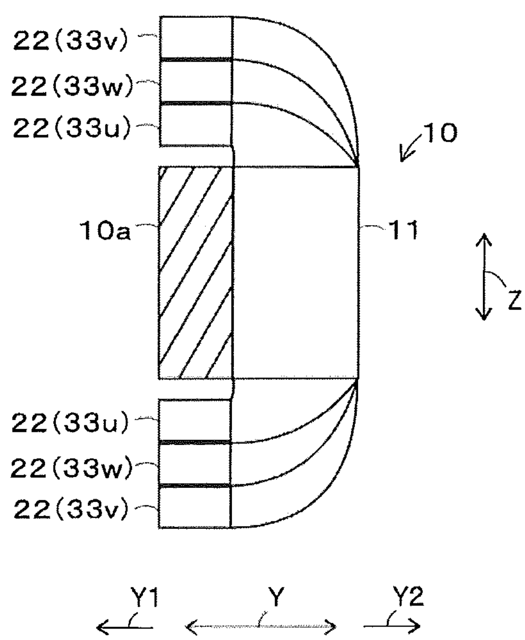
FIG. 30B is a cross-sectional end plan view of another example of the pair of coil ends 22, 22 of the unit coil 20 per each phase coil 33 unit (U-phase coil 33*u*, V-phase coil 33*v* and W-phase coil 33*w*) being arranged by cutting the stator 40 along in the second direction (Y-arrow direction) associated with the first embodiment.

Further, as shown in FIG. 30B, each pair of coil ends 22, 22 of the plurality of (twelve in each of three-phase, totaling of thirty-six) unit coils 20 included in the stator coil 30 is provided at both end portions in the third direction (Z-arrow direction) at every phase coil 33 (U-phase coil 33*u*, V-phase coil 33*v* and W-phase coil 33*w*) in the third direction (Z-arrow direction). In detail, the pair of coil ends 22, 22 of the unit coil 20 of the firstly assembled U-phase coil 33*u* is provided at the most stator iron core 10 side. The pair of coil ends 22, 22 of the unit coil 20 of the secondly assembled W-phase coil 33*w* is provided outside of the third direction (Z-arrow direction) compared to the provision of the pair of coil ends 22, 22 of the unit coil 20 of the U-phase coil 33*u*. The pair of coil ends 22, 22 of the unit coil 20 of the lastly assembled V-phase coil 33*v* is provided at the most outside of the third direction (Z-arrow direction). Thus, in either of the embodiments shown in FIGS. 30A and 30B, the pair of coil ends 22, 22 of the unit coil 20 of the plurality of (twelve in each of three-phase, totaling of thirty-six (36)) unit coils 20 included in the stator coil 30 is formed with a multi-layered winding (in the embodiment, three layers). Further, the rotating electrical machine 100 of the embodiment is a cylindrical type rotating electrical machine and the pair of coil ends 22, 22 of the plurality of (twelve in each of three-phase, totaling of thirty-six) unit coils 20 included in the stator coil 30 is formed approximately concentric with each other, seen from the third direction (Z-arrow direction).

According to the rotating electrical machine 100 of the embodiment, each pair of coil ends 22, 22 of the plurality of (twelve in each phase of three-phase, totaling of thirty-six) unit coils 20 included in the stator coil 30 is provided at both end portions in the third direction (Z-arrow direction) at every phase coil 33 (U-phase coil 33*u*, V-phase coil 33*v* and W-phase coil 33*w*) in the second direction (Y-arrow direction) or the third direction (Z-arrow direction) to be formed with multi-layers. Accordingly, the pair of coil ends 22, 22 of the unit coil 20 of the rotating electrical machine 100 of the embodiment can be simplified and down-sized. Further, according to the rotating electrical machine 100 of the embodiment, it is easy to provide insulation materials which secure the electric insulation among the phase coils 33 (U-phase coil 33*u*, V-phase coil 33*v* and W-phase coil 33*w*). The insulation materials are not limited as long as the material can insulate electrically among the phase coils 33 (U-phase coil 33*u*, V-phase coil 33*v* and W-phase coil 33*w*). As an insulation material, sheet like in-between phase insulation paper may be used.

Second Embodiment

This embodiment is different in the number of slots per every pole and every phase from that of the first embodiment. Further, in this embodiment, the arrangement of the half-coil 23*h* is different from the arrangement of the first embodiment. Hereinafter, the points different from the first embodiment will be mainly explained.

(Arrangement of Half-Coil 23*h* and Pair of Coil Leading Portions 32*f*, 32*s*)

Figure 31:
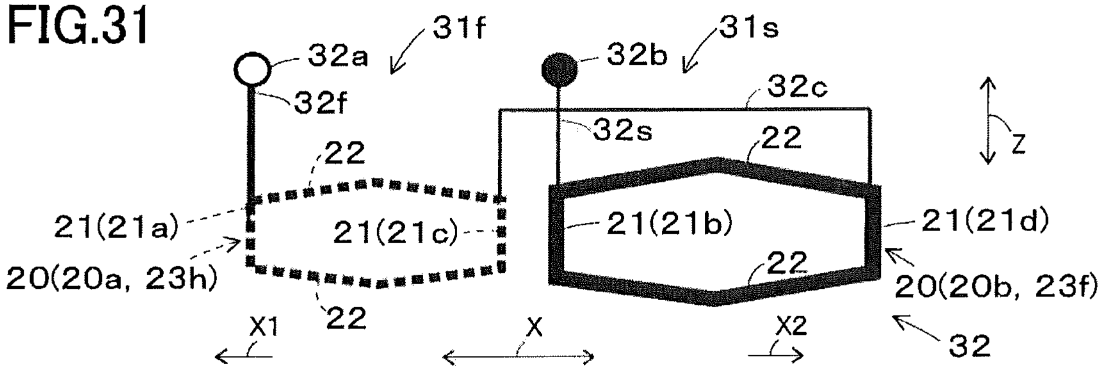
FIG. 31 is a schematic view of an example of structure of the pole paired coil 32 associated with the second embodiment, seen from the slot opening portion 11*b* side in the second direction (Y-arrow direction)
Figure 32:
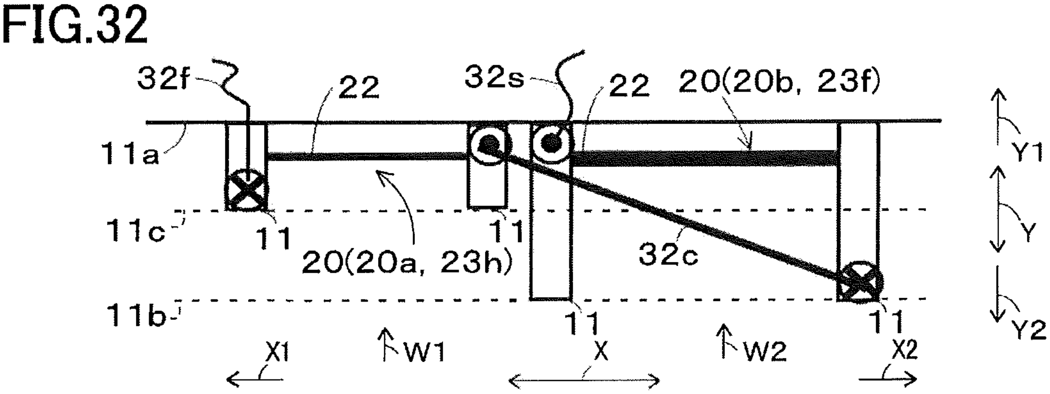
FIG. 32 is a schematic view of an example of the pole paired coil 32 being mounted in the plurality of (four) slots 11 shown in FIG. 31 seen from the pair of coil leading portions 32*f*, 32*s* in third direction (Z-arrow direction) associated with the second embodiment.

The rotating electrical machine 100 according to the embodiment is a three-phase rotating electrical machine with eight poles and thirty-six slots structure (three-phase rotating electrical machine having the basic structure having two magnetic poles of the mover 70, nine slots of stator 40). The number of slots per every pole and every phase is 1.5. Further, as shown in FIGS. 31 and 32, according to this embodiment, each pole paired coil 32 includes a half-coil 23*h* at the first pole coil 31*f* and the first pole coil 31*f* includes one unit coil 20 and the one unit coil 20 is defined to be the first unit coil 20*a*. The coil pitch between the pair of coil sides 21, 21 of the first unit coil 20*a* is set to be three slot pitches. The first unit coil 20*a* is wound concentrically to form the first pole coil 31*f*.

The second pole coil 31*s* includes one unit coil 20 and the one unit coil 20 is defined to be the second unit coil 20*b*. The coil pitch between the pair of coil sides 21, 21 of the second unit coil 20*b* is set to be four slot pitches. The second unit coil 20*b* is wound concentrically to form the second pole coil 31*s*. According to this embodiment, the first unit coil 20*a* is the half-coil 23*h* and the second unit coil 20*b* is the full-coil 23*f*.

Further, the winding advancing direction W1 of the first unit coil 20*a* and the winding advancing direction W2 of the second unit coil 20*b* are both the second direction slot bottom portion side (Y1-arrow direction). Further, the winding direction of the first unit coil 20*a* seen from the winding advancing direction W1 of the first unit coil 20*a* is a counterclockwise direction. The winding direction of the second unit coil 20*b* seen from the winding advancing direction W2 of the second unit coil 20*b* is a clockwise direction.

The first coil leading portion 32*f* is led out from the coil side 21 (first coil side 21*a*) of the first direction first pole coil side (X1-arrow direction) of the one single unit coil 20 (first unit coil 20*a*) which forms the first pole coil 31*f*. Further, the second coil leading portion 32*s* is led out from the coil side 21 (second coil side 21*b*) of the first direction first pole coil side (X1-arrow direction) of the one unit coil 20 (second unit coil 20*b*) which forms the second pole coil 31*s*. It is noted that in FIG. 32 the first coil leading portion 32*f* is led out from the slot central portion 11*c* and the second coil leading portion 32*s* is led out from the most slot bottom portion 11*a* side.

As shown in FIG. 32, in this embodiment, the pole coil connecting portion 32*c* is not intersecting with the pair of coil leading portions 32*f*, 32*s*. Further, the pole coil connecting portion 32*c* can cross over further outside (front side of the paper) of the coil end 22 of the second unit coil 20*b* in the third direction (Z-arrow direction).

Figure 33:
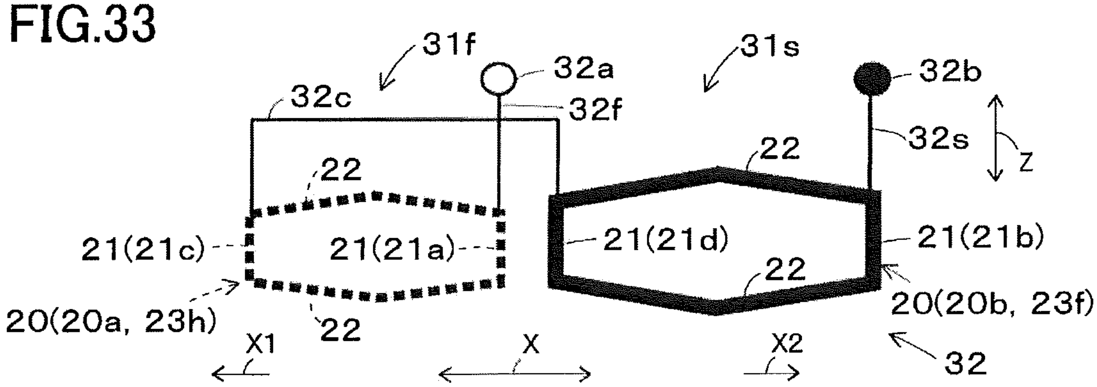
FIG. 33 is a schematic view of an example of structure of the pole paired coil 32 associated with the tenth modified embodiment, seen from the slot opening portion 11*b* side in the second direction (Y-arrow direction)
Figure 34:
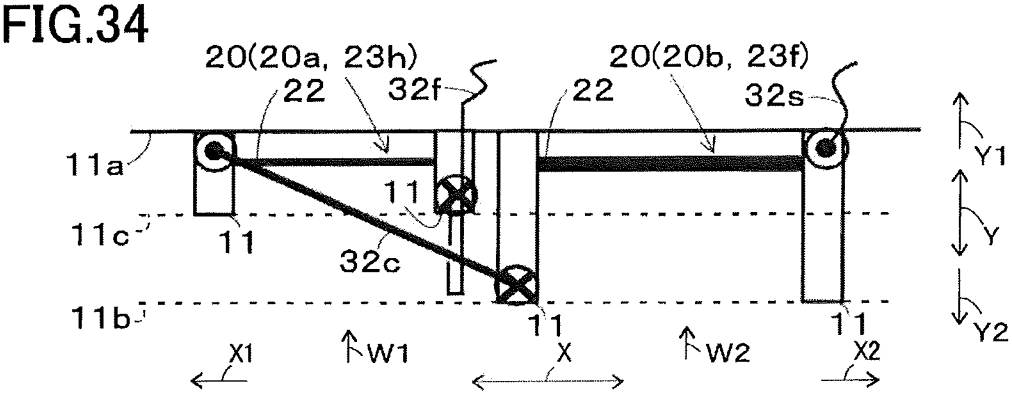
FIG. 34 is a schematic view of an example of structure of the pole paired coil 32 seen from the coil leading portions 32*f*, 32*s* side shown in FIG. 33, in the third direction (Z-arrow direction) being mounted in the plurality of (four) slots 11, associated with the tenth modified embodiment.

The arrangement of the half-coil 23*h* and the pair of coil leading portions 32*f*, 32*s* in the pole paired coil 32 can be changed to the arrangement of the tenth modified embodiment. As shown in FIGS. 33 and 34, according to the tenth modified embodiment, compared to the second embodiment, the arrangement of the pair of coil leading portions 32*f*, 32*s* is different.

In this embodiment, the first coil leading portion 32*f* is led out from the coil side 21 (first coil side 21*a*) of the first direction second pole coil side (X2-arrow direction) of the one unit coil 20 (first unit coil 20*a*) which forms the first pole coil 31*f*. Further, the second coil leading portion 32*s* is led out from the coil side 21 (second coil side 21*b*) of the first direction second pole coil side (X2-arrow direction) of the one unit coil 20 (second unit coil 20*b*) which forms the second pole coil 31*s*. It is noted that in FIG. 34 the first coil leading portion 32*f* is led out from the slot central portion 11*c* and the second coil leading portion 32*s* is led out from the most slot bottom portion 11*a* side.

Further, the pole paired coil 32 includes the half-coil 23*h* at the first pole coil 31*f*. The winding advancing direction W1 of the first unit coil 20*a* and the winding advancing direction W2 of the second unit coil 20*b* are both the second direction slot bottom portion side (Y1-arrow direction). Further, the winding direction of the first unit coil 20*a* seen from the winding advancing direction W1 of the first unit coil 20*a* is a clockwise direction. The winding direction of the second unit coil 20*b* seen from the winding advancing direction W2 of the second unit coil 20*b* is a counterclockwise direction.

In this embodiment, the pole coil connecting portion 32*c* and the first coil leading portion 32*f* are brought into contact and intersecting with each other. In FIG. 34, once the first coil leading portion 32*f* is wound around up to the slot opening portion 11*b* in the second direction slot opening portion side (Y2-arrow direction) and thereafter the first coil leading portion 32*f* is wound in the second direction slot bottom portion side (Y1-arrow direction). The first coil leading portion 32*f* once passes through the stator iron core 10 side (back side of the paper) of the third direction (Z-arrow direction) of the pole coil connecting portion 32*c* and wound around further outside (front side of the paper) of the coil end 22 of the first unit coil 20*a* and the pole coil connecting portion 32*c* in the third direction (Z-arrow direction). In this situation, compared to the embodiment, each pole coil 32 of the modified embodiment is oversized outside in the third direction (Z-arrow direction).

It is noted that the first coil leading portion 32*f* is wound around along in the wiring direction of the pole coil connecting portion 32*c* and is led out from the vicinity of slot bottom portion 11*a* side portion from which the second coil leading portion 32*s* of adjacently arranged another pole paired coil 32 is led out in order to avoid intersection explained above. Therefore, the first coil leading portion 32*f* and the second coil leading portion 32*s* are arranged adjacently to each other and this arrangement may lead to a reduction of efficiency in wiring work and pole paired coil 32 connecting work.

Figure 35:
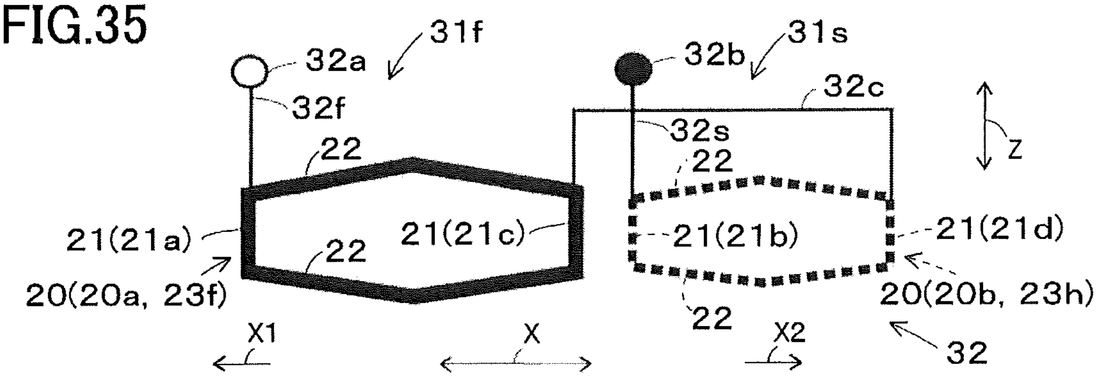
FIG. 35 is a schematic view of an example of structure of the pole paired coil 32, seen from the slot opening portion 11*b* side in the second direction (Y-arrow direction) associated with the eleventh modified embodiment.
Figure 36:
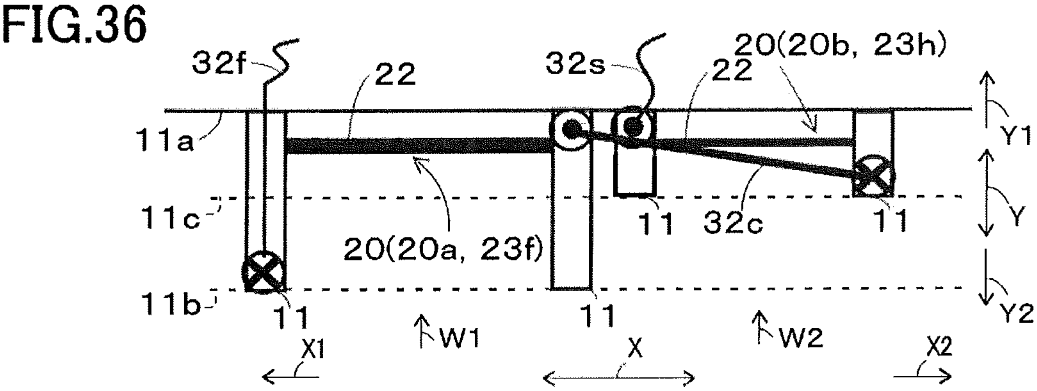
FIG. 36 is a schematic view of an example of the pole paired coil 32 being mounted in the plurality of (four) slots 11 shown in FIG. 35, seen from the pair of coil leading portions 32*f*, 32*s* side in third direction (Z-arrow direction), associated with the eleventh modified embodiment.

Further, the arrangement of the half-coil 23*h* and the pair of coil leading portions 32*f*, 32*s* in the pole paired coil 32 can be changed to the arrangement of the eleventh modified embodiment. As shown in FIGS. 35 and 36, according to the eleventh modified embodiment, compared to the second embodiment, the arrangement of the half-coil 23*h* is different.

According to the modified embodiment, the pole paired coil 32 includes the half-coil 23*h* at the second pole coil 31*s*. The first pole coil 31*f* includes one unit coil 20 and the one unit coil 20 is defined to be the first unit coil 20*a*. The coil pitch between the pair of coil sides 21, 21 of the first unit coil 20*a* is set to be four slot pitches. The first unit coil 20*a* is wound concentrically to form the first pole coil 31*f*.

The second pole coil 31*s* includes one unit coil 20 and the one unit coil 20 is defined to be the second unit coil 20*b*. The coil pitch between the pair of coil sides 21, 21 of the second unit coil 20*b* is set to be three slot pitches. The second unit coil 20*b* is wound concentrically to form the second pole coil 31*s*. According to the embodiment, the first unit coil 20*a* is the full-coil 23*f* and the second unit coil 20*b* is the half-coil 23*h*.

Further, the winding advancing direction W1 of the first unit coil 20*a* and the winding advancing direction W2 of the second unit coil 20*b* are both the second direction slot bottom portion side (Y1-arrow direction). Further, the winding direction of the first unit coil 20*a* seen from the winding advancing direction W1 of the first unit coil 20*a* is a counterclockwise direction. The winding direction of the second unit coil 20*b* seen from the winding advancing direction W2 of the second unit coil 20*b* is a clockwise direction.

According to the modified embodiment, the first coil leading portion 32*f* is led out from the coil side 21 (first coil side 21*a*) of the first direction first pole coil side (X1-arrow direction) of the one unit coil 20 (first unit coil 20*a*) which forms the first pole coil 31*f*. Further, the second coil leading portion 32*s* is led out from the coil side 21 (second coil side 21*b*) of the first direction first pole coil side (X1-arrow direction) of the one unit coil 20 (second unit coil 20*b*) which forms the second pole coil 31*s*. It is noted that in FIG. 36 the first coil leading portion 32*f* is led out from the most slot opening portion 11*b* side and the second coil leading portion 32*s* is led out from the most slot bottom portion 11*a* side.

As shown in FIG. 36, according to the modified embodiment, the pole coil connecting portion 32*c* is not intersecting with the pair of coil leading portions 32*f*, 32*s*. Further, the pole coil connecting portion 32*c* can cross over further outside (front side of the paper) of the coil end 22 of the second unit coil 20*b* in the third direction (Z-arrow direction).

Figure 37:
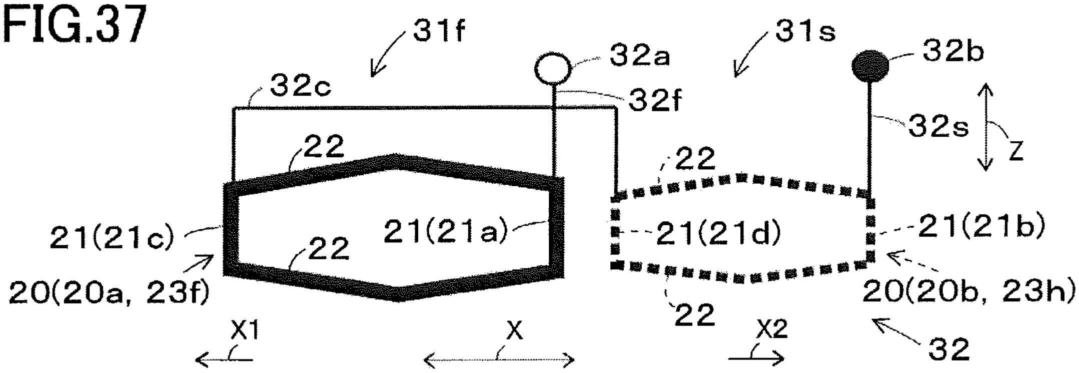
FIG. 37 is a schematic view of an example of structure of the pole paired coil 32 seen from the slot opening portion 11*b* side in the second direction (Y-arrow direction) associated with the twelfth modified embodiment.
Figure 38:
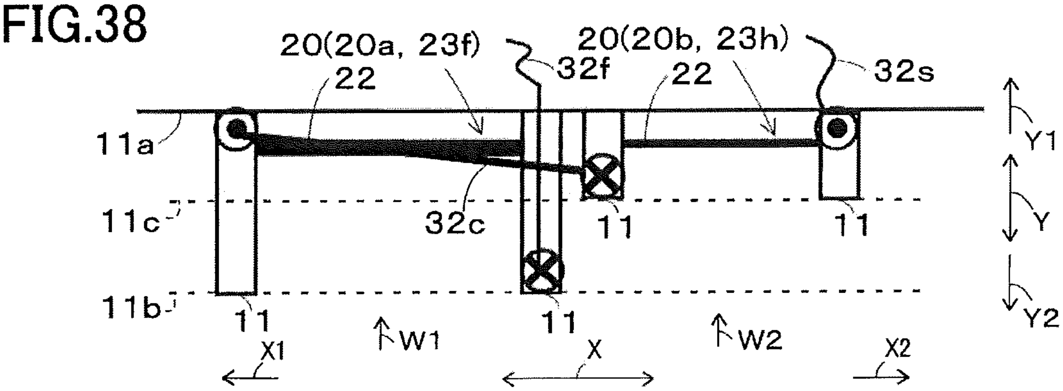
FIG. 38 is a schematic view of an example of structure of the pole paired coil 32, seen from the coil leading portions 32*f*, 32*s* side shown in FIG. 37 in the third direction (Z-arrow direction) being mounted in the plurality of (four) slots 11, associated with the twelfth modified embodiment.

The arrangement of the half-coil 23*h* and the pair of coil leading portions 32*f*, 32*s* in the pole paired coil 32 can be changed to the arrangement of the twelfth modified embodiment. As shown in FIGS. 37 and 38, according to the twelfth modified embodiment, compared to the eleventh modified embodiment, the arrangement of the pair of coil leading portions 32*f*, 32*s* is different.

According to the modified embodiment, the first coil leading portion 32*f* is led out from the coil side 21 (first coil side 21*a*) of the first direction second pole coil side (X2-arrow direction) of the one unit coil 20 (first unit coil 20*a*) which forms the first pole coil 31*f*. Further, the second coil leading portion 32*s* is led out from the coil side 21 (second coil side 21*b*) of the first direction second pole coil side (X2-arrow direction) of the one unit coil 20 (second unit coil 20*b*) which forms the second pole coil 31*s*. It is noted that in FIG. 38 the first coil leading portion 32*f* is led out from the most slot opening portion 11*b* side and the second coil leading portion 32*s* is led out from the most slot bottom portion 11*a* side.

Further, the pole paired coil 32 includes the half-coil 23*h* at the second pole coil 31*s*. The winding advancing direction W1 of the first unit coil 20*a* and the winding advancing direction W2 of the second unit coil 20*b* are both the second direction slot bottom portion side (Y1-arrow direction). Further, the winding direction of the first unit coil 20*a* seen from the winding advancing direction W1 of the first unit coil 20*a* is a clockwise direction. The winding direction of the second unit coil 20*b* seen from the winding advancing direction W2 of the second unit coil 20*b* is a counterclockwise direction.

In this modified embodiment, the pole coil connecting portion 32*c* and the first coil leading portion 32*f* are brought into contact and intersecting with each other. The first coil leading portion 32*f* is wound around further outside (front side of the paper) of the coil end 22 of the first unit coil 20*a* and the pole coil connecting portion 32*c* in the third direction (Z-arrow direction). In this situation, compared to the embodiment, each pole paired coil 32 of the modified embodiment is oversized outside in the third direction (Z-arrow direction).

It is noted that the first coil leading portion 32*f* is wound around along in the wiring direction of the pole coil connecting portion 32*c* and led out from the vicinity of slot bottom portion 11*a* side portion from which the second coil leading portion 32*s* of adjacently arranged another pole paired coil 32 is led out in order to avoid intersection explained above. Therefore, the first coil leading portion 32*f* and the second coil leading portion 32*s* are arranged adjacently to each other and this arrangement may lead to a reduction of efficiency in wiring work and pole paired coil 32 connecting work.

According to the rotating electrical machine 100 of the embodiment, the number of slots per every pole and every phase is 1.5. Further, the pole paired coil 32 includes a half-coil 23*h* at the first pole coil 31*f*. Further, the first coil leading portion 32*f* is led out from the coil side 21 (first coil side 21*a*) of the first direction first pole coil side (X1-arrow direction) of the one unit coil 20 (first unit coil 20*a*) which forms the first pole coil 31*f*. The second coil leading portion 32*s* is led out from the coil side 21 (second coil side 21*b*) of the first direction first pole coil side (X1-arrow direction) of the one unit coil 20 (second unit coil 20*b*) which forms the second pole coil 31*s*. It is noted that the first unit coil 20*a* is the half-coil 23*h* and the second unit coil 20*b* is the full-coil 23*f*.

In the embodiment, the pole coil connecting portion 32*c* is not intersecting with the pair of coil leading portions 32*f*, 32*s*. This can be said to the arrangement in the eleventh modified embodiment in which the half-coil 23*h* of the pole paired coil 32 and the pair of coil leading portions 32*f*, 32*s* are arranged similar to the arrangement of the first embodiment. Thus, the pole paired coil 32 of the embodiment and the eleventh modified embodiment can be simplified in wiring by reducing the size of the coil end 22 at the pair of coil leading portions 32*f*, 32*s* side of the third direction (Z-arrow direction), compared to those of the tenth modified embodiment and twelfth modified embodiment.

According to the rotating electrical machine 100 of the embodiment, the number of slots per every pole and every phase is 1.5 and the pole paired coil 32 has one full-coil 23*f* and one half-coil 23*h*. Accordingly, the unit coil connecting portion 31*c* can be eliminated to simplify the wiring in the pole paired coil 32. If the arrangement of the pair of coil leading portions 32*f*, 32*s* is the same, the rotating electrical machine 100 of the embodiment can reduce the interference intersection (contacting and intersecting) between the wiring in the pole paired coil 32 (pole coil connecting portion 32*c* and unit coil connecting portion 31*c*) and the pair of coil leading portions 32*f*, 32*s*, compared to the rotating electrical machine with the number of slots per every pole and every phase being 2.5 or more.

(Arrangement of Phase Coil 33)

It is preferable that the plurality of (in the embodiment, three) phase coils 33 (U-phase coil 33*u*, V-phase coil 33*v* and W-phase coil 33*w*) is mounted in the plurality of (thirty-six) slots 11 by the manufacturing method including the first mounting process, the second phase advance mounting process and the third phase advance mounting process, which are described in the first embodiment. Thus, as shown in FIGS. 39A through 39D, the plurality of (three) phase coils 33 is assembled in order of the U-phase coil 33*u*, V-phase coil 33*v* and W-phase coil 33*w*.

Figure 39A:
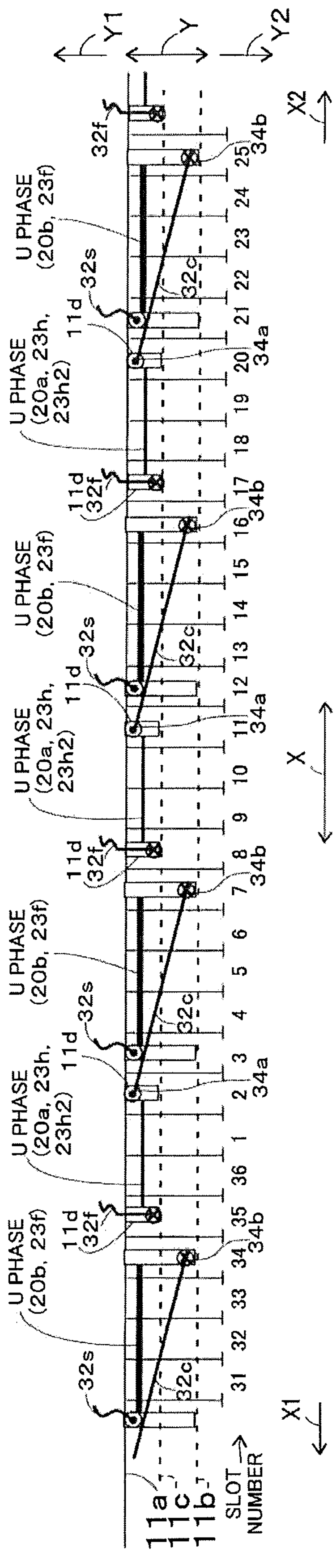
FIG. 39A is a schematic view of the U-phase coil 33*u* being mounted in the plurality of slots 11, seen from the pair of coil leading portions 32*f*, 32*s* side in the third direction (Z-arrow direction) associated with the second embodiment.

As shown in FIG. 39A, the first coil leading portion 32*f* of the U-phase coil 33*u* is led out from the slot central portion 11*c* side and is wound around in the second direction slot bottom portion side (Y1-arrow direction). The first coil leading portion 32*f* of the U-phase coil 33*u* can be wound around further outside (front side of the paper) of the coil end 22 of the first unit coil 20*a* of the U-phase coil 33*u* in the third direction (Z-arrow direction). The second coil leading portion 32*s* of the U-phase coil 33*u* is led out from the slot bottom portion 11*a* side.

As explained, the pair of coil leading portions 32*f*, 32*s* and the crossover line (pole coil connecting portion 32*c*) in the pole paired coil 32 of the U-phase coil 33*u* are not intersecting with each other and further, since the U-phase coil 33*u* is mounted first, it is not affected by another phase coil 33 (V-phase coil 33*v* and W-phase coil 33*w*) and accordingly, each of the pair of coil sides 21, 21 of the half-coil 23*h* is arranged at the slot bottom portion 11*a* side. In other words, the U-phase half-coil 23*h* is the one-side occupying half-coil 23*h*2.

Figure 39B:
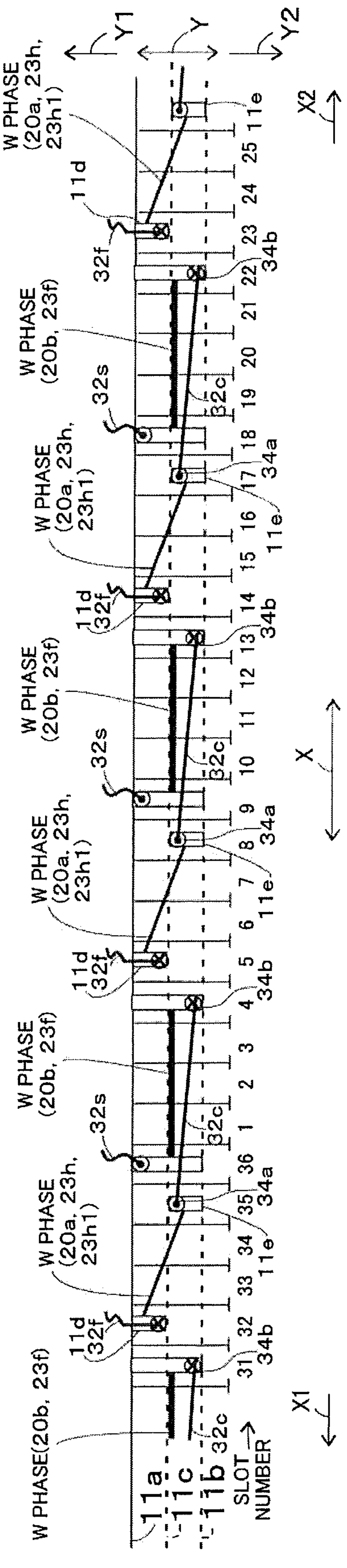
FIG. 39B is a schematic view of the W-phase coil 33*w* being mounted in the plurality of slots 11, seen from the pair of coil leading portions 32*f*, 32*s* side in the third direction (Z-arrow direction) associated with the second embodiment.

As shown in FIG. 39B, the first coil leading portion 32*f* of the W-phase coil 33*w* is led out from the slot central portion 11*c* side and wound around in the second direction slot bottom portion side (Y1-arrow direction). The first coil leading portion 32*f* of the W-phase coil 33*w* can be wound around further outside (front side of the paper) of the coil end 22 of the first unit coil 20*a* of the W-phase coil 33*w* in the third direction (Z-arrow direction). The second coil leading portion 32*s* of the W-phase coil 33*w* is led out from the slot bottom portion 11*a* side.

As explained, the pair of coil leading portions 32*f*, 32*s* and the crossover line (pole coil connecting portion 32*c*) in the pole paired coil 32 of the W-phase coil 33*w* are not intersecting with each other and further, since the W-phase coil 33*w* is mounted after U-phase 33*u*, one coil side 21 of the pair of coil sides 21, 21 of the half-coil 23*h* is arranged at the slot bottom portion 11*a* side and the other coil side 21 of the pair of coil sides 21, 21 is arranged at the slot opening portion 11*b* side. In other words, the W-phase half-coil 23*h* is the both-side occupying half-coil 23*h*1.

Figure 39C:
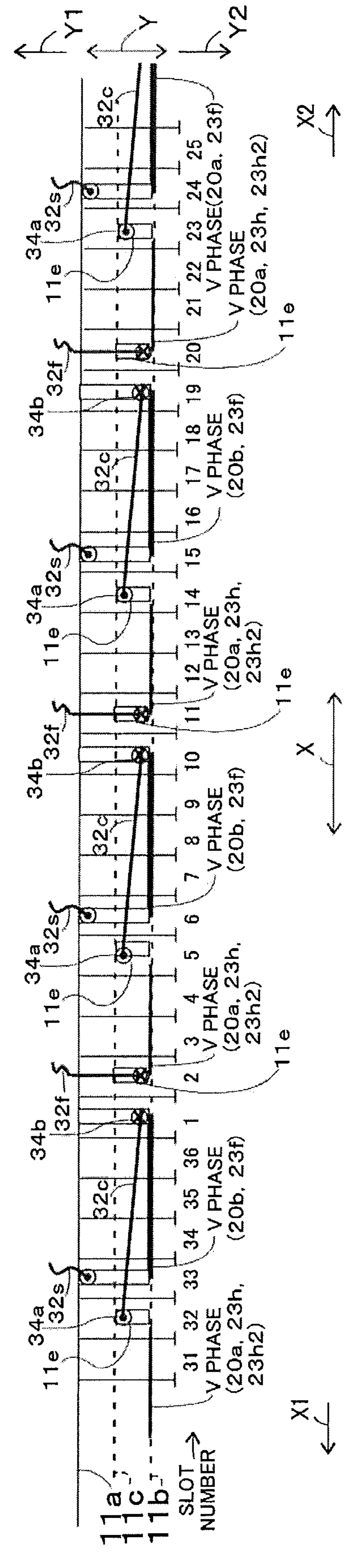
FIG. 39C is a schematic view of the V-phase coil 33*v* being mounted in the plurality of slots 11 seen from the pair of coil leading portions 32*f*, 32*s* side in the third direction (Z-arrow direction) associated with the second embodiment.
Figure 39D:
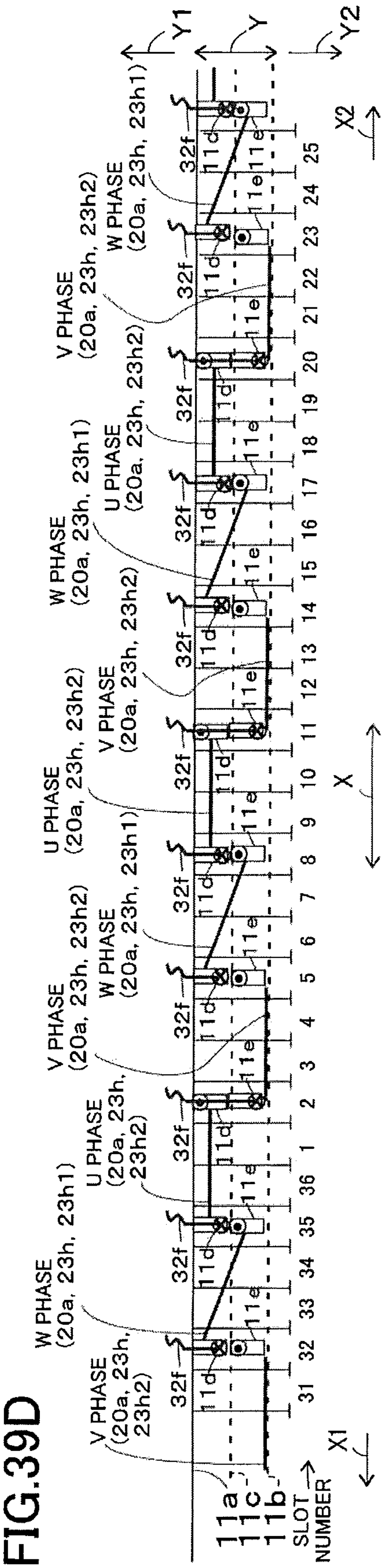
FIG. 39D is a schematic view of each half-coil 23*h* of the three-phase phase-coil 33 (U-phase coil 33*u*, V-phase coil 33*v* and W-phase coil 33*w*) seen from the pair of coil leading portions 32*f*, 32*s* side in the third direction (Z-arrow direction) being mounted in the plurality of slots 11 associated with the second embodiment.

As shown in FIG. 39C, the first coil leading portion 32*f* of the V-phase coil 33*v* is led out from the slot opening portion 11*b* side and wound around in the second direction slot bottom portion side (Y1-arrow direction). The first coil leading portion 32*f* of the V-phase coil 33*v* can be wound around further outside (front side of the paper) of the coil end 22 of the first unit coil 20*a* of the V-phase coil 33*v* in the third direction (Z-arrow direction). The second coil leading portion 32*s* of the V-phase coil 33*v* is led out from the slot bottom portion 11*a* side.

As explained, the pair of coil leading portions 32*f*, 32*s* and the crossover line (pole coil connecting portion 32*c*) in the pole paired coil 32 of the V-phase coil 33*v* are not intersecting with each other. Further, since the V-phase coil 33*v* is mounted last, both of the pair of coil sides 21, 21 of the half-coil 23*h* are arranged at the slot opening portion 11*b* side. In other words, the V-phase half-coil 23*h* is the one-side occupying half-coil 23*h*2.

As explained, according to the three-phase phase coil 33 (U-phase coil 33*u*, V-phase coil 33*v* and W-phase coil 33*w*), the pair of coil leading portions 32*f*, 32*s* and the crossover line (pole coil connecting portion 32*c*) in the pole paired coil 32 are not intersecting in any phase. It is noted that the first coil leading portion 32*f* of the U-phase coil 33*u* is led out from the slot central portion 11*c* but does not interfere with the crossover line (pole coil connecting portion 32*c*) in the pole paired coil 32. This can be said to the first coil leading portion 32*f* of the W-phase coil 33*w*.

As the result of assembling work using the coil inserting machine 31 (inserter tool), the first coil leading portion 32*f* of the V-phase coil 33*v* passes through further outside (front side of the paper) of the coil end 22 of the first unit coil 20*a* of the U-phase coil 33*u* in the third direction (Z-arrow direction). In other words, the leading line (at least one of the pair of coil leading portions 32*f*, 32*s*) which crosses over further outside (front side of the paper) of the coil end 22 of another phase unit coil 20 corresponds to one phase worth in the third direction (Z-arrow direction). In this specification, such leading line is referred to as another phase crossover leading line. According to the embodiment, the first coil leading portion 32*f* of the V-phase coil 33*v* corresponds to "another phase crossover leading line".

As shown in FIGS. 40A through 40D, the plurality of (three) phase coils 33 (U-phase coil 33*u*, V-phase coil 33*v* and W-phase coil 33*w*) can be mounted in the plurality of (thirty-six) slots 11 in order of the U-phase coil 33*u*, the V-phase coil 33*v* and the W-phase coil 33*w* (same order with the phase order) (thirteenth modified embodiment). According to the thirteenth modified embodiment, the V-phase coil 33*v* is mounted in the plurality of (sixteen) slots 11 deviated in the first direction second pole coil side (X2-arrow direction) by the in-between phase minimum difference worth (electric angle of 120 degrees) relative to the U-phase coil 33*u*. The W-phase coil 33*w* is mounted in the plurality of (sixteen) slots 11 deviated in the first direction second pole coil side (X2-arrow direction) by the in-between phase minimum difference worth (electric angle of 120 degrees) relative to the V-phase coil 33*v*. This method is the same with the manufacturing method of the rotating electrical machine 100 having the first mounting process, the second phase retard mounting process and the third phase retard mounting process, as will be explained in the third embodiment.

Figure 40A:
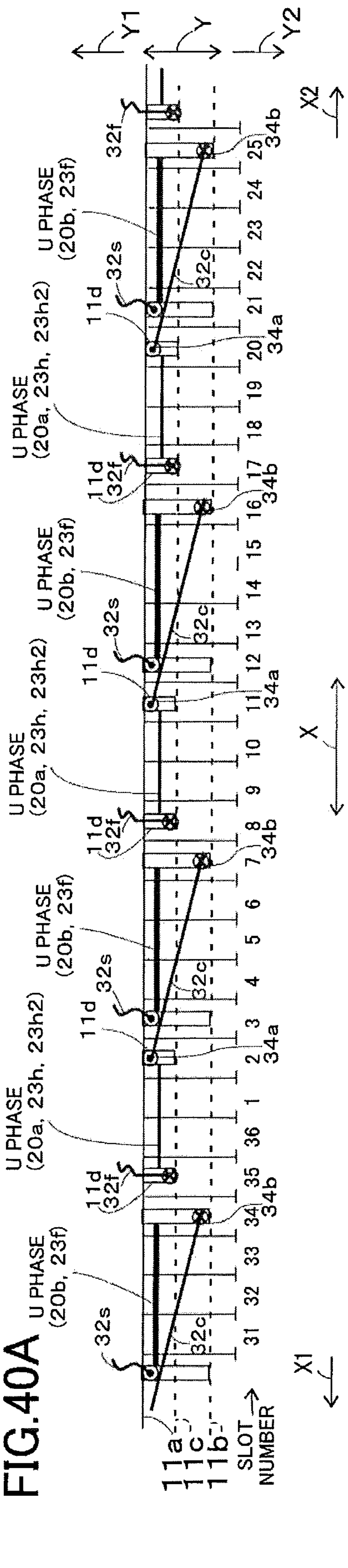
FIG. 40A is a schematic view of the U-phase coil 33*u* being mounted in the plurality of slots 11, seen from the pair of coil leading portions 32*f*, 32*s* side in the third direction (Z-arrow direction) associated with the thirteenth modified embodiment.
Figure 40B:
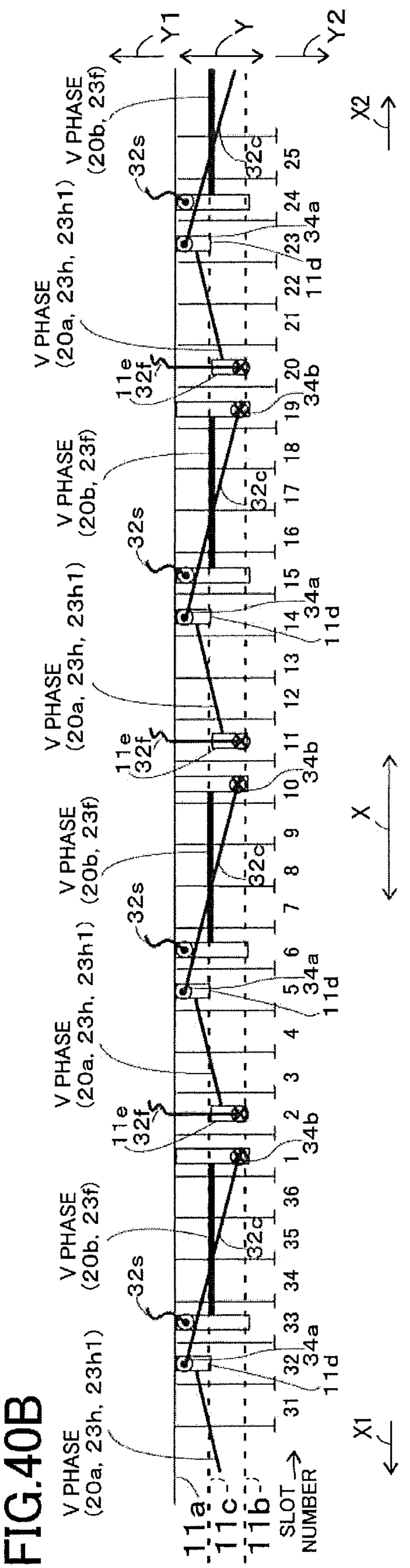
FIG. 40B is a schematic view of the V-phase coil 33*v* being mounted in the plurality of slots 11, seen from the pair of coil leading portions 32*f*, 32*s* side in the third direction (Z-arrow direction) associated with the thirteenth modified embodiment.

As shown in FIG. 40A, the state after the U-phase coil 33*u* has been mounted according to the thirteenth modified embodiment is the same with the state after the U-phase coil 33*u* has been mounted according to the embodiment shown in FIG. 39A. As shown in FIG. 40B, the first coil leading portion 32*f* of the V-phase coil 33*v* is led out from the slot opening portion 11*b* side and wound around in the second direction slot bottom portion side (Y1-arrow direction). The first coil leading portion 32*f* of the V-phase coil 33*v* can be wound around further outside (front side of the paper) of the coil end 22 of the first unit coil 20*a* of the V-phase coil 33*v* in the third direction (Z-arrow direction). It is noted that the second coil leading portion 32*s* of the V-phase coil 33*v* is led out from the slot bottom portion 11*a* side.

As explained, in the V-phase coil 33*v*, the pair of coil leading portions 32*f*, 32*s* and the crossover line (pole coil connecting portion 32*c*) in the pole paired coil 32 are not intersecting with each other. Further, since the V-phase coil 33*v* is mounted after the mounting of the U-phase coil 33*u*, one of the pair of coil sides 21, 21 of the half-coil 23*h* is arranged at the slot bottom portion 11*a* side and the other coil side 21 of the pair of coil sides 21, 21 is arranged at the slot opening portion 11*b* side. In other words, the V-phase half-coil 23*h* is the both-side occupying half-coil 23*h*1.

Figure 40C:
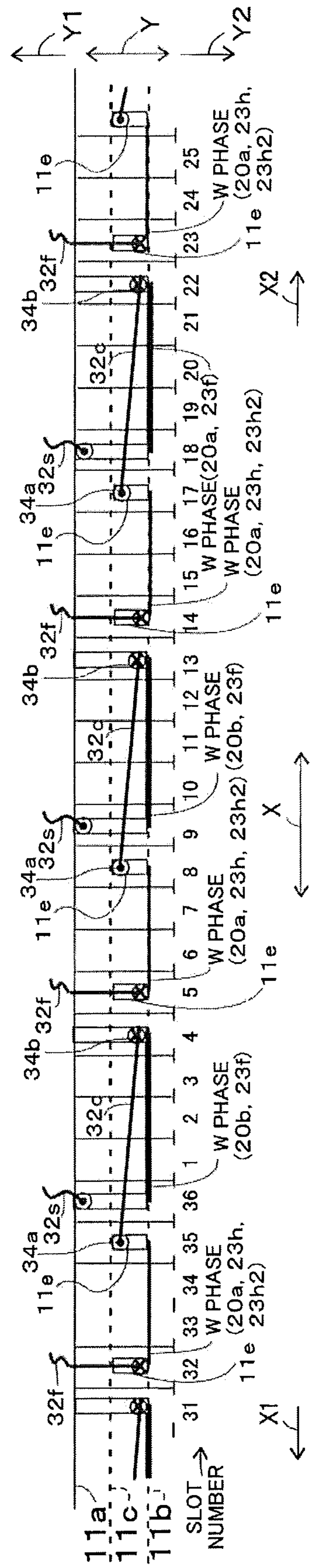
FIG. 40C is a schematic view of the W-phase coil 33*w* being mounted in the plurality of slots 11, seen from the pair of coil leading portions 32*f*, 32*s* side in the third direction (Z-arrow direction) associated with the thirteenth modified embodiment.
Figure 40D:
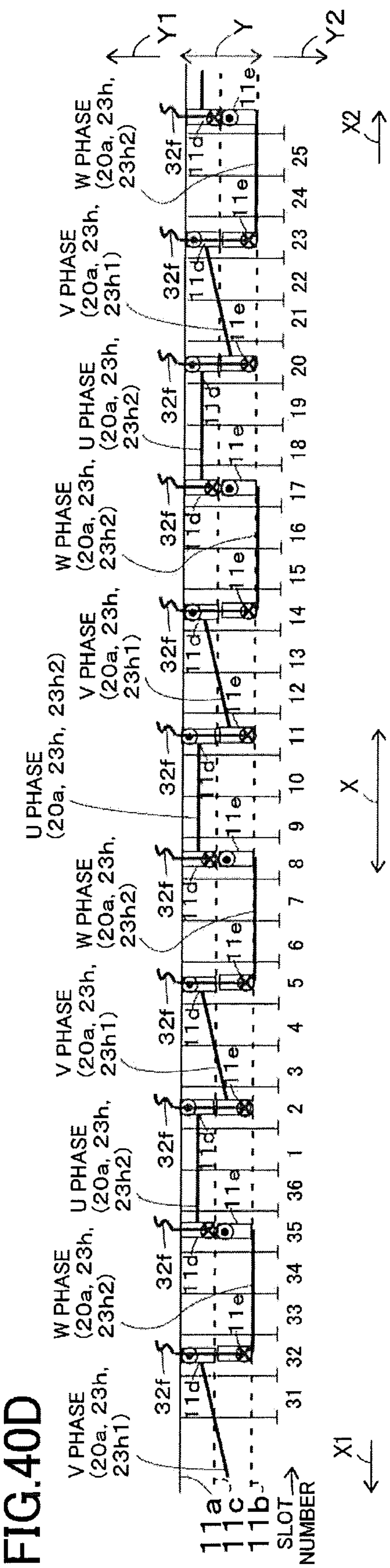
FIG. 40D is a schematic view of each half-coil 23*h* of the three-phase phase-coil 33 (U-phase coil 33*u*, V-phase coil 33*v* and W-phase coil 33*w*) seen from the pair of coil leading portions 32*f*, 32*s* side in the third direction (Z-arrow direction) being mounted in the plurality of slots 11 associated with the thirteenth modified embodiment.

As shown in FIG. 40C, the first coil leading portion 32*f* of the W-phase coil 33*w* is led out from the slot opening portion 11*b* side and wound around in the second direction slot bottom portion side (Y1-arrow direction). The first coil leading portion 32*f* of the W-phase coil 33*w* can be wound around further outside (front side of the paper) of the coil end 22 of the first unit coil 20*a* of the W-phase coil 33*w* in the third direction (Z-arrow direction). The second coil leading portion 32*s* of the W-phase coil 33*w* is led out from the slot bottom portion 11*a* side.

As explained, in the W-phase coil 33*w*, the pair of coil leading portions 32*f*, 32*s* and the crossover line (pole coil connecting portion 32*c*) in the pole paired coil 32 are not intersecting with each other. Further, since the W-phase coil 33*w* is mounted last, both of the pair of coil sides 21, 21 of the half-coil 23*h* are arranged at the slot opening portion 11*b* side. In other words, the W-phase half-coil 23*h* is the one-side occupying half-coil 23*h*2.

As explained, according to the three-phase phase coil 33 (U-phase coil 33*u*, V-phase coil 33*v* and W-phase coil 33*w*), the pair of coil leading portions 32*f*, 32*s* and the crossover line (pole coil connecting portion 32*c*) in the pole paired coil 32 are not intersecting in any phase. It is noted that the first coil leading portion 32*f* of the U-phase coil 33*u* is led out from the slot central portion 11*c* but does not interfere with the crossover line (pole coil connecting portion 32*c*) in the pole paired coil 32.

As the result of assembling work using the coil inserting machine 31 (inserter tool), the first coil leading portion 32*f* of the V-phase coil 33*v* passes through further outside (front side of the paper) of the coil end 22 of the first unit coil 20*a* of the U-phase coil 33*u* in the third direction (Z-arrow direction). Similarly, the first coil leading portion 32*f* of the W-phase coil 33*w* passes through further outside (front side of the paper) of the coil end 22 of the first unit coil 20*a* of the V-phase coil 33*v* in the third direction (Z-arrow direction). In other words, the "another phase crossover leading line" corresponds to the two phases worth in the thirteenth modified embodiment and the first coil leading portion 32*f* of the V-phase coil 33*v* and the first coil leading portion 32*f* of the W-phase coil 33*w* correspond to the "another phase crossover leading line".

On the other hand, according to the embodiment, the "another phase crossover leading line" corresponds to one phase worth and the first coil leading portion 32*f* of the V-phase coil 33*v* corresponds to another phase crossover leading line. As explained, the rotating electrical machine 100 of the embodiment has less number of phases of the "another phase crossover leading line", compared to the number thereof according to the rotating electrical machine 100 of the thirteenth modified embodiment. Accordingly, the rotating electrical machine 100 of the embodiment can reduce the necessary electric insulation portions between the phase coils 33. The materials used for the electric insulation portion are not limited as long as such material can insulate the needed portions electrically and for example, insulation tube may be used. This can be the same with the insulation materials explained in the fourth embodiment.

Figure 40E:
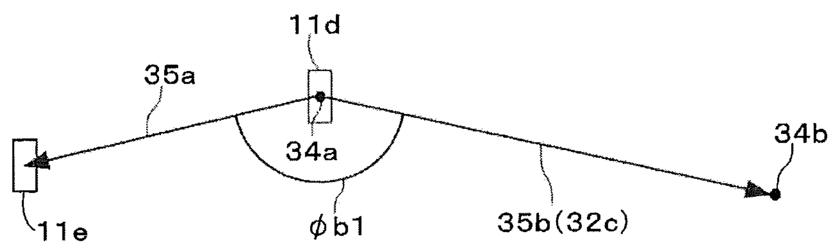
FIG. 40E is a schematic view of angle φb1 formed by the first vector 35*a* and the second vector 35*b* associated with the thirteenth modified embodiment.

As shown in FIG. 40E, according to the thirteenth modified embodiment, the angle φb1 formed by a vector (first vector 35*a*) which has one point in the first half slot portion 11*d* of both side occupying half-coil 23*h*1 as the start point and one point in the second half slot portion 11*e* of both side occupying half-coil 23*h*1 as the end point and a vector (second vector 35*b*) which has the first crossover line end portion 34*a* of the pole coil connecting portion 32*c* as the start point and the second crossover line end portion 34*b* as the end point is set to be an obtuse angle which is larger than mechanical angle of 90 degrees.

Figure 39E:
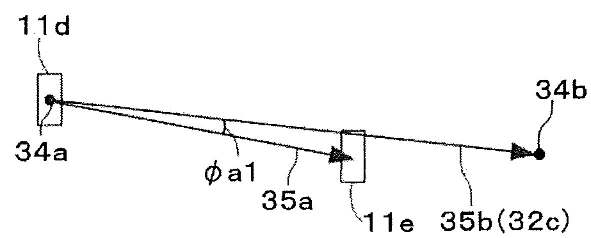
FIG. 39E is a schematic view of angle φa1 formed by the first vector 35*a* and the second vector 35*b* associated with the second embodiment.

On the other hand, as shown in FIG. 39E, according to the embodiment, the angle φa1 formed by a vector (first vector 35*a*) which has one point in the first half slot portion 11*d* of both side occupying half-coil 23*h*1 as the start point and one point in the second half slot portion 11*e* of both side occupying half-coil 23*h*1 as the end point and a vector (second vector 35*b*) which has the first crossover line end portion 34*a* of the pole coil connecting portion 32*c* as the start point and the second crossover line end portion 34*b* as the end point is set to be an acute angle which is smaller than mechanical angle of 90 degrees.

Therefore, the rotating electrical machine 100 according to the embodiment can reduce the interference intersection (contact intersecting state) between each crossover line (unit coil connecting portion 31*c*) of the pole paired coil 32 and the pair of coil leading portions 32*f*, 32*s* and accordingly, reduce the number of another phase crossover leading lines. Thus, according to the pole paired coil 32 of the embodiment, the coil end 22 of the pair of coil leading portions 32*f*, 32*s* of the third direction (Z-arrow direction) can be downsized and the wiring thereof can be simplified, compared to those of the pole paired coil 32 of the thirteenth modified embodiment.

The arrangement of the phase coil 33 (U-phase coil 33*u*, V-phase coil 33*v* and W-phase coil 33*w*) according to the embodiment can be the same with that of the eleventh modified embodiment. In more detail, as shown in FIGS. 41A through 41D, in the eleventh modified embodiment, it is also preferable to mount the plurality of (three) phase coils 33 (U-phase coil 33*u*, V-phase coil 33*v* and W-phase coil 33*w*) in the plurality of (thirty-six (36)) slots 11 in order of the U-phase coil 33*u*, the V-phase coil 33*v* and the W-phase coil 33*w*.

Figure 41A:
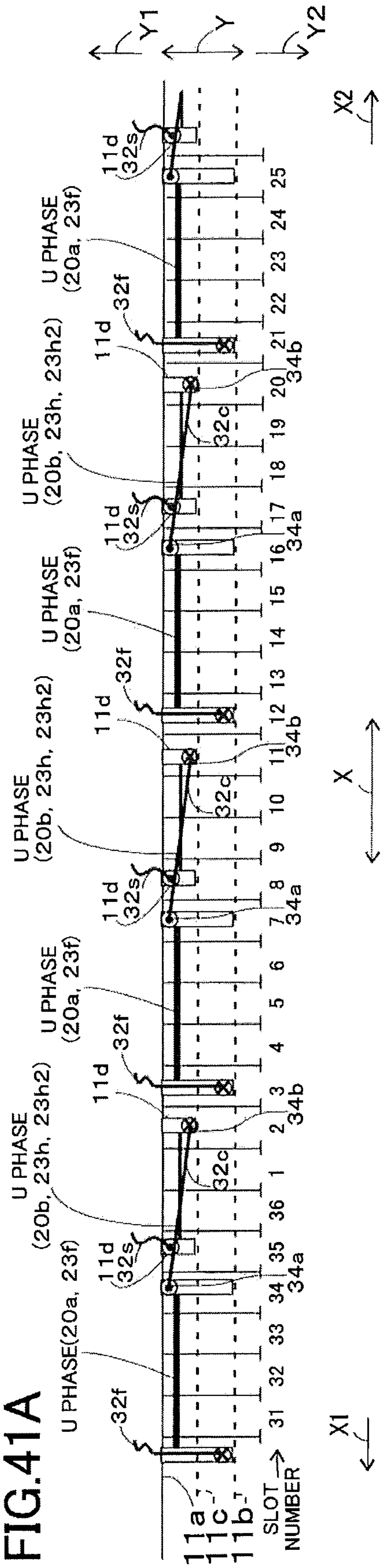
FIG. 41A is a schematic view of the U-phase coil 33*u* being mounted in the plurality of slots 11 seen from the pair of coil leading portions 32*f*, 32*s* side in the third direction (Z-arrow direction) associated with the eleventh modified embodiment.

As shown in FIG. 41A, the first coil leading portion 32*f* of the U-phase coil 33*u* is led out from the slot opening portion 11*b* side and wound around in the second direction slot bottom portion side (Y1-arrow direction). The first coil leading portion 32*f* of the U-phase coil 33*u* can be wound around further outside (front side of the paper) of the coil end 22 of the first unit coil 20*a* of the U-phase coil 33*u* in the third direction (Z-arrow direction). The second coil leading portion 32*s* of the U-phase coil 33*u* is led out from the slot bottom portion 11*a* side. As explained, according to the U-phase coil 33*u*, the pair of coil leading portions 32*f*, 32*s* and the crossover line (pole coil connecting portion 32*c*) in the pole paired coil 32 are not intersecting. Further, the U-phase half-coil 23*h* is the one side occupying half-coil 23*h*2.

Figure 41B:
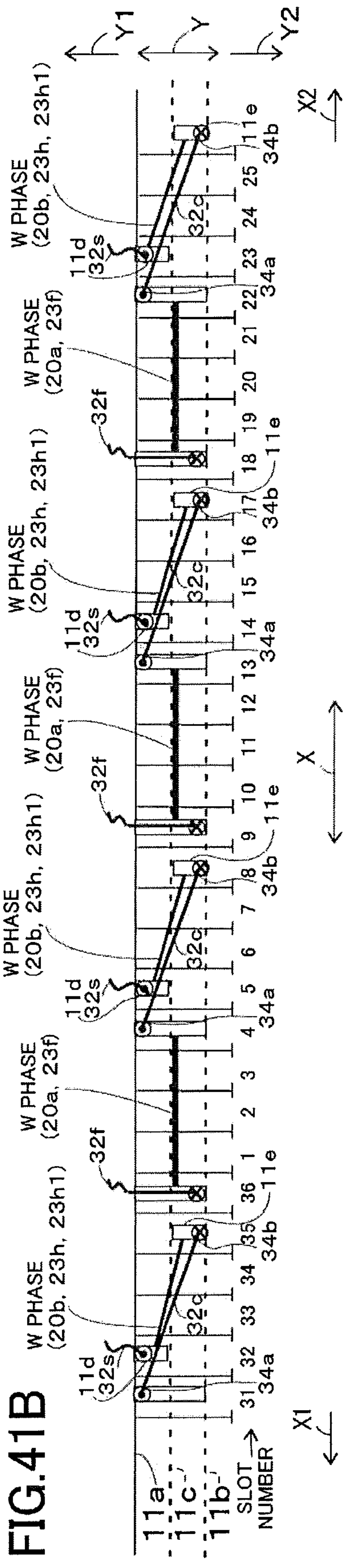
FIG. 41B is a schematic view of the W-phase coil 33*w* being mounted in the plurality of slots 11, seen from the pair of coil leading portions 32*f*, 32*s* side in the third direction (Z-arrow direction) associated with the eleventh modified embodiment.

As shown in FIG. 41B, the first coil leading portion 32*f* of the W-phase coil 33*w* is led out from the slot opening portion 11*b* side and wound around in the second direction slot bottom portion side (Y1-arrow direction). The first coil leading portion 32*f* of the W-phase coil 33*w* can be wound around further outside (front side of the paper) of the coil end 22 of the first unit coil 20*a* of the W-phase coil 33*w* in the third direction (Z-arrow direction). The second coil leading portion 32*s* of the W-phase coil 33*w* is led out from the slot bottom portion 11*a* side. As explained, according to the W-phase coil 33*w*, the pair of coil leading portions 32*f*, 32*s* and the crossover line (pole coil connecting portion 32*c*) of the pole paired coil 32 are not intersecting. Further, the W-phase half-coil 23*h* is the both side occupying half-coil 23*h*1.

Figure 41C:
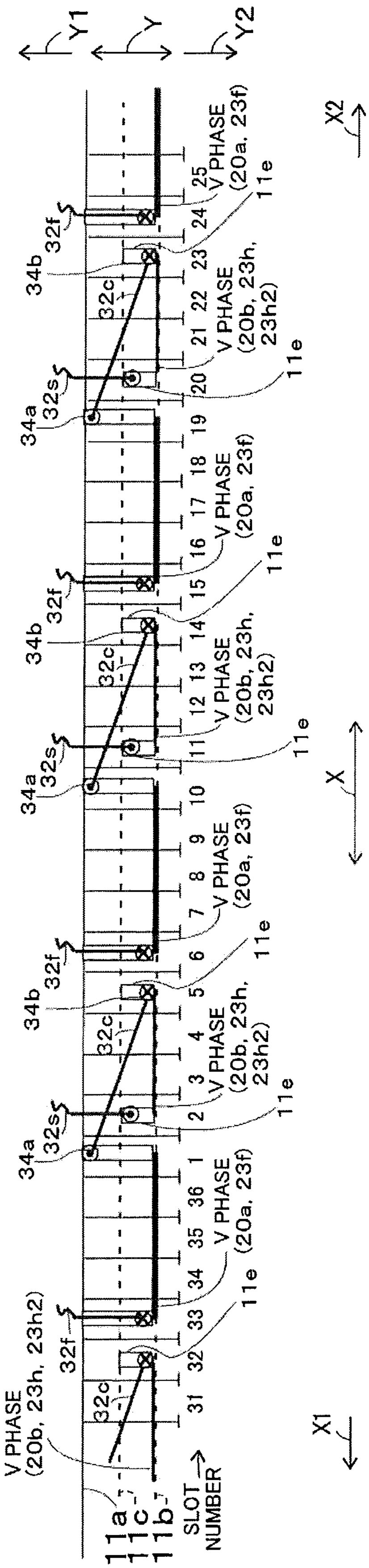
FIG. 41C is a schematic view of the V-phase coil 33*v* being mounted in the plurality of slots 11, seen from the pair of coil leading portions 32*f*, 32*s* side in the third direction (Z-arrow direction) associated with the eleventh modified embodiment.
Figure 41D:
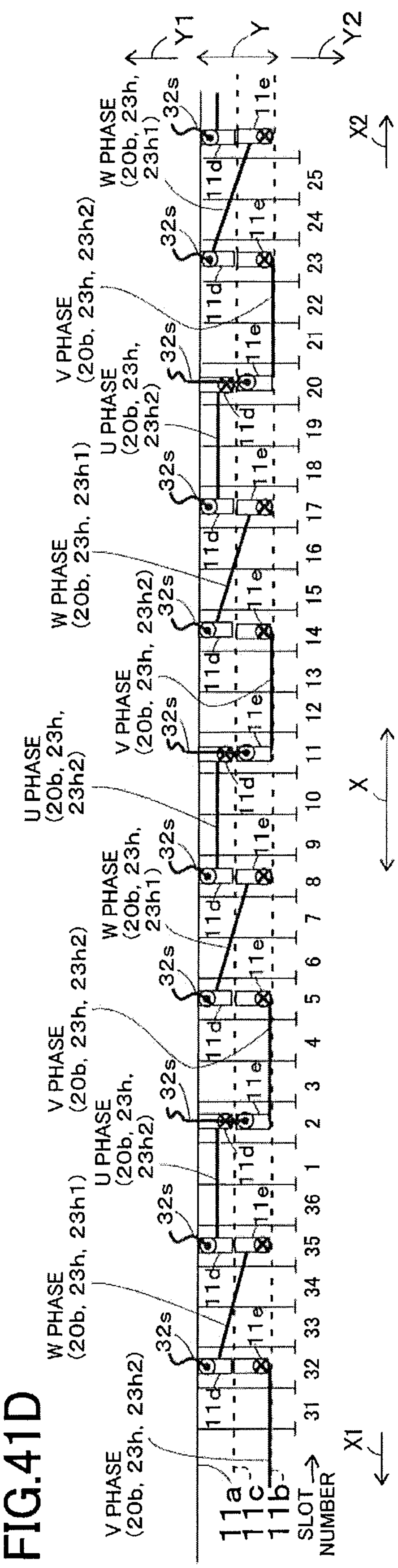
FIG. 41D is a schematic view of each half-coil 23*h* of the three-phase phase-coil 33 (U-phase coil 33*u*, V-phase coil 33*v* and W-phase coil 33*w*) being mounted in the plurality of slots 11, seen from the pair of coil leading portions 32*f*, 32*s* side in the third direction (Z-arrow direction) associated with the eleventh modified embodiment.

As shown in FIG. 41C, the first coil leading portion 32*f* of the V-phase coil 33*v* is led out from the slot opening portion 11*b* side and wound around in the second direction slot bottom portion side (Y1-arrow direction). The first coil leading portion 32*f* of the V-phase coil 33*v* can be wound around further outside (front side of the paper) of the coil end 22 of the first unit coil 20*a* of the V-phase coil 33*v* in the third direction (Z-arrow direction). The V-phase half-coil 23*h* is the one-side occupying half-coil 23*h*2.

The second coil leading portion 32*s* of the V-phase coil 33*v* is led out from the slot central portion 11*c*. In the V-phase coil 33*v*, the second coil leading portion 32*s* and the crossover line (pole coil connecting portion 32*c*) in the pole paired coil 32 are brought into contact and intersecting with each other. Therefore, at the intersecting portion, it is necessary to secure an electrical insulation. As the result of assembling work using the coil inserting machine 31 (inserter tool), the second coil leading portion 32*s* of the V-phase coil 33*v* passes further outside (front side of the paper) of the coil end 22 of the second unit coil 20*b* of the U-phase coil 33*u* in the third direction (Z-arrow direction). In other words, according to the modified embodiment, the "another phase crossover leading line" corresponds to one phase worth and corresponds to the second coil leading portion 32*s* of the V-phase coil 33*v*.

On the other hand, according to the embodiment, in the three-phase phase coil 33 (U-phase coil 33*u*, V-phase coil 33*v* and W-phase coil 33*w*), the pair of coil leading portions 32*f*, 32*s* and the crossover line (pole coil connecting portion 32*c*) in the pole paired coil 32 are not intersecting in any of the phase coils. According to the embodiment, the "another phase crossover leading line" corresponds to one phase worth and corresponds to the first coil leading portion 32*f* of the V-phase coil 33*v*.

As explained before, the pole paired coil 32 of the embodiment and the eleventh modified embodiment can be simplified in wiring by reducing the size of the coil end 22 at the pair of coil leading portions 32*f*, 32*s* side of the third direction (Z-arrow direction) compared to those of the tenth modified embodiment and twelfth modified embodiment. Further, considering the arrangement of the phase coil 33 (U-phase coil 33*u*, V-phase coil 33*v* and W-phase coil 33*w*), the pole paired coil 32 of the embodiment is more preferable compared to that of the eleventh modified embodiment and can be said most preferable compared to those of the pole paired coils 32 in the tenth to twelfth modified embodiments.

According to the eleventh modified embodiment, the first coil leading portion 32*f* of the U-phase coil 33*u* is led out from the slot opening portion 11*b* side and wound around in the second direction slot bottom portion side (Y1-arrow direction). In other words, the first coil leading portion 32*f* of the U-phase coil 33*u* crosses over the slot 11 from the slot opening portion 11*b* side to the slot bottom portion 11*a* side in the depth direction (second direction (Y-arrow direction)) of the slot 11. It is noted that the slot 11 crossover length is defined to be the full crossover length (length ratio: 1). These are the same with the first coil leading portion 32*f* of the V-phase coil 33*v* and the first coil leading portion 32*f* of the W-phase coil 33*w*.

Further, the second coil leading portion 32*s* of the V-phase coil 33*v* is led out from the slot central portion 11*c* and wound around in the second direction slot bottom portion side (Y1-arrow direction). In other words, the second coil leading portion 32*s* of the V-phase coil 33*v* crosses over the slot 11 from the slot central portion 11*c* to the slot bottom portion 11*a* side in the depth direction (second direction (Y-arrow direction)). The slot crossover length of the slot 11 here is defined to be the half crossover length (length ratio: 0.5). It is noted that the second coil leading portion 32*s* of the U-phase coil 33*u* is led out from the slot bottom portion 11*a* side and therefore does not cross over the slot 11. This can be said to the second coil leading portion 32*s* of the W-phase coil 33*w*. As explained above, the slot 11 crossover length of the pair of coil leading portions 32*f*, 32*s* of three phases worth is 3.5 in length ratio which is obtained by adding the three full crossover-lengths (length ratio: 3) and one half-crossover length (length ratio: 0.5).

On the other hand, according to the embodiment, the first coil leading portion 32*f* of the V-phase coil 33*v* is led out from the slot opening portion 11*b* side and wound around in the second direction slot bottom portion side (Y1-arrow direction). In other words, according to the first coil leading portion 32*f* of the V-phase coil 33*v*, the crossover length of the slot 11 corresponds to the full crossover length (length ratio: 1). Further, the first coil leading portion 32*f* of the U-phase coil 33*u* is led out from the slot central portion 11*c* and wound around in the second direction slot bottom portion side (Y1-arrow direction). In other words, according to the first coil leading portion 32*f* of the U-phase coil 33*u*, the crossover length of the slot 11 corresponds to the half crossover length (length ratio: 0.5). The first coil leading portion 32*f* of the W-phase coil 33*w* is similar to the first coil leading portion 32*f* of the U-phase coil 33*u*.

Further, the second coil leading portion 32*s* of the U-phase coil 33*u* is led out from the slot bottom portion 11*a* side and does not cross over the slot 11. This can be said to the second coil leading portion 32*f* of the V-phase coil 33*v* and also to the second coil leading portion 32*f* of the W-phase coil 33*w*. As explained, the slot 11 crossover length of the pair of coil leading portions 32*f*, 32*s* of three phases worth is 2 in length ratio which is obtained by adding the one full crossover-lengths (length ratio: 1) and two half-crossover lengths (length ratio: 1). Thus, the slot 11 crossover length of the embodiment is shortened compared to the pole paired coil 32 of the eleventh modified embodiment.

Third Embodiment

This embodiment is different in the winding advancing direction of each unit coil of each pole paired coil 32, compared to the first embodiment. Further, in this embodiment, the arrangement of the half-coil 23*h* and the pair of coil leading portions 32*f*, 32*s* is different from the arrangement of the first embodiment. Hereinafter, the points different from the first embodiment will be mainly explained.

(Winding Advancing Direction of Each Unit Coil 20)

Figure 42:
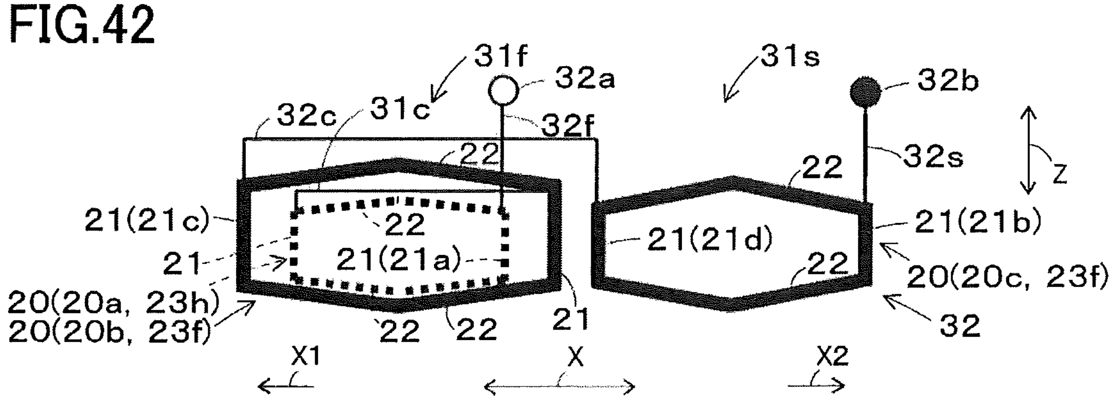
FIG. 42 is a schematic view of the pole paired coil 32, seen from the slot opening portion 11*b* side in the second direction (Y-arrow direction) associated with the third embodiment.
Figure 43:
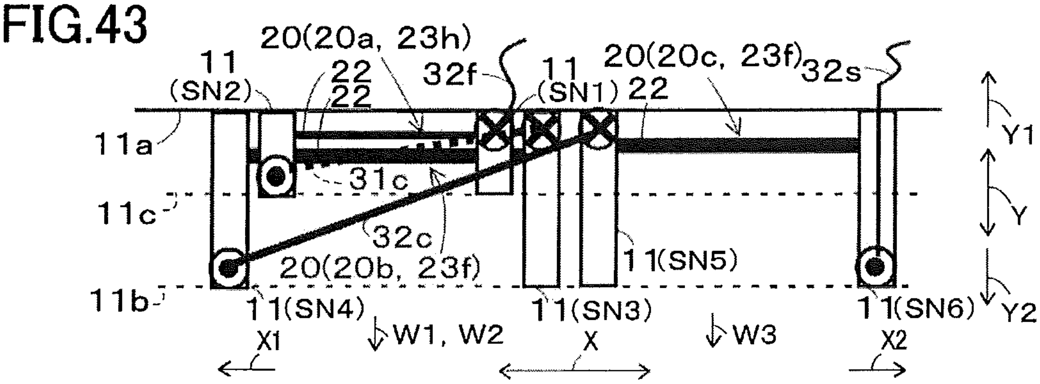
FIG. 43 is a schematic view of an example of the pole paired coil 32 being mounted in the plurality of (six) slots 11 shown in FIG. 42, seen from the pair of coil leading portions 32*f*, 32*s* side in the third direction (Z-arrow direction) associated with the third embodiment.

As shown in FIGS. 42 and 43, according to the embodiment, the first pole coil 31*f* includes a plurality of (in this embodiment, two) unit coils 20 and the two unit coils 20, 20 are the first unit coil 20*a* and the second unit coil 20*b*. The coil pitch between the pair of coil sides 21, 21 of the first unit coil 20*a* is set to be five slot pitches and the coil pitch between the pair of coil sides 21, 21 of the second unit coil 20*b* is set to be seven slot pitches. The first unit coil 20*a* and the second unit coil 20*b* are concentrically wound and are connected in series by the unit coil connecting portion 31*c* to form the first pole coil 31*f*.

The second pole coil 31*s* includes one unit coil 20 and the one unit coil 20 is defined to be the third unit coil 20*c*. The coil pitch between the pair of coil sides 21, 21 of the third unit coil 20*c* is set to be six slot pitches. The third unit coil 20*c* is concentrically wound to form the second pole coil 31*s*. According to the embodiment, the first unit coil 20*a* is the half-coil 23*h* and the second unit coil 20*b* and the third unit coil 20*c* are the full-coil 23*f*.

As shown in FIG. 43, the first unit coil 20*a* starts winding from the slot bottom portion 11*a* side of the slot referred to as the slot number SN1 from which the first coil leading portion 32*f* is led out. Then, the first unit coil 20*a* is wound between the pair of slots 11, 11 (slot number SN1 and slot number SN2) and ends the winding at the slot central portion 11*c* of the slot number SN2 at one end side of the unit coil connecting portion 31*c*. Under this situation, the winding advancing direction W1 of the first unit coil 20 is the second direction slot opening portion side (Y2-arrow direction) and the winding direction of the first unit coil 20*a* seen from the winding advancing direction W1 of the first unit coil 20*a* is the counterclockwise direction. The unit coil connecting portion 31*c* is wound from the slot central portion 11*c* of the number SN2 slot towards the slot bottom portion 11*a* side of the number SN3 slot.

The second unit coil 20*b* starts winding from the slot bottom portion 11*a* side of the number SN3 slot at the other end side of the unit coil connecting portion 31*c*. Then, the second unit coil 20*b* is wound between the pair of slots 11, 11 (slot number SN3 and slot number SN4) and ends the winding at the slot opening portion 11*b* side of the slot number SN4 slot at one end side of the pole coil connecting portion 32*c*. Under this situation, the winding advancing direction W2 of the second unit coil 20*b* is the second direction slot opening portion side (Y2-arrow direction) and the winding direction of the second unit coil 20*b* seen from the winding advancing direction W2 of the second unit coil 20*b* is the counterclockwise direction. The pole coil connecting portion 32*c* is wound from the slot opening portion 11*b* side of the number SN4 slot towards the slot bottom portion 11*a* side of the number SN5 slot.

The third unit coil 20*c* starts winding from the slot bottom portion 11*a* side of the number SN5 slot at the other end side of the pole coil connecting portion 32*c*. Then, the third unit coil 20*c* is wound between the pair of slots 11, 11 (slot number SN5 and slot number SN6) and ends the winding at the slot opening portion 11*b* side of the slot number SN6 slot from which the second coil leading portion 32*s* is led out. Under this situation, the winding advancing direction W3 of the third unit coil 20*c* is the second direction slot opening portion side (Y2-arrow direction) and the winding direction of the third unit coil 20*c* seen from the winding advancing direction W3 of the third unit coil 20*c* is the clockwise direction.

As explained, the winding advancing direction W1 of the first unit coil 20*a*, the winding advancing direction W2 of the second unit coil 20*b* and the winding advancing direction W3 of the third unit coil 20*c* are all the second direction slot opening portion side (Y2-arrow direction). Further, the winding direction of the first unit coil 20*a* seen from the winding advancing direction W1 of the first unit coil 20*a* is a counterclockwise direction. The winding direction of the second unit coil 20*b* seen from the winding advancing direction W2 of the second unit coil 20*b* is a counterclockwise direction and further, the winding direction of the third unit coil 20*c* seen from the winding advancing direction W3 of the third unit coil 20*c* is the clockwise direction.

According to the rotating electrical machine 100 of the embodiment, each winding advancing direction (W1-arrow direction, W2-arrow direction and W3-arrow direction) of the plurality of (three) unit coils 20 (first unit coil 20*a*, second unit coil 20*b* and third unit coil 20*c*) forming each pole paired coil 32 is the second direction slot opening portion side (Y2-arrow direction). Accordingly, according to the rotating electrical machine 100 of the embodiment, the plurality of (four) pole paired coils 32 can be mounted in the plurality of (twenty-four) slots 11 per phase coil 33 unit (U-phase coil 33*u*, V-phase coil 33*v* and W-phase coil 33*w*) in order thereof. Accordingly, the rotating electrical machine 100 of the embodiment can assemble the stator coil 30 without using the coil inserting machine (inserter tool), for example, by series-winding. Therefore, compared to the case that the coil inserting machine (inserter tool) is used, the rotating electrical machine 100 of the embodiment can reduce the manufacturing cost. The rotating electrical machine 100 of the embodiment is preferably applicable to the rotating electrical machine in which the mover 70 is provided outside of the stator 40, which will be explained later.

(Arrangement of Half-Coil 23*h* & Pair of Coil Leading Portions 32*f*, 32*s*)

According to the embodiment, each pole paired coil 32 includes the half-coil 23*h* at the first pole coil 31*f*. Further, the first coil leading portion 32*f* is led out from the coil side 21 (first coil side 21*a*) of the first direction second pole coil side (X2-arrow direction) of the unit coil 20 (first unit coil 20*a*) which coil pitch between the pair of coil sides 21, 21 is the minimum among the plurality of (two) unit coils 20 (first unit coil 20*a* and second unit coil 20*b*) forming the first pole coil 31*f*. Further, the second coil leading portion 32*s* is led out from the coil side 21 (second coil side 21*b*) of the first direction second pole coil side (X2-arrow direction) of the one unit coil 20 (third unit coil 20*c*) forming the second pole coil 31*s*. It is noted that in FIG. 43, the first coil leading portion 32*f* is led out from the most slot bottom portion 11*a* side and the second coil leading portion 32*s* is led out from the most slot opening portion 11*b* side.

As shown in FIG. 43, according to the embodiment, neither of the pole coil connecting portion 32*c* and the unit coil connecting portion 31*c* is intersecting with the pair of coil leading portions 32*f*, 32*s*. Accordingly, as similar to the first embodiment, interference at the adjacent portions can be easily avoided. It is noted that the pole coil connecting portion 32*c* can be extended further outside (front side of the paper) of the coil end 22 of the second unit coil 20*b* in the third direction (Z-arrow direction). It is also noted that the unit coil connecting portion 31*c* can be accommodated in the space between the coil ends 22, 22 between the first unit coil 20*a* and the second unit coil 20*b*.

Figure 44:
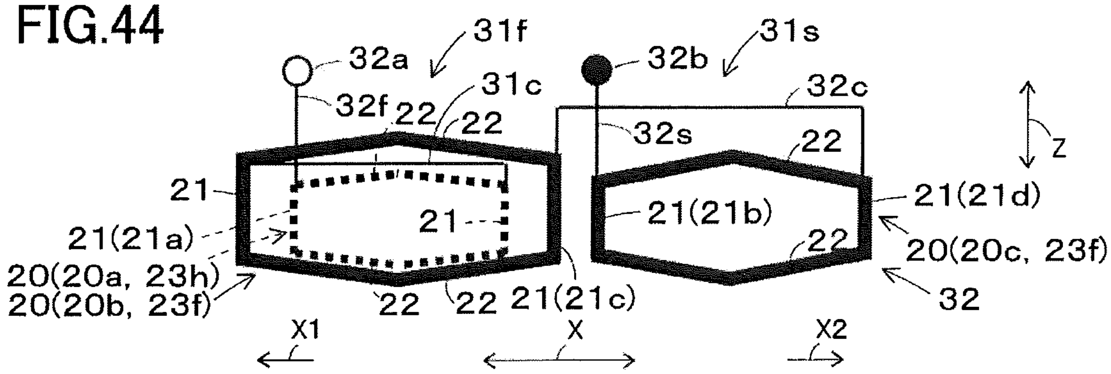
FIG. 44 is a schematic view of an example of structure of the pole paired coil 32, seen from the slot opening portion 11*b* side in the second direction (Y-arrow direction) associated with the fourteenth modified embodiment.
Figure 45:
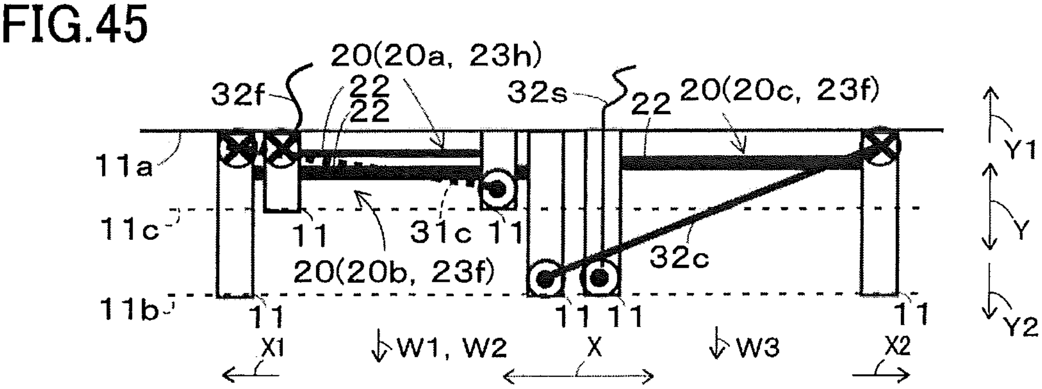
FIG. 45 is a schematic view of an example of structure of the pole paired coil 32 shown in FIG. 44, being mounted in the plurality of (six) slots 11, seen from the coil leading portions 32*f*, 32*s* side in the third direction (Z-arrow direction), associated with the fourteenth modified embodiment.

The arrangement of the half-coil 23*h* and the pair of coil leading portions 32*f*, 32*s* at each pole paired coil 32 can be changed to the arrangement of the fourteenth modified embodiment. As shown in FIGS. 44 and 45, in the fourteenth modified embodiment, the arrangement of the pair of coil leading portions 32*f*, 32*s* is different from that of the third embodiment.

The first coil leading portion 32*f* is led out from the coil side 21 (first coil side 21*a*) of the first direction first pole coil side (X1-arrow direction) of the unit coil 20 (first unit coil 20*a*) which coil pitch between the pair of coil sides 21, 21 is the minimum among the plurality of (two) unit coils 20 (first unit coil 20*a* and second unit coil 20*b*) forming the first pole coil 31*f*. Further, the second coil leading portion 32*s* is led out from the coil side 21 (second coil side 21*b*) of the first direction first pole coil side (X1-arrow direction) of the one unit coil 20 (third unit coil 20*c*) forming the second pole coil 31*s*. It is noted that in FIG. 45, the first coil leading portion 32*f* is led out from the most slot bottom portion 11*a* side and the second coil leading portion 32*s* is led out from the most slot opening portion 11*b* side.

It is noted that each pole paired coil 32 includes the half-coil 23*h* at the first pole coil 31*f*. Further, the winding advancing direction W1 of the first unit coil 20*a*, the winding advancing direction W2 of the second unit coil 20*b* and the winding advancing direction W3 of the third unit coil 20*c* are all the second direction slot opening portion side (Y2-arrow direction). Still further, the winding direction of the first unit coil 20*a* seen from the winding advancing direction W1 of the first unit coil 20*a* is clockwise direction and the winding direction of the second unit coil 20*b* seen from the winding advancing direction W2 of the second unit coil 20*b* is the clockwise direction. Further, the winding direction of the third unit coil 20*c* seen from the winding advancing direction W3 of the third unit coil 20*c* is the counterclockwise direction.

According to the modified embodiment, the pole coil connecting portion 32*c* and the second coil leading portion 32*s* are brought into contact with and intersecting with each other. Therefore, in FIG. 45, the second coil leading portion 32*s* is wound around further outside (front side of the paper) of the coil end 22 of the third unit coil 20*c* and the pole coil connecting portion 32*c* in the third direction (Z-arrow direction). In this situation, compared to the embodiment, each pole paired coil 32 of the modified embodiment is oversized outside in the third direction (Z-arrow direction).

It is noted that the second coil leading portion 32*s* is wound around along in the wiring direction of the pole coil connecting portion 32*c* and led out from the vicinity of slot bottom portion 11*a* side portion from which the first coil leading portion 32*f* of adjacently arranged another pole paired coil 32 is led out in order to avoid intersection explained above. Therefore, the first coil leading portion 32*f* and the second coil leading portion 32*s* are arranged adjacently to each other and this arrangement may lead to a reduction of efficiency in wiring work and pole paired coil 32 connecting work.

Figure 46:
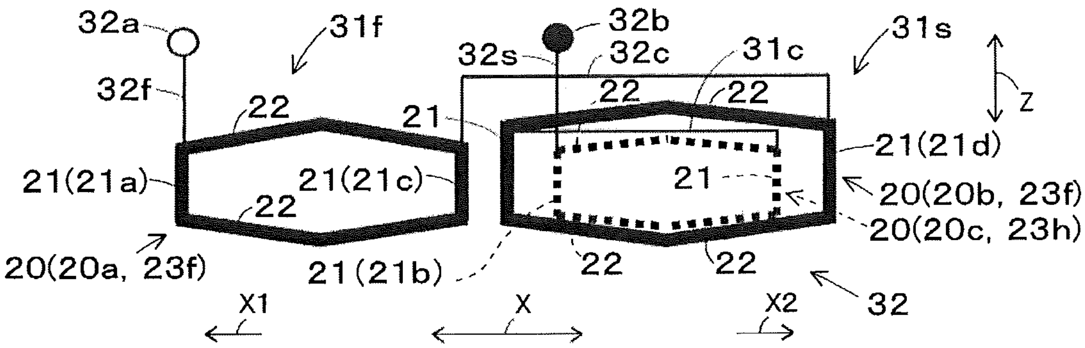
FIG. 46 is a schematic view of an example of structure of the pole paired coil 32, seen from the slot opening portion 11*b* side in the second direction (Y-arrow direction) associated with the fifteenth modified embodiment.
Figure 47:
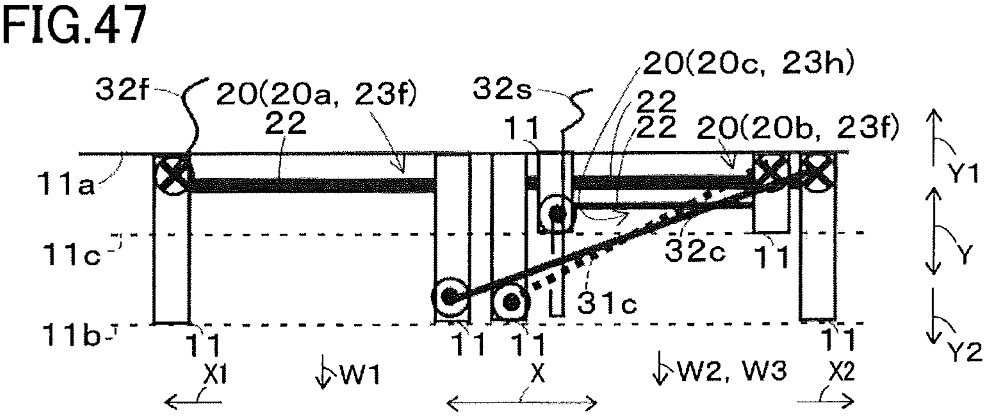
FIG. 47 is a schematic view of an example of the pole paired coil 32 being mounted in the plurality of (six) slots 11 shown in FIG. 46, seen from the pair of coil leading portions 32*f*, 32*s* in third direction (Z-arrow direction), associated with the fifteenth modified embodiment.

The arrangement of the half-coil 23*h* and the pair of coil leading portions 32*f*, 32*s* at each pole paired coil 32 can be changed to the arrangement of the fifteenth modified embodiment. As shown in FIGS. 46 and 47, in the fifteenth modified embodiment, the arrangement of the half-coil 23*h* and the pair of coil leading portions 32*f*, 32*s* are different from that of the third embodiment.

According to the modified embodiment, each pole paired coil 32 includes the half-coil 23*h* at the second pole coil 31*s*. The first pole coil 31*f* includes one unit coil 20 and the one unit coil 20 is defined to be the first unit coil 20*a*. The coil pitch between the pair of coil sides 21, 21 of the first unit coil 20*a* is set to be six slot pitches. The first unit coil 20*a* is wound concentrically to form the first pole coil 31*f*.

The second pole coil 31*s* has a plurality of (in the modified embodiment, two) unit coils 20 and the two unit coils 20, 20 are defined as the second unit coil 20*b* and the third unit coil 20*c*. The coil pitch between the pair of coil sides 21, 21 of the second unit coil 20*b* is set to be 7 slot pitches. The coil pitch between the pair of coil sides 21, 21 of the third unit coil 20*c* is set to be 5 slot pitches. The second unit coil 20*b* and the third unit coil 20*c* are wound concentrically and are connected in series by the unit coil connecting portion 31*c* to form the second pole coil 31*s*. According to the modified embodiment, the first unit coil 20*a* and the second unit coil 20*b* are the full-coils 23*f* and the third unit coil 20*c* is the half-coil 23*h*.

Further, the winding advancing direction W1 of the first unit coil 20*a*, the winding advancing direction W2 of the second unit coil 20*b* and the winding advancing direction W3 of the third unit coil 20*c* are all the second direction slot opening portion side (Y2-arrow direction). Still further, the winding direction of the first unit coil 20*a* seen from the winding advancing direction W1 of the first unit coil 20*a* is clockwise direction and the winding direction of the second unit coil 20*b* seen from the winding advancing direction W2 of the second unit coil 20*b* is the counterclockwise direction. Further, the winding direction of the third unit coil 20*c* seen from the winding advancing direction W3 of the third unit coil 20*c* is the counterclockwise direction.

According to the modified embodiment, the first coil leading portion 32*f* is led out from the coil side 21 (first coil side 21*a*) of the first direction first pole coil side (X1-arrow direction) of the unit coil 20 (first unit coil 20*a*) which forms the first pole coil 31*f*. Further, the second coil leading portion 32*s* is led out from the coil side 21 (second coil side 21*b*) of the first direction first pole coil side (X1-arrow direction) of the unit coil 20 (third unit coil 20*c*) which coil pitch between the pair of coil sides 11 is the minimum between the plurality of (two) unit coils 20, 20 (second unit coil 20*b* and third unit coil 20*c*) forming the second pole coil 31*s*. It is noted that in FIG. 47, the first coil leading portion 32*f* is led out from the most slot bottom portion 11*a* side and the second coil leading portion 32*s* is led out from the slot central portion 11*c*.

According to the modified embodiment, the pole coil connecting portion 32*c* and the second coil leading portion 32*s* are brought into contact with and intersecting with each other and the unit coil connecting portion 31*c* and the second coil leading portion 32*s* are brought into contact with and intersecting with each other. As shown in FIG. 47, once the second coil leading portion 32*s* is wound around up to the slot opening portion 11*b* in the second direction slot opening portion side (Y2-arrow direction) and thereafter is wound in the second direction slot bottom portion side (Y1-arrow direction). The second coil leading portion 32*s* once passes through the stator iron core 10 side (back side of the paper) of the third direction (Z-arrow direction) of the unit coil connecting portion 31*c* and wound around further outside (front side of the paper) of the coil ends 22 of the third unit coil 20*c* and the second unit coils 20*b* in the third direction (Z-arrow direction) and the unit coil connecting portion 31*c* and the pole coil connecting portion 32*c*. In this situation, compared to the embodiment, each pole coil 32 of the modified embodiment is oversized outside in the third direction (Z-arrow direction).

It is noted that the second coil leading portion 32*s* is wound around along in the wiring direction of the pole coil connecting portion 32*c* and led out from the vicinity of slot bottom portion 11*a* side portion from which the first coil leading portion 32*f* of adjacently arranged another pole paired coil 32 is led out in order to avoid intersection explained above. Therefore, the first coil leading portion 32*f* and the second coil leading portion 32*s* are arranged adjacently to each other and this arrangement may lead to a reduction of efficiency in wiring work and pole paired coil 32 connecting work.

Figure 48:
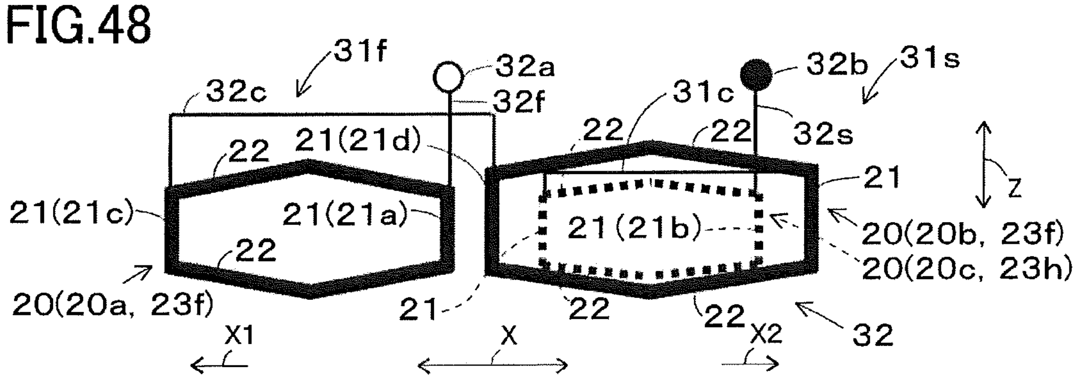
FIG. 48 is a schematic view of an example of structure of the pole paired coil 32, seen from the slot opening portion 11*b* side in the second direction (Y-arrow direction) associated with the sixteenth modified embodiment.
Figure 49:
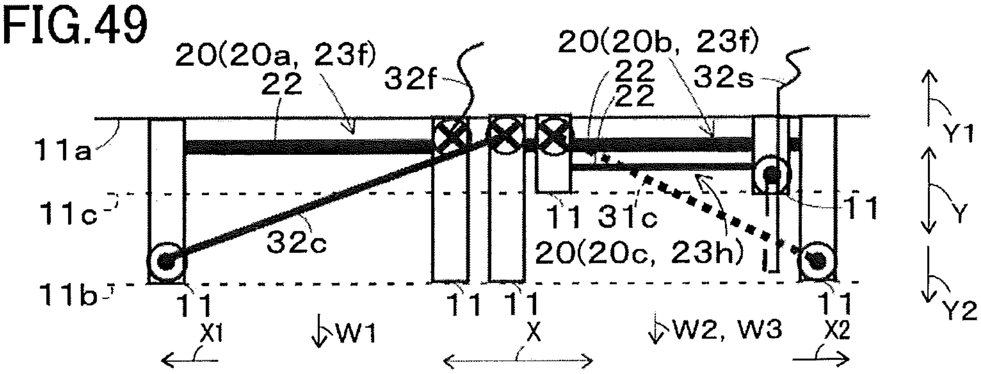
FIG. 49 is a schematic view of an example of structure of the pole paired coil 32 shown in FIG. 48 being mounted in the plurality of (six) slots 11, seen from the coil leading portions 32*f*, 32*s* side in the third direction (Z-arrow direction) associated with the sixteenth modified embodiment.

The arrangement of the half-coil 23*h* and the pair of coil leading portions 32*f*, 32*s* at each pole paired coil 32 can be changed to the arrangement of the sixteenth modified embodiment. As shown in FIGS. 48 and 49, in the sixteenth modified embodiment, the arrangement of the pair of coil leading portions 32*f*, 32*s* is different from that of the fifteenth modified embodiment.

According to the modified embodiment, the first coil leading portion 32*f* is led out from the coil side 21 (first coil side 21*a*) of the first direction second pole coil side (X2-arrow direction) of the unit coil 20 (first unit coil 20*a*) which forms the first pole coil 31*f*. Further, the second coil leading portion 32*s* is led out from the coil side 21 (second coil side 21*b*) of the first direction second pole coil side (X2-arrow direction) of the unit coil 20 (third unit coil 20*c*) which coil pitch between the pair of coil sides 11 is the minimum among the plurality of (two) unit coils 20, 20 (second unit coil 20*b* and third unit coil 20*c*) forming the second pole coil 31*s*. It is noted that in FIG. 49, the first coil leading portion 32*f* is led out from the most slot bottom portion 11*a* side and the second coil leading portion 32*s* is led out from the slot central portion 11*c*.

According to the modified embodiment, the unit coil connecting portion 31*c* and the second coil leading portion 32*s* are brought into contact with and intersecting with each other. As shown in FIG. 49, once the second coil leading portion 32*s* is wound around up to the slot opening portion 11*b* side in the second direction slot opening portion side (Y2-arrow direction) and thereafter is wound in the second direction slot bottom portion side (Y1-arrow direction). The second coil leading portion 32*s* once passes through the stator iron core 10 side (back side of the paper) of the third direction (Z-arrow direction) of the unit coil connecting portion 31*c* and wound around further outside (front side of the paper) of the unit coil connecting portion 31*c* and the coil ends 22 of the third unit coil 20*c* and the second unit coils 20*b* in the third direction (Z-arrow direction). In this situation, compared to the embodiment, each pole coil 32 of the modified embodiment is oversized outside in the third direction (Z-arrow direction).

It is noted that as similar to the third modified embodiment shown in FIG. 13B, the second coil leading portion 32*s* is wound around such that the second coil leading portion 32*s* avoids interference with the up-right portion of the coil end 22 of the second unit coil 20*b* within the approximately the same vertical plane in the third direction (Z-arrow direction). The embodiment can suppress the oversizing in the third direction (Z-arrow direction) compared to the case shown in FIG. 49. However, according to the structure, it is necessary to perform wiring work to avoid an extending towards the second direction slot opening portion side (Y2-arrow direction) and further, the workability in connecting of the pole paired coil 32 may possibly be worsened.

According to the rotating electrical machine 100 of the embodiment, each pole paired coil 32 includes the half-coil 23*h* at the first pole coil 31*f*. Further, the first coil leading portion 32*f* is led out from the coil side 21 (first coil side 21*a*) of the first direction second pole coil side (X2-arrow direction) of the unit coil 20 (first unit coil 20*a*) which coil pitch between the pair of coil sides is the minimum among the plurality of (two) unit coils 20, 20 (first unit coil 20*a* and second unit coil 20*b*) which forms the first pole coil 31*f*. Further, the second coil leading portion 32*s* is led out from the coil side 21 (second coil side 21*b*) of the first direction second pole coil side (X2-arrow direction) of the unit coil 20 (third unit coil 20*c*) which forms the second pole coil 31*s*.

By this arrangement, both of the pole coil connecting portion 32*c* and the unit coil connecting portion 31*c* are not intersecting with the pair of coil leading portions 32*f*, 32*s*. As a result, compared to the modified embodiments (fourteenth modified embodiment through sixteenth modified embodiment) in which at least one of the half-coil 23*h* and the pair of the coil leading portions 32*f*, 32*s* is different in arrangement from the arrangement of this embodiment, the size of the coil ends 22 of the pair of coil leading portions 32*f*, 32*s* side of the third direction (Z-arrow direction) in the pole paired coil 32 can be shortened and the wiring thereof can be simplified. It is noted that the arrangement of the half-coil 23*h* and the pair of coil leading portions 32*f*, 32*s* in the pole paired coil 32 tends to be seen in the case where the number of slots per every pole and every phase is 3.5 or more.

(Arrangement of Phase Coil 33)

It is preferable that the plurality of (in the embodiment, three) phase coils 33 (U-phase coil 33*u*, V-phase coil 33*v* and W-phase coil 33*w*) is mounted in the plurality of (sixty) slots 11 by the manufacturing method including the first mounting process, the second phase advance mounting process and the third phase advance mounting process. Thus, according to the embodiment, the plurality of (three) phase coils 33 is assembled in order of the U-phase coil 33*u*, V-phase coil 33*v* and W-phase coil 33*w* and each phase of the plurality of (three) phase coils 33 is retarded in order of U-phase coil 33*u*, V-phase coil 33*v* and W-phase coil 33*w*.

Further, the plurality of (three) phase coils 33 is provided in order of the phase, i.e., U-phase coil 33*u*, V-phase coil 33*v* and W-phase coil 33*w* in the first direction second pole coil side (X2-arrow direction).

Figure 50A:
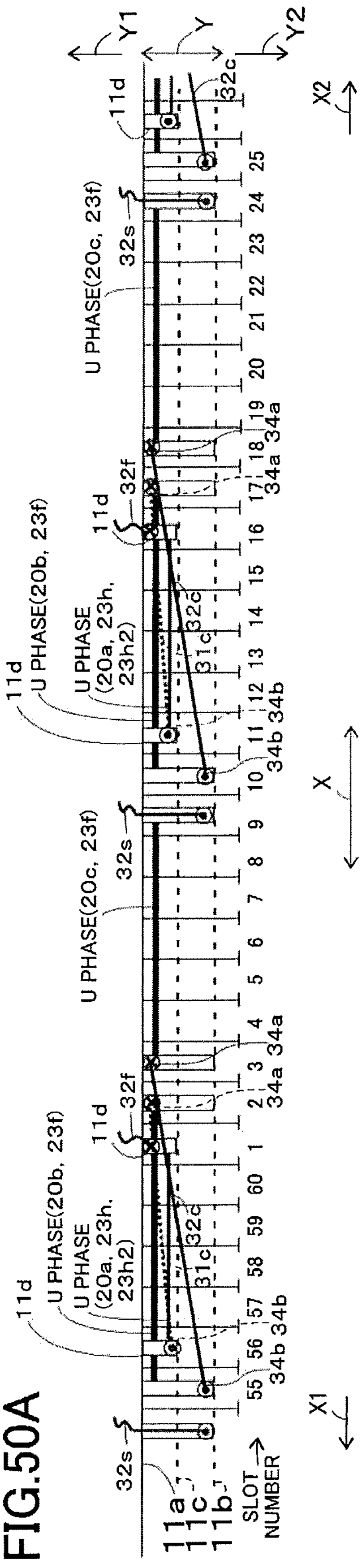
FIG. 50A is a schematic view of the U-phase coil 33*u* being mounted in the plurality of slots 11, seen from the pair of coil leading portions 32*f*, 32*s* side in the third direction (Z-arrow direction) associated with the third embodiment.

As shown in FIG. 50A, the first mounting process is the process for mounting one (in this embodiment, U-phase coil 33*u*) of the plurality of (three) phase coils 33 in the plurality of (twenty-four (24)) slots 11. In FIG. 50A, the pole paired coil 32 worth of four magnetic poles (two pole pairs) forming the U-phase coil 33*u* is shown and the pole paired coil 32 worth of the remaining four magnetic poles (two pole pairs worth) is omitted from the drawing.

As shown in FIG. 50A, the first coil leading portion 32*f* of the U-phase coil 33*u* is led out from the slot bottom portion 11*a* side. The second coil leading portion 32*s* of the U-phase coil 33*u* is led out from the slot opening portion 11*b* side and is wound around in the second direction slot bottom portion side (direction Y1-arrow direction). The second coil leading portion 32*s* of the U-phase coil 33*u* is wound around further outside (front side of the paper) of the coil end 22 of the third unit coil 20*c* of the U-phase coil 33*u* in the third direction (Z-arrow direction).

As explained, in the U-phase coil 33*u*, the pair of coil leading portions 32*f*, 32*s* and the crossover line (unit coil connecting portion 31*c* and pole coil connecting portion 32*c*) of the pole paired coil 32 are not intersecting with each other. Further, since the U-phase coil 33*u* is mounted first, both of the pair of coil sides 21, 21 of the half-coil 23*h* are arranged at the slot bottom portion 11*a* side, without being influenced by another phase coil 33 (V-phase coil 33*v* and W-phase coil 33*w*). In other words, the U-phase half-coil 23*h* is the one-side occupying half-coil 23*h*2.

The second phase retard mounting process is the process for mounting the remaining one phase coil 33 of the plurality of (three) phase coils 33 in the plurality of (twenty-four) slots 11 by deviating the in-between phase minimum difference worth in the first direction second pole coil side (X2-arrow direction) relative to the phase coil 33 (U-phase coil 33*u*) which has been mounted in the first mounting process. The "remaining one phase coil 33" means the phase coil 33 (in this embodiment, V-phase coil 33*v*) which phase retards by the in-between phase minimum difference worth compared to the phase of the phase coil 33 (U-phase coil 33*u*) which has been mounted in the first mounting process. The value of "in-between phase minimum difference" is the same with the value of the first embodiment and is set to be the electric angle of 120 degrees. The rotating electrical machine 100 of the embodiment is the same with that of the first embodiment and is a rotating electrical machine with eight poles and sixty slots structure and the in-between phase minimum difference corresponds to the five slot pitches worth.

Figure 50B:
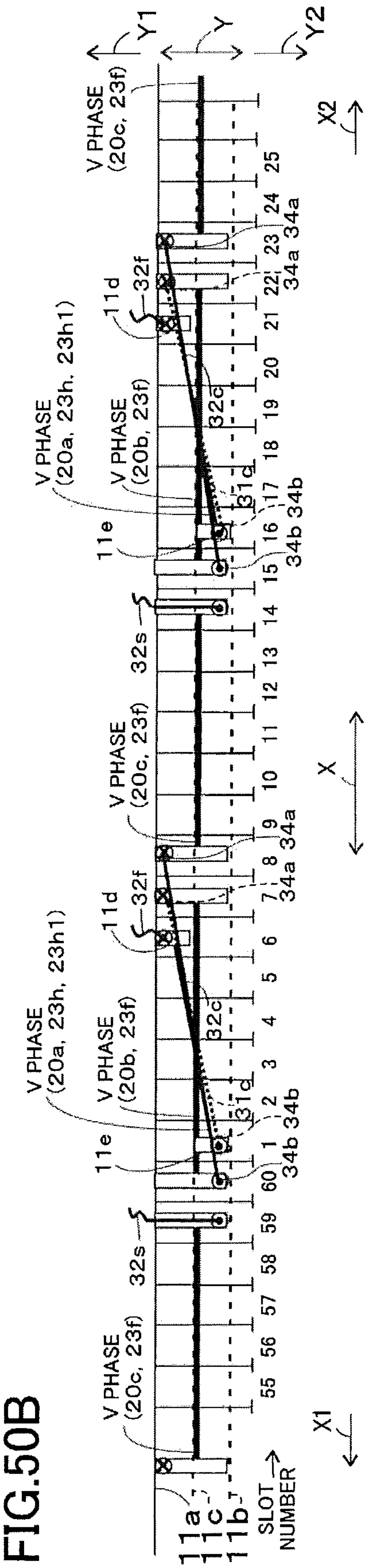
FIG. 50B is a schematic view of the V-phase coil 33*v* being mounted in the plurality of slots 11, seen from the pair of coil leading portions 32*f*, 32*s* side in the third direction (Z-arrow direction) associated with the third embodiment.

As shown in FIG. 50B, the first coil leading portion 32*f* of the V-phase coil 33*v* is led out from the slot bottom portion 11*a* side and the second coil leading portion 32*s* of the V-phase coil 33*v* is led out from the slot opening portion 11*b* side and is wound in the second direction slot bottom portion side (Y1-arrow direction). The second coil leading portion 32*s* of the V-phase coil 33*v* can be wound further outside (front side of the paper) of the coil end 22 of the third unit coil 20*c* of the V-phase coil 33*v* in the third direction (Z-arrow direction).

As explained, in the V-phase coil 33*v*, the pair of coil leading portions 32*f*, 32*s* and the crossover line (unit coil connecting portion 31*c* and pole coil connecting portion 32*c*) of the pole paired coil 32 are not intersecting with each other. Further, since the V-phase coil 33*v* is mounted after the mounting of the U-phase coil 33*u*, one of the pair of coil sides 21, 21 of the half-coil 23*h* is arranged at the slot bottom portion 11*a* side and the other of the pair of coil sides 21, 21 is arranged at the slot opening portion 11*b* side. In other words, the V-phase half-coil 23*h* is the both-side occupying half-coil 23*h*1.

The third phase retard mounting process is the process for mounting the phase coil 33 which phase retards by the in-between phase minimum difference worth (electric angle of 120 degrees) relative to the lastly mounted phase coil 33 by deviating the in-between phase minimum difference worth (electric angle of 120 degrees) in the first direction second pole coil side (X2-arrow direction) until all of the plurality of (three) phase coils 33 (U-phase coil 33*u*, V-phase coil 33*v* and W-phase coil 33*w*) have been mounted in the plurality of (sixty) slots 11. According to the embodiment, the W-phase coil 33*w* is not mounted yet at the time when the second phase retard mounting process ends. Therefore, in the third phase retard mounting process, the W-phase coil 33*w* is mounted in the plurality of (twenty-four) slots 11 by deviating by the in-between phase minimum difference worth (electric angle of 120 degrees) in the first direction second pole coil side relative to the phase coil 33 (V-phase coil 33*v*) which has been mounted most recently. Thus, the plurality of (three) phase coils 33 (U-phase coil 33*u*, V-phase coil 33*v* and W-phase coil 33*w*) are mounted in the plurality of (sixty) slots 11 to complete the third phase retard mounting process.

Figure 50C:
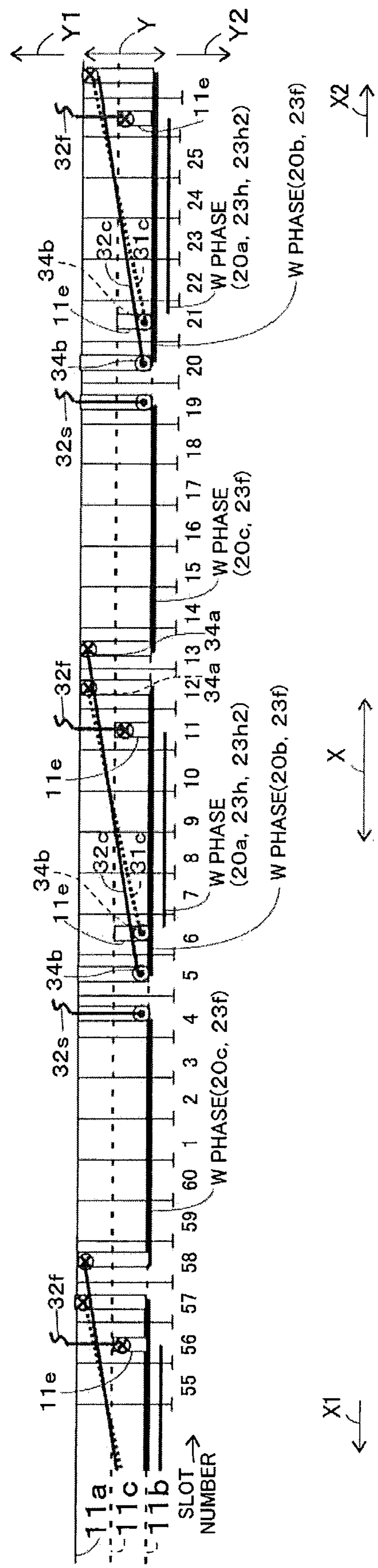
FIG. 50C is a schematic view of the W-phase coil 33*w* being mounted in the plurality of slots 11, seen from the pair of coil leading portions 32*f*, 32*s* side in the third direction (Z-arrow direction) associated with the third embodiment.

As shown in FIG. 50C, the first coil leading portion 32*f* of the W-phase coil 33*w* is led out from the slot central portion 11*c* and is wound around in the second direction slot bottom portion side (Y1-arrow direction). The second coil leading portion 32*s* of the W-phase coil 33*w* is led out from the slot opening portion 11*b* side and is wound around in the second direction slot bottom portion side (Y1-arrow direction). The second coil leading portion 32*s* of the W-phase coil 33*w* is wound around further outside (front side of the paper) of the coil end 22 of the third unit coil 20*c* of the W-phase coil 33*w* in the third direction (Z-arrow direction).

According to the W-phase coil 33*w*, the first coil leading portion 32*f* and the crossover line (pole coil connecting portion 32*c*) in the pole paired coil 32 are brought into contact and intersecting with each other. Therefore, at the intersecting portion, it is necessary to secure an electrical insulation. However, the pole coil connecting portion 32*c* is not brought into contact with and intersecting with the first coil leading portion 32*f* and accordingly, no electric insulation measures has to be taken for the first coil leading portion 32*f*. As the result of assembling work of the W-phase coil 33*w*, the first coil leading portion 32*f* of the W-phase coil 33*w* passes the stator iron core 10 side (back side of the paper) of the third direction (Z-arrow direction) of each crossover line (unit coil connecting portion 31*c* and pole coil connecting portion 32*c*) of the pole paired coil 32 of the W-phase coil 33*w*. Further, the first coil leading portion 32*f* of the W-phase coil 33*w* passes further outside (front side of the paper) of the coil end 22 of the first unit coil 20*a* of the U-phase coil 33*u* in the third direction (Z-arrow direction). It is noted that since the W-phase coil 33*w* is mounted lastly, both of the pair of coil sides 21, 21 of the half-coil 23*h* are arranged at the slot opening portion 11*b* side. In other words, the W-phase half-coil 23*h* is the one-side occupying half-coil 23*h*2.

As shown in FIGS. 51A through 51D, the plurality of (three) phase coils 33 (U-phase coil 33*u*, V-phase coil 33*v* and W-phase coil 33*w*) can be mounted in the plurality of (sixty) slots 11 in order of W-phase coil 33*w*, V-phase coil 33*v* and U-phase coil 33*u* (reverse order to the phase order) (seventeenth modified embodiment). This manufacturing method is the same with the manufacturing method for manufacturing the rotating electrical machine 100 which includes the first mounting process, second phase retard mounting process and third phase retard mounting process which are already explained in the first embodiment.

Figure 51A:
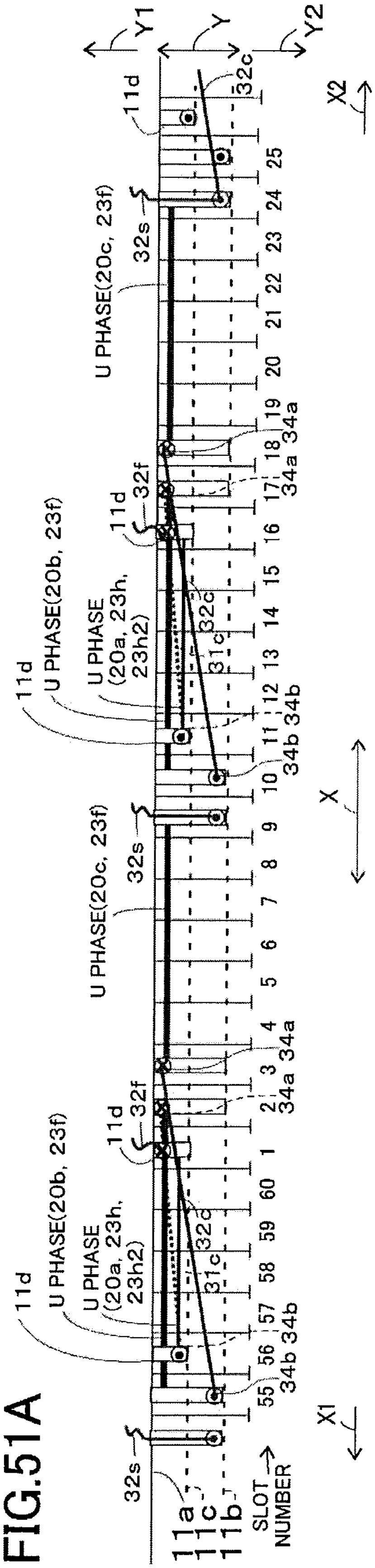
FIG. 51A is a schematic view of the U-phase coil 33*u* being mounted in the plurality of slots 11, seen from the pair of coil leading portions 32*f*, 32*s* side in the third direction (Z-arrow direction) associated with the seventeenth modified embodiment.
Figure 51B:
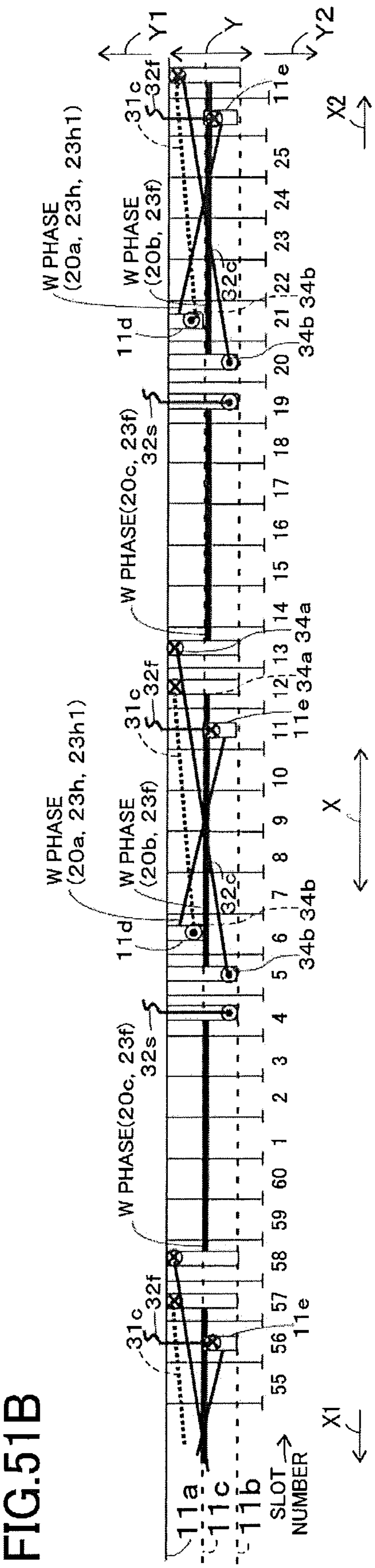
FIG. 51B is a schematic view of the W-phase coil 33*w* being mounted in the plurality of slots 11, seen from the pair of coil leading portions 32*f*, 32*s* side in the third direction (Z-arrow direction) associated with the seventeenth modified embodiment.

As shown in FIG. 51A, the state after the U-phase coil 33*u* of the seventeenth modified embodiment was mounted is the same with the state after the U-phase coil 33*u* of the embodiment was mounted as shown in FIG. 50A. As shown in FIG. 51B, the first coil leading portion 32*f* of the W-phase coil 33*w* is led out from the slot central portion 11*c* and wound around in the second direction slot bottom portion side (V1-arrow direction). The second coil leading portion 32*s* of the W-phase coil 33*w* is led out from the slot opening portion 11*b* side and is wound around in the second direction slot bottom portion side (V1-arrow direction). The second coil leading portion 32*s* of the W-phase coil 33*w* is wound around further outside (front side of the paper) of the coil end 22 of the third unit coil 20*c* of the W-phase coil 33*w* in the third direction (Z-arrow direction).

The first coil leading portion 32*f* of the W-phase coil 33*w* and the crossover line (unit coil connecting portion 31*c*) of the pole paired coil 32 are brought into contact with and intersecting with each other. Therefore, at the intersecting portion, it is necessary to secure an electrical insulation. However, since the pole coil connecting portion 32*c* is not intersecting with the first coil leading portion 32*f*, no securing of the electric insulation at the first coil leading portion 32*f* is necessary. As the result of assembling work for the W-phase coil 33*w*, the first coil leading portion 32*f* of the W-phase coil 33*w* passes the stator iron core 10 side (back side of the paper) of the third direction (Z-arrow direction) of each crossover line (unit coil connecting portion 31*c* and the pole coil connecting portion 32*c*) in the pole paired coil 32 of W-phase coil 33*w*. Further, the first coil leading portion 32*f* of the W-phase coil 33*w* passes further outside (front side of the paper) of the coil end 22 of the first unit coil 20*a* of the U-phase coil 33*u* in the third direction (Z-arrow direction). It is noted that since the W-phase coil 33*w* is mounted after the mounting of the U-phase coil 33*u*, one coil side 21 of the pair of coil sides 21, 21 of the half-coil 23*h* is provided at the slot bottom portion 11*a* side and the other coil side 21 of the pair of coil sides 21, 21 of the half-coil 23*h* is provided at the slot opening portion 11*b* side. In other words, the W-phase half-coil 23*h* is the both-side occupying half-coil 23*h*1.

Figure 51C:
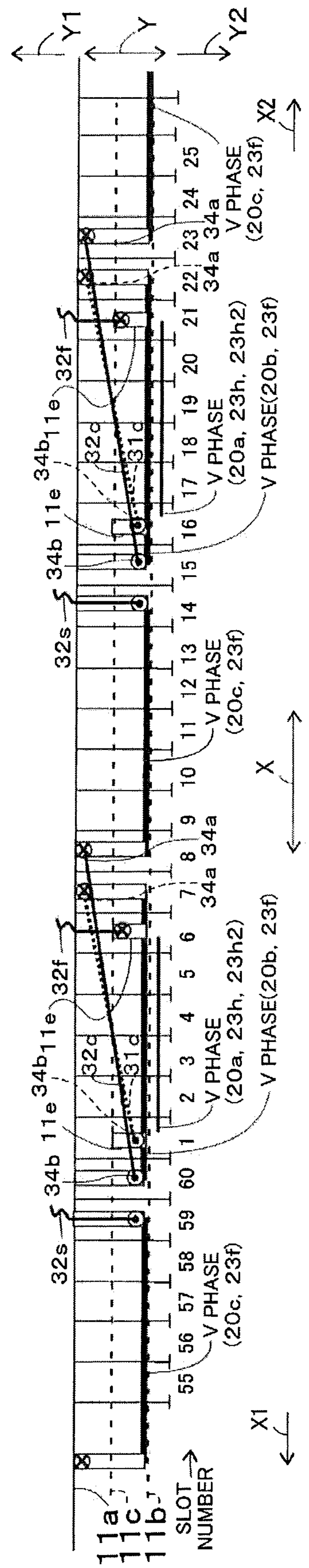
FIG. 51C is a schematic view of the V-phase coil 33*v* being mounted in the plurality of slots 11, seen from the pair of coil leading portions 32*f*, 32*s* side in the third direction (Z-arrow direction) associated with the seventeenth modified embodiment.

As shown in FIG. 51C, the first coil leading portion 32*f* of the V-phase coil 33*v* is led out from the slot central portion 11*c* and is wound around in the second direction slot bottom portion side (Y1-arrow direction). The second coil leading portion 32*s* of the V-phase coil 33*v* is led out from the slot opening portion 11*b* side and is wound around in the second direction slot bottom portion side (Y1-arrow direction). The second coil leading portion 32*s* of the V-phase coil 33*v* is wound around further outside (front side of the paper) of the coil end 22 of the third unit coil 20*c* of the V-phase coil 33*v* in the third direction (Z-arrow direction).

According to the V-phase coil 33*v*, the first coil leading portion 32*f* and the crossover line (pole coil connecting portion 31*c*) in the pole paired coil 32 are brought into contact and intersecting with each other. Therefore, at the intersecting portion, it is necessary to secure an electrical insulation. However, since the pole coil connecting portion 32*c* is not brought into contact with and intersecting with the first coil leading portion 32*f*, no electric insulation measures has to be taken for the first coil leading portion 32*f*. As the result of assembling work for the V-phase coil 33*v*, the first coil leading portion 32*f* of the V-phase coil 33*v* passes the stator iron core 10 side (back side of the paper) of the third direction (Z-arrow direction) of each crossover line (unit coil connecting portion 31*c* and pole coil connecting portion 32*c*) in the pole paired coil 32 of the V-phase coil 33*v*. Further, the first coil leading portion 32*f* of the V-phase coil 33*v* passes further outside (front side of the paper) of the coil end 22 of the first unit coil 20*a* of the W-phase coil 33*w* in the third direction (Z-arrow direction). It is noted that since the V-phase coil 33*v* is mounted lastly, both of the pair of coil sides 21, 21 of the half-coil 23*h* are arranged at the slot opening portion 11*b* side. In other words, the V-phase half-coil 23*h* is the one-side occupying half-coil 23*h*2.

According to the seventeenth modified embodiment, the first coil leading portion 32*f* of the V-phase coil 33*v* is led out from the slot central portion 11*c*. In the V-phase coil 33*v*, the first coil leading portion 32*f* and the crossover line (unit coil connecting portion 31*c*) in the pole paired coil 32 are brought into contact and intersecting with each other. The above explanation can be applicable to the case of W-phase coil 33*w*. As explained, according to the seventeenth modified embodiment, in two phases (V-phase and W-phase) of the plurality of (three) phase coils 33, the first coil leading portion 32*f* and the crossover line (unit coil connecting portion 31*c*) in the pole paired coil 32 are brought into contact and intersecting with each other.

On the other hand, according to the embodiment, in one phase (N-phase) among the plurality of (three) phase coils 33 (U-phase coil 33*u*, V-phase coil 33*v* and W-phase coil 33*w*), the first coil leading portion 32*f* and the crossover line (unit coil connecting portion 31*c*) in the pole paired coil 32 are in contact and intersecting with each other. As explained, the rotating electrical machine 100 of the embodiment has less number of phases in which the pair of coil leading portions 32*f*, 32*s* and crossover line (unit coil connecting portion 31*c*) in the pole paired coil 32 are in contact with and intersecting with each other, than the number of phases of the rotating electrical machine 100 according to the seventeenth modified embodiment. Accordingly, the coil end 22 at the pair of coil leading portions 32*f*, 32*s* of the third direction (Z-arrow direction) can be reduced in size and the wiring thereof can be simplified, compared to the pole paired coil 32 of the seventeenth modified embodiment.

Figure 51D:
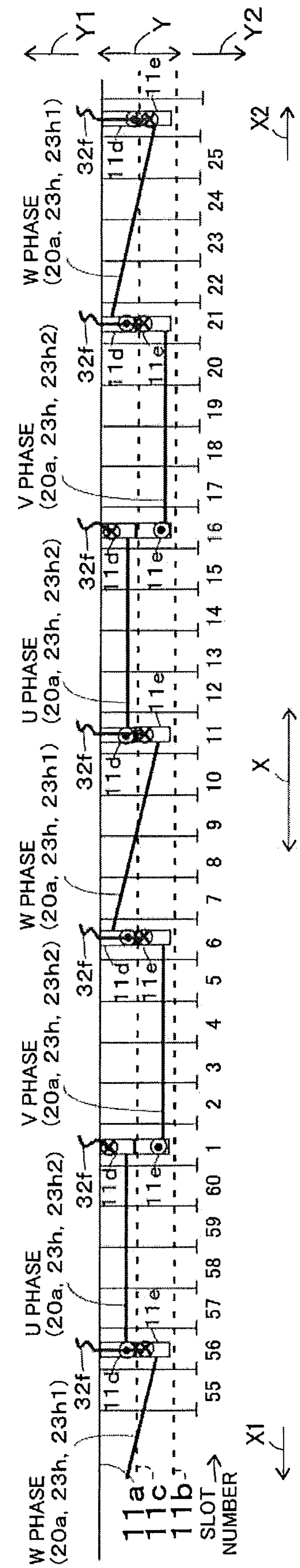
FIG. 51D is a schematic view of each half-coil 23*h* of the three-phase phase-coil 33 (U-phase coil 33*u*, V-phase coil 33*v* and W-phase coil 33*w*) being mounted in the plurality of slots 11, seen from the pair of coil leading portions 32*f*, 32*s* side in the third direction (Z-arrow direction) associated with the seventeenth modified embodiment.

Further, as shown in FIG. 51D, according to the seventeenth modified embodiment, the angle formed by a vector (corresponding to the first vector 35*a*) which has one point in the first half slot portion 11*d* of both side occupying half-coil 23*h*1 as the start point and one point in the second half slot portion 11*e* of both side occupying half-coil 23*h*1 as the end point and a vector (corresponding to the second vector 35*b*) which has the first crossover line end portion 34*a* of the pole coil connecting portion 32*c* as the start point and the second crossover line end portion 34*b* as the end point is set to be an obtuse angle which is larger than mechanical angle of 90 degrees. This can be applicable to the case of unit coil connecting portion 31*c*.

Figure 50D:
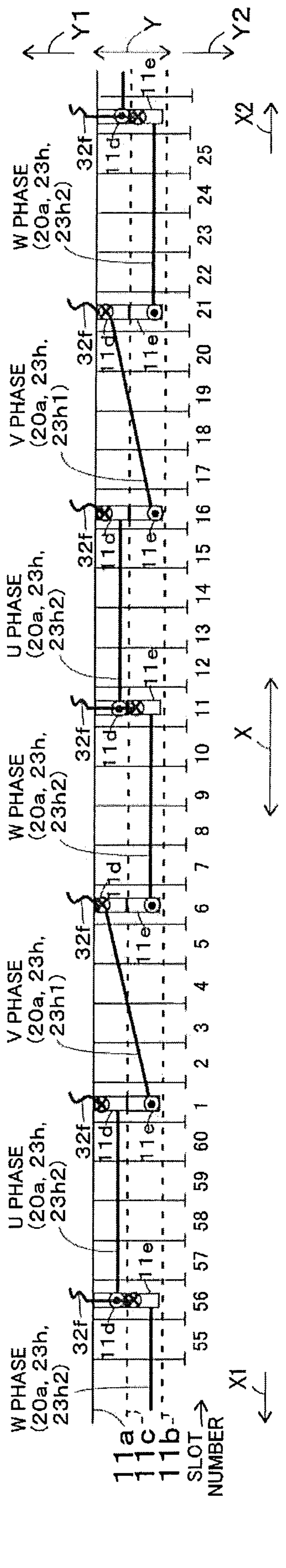
FIG. 50D is a schematic view of each half-coil 23*h* of the three-phase phase-coil 33 (U-phase coil 33*u*, V-phase coil 33*v* and W-phase coil 33*w*) being mounted in the plurality of slots 11, seen from the pair of coil leading portions 32*f*, 32*s* side in the third direction (Z-arrow direction) associated with the third embodiment.

On the other hand, as shown in FIG. 50D, according to the embodiment, the angle formed by a vector (corresponding to the first vector 35*a*) which has one point in the first half slot portion 11*d* of both side occupying half-coil 23*h*1 as the start point and one point in the second half slot portion 11*e* of both side occupying half-coil 23*h*1 as the end point and a vector (corresponding to the second vector 35*b*) which has the first crossover line end portion 34*a* of the pole coil connecting portion 32*c* as the start point and the second crossover line end portion 34*b* as the end point is set to be an acute angle which is smaller than mechanical angle of 90 degrees. This can be applicable to the case of unit coil connecting portion 31*c*.

The rotating electrical machine 100 of the embodiment, by the structure explained above, can reduce the interference intersection (contact intersecting state) between coil end 22 of the both side occupying half-coil 23*h*1, each crossover line (unit coil connecting portion 31*c* and the pole coil connecting portion 32*c*) of the pole paired coil 32 and the pair of coil leading portions 32*f*, 32*s* and can reduce the number of other phase crossing leading lines. Thus, according to the embodiment, the coil end 22 of the pair of coil leading portions 32*f*, 32*s* of the third direction (Z-arrow direction) of the pole paired coil 32 can be reduced and the wiring thereof can be simplified, compared to those of the seventeenth modified embodiment.

Fourth Embodiment

This embodiment is different in the number of slots per every pole and every phase from that of the third embodiment. Further, in this embodiment, the arrangement of the half-coil 23*h* is different from the arrangement of the third embodiment. Hereinafter, the points different from the third embodiment will be mainly explained.

(Arrangement of Half-Coil 23*h* and Pair of Coil Leading Portions 32*f*, 32*s*)

Figure 52:
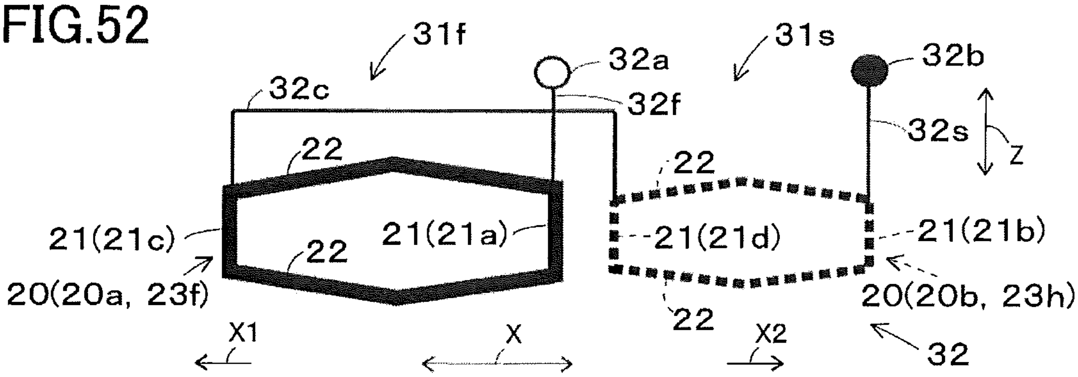
FIG. 52 is a schematic view of the pole paired coil 32 seen from the slot opening portion 11*b* side in the second direction (Y-arrow direction) associated with the fourth embodiment.
Figure 53:
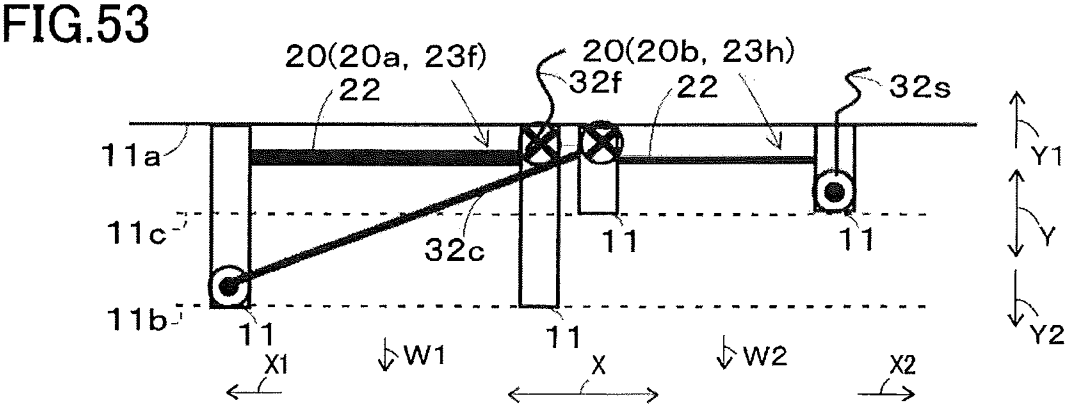
FIG. 53 is a schematic view of an example of the pole paired coil 32 being mounted in the plurality of (six) slots 11 shown in FIG. 52, seen from the pair of coil leading portions 32*f*, 32*s* side in the third direction (Z-arrow direction) associated with the fourth embodiment.

The rotating electrical machine 100 according to the embodiment is a three-phase rotating electrical machine with eight poles and thirty-six slots structure (three-phase rotating electrical machine having the basic structure having two magnetic poles of the mover 70, nine slots of stator 40). The number of slots per every pole and every phase is 1.5. Further, as shown in FIGS. 52 and 53, according to this embodiment, each pole paired coil 32 includes a half-coil 23*h* at the second pole coil 31*s* and the first pole coil 31*f* includes one unit coil 20 and the one unit coil 20 is defined to be the first unit coil 20*a*. The coil pitch between the pair of coil sides 21, 21 of the first unit coil 20*a* is set to be four slot pitches. The first unit coil 20*a* is wound concentrically to form the first pole coil 31*f*.

The second pole coil 31*s* includes one unit coil 20 and the one unit coil 20 is defined to be the second unit coil 20*b*. The coil pitch between the pair of coil sides 21, 21 of the second unit coil 20*b* is set to be three slot pitches. The second unit coil 20*b* is wound concentrically to form the second pole coil 31*s*. According to this embodiment, the first unit coil 20*a* is the half-coil 23*h* and the second unit coil 20*b* is the full-coil 23*f*.

Further, the winding advancing direction W1 of the first unit coil 20*a* and the winding advancing direction W2 of the second unit coil 20*b* are both the second direction slot opening portion side (Y2-arrow direction). Further, the winding direction of the first unit coil 20*a* seen from the winding advancing direction W1 of the first unit coil 20*a* is a counterclockwise direction. The winding direction of the second unit coil 20*b* seen from the winding advancing direction W2 of the second unit coil 20*b* is a clockwise direction.

The first coil leading portion 32*f* is led out from the coil side 21 (first coil side 21*a*) of the first direction second pole coil side (X2-arrow direction) of the one single unit coil 20 (first unit coil 20*a*) which forms the first pole coil 31*f*. Further, the second coil leading portion 32*s* is led out from the coil side 21 (second coil side 21*b*) of the first direction second pole coil side (X2-arrow direction) of the one unit coil 20 (second unit coil 20*b*) which forms the second pole coil 31*s*. It is noted that in FIG. 53, the first coil leading portion 32*f* is led out from the most slot bottom portion 11*a* side and the second coil leading portion 32*s* is led out from the slot central portion 11*c*.

As shown in FIG. 53, in this embodiment, the pole coil connecting portion 32*c* is not intersecting with the pair of coil leading portions 32*f*, 32*s*. Further, the pole coil connecting portion 32*c* can cross over further outside (front side of the paper) of the coil end 22 of the first unit coil 20*a* in the third direction (Z-arrow direction).

Figure 54:
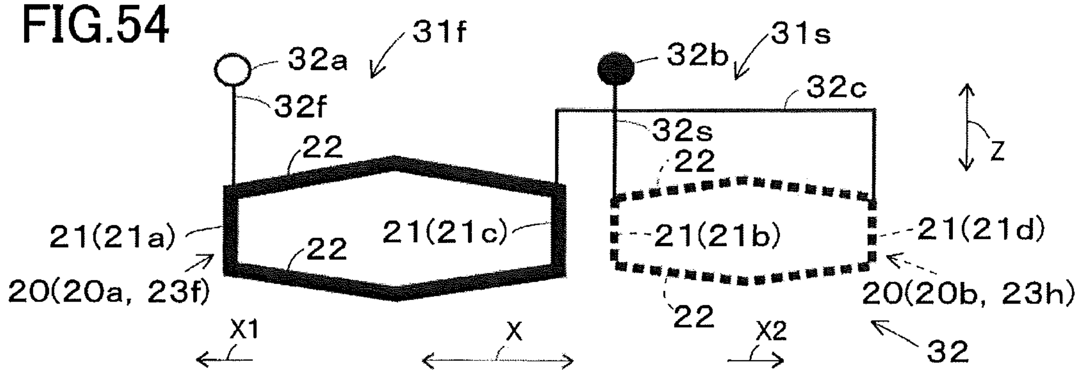
FIG. 54 is a schematic view of an example of structure of the pole paired coil 32, seen from the slot opening portion 11*b* side in the second direction (Y-arrow direction) associated with the eighteenth modified embodiment.
Figure 55:
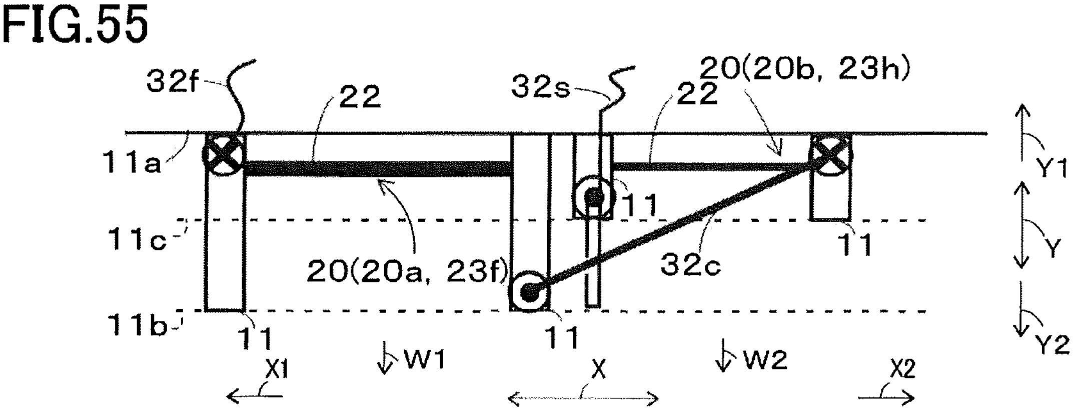
FIG. 55 is a schematic view of an example of structure of the pole paired coil 32 shown in FIG. 54 being mounted in the plurality of (four) slots 11, seen from the coil leading portions 32*f*, 32*s* side in the third direction (Z-arrow direction), associated with the eighteenth modified embodiment.

The arrangement of the half-coil 23*h* and the pair of coil leading portions 32*f*, 32*s* of the pole paired coil 32 can be changed to the arrangement of the eighteenth modified embodiment. As shown in FIGS. 54 and 55, according to the eighteenth modified embodiment, compared to the fourth embodiment, the arrangement of the pair of coil leading portions 32*f*, 32*s* is different.

In this embodiment, the first coil leading portion 32*f* is led out from the coil side 21 (first coil side 21*a*) of the first direction first pole coil side (X1-arrow direction) of the one unit coil 20 (first unit coil 20*a*) which forms the first pole coil 31*f*. Further, the second coil leading portion 32*s* is led out from the coil side 21 (second coil side 21*b*) of the first direction first pole coil side (X1-arrow direction) of the one unit coil 20 (second unit coil 20*b*) which forms the second pole coil 31*s*. In FIG. 55, the first coil leading portion 32*f* is led out from the most slot bottom portion 11*a* side and the second coil leading portion 32*s* is led out from the slot central portion 11*c*.

Further, the pole paired coil 32 includes the half-coil 23*h* at the second pole coil 31*s*. The winding advancing direction W1 of the first unit coil 20*a* and the winding advancing direction W2 of the second unit coil 20*b* are both the second direction slot opening portion side (Y2-arrow direction). Further, the winding direction of the first unit coil 20*a* seen from the winding advancing direction W1 of the first unit coil 20*a* is a clockwise direction. The winding direction of the second unit coil 20*b* seen from the winding advancing direction W2 of the second unit coil 20*b* is a counterclockwise direction.

In the modified embodiment, the pole coil connecting portion 32*c* and the second coil leading portion 32*s* are brought into contact and intersecting with each other. As shown in FIG. 55, once the second coil leading portion 32*s* is wound around up to the slot opening portion 11*b* in the second direction slot opening portion side (Y2-arrow direction) and thereafter the second coil leading portion 32*s* is wound in the second direction slot bottom portion side (Y1-arrow direction). The second coil leading portion 32*s* once passes through the stator iron core 10 side (back side of the paper) of the third direction (Z-arrow direction) of the pole coil connecting portion 32*c* and wound around further outside (front side of the paper) of the pole coil connecting portion 32*c* and the coil end 22 of the second unit coil 20*b* in the third direction (Z-arrow direction). In this situation, compared to the embodiment, each pole coil 32 of the modified embodiment is oversized in the third direction (Z-arrow direction).

It is noted that the second coil leading portion 32*s* is wound around along in the wiring direction of the pole coil connecting portion 32*c* and led out from the vicinity of slot bottom portion 11*a* side portion from which the first coil leading portion 32*f* of adjacently arranged another pole paired coil 32 is led out in order to avoid intersection explained above. Therefore, the first coil leading portion 32*f* and the second coil leading portion 32*s* are arranged adjacently to each other and this arrangement may lead to a reduction of efficiency in wiring work and pole paired coil 32 connecting work.

Figure 56:
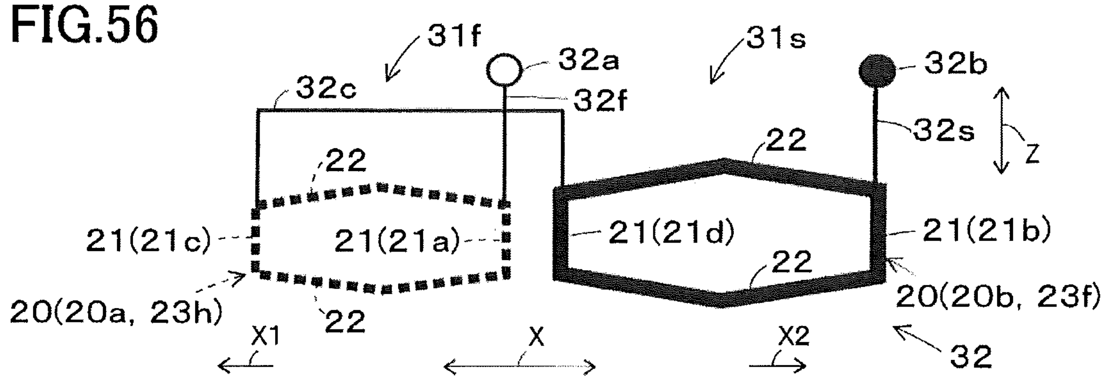
FIG. 56 is a schematic view of the pole paired coil 32 seen from the slot opening portion 11*b* side in the second direction (Y-arrow direction) associated with the nineteenth modified embodiment.
Figure 57:
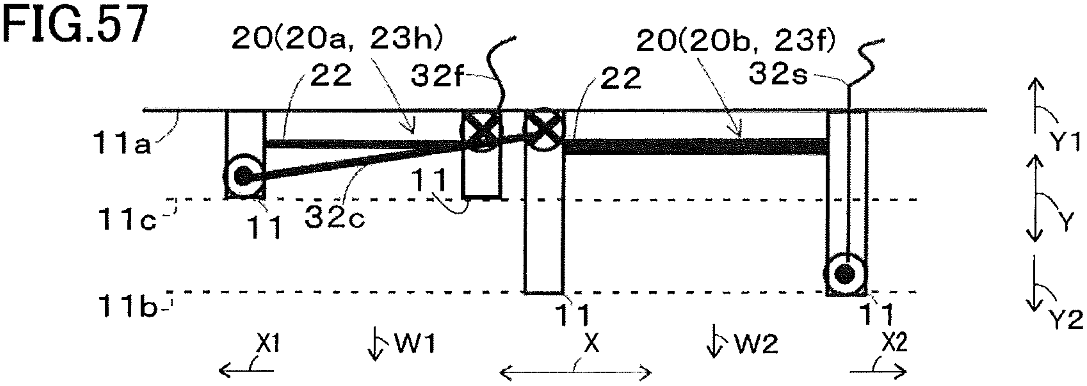
FIG. 57 is a schematic view of an example of the pole paired coil 32 shown in FIG. 56 being mounted in the plurality of (four) slots 11, seen from the pair of coil leading portions 32*f*, 32*s* side in the third direction (Z-arrow direction) associated with the nineteenth modified embodiment.

Further, the arrangement of the half-coil 23*h* and the pair of coil leading portions 32*f*, 32*s* of the pole paired coil 32 can be changed to the arrangement of the nineteenth modified embodiment. As shown in FIGS. 56 and 57, according to the nineteenth modified embodiment, compared to the fourth embodiment, the arrangement of the half-coil 23*h* is different.

According to the modified embodiment, the pole paired coil 32 includes the half-coil 23*h* at the first pole coil 31*f*. The first pole coil 31*f* includes one unit coil 20 and the one unit coil 20 is defined to be the first unit coil 20*a*. The coil pitch between the pair of coil sides 21, 21 of the first unit coil 20*a* is set to be three slot pitches. The first unit coil 20*a* is wound concentrically to form the first pole coil 31*f*.

The second pole coil 31*s* includes one unit coil 20 and the one unit coil 20 is defined to be the second unit coil 20*b*. The coil pitch between the pair of coil sides 21, 21 of the second unit coil 20*b* is set to be four slot pitches. The second unit coil 20*b* is wound concentrically to form the second pole coil 31*s*. According to the embodiment, the first unit coil 20*a* is the half-coil 23*h* and the second unit coil 20*b* is the full-coil 23*f*.

Further, the winding advancing direction W1 of the first unit coil 20*a* and the winding advancing direction W2 of the second unit coil 20*b* are both the second direction slot opening portion side (Y2-arrow direction). Further, the winding direction of the first unit coil 20*a* seen from the winding advancing direction W1 of the first unit coil 20*a* is a counterclockwise direction. The winding direction of the second unit coil 20*b* seen from the winding advancing direction W2 of the second unit coil 20*b* is a clockwise direction.

According to the modified embodiment, the first coil leading portion 32*f* is led out from the coil side 21 (first coil side 21*a*) of the first direction second pole coil side (X2-arrow direction) of the one unit coil 20 (first unit coil 20*a*) which forms the first pole coil 31*f*. Further, the second coil leading portion 32*s* is led out from the coil side 21 (second coil side 21*b*) of the first direction second pole coil side (X2-arrow direction) of the one unit coil 20 (second unit coil 20*b*) which forms the second pole coil 31*s*. It is noted that in FIG. 57 the first coil leading portion 32*f* is led out from the most slot opening portion 11*b* side and the second coil leading portion 32*s* is led out from the most slot opening portion 11*b* side.

As shown in FIG. 57, according to the modified embodiment, the pole coil connecting portion 32*c* is not intersecting with the pair of coil leading portions 32*f*, 32*s*. Further, the pole coil connecting portion 32*c* can cross over further outside (front side of the paper) of the coil end 22 of the first unit coil 20*a* in the third direction (Z-arrow direction).

Figure 58:
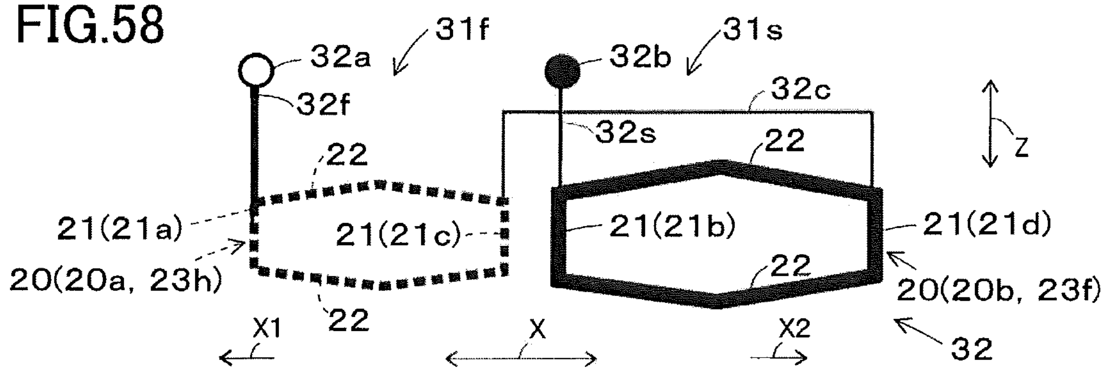
FIG. 58 is a schematic view of an example of structure of the pole paired coil 32 seen from the slot opening portion 11*b* side in the second direction (Y-arrow direction) associated with the twentieth modified embodiment.
Figure 59:
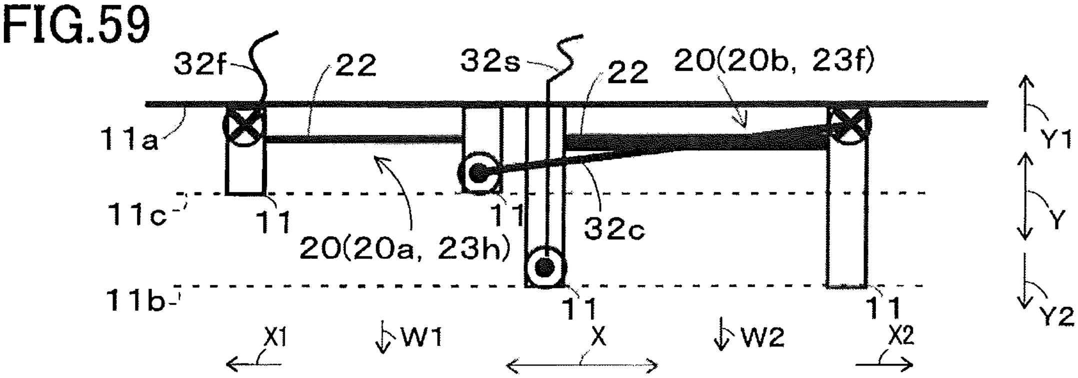
FIG. 59 is a schematic view of an example of structure of the pole paired coil 32 shown in FIG. 58 being mounted in the plurality of (four) slots 11, seen from the coil leading portions 32*f*, 32*s* side in the third direction (Z-arrow direction) associated with the twentieth modified embodiment.

The arrangement of the half-coil 23*h* and the pair of coil leading portions 32*f*, 32*s* of the pole paired coil 32 can be changed to the arrangement of the twentieth modified embodiment. As shown in FIGS. 58 and 59, according to the twentieth modified embodiment, compared to the nineteenth modified embodiment, the arrangement of the pair of coil leading portions 32*f*, 32*s* is different.

According to the modified embodiment, the first coil leading portion 32*f* is led out from the coil side 21 (first coil side 21*a*) of the first direction first pole coil side (X1-arrow direction) of the one unit coil 20 (first unit coil 20*a*) which forms the first pole coil 31*f*. Further, the second coil leading portion 32*s* is led out from the coil side 21 (second coil side 21*b*) of the first direction first pole coil side (X1-arrow direction) of the one unit coil 20 (second unit coil 20*b*) which forms the second pole coil 31*s*. It is noted that in FIG. 59, the first coil leading portion 32*f* is led out from the most slot bottom portion 11*a* side and the second coil leading portion 32*s* is led out from the most slot opening portion 11*b* side.

Further, the pole paired coil 32 includes the half-coil 23*h* at the first pole coil 31*f*. The winding advancing direction W1 of the first unit coil 20*a* and the winding advancing direction W2 of the second unit coil 20*b* are both the second direction slot opening portion side (Y2-arrow direction). Further, the winding direction of the first unit coil 20*a* seen from the winding advancing direction W1 of the first unit coil 20*a* is a clockwise direction. The winding direction of the second unit coil 20*b* seen from the winding advancing direction W2 of the second unit coil 20*b* is a counterclockwise direction.

In this modified embodiment, the pole coil connecting portion 32*c* and the second coil leading portion 32*s* are brought into contact and intersecting with each other. The second coil leading portion 32*s* is wound around further outside (front side of the paper) of the coil end 22 of the second unit coil 20*b* and the pole coil connecting portion 32*c* in the third direction (Z-arrow direction). In this situation, compared to the embodiment, each pole paired coil 32 of the modified embodiment is oversized outside in the third direction (Z-arrow direction).

It is noted that the second coil leading portion 32*s* is wound around along in the wiring direction of the pole coil connecting portion 32*c* and led out from the vicinity of slot bottom portion 11*a* side portion from which the first coil leading portion 32*f* of adjacently arranged another pole paired coil 32 is led out in order to avoid intersection explained above. Therefore, the first coil leading portion 32*f* and the second coil leading portion 32*s* are arranged adjacently to each other and this arrangement may lead to a reduction of efficiency in wiring work and pole paired coil 32 connecting work.

According to the rotating electrical machine 100 of the embodiment, the number of slots per every pole and every phase is 1.5. Further, the pole paired coil 32 includes a half-coil 23*h* at the second pole coil 31*s*. Further, the first coil leading portion 32*f* is led out from the coil side 21 (first coil side 21*a*) of the first direction second pole coil side (X2-arrow direction) of the one unit coil 20 (first unit coil 20*a*) which forms the first pole coil 31*f*. The second coil leading portion 32*s* is led out from the coil side 21 (second coil side 21*b*) of the first direction second pole coil side (X2-arrow direction) of the one unit coil 20 (second unit coil 20*b*) which forms the second pole coil 31*s*. It is noted that the first unit coil 20*a* is the full-coil 23*f* and the second unit coil 20*b* is the half-coil 23*h*.

In the embodiment, the pole coil connecting portion 32*c* is not intersecting with the pair of coil leading portions 32*f*, 32*s*. This can be said to the arrangement in the nineteenth modified embodiment in which the half-coil 23*h* of the pole paired coil 32 and the pair of coil leading portions 32*f*, 32*s* are arranged similar to the arrangement of the third embodiment. Thus, the pole paired coil 32 of the embodiment and the nineteenth modified embodiment can be simplified in wiring by reducing the size of the coil end 22 at the pair of coil leading portions 32*f*, 32*s* side of the third direction (Z-arrow direction) compared to those of the eighteenth modified embodiment and twentieth modified embodiment.

According to the rotating electrical machine 100 of the embodiment, since the number of slots per every pole and every phase is 1.5, the pole paired coil 32 has one full-coil 23*f* and one half-coil 23*h*. Accordingly, the unit coil connecting portion 31*c* can be eliminated to simplify the wiring in the pole paired coil 32. Thus, the rotating electrical machine 100 of the embodiment can reduce the interference intersection (contact intersecting state) between each crossover line (unit coil connecting portion 31*c*) of the pole paired coil 32 and the pair of coil leading portions 32*f*, 32*s*, compared to the rotating electrical machine with the number of slots per every pole and every phase being 2.5 or more.

(Arrangement of Phase Coil 33)

It is preferable that the plurality of (in the embodiment, three) phase coils 33 (U-phase coil 33*u*, V-phase coil 33*v* and W-phase coil 33*w*) is mounted in the plurality of (thirty-six) slots 11 by the manufacturing method including the first mounting process, the second phase advance mounting process and the third phase advance mounting process, which are described in the third embodiment. Thus, as shown in FIGS. 60A through 60D, the plurality of (three) phase coils 33 is assembled in order of the U-phase coil 33*u*, V-phase coil 33*v* and W-phase coil 33*w*.

Figure 60A:
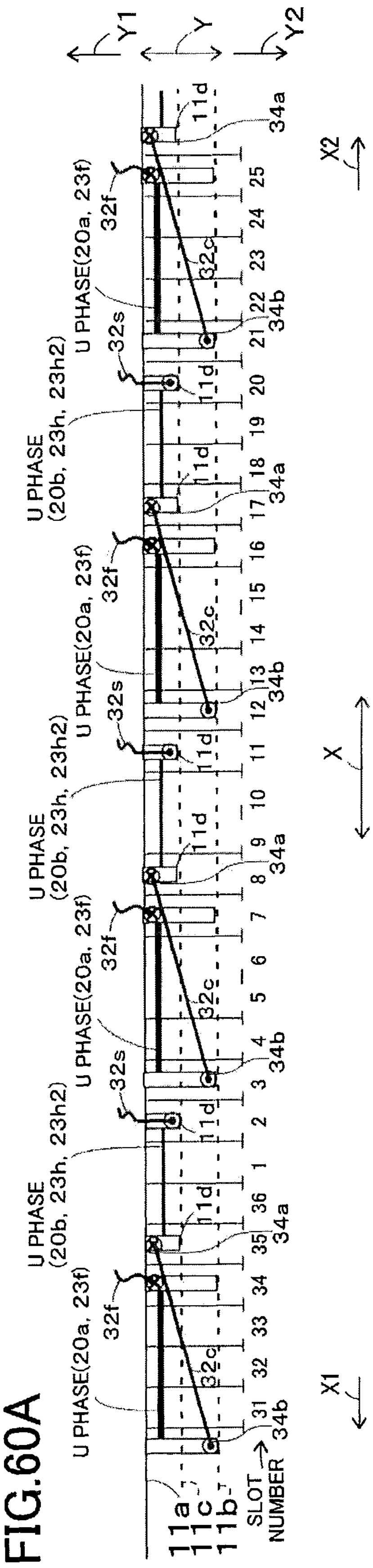
FIG. 60A is a schematic view of the U-phase coil 33*u* being mounted in the plurality of slots 11 seen from the pair of coil leading portions 32*f*, 32*s* side in the third direction (Z-arrow direction) associated with the fourth embodiment.

As shown in FIG. 60A, the first coil leading portion 32*f* of the U-phase coil 33*u* is led out from the slot bottom portion 11*a* side. The second coil leading portion 32*s* of the U-phase coil 33*u* is led out from the slot central portion 11*c* and is wound around in the second direction slot bottom portion side (Y1-arrow direction). The second coil leading portion 32*s* of the U-phase coil 33*u* can be wound around further outside (front side of the paper) of the coil end 22 of the second unit coil 20*b* of the U-phase coil 33*u* in the third direction (Z-arrow direction).

As explained, the pair of coil leading portions 32*f*, 32*s* and the crossover line (pole coil connecting portion 32*c*) in the pole paired coil 32 of the U-phase coil 33*u* are not intersecting with each other and further, since the U-phase coil 33*u* is mounted first, it is not affected by another phase coil 33 (V-phase coil 33*v* and W-phase coil 33*w*) and accordingly, each of the pair of coil sides 21, 21 of the half-coil 23*h* is arranged at the slot bottom portion 11*a* side. In other words, the U-phase half-coil 23*h* is the one-side occupying half-coil 23*h*2.

Figure 60B:
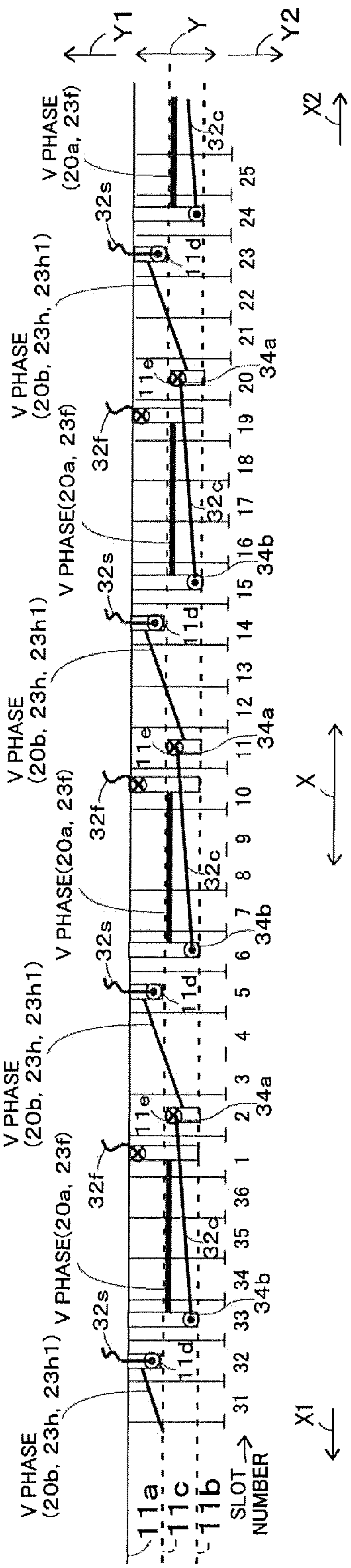
FIG. 60B is a schematic view of the V-phase coil 33*v* being mounted in the plurality of slots 11, seen from the pair of coil leading portions 32*f*, 32*s* side in the third direction (Z-arrow direction) associated with the fourth embodiment.

As shown in FIG. 60B, the first coil leading portion 32*f* of the V-phase coil 33*v* is led out from the slot bottom portion 11*a* side. The second coil leading portion 32*s* of the V-phase coil 33*v* is led out from the slot central portion 11*c* and wound around in the second direction slot bottom portion side (Y1-arrow direction). The second coil leading portion 32*s* of the V-phase coil 33*v* can be wound around further outside (front side of the paper) of the coil end 22 of the second unit coil 20*b* of the V-phase coil 33*v* in the third direction (Z-arrow direction).

As explained, the pair of coil leading portions 32*f*, 32*s* and the crossover line (pole coil connecting portion 32*c*) of the pole paired coil 32 of the V-phase coil 33*v* are not intersecting with each other and further, since the V-phase coil 33*v* is mounted after the mounting of the U-phase coil 33*u*, one coil side 21 of the pair of coil sides 21, 21 of the half-coil 23*h* is arranged at the slot bottom portion 11*a* side and the other coil side 21 of the pair of coil sides 21, 21 is arranged at the slot opening portion 11*b* side. In other words, the V-phase half-coil 23*h* is the both-side occupying half-coil 23*h*1.

Figure 60C:
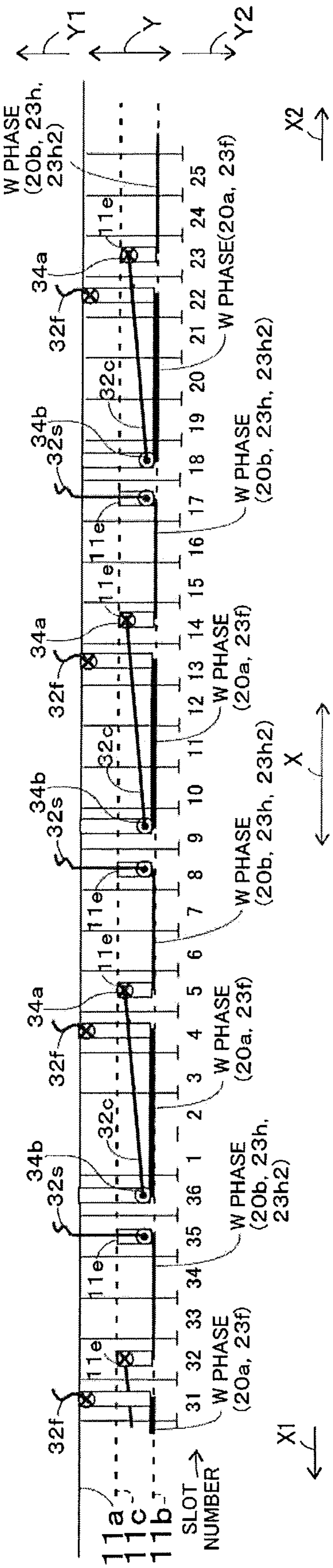
FIG. 60C is a schematic view of the W-phase coil 33*w* being mounted in the plurality of slots 11, seen from the pair of coil leading portions 32*f*, 32*s* side in the third direction (Z-arrow direction) associated with the fourth embodiment.

As shown in FIG. 60C, the first coil leading portion 32*f* of the W-phase coil 33*w* is led out from the slot bottom portion 11*a* side. The second coil leading portion 32*s* of the W-phase coil 33*w* is led out from the slot opening portion 11*b* side and wound around in the second direction slot bottom portion side (Y1-arrow direction). The second coil leading portion 32*s* of the W-phase coil 33*w* can be wound around further outside (front side of the paper) of the coil end 22 of the second unit coil 20*b* of the W-phase coil 33*w* in the third direction (Z-arrow direction).

As explained, the pair of coil leading portions 32*f*, 32*s* and the crossover line (pole coil connecting portion 32*c*) in the pole paired coil 32 of the W-phase coil 33*w* are not intersecting with each other. Further, since the W-phase coil 33*w* is mounted last, both of the pair of coil sides 21, 21 of the half-coil 23*h* are arranged at the slot opening portion 11*b* side. In other words, the W-phase half-coil 23*h* is the one-side occupying half-coil 23*h*2.

As explained, according to the three-phase phase coil 33 (U-phase coil 33*u*, V-phase coil 33*v* and W-phase coil 33*w*), the pair of coil leading portions 32*f*, 32*s* and the crossover line (pole coil connecting portion 32*c*) in the pole paired coil 32 are not intersecting in any phase. It is noted that the second coil leading portion 32*s* of the U-phase coil 33*u* is led out from the slot central portion 11*c* but does not interfere with the crossover line (pole coil connecting portion 32*c*) in the pole paired coil 32. This can be said to the second coil leading portion 32*s* of the V-phase coil 33*v*.

As a result of the assembling of the W-phase coil 33*w*, the second coil leading portion 32*s* of the W-phase coil 33*w* passes through further outside (front side of the paper) of the coil end 22 of the second unit coil 20*b* of the U-phase coil 33*u* in the third direction (Z-arrow direction). In other words, according to the embodiment, the "another phase crossover leading line" corresponds to one phase worth which is the second coil leading portion 32*s* of the W-phase coil 33*w*.

As shown in FIGS. 61A through 61D, the plurality of (three) phase coils 33 (U-phase coil 33*u*, V-phase coil 33*v* and W-phase coil 33*w*) can be mounted in the plurality of (thirty-six) slots 11 in order of the U-phase coil 33*u*, the W-phase coil 33*w* and the V-phase coil 33*v* (reverse order of the phase order) (twenty-first modified embodiment). This method is the same with the manufacturing method of the rotating electrical machine 100 having the first mounting process, the second phase advance mounting process and the third phase advance mounting process, as has been explained in the first embodiment.

Figure 61A:
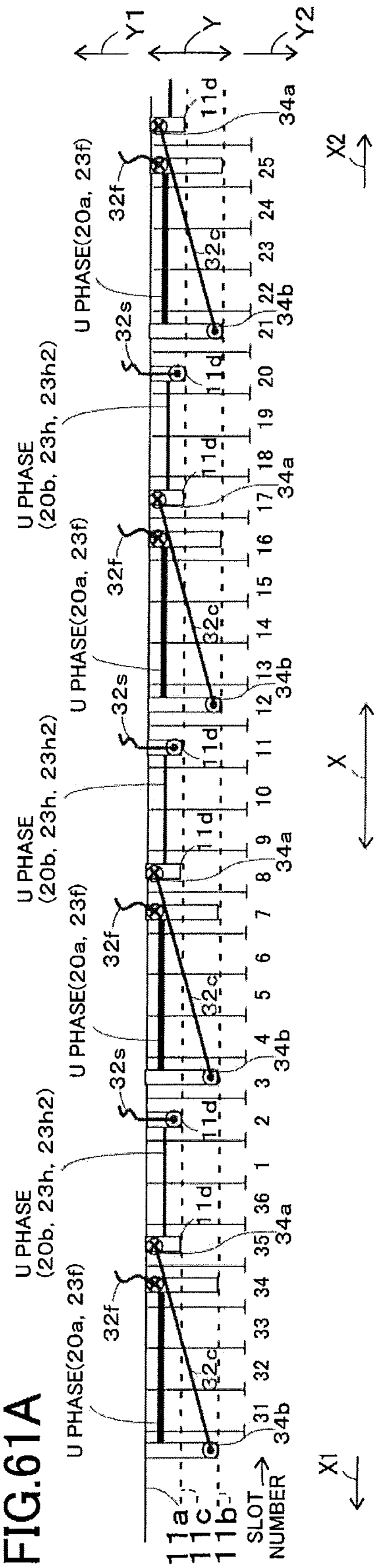
FIG. 61A is a schematic view of the U-phase coil 33*u* being mounted in the plurality of slots 11 seen from the pair of coil leading portions 32*f*, 32*s* side in the third direction (Z-arrow direction) associated with the twenty-first modified embodiment.
Figure 61B:
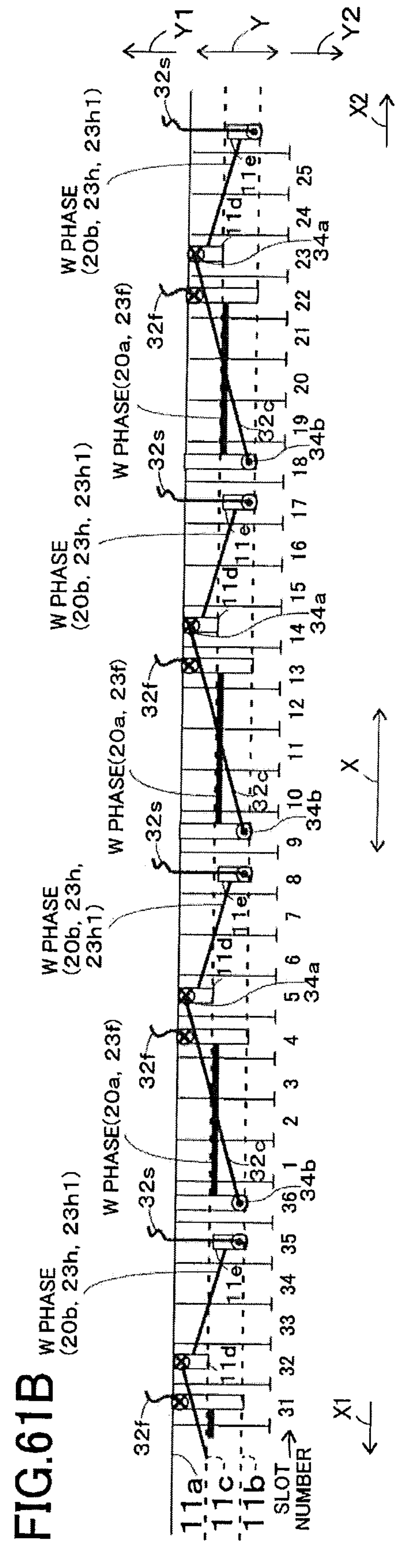
FIG. 61B is a schematic view of the W-phase coil 33*w* being mounted in the plurality of slots 11 seen from the pair of coil leading portions 32*f*, 32*s* side in the third direction (Z-arrow direction) associated with the twenty-first modified embodiment.

As shown in FIG. 61A, the state after the U-phase coil 33*u* has been mounted according to the twenty-first modified embodiment is the same with the state after the U-phase coil 33*u* has been mounted according to the embodiment shown in FIG. 60A. As shown in FIG. 61B, the first coil leading portion 32*f* of the W-phase coil 33*w* is led out from the slot bottom portion 11*a* side. The second coil leading portion 32*s* of the W-phase coil 33*w* is led out from the slot opening portion 11*b* side and is wound around in the second direction slot bottom portion side (Y1-arrow direction). The second coil leading portion 32*s* of the W-phase coil 33*w* can be wound around further outside (front side of the paper) of the coil end 22 of the second unit coil 20*b* of the W-phase coil 33*w* in the third direction (Z-arrow direction).

As explained, in the W-phase coil 33*w*, the pair of coil leading portions 32*f*, 32*s* and the crossover line (pole coil connecting portion 32*c*) in the pole paired coil 32 are not intersecting with each other. Further, since the W-phase coil 33*w* is mounted after the mounting of the U-phase coil 33*u*, one coil side 21 of the pair of coil sides 21, 21 of the half-coil 23*h* is arranged at the slot bottom portion 11*a* side and the other coil side 21 of the pair of coil sides 21, 21 is arranged at the slot opening portion 11*b* side. In other words, the W-phase half-coil 23*h* is the both-side occupying half-coil 23*h*1.

Figure 61C:
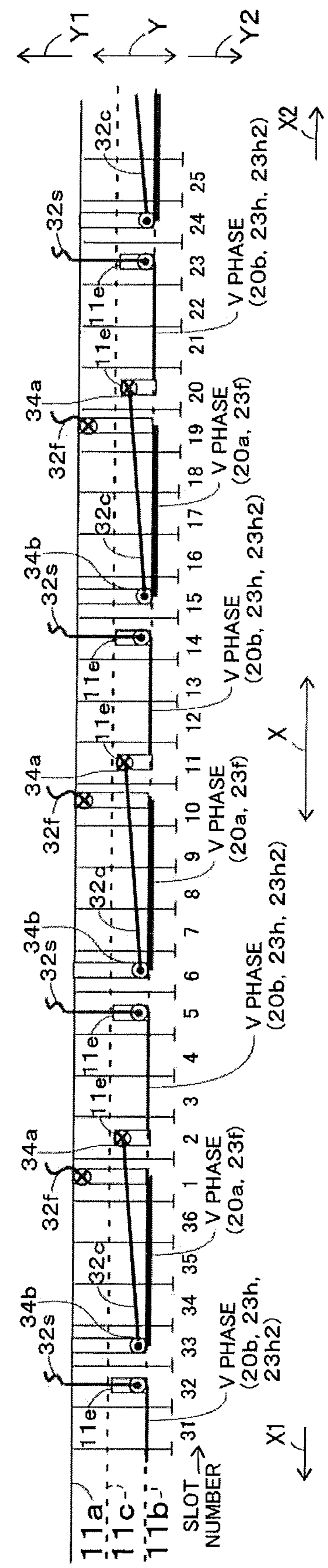
FIG. 61C is a schematic view of the V-phase coil 33*v* being mounted in the plurality of slots 11 seen from the pair of coil leading portions 32*f*, 32*s* side in the third direction (Z-arrow direction) associated with the twenty-first modified embodiment.

As shown in FIG. 61C, the first coil leading portion 32*f* of the V-phase coil 33*v* is led out from the slot bottom portion 11*a* side and the second coil leading portion 32*s* of the V-phase coil 33*v* is led out from the slot opening portion 11*b* side and is wound around in the second direction slot bottom portion side (Y1-arrow direction). The second coil leading portion 32*s* of the V-phase coil 33*v* can be wound around further outside (front side of the paper) of the coil end 22 of the second unit coil 20*b* of the V-phase coil 33*v* in the third direction (Z-arrow direction).

As explained, in the V-phase coil 33*v*, the pair of coil leading portions 32*f*, 32*s* and the crossover line (pole coil connecting portion 32*c*) of the pole paired coil 32 are not intersecting with each other. Further, since the V-phase coil 33*v* is mounted last, both of the pair of coil sides 21, 21 of the half-coil 23*h* are arranged at the slot opening portion 11*b* side. In other words, the V-phase half-coil 23*h* is the one-side occupying half-coil 23*h*2.

As explained above, according to the three-phase phase coil 33 (U-phase coil 33*u*, V-phase coil 33*v* and W-phase coil 33*w*), the pair of coil leading portions 32*f*, 32*s* and the crossover line (pole coil connecting portion 32*c*) in the pole paired coil 32 are not intersecting in any phase. It is noted that the second coil leading portion 32*s* of the U-phase coil 33*u* is led out from the slot central portion 11*c* but does not interfere with the crossover line (pole coil connecting portion 32*c*) in the pole paired coil 32.

As a result of the assembling of the V-phase coil 33*v*, the second coil leading portion 32*s* of the V-phase coil 33*v* passes through further outside (front side of the paper) of the coil end 22 of the second unit coil 20*b* of the W-phase coil 33*w* in the third direction (Z-arrow direction). Similarly, as a result of assembling of the W-phase coil 33*w*, the second coil leading portion 32*s* of the W-phase coil 33*w* passes through further outside (front side of the paper) of the coil end 22 of the second unit coil 20*b* of the U-phase coil 33*u* in the third direction (Z-arrow direction). In other words, the "another phase crossover leading line" corresponds to the two phases worth corresponding to the second coil leading portion 32*s* of the V-phase coil 33*v* and the second coil leading portion 32*s* of the W-phase coil 33*w* which correspond to the "another phase crossover leading line" in the twenty-first modified embodiment.

On the other hand, according to the embodiment, the "another phase crossover leading line" corresponds to one phase worth and the second coil leading portion 32*s* of the W-phase coil 33*w* corresponds to the "another phase crossover leading line". As explained, the rotating electrical machine 100 of the embodiment has less number of phases of another phase crossover leading line, compared to the number thereof according to the rotating electrical machine 100 of the twenty-first modified embodiment. Accordingly, the rotating electrical machine 100 of the embodiment can reduce the number of necessary electric insulation portions between the phase coils 33, compared to the number thereof according to the rotating electrical machine 100 of the twenty-first modified embodiment.

Figure 61D:
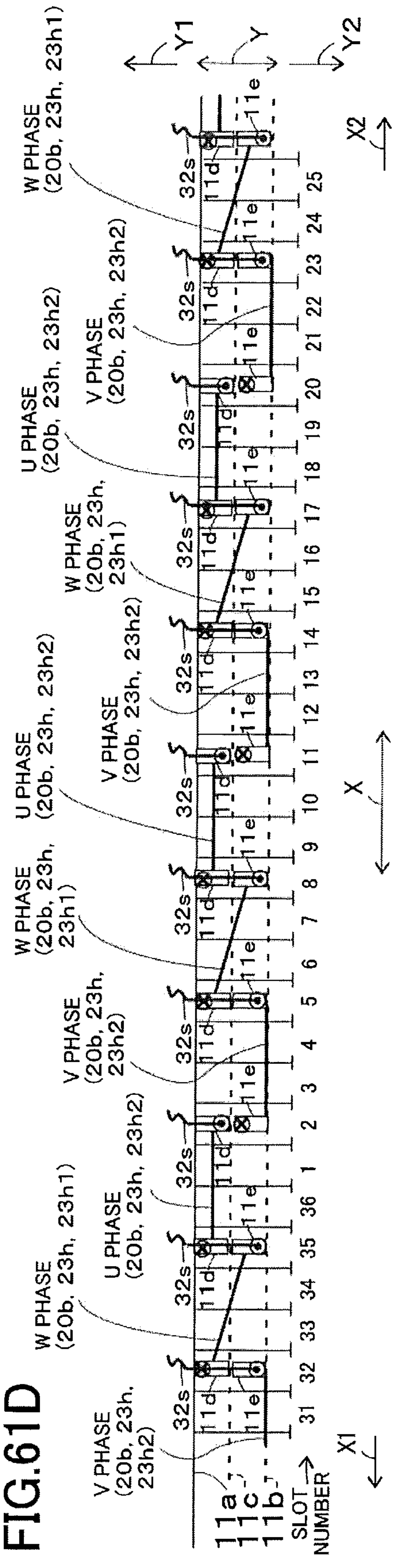
FIG. 61D is a schematic view of each half-coil 23*h* of the three-phase phase-coil 33 (U-phase coil 33*u*, V-phase coil 33*v* and W-phase coil 33*w*) being mounted in the plurality of slots 11, seen from the pair of coil leading portions 32*f*, 32*s* side in the third direction (Z-arrow direction) associated with the twenty-first modified embodiment.

As shown in FIG. 61D, according to the twenty-first modified embodiment, the angle formed by a vector (corresponding to the first vector 35*a*) which has one point in the first half slot portion 11*d* of both side occupying half-coil 23*h*1 as the start point and one point in the second half slot portion 11*e* of both side occupying half-coil 23*h*1 as the end point and a vector (corresponding to the second vector 35*b*) which has the first crossover line end portion 34*a* of the pole coil connecting portion 32*c* as the start point and the second crossover line end portion 34*b* as the end point is set to be an obtuse angle which is larger than mechanical angle of 90 degrees.

Figure 60D:
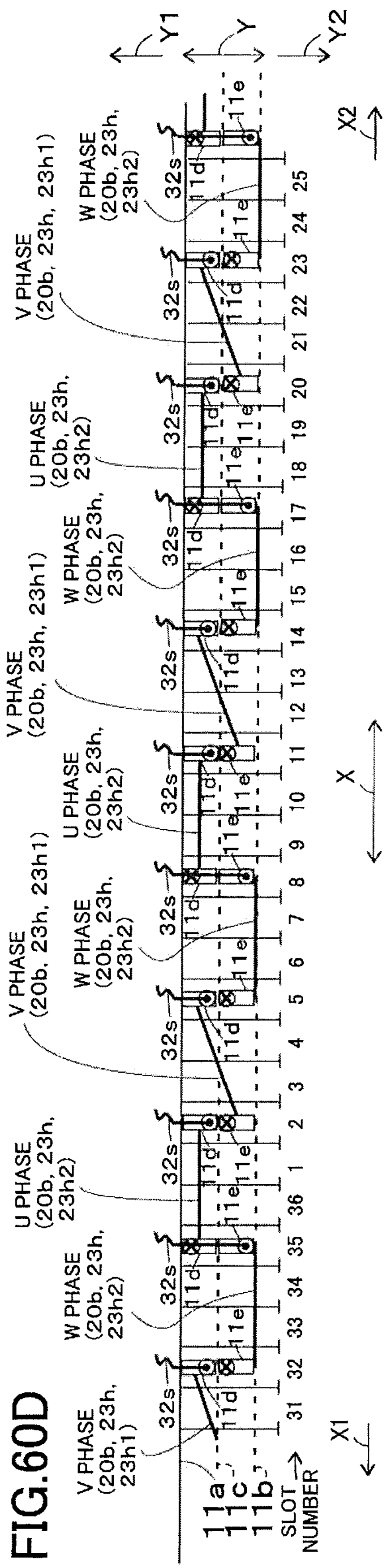
FIG. 60D is a schematic view of each half-coil 23*h* of the three-phase phase-coil 33 (U-phase coil 33*u*, V-phase coil 33*v* and W-phase coil 33*w*) being mounted in the plurality of slots 11, seen from the pair of coil leading portions 32*f*, 32*s* side in the third direction (Z-arrow direction) associated with the fourth embodiment.

On the other hand, as shown in FIG. 60D according to the embodiment, the angle formed by a vector (corresponding to the first vector 35*a*) which has one point in the first half slot portion 11*d* of both side occupying half-coil 23*h*1 as the start point and one point in the second half slot portion 11*e* of both side occupying half-coil 23*h*1 as the end point and a vector (corresponding to the second vector 35*b*) which has the first crossover line end portion 34*a* of the pole coil connecting portion 32*c* as the start point and the second crossover line end portion 34*b* as the end point is set to be an acute angle which is smaller than mechanical angle of 90 degrees.

According to the rotating electrical machine 100 of the embodiment as structured above, the interference intersection (contact intersecting state) between coil end 22 of the both side occupying half-coil 23*h*1, each crossover line (pole coil connecting portion 32*c*) in the pole paired coil 32 and the pair of coil leading portions 32*f*, 32*s* can be reduced and accordingly, the number of another phase crossover leading lines can be reduced. Thus, according to the pole paired coil 32 of the embodiment, the coil end 22 of the pair of coil leading portions 32*f*, 32*s* of the third direction (Z-arrow direction) can be downsized and the wiring thereof can be simplified, compared to those of the pole paired coil 32 of the twenty-first modified embodiment.

The arrangement of the phase coil 33 (U-phase coil 33*u*, V-phase coil 33*v* and W-phase coil 33*w*) according to the embodiment can be the same with that of the nineteenth modified embodiment. In more detail, as shown in FIGS. 62A through 62D, in the nineteenth modified embodiment, it is also preferable to mount the plurality of (three) phase coils 33 (U-phase coil 33*u*, V-phase coil 33*v* and W-phase coil 33*w*) in the plurality of (thirty-six (36)) slots 11 in order of the U-phase coil 33*u*, the V-phase coil 33*v* and the W-phase coil 33*w*.

Figure 62A:
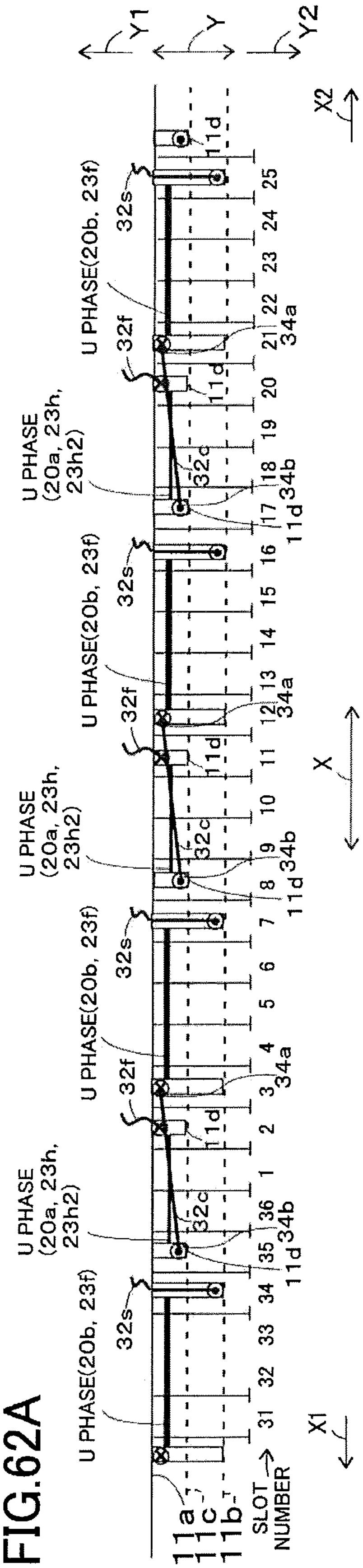
FIG. 62A is a schematic view of the U-phase coil 33*u* being mounted in the plurality of slots 11 seen from the pair of coil leading portions 32*f*, 32*s* side in the third direction (Z-arrow direction) associated with the nineteenth modified embodiment.

As shown in FIG. 62A, the first coil leading portion 32*f* of the U-phase coil 33*u* is led out from the slot bottom portion 11*a* side. The second coil leading portion 32*s* of the U-phase coil 33*u* is led out from the slot opening portion 11*b* side and is wound around in the second direction slot bottom portion side (Y1-arrow direction). The second coil leading portion 32*s* of the U-phase coil 33*u* can be wound around further outside (front side of the paper) of the coil end 22 of the second unit coil 20*b* of the U-phase coil 33*u* in the third direction (Z-arrow direction). As explained, according to the U-phase coil 33*u*, the pair of coil leading portions 32*f*, 32*s* and the crossover line (pole coil connecting portion 32*c*) in the pole paired coil 32 are not intersecting. Further, the U-phase half-coil 23*h* is the one side occupying half-coil 23*h*2.

Figure 62B:
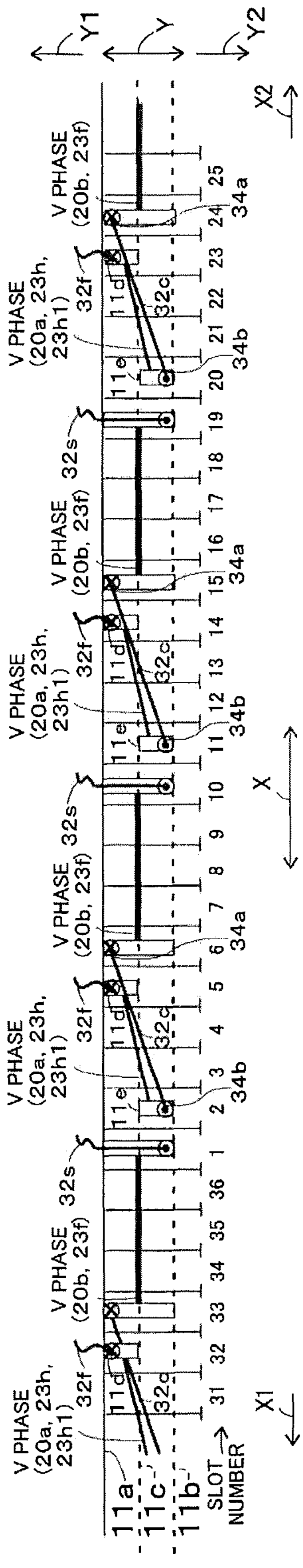
FIG. 62B is a schematic view of the V-phase coil 33*v* being mounted in the plurality of slots 11 seen from the pair of coil leading portions 32*f*, 32*s* side in the third direction (Z-arrow direction) associated with the nineteenth modified embodiment.

As shown in FIG. 62B, the first coil leading portion 32*f* of the V-phase coil 33*v* is led out from the slot bottom portion 11*a* side. The second coil leading portion 32*s* of the V-phase coil 33*v* is led out from the slot opening portion 11*b* side and is wound around in the second direction slot bottom portion side (Y1-arrow direction). The second coil leading portion 32*s* of the V-phase coil 33*v* can be wound around further outside (front side of the paper) of the coil end 22 of the second unit coil 20*b* of the V-phase coil 33*v* in the third direction (Z-arrow direction). As explained, according to the V-phase coil 33*v*, the pair of coil leading portions 32*f*, 32*s* and the crossover line (pole coil connecting portion 32*c*) in the pole paired coil 32 are not intersecting. Further, the V-phase half-coil 23*h* is the both side occupying half-coil 23*h*1.

Figure 62C:
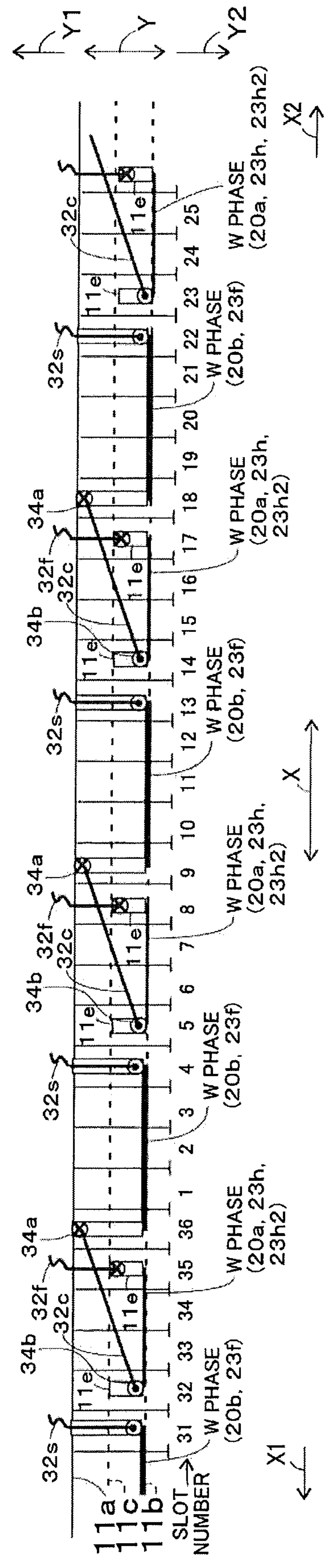
FIG. 62C is a schematic view of the W-phase coil 33*w* being mounted in the plurality of slots 11, seen from the pair of coil leading portions 32*f*, 32*s* side in the third direction (Z-arrow direction) associated with the nineteenth modified embodiment.
Figure 62D:
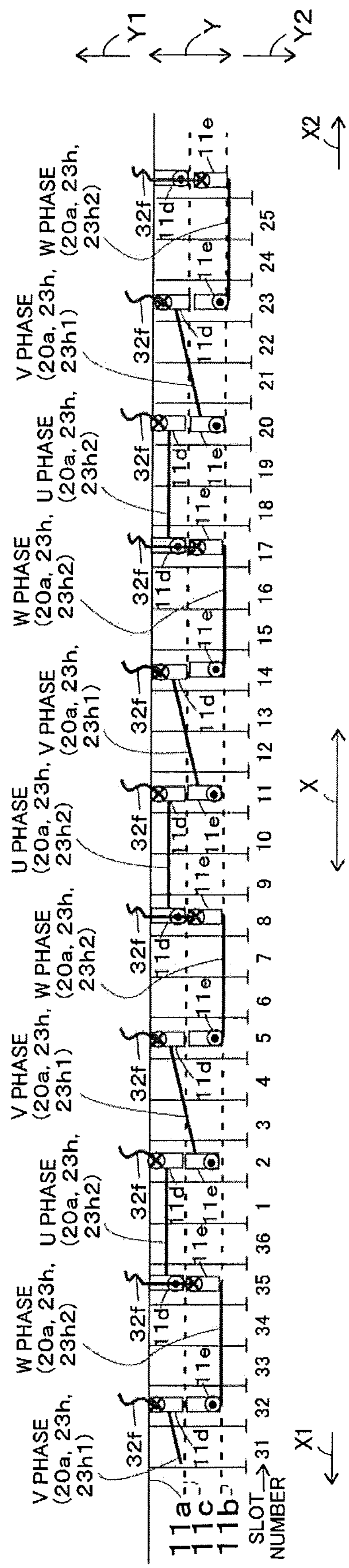
FIG. 62D is a schematic view of each half-coil 23*h* of the three-phase phase-coil 33 (U-phase coil 33*u*, V-phase coil 33*v* and W-phase coil 33*w*) being mounted in the plurality of slots 11, seen from the pair of coil leading portions 32*f*, 32*s* side in the third direction (Z-arrow direction) associated with the nineteenth modified embodiment.

As shown in FIG. 62C, the first coil leading portion 32*f* of the W-phase coil 33*w* is led out from the slot central portion 11*c* side and wound around in the second direction slot bottom portion side (Y1-arrow direction). In the W-phase coil 33*w*, the first coil leading portion 32*f* and the crossover line (pole coil connecting portion 32*c*) in the pole paired coil 32 are brought into contact and intersecting with each other. Therefore, at the intersecting portion, it is necessary to secure an electrical insulation. As the result of assembling of the W-phase coil 33*w*, the first coil leading portion 32*f* of the W-phase coil 33*w* passes further outside (front side of the paper) of the coil end 22 of the first unit coil 20*a* of the U-phase coil 33*u* in the third direction (Z-arrow direction). In other words, according to the modified embodiment, another phase crossover leading line corresponds to one phase worth and corresponds to the first coil leading portion 32*f* of the W-phase coil 33*w*. It is noted that the second coil leading portion 32*s* of the W-phase coil 33*w* is led out from the slot opening portion 11*b* side and is wound around in the second direction slot bottom portion side (Y1-arrow direction). Further, the W-phase half-coil 23*h* is the one-side occupying half-coil 23*h*2.

On the other hand, according to the embodiment, in the three-phase phase coil 33 (U-phase coil 33*u*, V-phase coil 33*v* and W-phase coil 33*w*), the pair of coil leading portions 32*f*, 32*s* and the crossover line (pole coil connecting portion 32*c*) in the pole paired coil 32 are not intersecting in any phase. According to the embodiment, the "another phase crossover leading line" corresponds to one phase worth and corresponds to the second coil leading portion 32*s* of the W-phase coil 33*w*.

As explained before, the pole paired coil 32 of the embodiment and the nineteenth modified embodiment can be simplified in wiring by reducing the size of the coil end 22 at the pair of coil leading portions 32*f*, 32*s* side of the third direction (Z-arrow direction), compared to those of the eighteenth modified embodiment and twentieth modified embodiment. Further, considering the arrangement of the phase coil 33 (U-phase coil 33*u*, V-phase coil 33*v* and W-phase coil 33*w*), the pole paired coil 32 of the embodiment is more preferable compared to that of the nineteenth modified embodiment and can be said most preferable compared to those of the pole paired coils 32 in the eighteenth to twentieth modified embodiments.

According to the nineteenth modified embodiment, the first coil leading portion 32*f* of the W-phase coil 33*w* is led out from the slot central portion 11*c* and wound around in the second direction slot bottom portion side (Y1-arrow direction). In other words, with respect to the first coil leading portion 32*f* of the W-phase coil 33*w*, the crossover length of the slot 11 corresponds to the half crossover length (length ratio: 0.5). It is noted that the first coil leading portion 32*f* of the U-phase coil 33*u* is led out from the slot bottom portion 11*a* side and therefore, does not cross over the slot 11. This can be the same with the first coil leading portion 32*f* of the V-phase coil 33*v*.

Further, the second coil leading portion 32*s* of the U-phase coil 33*u* is led out from the slot opening portion 11*b* side and wound around in the second direction slot bottom portion side (Y1-arrow direction). In other words, with respect to the second coil leading portion 32*s* of the U-phase coil 33*u*, the crossover length of the slot 11 corresponds to the full crossover length (length ratio: 1). This can be said to the second coil leading portion 32*s* of the V-phase coil 33*v* and is also to the second coil leading portion 32*s* of the W-phase coil 33*w*. As explained above, the crossover length of the slot 11 with respect to the pair of coil leading portions 32*f*, 32*s* of three phases worth is 3.5 in length ratio which is obtained by adding the three full-crossover lengths (length ratio: 3) and one half-crossover length (length ratio: 0.5).

On the other hand, according to the embodiment, the first coil leading portion 32*f* of the U-phase coil 33*u* is led out from the slot bottom portion 11*a* side and does not cross over the slot 11. This can be said to the first coil leading portion 32*f* of the V-phase coil 33*v* and is also to the first coil leading portion 32*f* of the W-phase coil 33*w*.

The second coil leading portion 32*s* of the U-phase coil 33*u* is led out from the slot central portion 11*c* and is wound around in the second direction slot bottom portion side (Y1-arrow direction). In other words, the crossover length of slot 11 according to the second coil leading portion 32*s* of the U-phase coil 33*u* corresponds to the half crossover length (length ratio: 0.5). The crossover length of the second coil leading portion 32*s* of the V-phase coil 33*v* is the same with the second coil leading portion 32*s* of the U-phase coil 33*u*. The second coil leading portion 32*s* of the W-phase coil 33*w* is led out from the slot opening portion 11*b* side and is wound around in the second direction slot bottom portion side (Y1-arrow direction). In other words, the crossover length of slot 11 of the second coil leading portion 32*s* of the W-phase coil 33*w* corresponds to the full crossover length (length ratio: 1).

As explained above, the crossover length of slot 11 of the pair of coil leading portions 32*f*, 32*s* of the three-phase worth is the total of one full crossover length (length ratio: 1), two half crossover length (length ratio: 1) becomes 2 in length ratio. Thus, the crossover length of slot 11 of the pole paired coil 32 according to the embodiment can be shortened compared to that of the nineteenth modified embodiment.

<Stator Coil 30 in Mirror Surface Symmetry with Void Surface 50*g* as Boundary Surface>

According to the embodiments and the modified embodiments explained above, the rotating electrical machine 100 in which the mover 70 is provided inside of the stator coil 40 has been explained as an example. However, the rotating electrical machine associated with the present invention is not limited to this type and the rotating electrical machine in which the mover 70 is provided outside of the stator coil 40 can be also applicable. According to the twenty-second modified embodiment, the structure is different in the arrangement of the mover 70 which is provided outside of the stator coil 40, compared to the first embodiment. Hereinafter, based on FIGS. 63 and 64, the explanation of structural points which are different from the first embodiment will be explained mainly.

Figure 64:
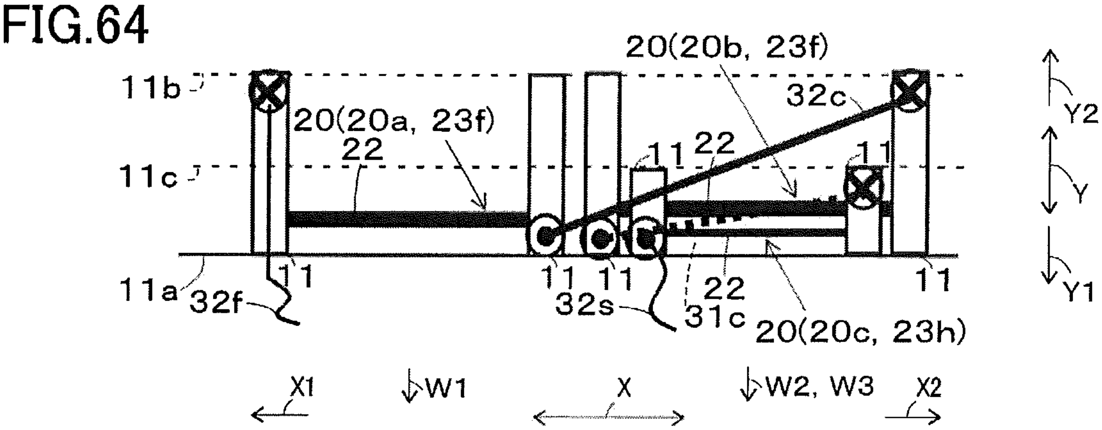
FIG. 64 is a schematic view of an example of the pole paired coil 32 shown in FIG. 63 being mounted in the plurality of (six) slots 11 seen from the pair of coil leading portions 32*f*, 32*s* side in the third direction (Z-arrow direction) associated with the twenty-second modified embodiment.

It is assumed here that the imaginary surface formed in a space between the stator 40 and the mover 70 shown in FIG. 1 formed along in the first direction (X-arrow direction) is defined to be the void surface 50*g*. The state of the pole paired coil 32 illustrated in FIG. 64 indicates the state (mirror image) indicating that the pole paired coil 32 shown in FIG. 9 is turned back with respect to the void surface 50*g* as the boundary. In FIG. 64, the second direction slot bottom portion side (Y1-arrow direction) is the direction of downward of the paper and the second direction slot opening portion side (Y2-arrow direction) is the direction of upward of the paper.

Figure 63:
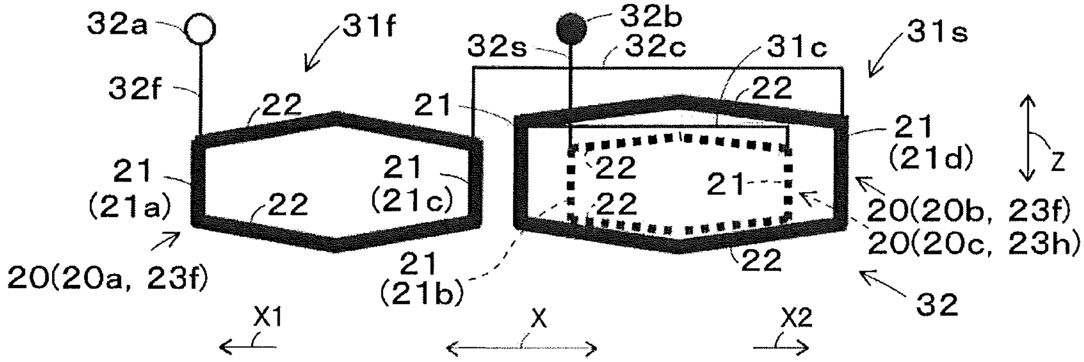
FIG. 63 is a schematic view of the pole paired coil 32, seen from the slot bottom portion 11*a* side in the second direction (Y-arrow direction) associated with the twenty-second modified embodiment.

FIG. 63 is a view schematically illustrating an example of the structure of the pole paired coil 32 seen from the slot bottom portion 11*a* side of the second direction (Y-arrow direction). Since the pole paired coil 32 according to the twenty-second modified embodiment and the pole paired coil 32 according to the first embodiment are in mirror surface symmetry relation, the pole paired coil 32 seen from the slot bottom portion 11*a* side of the second direction (Y-arrow direction) shown in FIG. 63 corresponds to the pole paired coil 32 seen from the slot opening portion 11*b* side of the second direction (Y-arrow direction) shown in FIG. 2.

As shown in FIGS. 63 and 64, each winding advancing direction (W1-arrow direction, W2-arrow direction and W3-arrow direction) of the plurality of (three) unit coils 20 (first unit coil 20*a*, second unit coil 20*b* and third unit coil 20*c*) which forms the pole paired coil 32 is the second direction slot bottom portion side (Y1-arrow direction). Further, the winding direction of the first unit coil 20*a* seen from the winding advancing direction W1 is a clockwise direction. Further, the winding direction of the second unit coil 20*b* seen from the winding advancing direction W2 of the second unit coil 20*b* is a counterclockwise direction and the winding direction of the third unit coil 20*c* seen from the winding advancing direction W3 of the third unit coil 20*c* is a counterclockwise direction.

Further, the pole paired coil 32 includes the half-coil 23*h* at the second pole coil 31*s*. Further, the first coil leading portion 32*f* is led out from the coil side 21 (first coil side 21*a*) of the first direction first pole coil side (X1-arrow direction) of the one unit coil 20 (first unit coil 20*a*) which forms the first pole coil 31*f*. Further, the second coil leading portion 32*s* is led out from the coil side 21 (second coil side 21*b*) of the first direction first pole coil side (X1-arrow direction) of the unit coil 20 (third unit coil 20*c*) which coil pitch between the pair of coil sides 21, 21 is the minimum among the plurality of (two) unit coil 20 (second unit coil 20*b* and third unit coil 20*c*) which forms the second pole coil 31*s*. It is noted that in FIG. 64, the first coil leading portion 32*f* is led out from the most slot opening portion 11*b* side and the second coil leading portion 32*s* is led out from the most slot bottom portion 11*a* side.

Thus, according to the modified embodiment, the winding advancing direction of each unit coil 20 in each pole paired coil 32 is the same direction as the direction of the first embodiment. The arrangement of the half-coil 23*h* and the pair of coil leading portions 32*f*, 32*s* is the same with that of the first embodiment and further, the arrangement of the phase coil 33 (U-phase coil 33*u*, V-phase coil 33*v* and W-phase coil 33*w*) is also the same with the first embodiment. However, the winding directions of the unit coils 20 seen from the respective winding advancing directions of the unit coils 20 are different from those of the first embodiment. Therefore, when the phase of the electric current flowing through each unit coil 20 is the same with that of the first embodiment, the magnetic pole arrangement (polarity of the magnetic pole) generated at the void surface 50*g* is reversed and the mirror surface symmetry relation of the magnetic pole arrangement generated at the void surface 50*g* cannot be maintained. Accordingly, according to the modified embodiment, it is necessary to reverse the electric current flowing direction of each unit coil 20 relative to that of the first embodiment. This can be said to the modified embodiment explained in the explanation of the first embodiment, the second embodiment and the modified embodiment explained in the second embodiment.

The above explanation can be similarly said to the third embodiment. Hereinafter, the explanation of the twenty-third modified embodiment will be made with reference to FIGS. 65 and 66, mainly on the points different from the third embodiment. The pole paired coil 32 shown in FIG. 66 indicates the state that the pole paired coil 32 shown in FIG. 43 is turned back with respect to the void surface 50*g* as the boundary (mirror image). In FIG. 66, the second direction slot bottom portion side (Y1-arrow direction) is the direction of downward of the paper and the second direction slot opening portion side (Y2-arrow direction) is the direction of upward of the paper.

Figure 65:
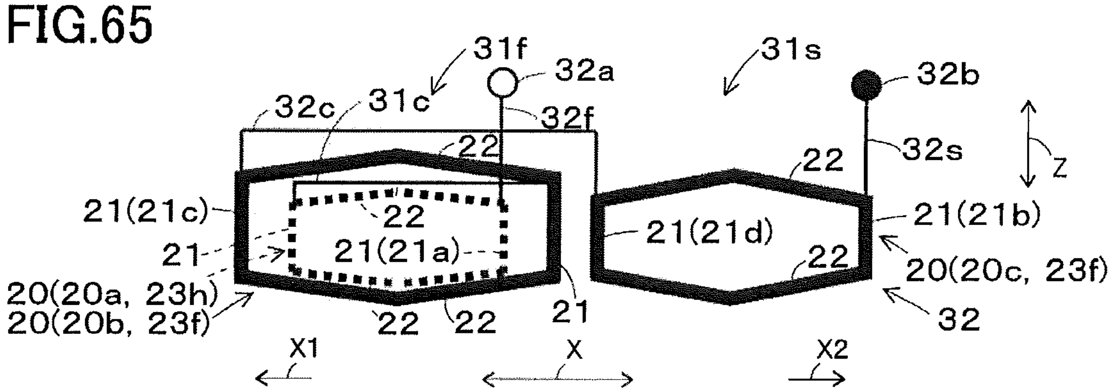
FIG. 65 is a schematic view of an example of structure of the pole paired coil 32 seen from the slot bottom portion 11*a* side in the second direction (Y-arrow direction) associated with the twenty-third modified embodiment.
Figure 66:
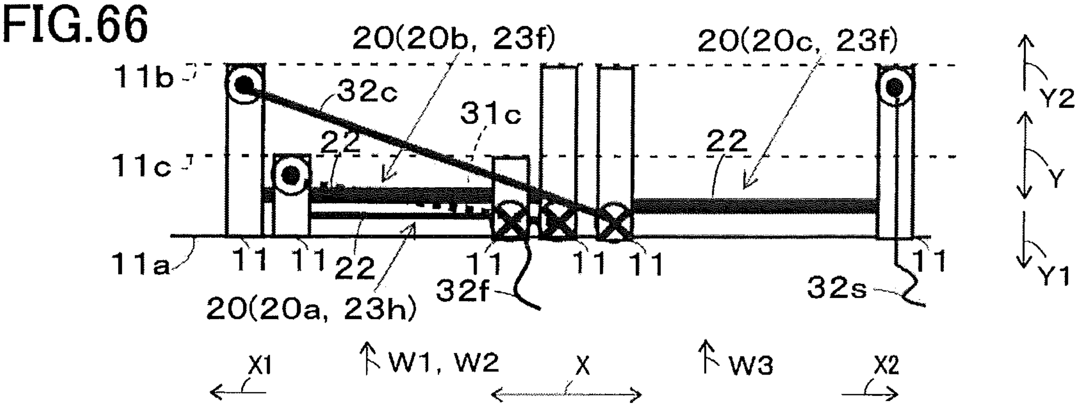
FIG. 66 is a schematic view of an example of structure of the pole paired coil 32 shown in FIG. 65, being mounted in the plurality of (six) slots 11, seen from the coil leading portions 32*f*, 32*s* side in the third direction (Z-arrow direction), associated with the twenty-third modified embodiment.

FIG. 65 is a view schematically illustrating an example of the structure of the pole paired coil 32 seen from the slot bottom portion 11*a* side of the second direction (Y-arrow direction). Since the pole paired coil 32 according to the twenty-third modified embodiment and the pole paired coil 32 according to the third embodiment are in mirror surface symmetry relation, the pole paired coil 32 seen from the slot bottom portion 11*a* side of the second direction (Y-arrow direction) shown in FIG. 65 corresponds to the pole paired coil 32 seen from the slot opening portion 11*b* side of the second direction (Y-arrow direction) shown in FIG. 42.

As shown in FIGS. 65 and 66, each winding advancing direction (W1-arrow direction, W2-arrow direction and W3-arrow direction) of the plurality of (three) unit coils 20 (first unit coil 20*a*, second unit coil 20*b* and third unit coil 20*c*) which forms the pole paired coil 32 is the second direction slot bottom portion side (Y2-arrow direction). Further, the winding direction of the first unit coil 20*a* seen from the winding advancing direction W1 is a clockwise direction. Further, the winding direction of the second unit coil 20*b* seen from the winding advancing direction W2 of the second unit coil 20*b* is a clockwise direction and the winding direction of the third unit coil 20*c* seen from the winding advancing direction W3 of the third unit coil 20*c* is a counterclockwise direction.

Further, the pole paired coil 32 includes the half-coil 23*h* at the first pole coil 31*f*. Further, the first coil leading portion 32*f* is led out from the coil side 21 (first coil side 21*a*) of the first direction second pole coil side (X2-arrow direction) of the one unit coil 20 (first unit coil 20*a*) which coil pitch between the pair of coil sides 21, 21 is the minimum among the plurality of (two) unit coils 20 (first unit coil 20*a* and second unit coil 20*b*) which forms the first pole coil 31*f*. Further, the second coil leading portion 32*s* is led out from the coil side 21 (second coil side 21*b*) of the first direction second pole coil side (X2-arrow direction) of the one unit coil 20 (third unit coil 20*c*) which forms the second pole coil 31*s*. It is noted that in FIG. 66, the first coil leading portion 32*f* is led out from the most slot bottom portion 11*a* side and the second coil leading portion 32*s* is led out from the most slot opening portion 11*b* side.

Thus, according to the modified embodiment, the winding advancing direction of each unit coil 20 in each pole paired coil 32 is the same direction as the third embodiment. The arrangement of the half-coil 23*h* and the pair of coil leading portions 32*f*, 32*s* is the same with that of the third embodiment and further, the arrangement of the phase coil 33 (U-phase coil 33*u*, V-phase coil 33*v* and W-phase coil 33*w*) is also the same with the third embodiment. However, the winding directions of the unit coils 20 seen from the respective winding advancing directions of the unit coils 20 are different from those of the third embodiment. Therefore, according to the modified embodiment, it is necessary to reverse the current flowing direction of each unit coil 20 relative to the current flowing direction explained in the third embodiment. This can be said to the modified embodiment explained in the explanation of the third embodiment, the fourth embodiment and the modified embodiment explained in the fourth embodiment.

As explained, by reversing the electric current direction flowing through each unit coil 20 relative to the electric current flowing direction explained embodiments and the modified embodiments, the invention can be applicable to the stator coil 30 in mirror surface relation with respect to the void surface 50*g* as the boundary surface.

<Stator Coil 30 in Mirror Surface Symmetry with Slot Central Surface 40*c* as Boundary Surface>

The present invention can be applicable to the stator coil 30 which is in a mirror surface symmetrical relation with respect to the slot central surface 40*c* as the boundary surface. Compared to the first embodiment, according to the twenty-fourth modified embodiment, the point that the stator coil 30 in a mirror surface symmetrical relation with respect to the slot central surface 40*c* as the boundary surface is different. Hereinafter, the points different from the first embodiment will be explained mainly with reference to FIGS. 67 and 68.

It is assumed here that as shown in FIG. 1, an imaginary plane surface formed along in the second direction (Y-arrow direction) and the third direction (Z-arrow direction) and bisecting the slot 11 is defined to be the slot central surface 40*c*. The state of the pole paired coil 32 illustrated in FIG. 68 indicates the state (mirror image) indicating that the pole paired coil 32 shown in FIG. 9 is turned back with respect to the slot central surface 40*c* as the boundary surface. In FIG. 68, the first direction first pole coil side (X1-arrow direction) is the direction of right side of the paper and the first direction second pole coil side (X2-arrow direction) is the direction of left side of the paper. This can be similarly said to the relationship between the pole paired coil 32 shown in FIG. 67 and the pole paired coil 32 shown in FIG. 2.

Figure 67:
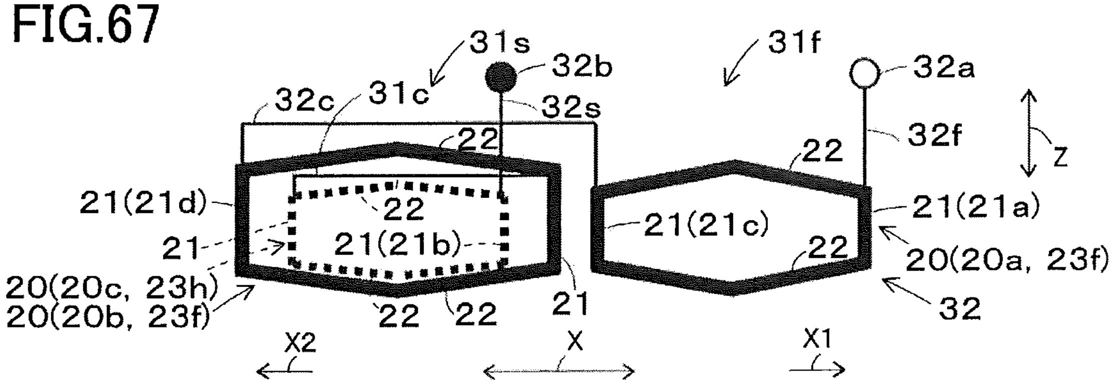
FIG. 67 is a schematic view of the pole paired coil 32 seen from the slot opening portion 11*b* side in the second direction (Y-arrow direction) associated with the twenty-fourth modified embodiment.
Figure 68:
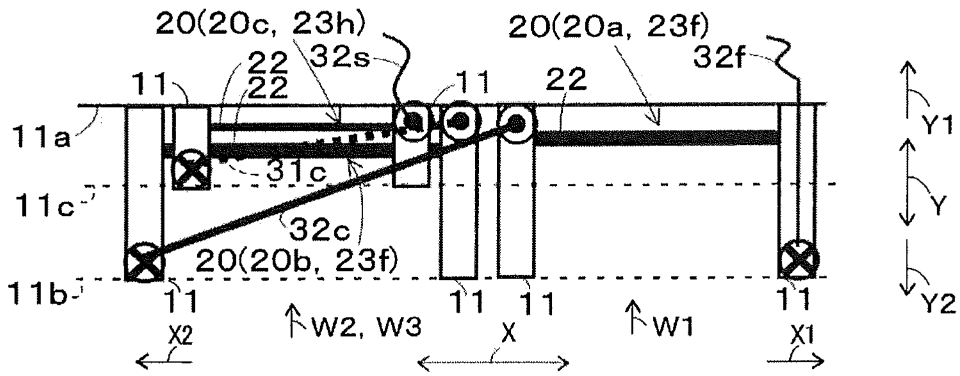
FIG. 68 is a schematic view of an example of the pole paired coil 32 shown in FIG. 67 being mounted in the plurality of (six) slots 11, seen from the pair of coil leading portions 32*f*, 32*s* side in the third direction (Z-arrow direction) associated with the twenty-fourth modified embodiment.

As shown in FIGS. 67 and 68, each winding advancing direction (W1-arrow direction, W2-arrow direction and W3-arrow direction) of the plurality of (three) unit coils 20 (first unit coil 20*a*, second unit coil 20*b* and third unit coil 20*c*) which forms the pole paired coil 32 is the second direction slot bottom portion side (Y1-arrow direction). Further, the winding direction of the first unit coil 20*a* seen from the winding advancing direction W1 is a clockwise direction. Further, the winding direction of the second unit coil 20*b* seen from the winding advancing direction W2 of the second unit coil 20*b* is a counterclockwise direction and the winding direction of the third unit coil 20*c* seen from the winding advancing direction W3 of the third unit coil 20*c* is a counterclockwise direction.

Further, the pole paired coil 32 includes the half-coil 23*h* at the second pole coil 31*s*. Further, the first coil leading portion 32*f* is led out from the coil side 21 (first coil side 21*a*) of the first direction first pole coil side (X1-arrow direction) of the one unit coil 20 (first unit coil 20*a*) which forms the first pole coil 31*f*. Further, the second coil leading portion 32*s* is led out from the coil side 21 (second coil side 21*b*) of the first direction first pole coil side (X1-arrow direction) of the unit coil 20 (third unit coil 20*c*) which coil pitch between the pair of coil sides 21, 21 is the minimum among the plurality of (two) unit coil 20 (second unit coil 20*b* and third unit coil 20*c*) which forms the second pole coil 31*s*. It is noted that in FIG. 68, the first coil leading portion 32*f* is led out from the most slot opening portion 11*b* side and the second coil leading portion 32*s* is led out from the most slot bottom portion 11*a* side.

Thus, according to the modified embodiment, the winding advancing direction of each unit coil 20 in each pole paired coil 32 is the same direction as the direction of the first embodiment. The arrangement of the half-coil 23*h* and the pair of coil leading portions 32*f*, 32*s* is the same with that of the first embodiment and further, the arrangement of the phase coil 33 (U-phase coil 33*u*, V-phase coil 33*v* and W-phase coil 33*w*) is also the same with the first embodiment. However, the winding directions of the unit coils 20 seen from the respective winding advancing directions of the unit coils 20 are different from those of the first embodiment. Therefore, according to the modified embodiment, it is necessary to reverse the current flowing direction of the unit coil 20 relative to the electric current flowing direction of the first embodiment. This can be said to the modified embodiment explained in the explanation of the first embodiment, the second embodiment and the modified embodiment explained in the second embodiment.

The above explanation can be said to the explanation of the third embodiment. Hereinafter, the explanation of the twenty-fifth modified embodiment will be made with reference to FIGS. 69 and 70, mainly on the points different from the third embodiment. The pole paired coil 32 shown in FIG. 70 indicates the state that the pole paired coil 32 shown in FIG. 43 is turned back with respect to the slot central portion 40*c* as the boundary surface (mirror image). In FIG. 70, the first direction first pole coil side (X1-arrow direction) is the direction of right side of the paper and the first direction second pole coil side (X2-arrow direction) is the direction of left side of the paper. This can be similarly said to the relationship between the pole paired coil 32 shown in FIG. 69 and the pole paired coil 32 shown in FIG. 42.

Figure 69:
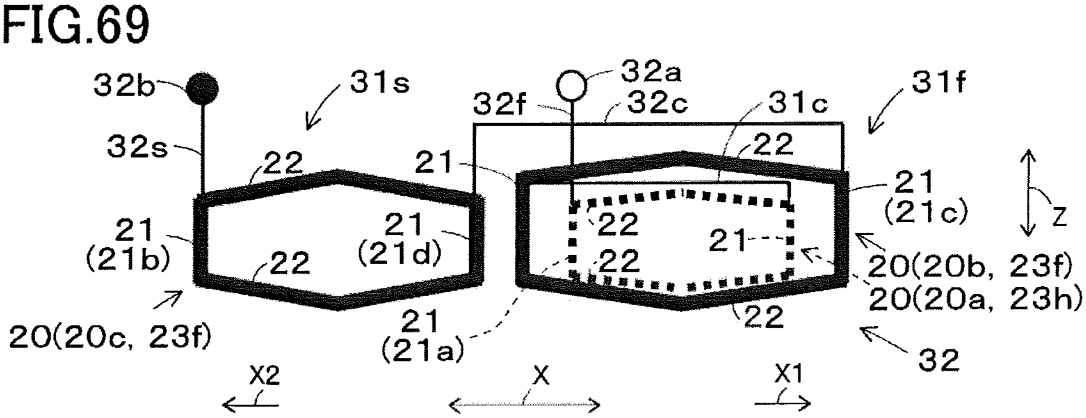
FIG. 69 is a schematic view of an example of structure of the pole paired coil 32 seen from the slot opening portion 11*b* side in the second direction (Y-arrow direction) associated with the twenty-fifth modified embodiment.
Figure 70:
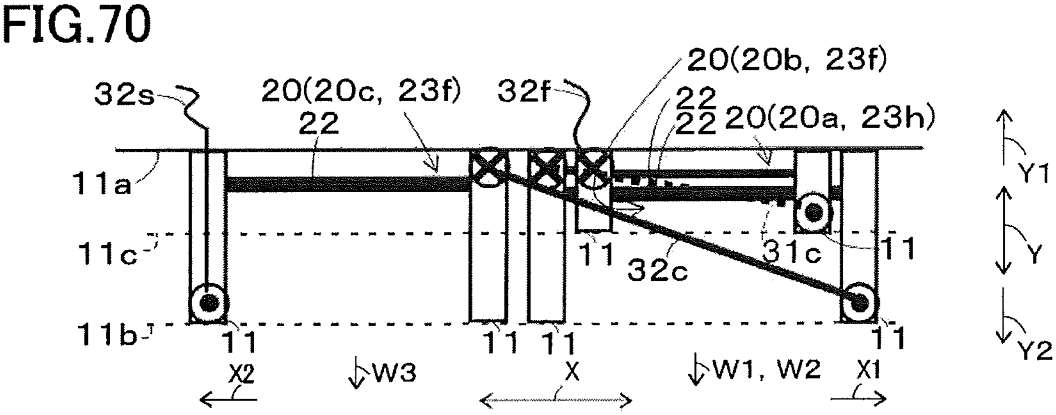
FIG. 70 is a schematic view of an example of structure of the pole paired coil 32 shown in FIG. 69 being mounted in the plurality of (six) slots 11, seen from the coil leading portions 32*f*, 32*s* side in the third direction (Z-arrow direction) associated with the twenty-fifth modified embodiment.

As shown in FIGS. 69 and 70, each winding advancing direction (W1-arrow direction, W2-arrow direction and W3-arrow direction) of the plurality of (three) unit coils 20 (first unit coil 20*a*, second unit coil 20*b* and third unit coil 20*c*) which forms the pole paired coil 32 is the second direction slot opening portion side (Y2-arrow direction). Further, the winding direction of the first unit coil 20*a* seen from the winding advancing direction W1 is a clockwise direction. Further, the winding direction of the second unit coil 20*b* seen from the winding advancing direction W2 of the second unit coil 20*b* is a clockwise direction and the winding direction of the third unit coil 20*c* seen from the winding advancing direction W3 of the third unit coil 20*c* is a counterclockwise direction.

Further, the pole paired coil 32 includes the half-coil 23*h* at the first pole coil 31*f*. Further, the first coil leading portion 32*f* is led out from the coil side 21 (first coil side 21*a*) of the first direction second pole coil side (X2-arrow direction) of the one unit coil 20 (first unit coil 20*a*) which coil pitch between the pair of coil sides 21, 21 is the minimum among the plurality of (two) unit coils 20 (first unit coil 20*a* and second unit coil 20*b*) which forms the first pole coil 31*f*. Further, the second coil leading portion 32*s* is led out from the coil side 21 (second coil side 21*b*) of the first direction second pole coil side (X2-arrow direction) of the one unit coil 20 (third unit coil 20*c*) which forms the second pole coil 31*s*. It is noted that in FIG. 70, the first coil leading portion 32*f* is led out from the most slot bottom portion 11*a* side and the second coil leading portion 32*s* is led out from the most slot opening portion 11*b* side.

Thus, according to the modified embodiment, the winding advancing direction of each unit coil 20 in each pole paired coil 32 is the same direction as the third embodiment. The arrangement of the half-coil 23*h* and the pair of coil leading portions 32*f*, 32*s* is the same with that of the third embodiment and further, the arrangement of the phase coil 33 (U-phase coil 33*u*, V-phase coil 33*v* and W-phase coil 33*w*) is also the same with the third embodiment. However, the winding directions of the unit coils 20 seen from the respective winding advancing directions of the unit coils 20 are different from those of the third embodiment. Therefore, according to the modified embodiment, it is necessary to reverse the current flowing direction of each unit coil 20 relative to the current flowing direction explained in the third embodiment. This can be said to the modified embodiment explained in the explanation of the third embodiment, the fourth embodiment and the modified embodiment explained in the fourth embodiment.

As explained, by reversing the current direction flowing through each unit coil 20 relative to the current flowing direction explained embodiments and the modified embodiments, the invention can be similarly applicable to the stator coil 30 in mirror surface relation with respect to the slot central surface 40*c* as the boundary surface.

<Cylindrical Rotating Electrical Machine>

The following relation exists in the cylindrical rotating electrical machine. It is assumed here that crossover direction (direction towards the second pole coil 31*s* side from the first pole coil 31*f* side) of the pole coil connecting portion 32*c* seen from the pair of coil leading portions 32*f*, 32*s* side of the third direction (Z-arrow direction) is defined to be the pole coil connecting portion crossover direction. Further, in assembling of the phase coil 33 (U-phase coil 33*u*, V-phase coil 33*v* and W-phase coil 33*w*), when the phase is deviated relative to the lastly mounted phase coil 33 by the in-between phase minimum difference worth (electrical angle of 120 degrees), such deviated direction is defined to be the phase coil assembling direction.

According to the first embodiment, the winding advancing direction W1 of the first unit coil 20*a*, the winding advancing direction W2 of the second unit coil 20*b* and the winding advancing direction of the third unit coil 20*c* are all second direction slot bottom portion side (Y1-arrow direction). Further, the winding direction of the first unit coil 20*a* seen from the winding advancing direction W1 of the first unit coil 20*a* is the counterclockwise direction. The winding direction of the second unit oil 20*b* seen from the winding advancing direction W2 of the second unit coil 20*b* is the clockwise direction and the winding direction of the third unit coil 20*c* seen from the winding advancing direction W3 of the third unit coil 20*c* is the clockwise direction. The half-coil 23*h* is the third unit coil 20*c*.

Since the pole coil connecting portion crossover direction is the clockwise direction, the pole coil connecting portion crossover direction is the reverse direction relative to the winding direction of the first unit coil 20*a* and is the same direction relative to the winding directions of the second unit coil 20*b* and the third unit coil 20*c*. Since the phase coil assembling direction is the counterclockwise direction, the phase coil assembling direction is the reverse direction relative to the winding direction of the half-coil 23*h*.

According to the third embodiment, the winding advancing direction W1 of the first unit coil 20*a*, the winding advancing direction W2 of the second unit coil 20*b* and the winding advancing direction W3 of the third unit coil 20*c* are all second direction slot opening portion side (Y2-arrow direction). Further, the winding direction of the first unit coil 20*a* seen from the winding advancing direction W1 of the first unit coil 20*a* is the counterclockwise direction. The winding direction of the second unit oil 20*b* seen from the winding advancing direction W2 of the second unit coil 20*b* is the counterclockwise direction and further the winding direction of the third unit coil 20*c* seen from the winding advancing direction W3 of the third unit coil 20*c* is the clockwise direction. The half-coil 23*h* is the first unit coil 20*a*.

Since the pole coil connecting portion crossover direction is the clockwise direction, the pole coil connecting portion crossover direction is the reverse direction relative to the winding direction of the first unit coil 20*a* and the winding direction of the second unit coil 20*b* and is the same direction relative to the winding directions of the third unit coil 20*c*. Since the phase coil assembling direction is the clockwise direction, the phase coil assembling direction is the reverse direction relative to the winding direction of the half-coil 23*h*.

According to the twenty-second modified embodiment, the winding advancing direction W1 of the first unit coil 20*a*, the winding advancing direction W2 of the second unit coil 20*b* and the winding advancing direction W3 of the third unit coil 20*c* are all second direction slot bottom portion side (Y1-arrow direction). Further, the winding direction of the first unit coil 20*a* seen from the winding advancing direction W1 of the first unit coil 20*a* is the clockwise direction. The winding direction of the second unit oil 20*b* seen from the winding advancing direction W2 of the second unit coil 20*b* is the counterclockwise direction and further the winding direction of the third unit coil 20*c* seen from the winding advancing direction W3 of the third unit coil 20*c* is the counterclockwise direction. The half-coil 23*h* is the third unit coil 20*c*.

Since the pole coil connecting portion crossover direction is the clockwise direction, the pole coil connecting portion crossover direction is the same direction with the winding direction of the first unit coil 20*a* and is the reverse direction relative to the winding directions of the second unit coil 20*b* and the third unit coil 20*c*. Since the phase coil assembling direction is the counterclockwise direction, the phase coil assembling direction is the same direction with the winding direction of the half-coil 23*h*.

According to the twenty-third modified embodiment, the winding advancing direction W1 of the first unit coil 20*a*, the winding advancing direction W2 of the second unit coil 20*b* and the winding advancing direction W3 of the third unit coil 20*c* are all second direction slot opening portion side (Y2-arrow direction). Further, the winding direction of the first unit coil 20*a* seen from the winding advancing direction W1 of the first unit coil 20*a* is the clockwise direction. The winding direction of the second unit oil 20*b* seen from the winding advancing direction W2 of the second unit coil 20*b* is the clockwise direction and further the winding direction of the third unit coil 20*c* seen from the winding advancing direction W3 of the third unit coil 20*c* is the counterclockwise direction. The half-coil 23*h* is the first unit coil 20*a*.

Since the pole coil connecting portion crossover direction is the clockwise direction, the pole coil connecting portion crossover direction is the same direction with the winding directions of the first unit coil 20*a* and the second unit coil 20*b* but is the reverse direction relative to the winding direction of the third unit coil 20*c*. Since the phase coil assembling direction is the clockwise direction, the phase coil assembling direction is the same direction with the winding direction of the half-coil 23*h*.

According to the twenty-fourth modified embodiment, the winding advancing direction W1 of the first unit coil 20*a*, the winding advancing direction W2 of the second unit coil 20*b* and the winding advancing direction W3 of the third unit coil 20*c* are all second direction slot bottom portion side (Y1-arrow direction). Further, the winding direction of the first unit coil 20*a* seen from the winding advancing direction W1 of the first unit coil 20*a* is the clockwise direction. The winding direction of the second unit oil 20*b* seen from the winding advancing direction W2 of the second unit coil 20*b* is the counterclockwise direction and further the winding direction of the third unit coil 20*c* seen from the winding advancing direction W3 of the third unit coil 20*c* is the counterclockwise direction. The half-coil 23*h* is the third unit coil 20*c*.

Since the pole coil connecting portion crossover direction is the counterclockwise direction, the pole coil connecting portion crossover direction is the reverse direction relative to the winding direction of the first unit coil 20*a* and is the same direction with the winding directions of the second unit coil 20*b* and the winding direction of the third unit coil 20*c*. Since the phase coil assembling direction is the clockwise direction, the phase coil assembling direction is the reverse direction relative to the winding direction of the half-coil 23*h*.

According to the twenty-fifth modified embodiment, the winding advancing direction W1 of the first unit coil 20*a*, the winding advancing direction W2 of the second unit coil 20*b* and the winding advancing direction W3 of the third unit coil 20*c* are all second direction slot opening portion side (Y2-arrow direction). Further, the winding direction of the first unit coil 20*a* seen from the winding advancing direction W1 of the first unit coil 20*a* is the clockwise direction. The winding direction of the second unit oil 20*b* seen from the winding advancing direction W2 of the second unit coil 20*b* is the clockwise direction and further the winding direction of the third unit coil 20*c* seen from the winding advancing direction W3 of the third unit coil 20*c* is the counterclockwise direction. The half-coil 23*h* is the first unit coil 20*a*.

Since the pole coil connecting portion crossover direction is the counterclockwise direction, the pole coil connecting portion crossover direction is the reverse direction relative to the winding direction of the first unit coil 20*a* and the winding direction of the third unit coil 20*c* but is the same direction with the winding direction of the third unit coil 20*c*. Since the phase coil assembling direction is the counterclockwise direction, the phase coil assembling direction is the reverse direction relative to the winding direction of the half-coil 23*h*.

According to the twenty-fourth modified embodiment, both pole paired coil 32 and the phase order direction (direction of arrangement of the three-phase phase coils 33) are in mirror surface symmetric relation with the slot central surface 40*c* as the boundary surface, relative to the first embodiment. However, the above explanation can be said similarly to the case where only one of the pole paired coil 32 and the phase order direction (direction of arrangement of the three-phase phase coils 33) are in mirror surface symmetric relation with the slot central surface 40*c* as the boundary surface, relative to the first embodiment. This can be said similarly to the case of the twenty-fifth modified embodiment. In other words, the phase coil assembling direction is the reverse direction relative to the winding direction of the half-coil 23*h*.

<Others>

This invention is not limited to the embodiments explained above and shown in the attached drawings, but other changes or modifications are also included as long as such are within the subject matter of the invention. For example, according to the embodiments above, the rotating electrical machine with eight poles. However, the number of poles and/or the number of slots is not limited to those explained in the above embodiments and any multi-phase rotating electrical machine with plurality of phase coils can be applicable to the invention. Further, the invention is not limited to the radial void surface type or the axial void surface type cylindrical rotating electrical machine in which the stator 40 and the mover 70 are arranged coaxially and can be applicable to the linear type electrical motor or linear type generator in which the stator 40 and the mover 70 are arranged in a straight line in series so that the mover 70 is movable linearly relative to the stator 40. Further, the rotating electrical machine of the present invention can be applicable to various type rotating electrical machines, such as for example, vehicle drive motor, vehicle generator or industrial use motor or generator.

EXPLANATION OF SIGNS OR NUMERALS

10: stator iron core
11: slot
11*a*: slot bottom portion, 11*b*: slot opening portion,
11*d*: first half slot portion, 11*e*: second half slot portion,
20: unit coil
21, 21: a pair of coil sides, 22, 22: a pair of coil ends,
23*f*: full-coil, 23*h*: half-coil, 23*h*1: both side occupying half-coil,
30: stator coil
311; first pole coil, 31*s*: second pole coil, 32: pole paired coil,
32*c*: pole coil connecting portion,
32*f*: first coil leading portion, 32*s*: second coil leading portion,
32*f*, 32*s*: a pair of coil leading portions,
33: phase coil,
34*a*: first crossover line end portion, 34*b*: second crossover line end portion,
35*a*: first vector, 35*b*: second vector,
40: stator,
50: mover iron core,
61, 62: a pair of mover magnetic poles,
70, mover,
100: rotating electrical machine.

The invention claimed is:

1. A rotating electrical machine with a fractional slot structure having a number of slots per every pole and every phase being fractions with decimal places of 0.5, comprising:

a stator including:
a stator iron core provided with a plurality of slots; and
a stator coil including a plurality of unit coils wound between one pair of slots among the plurality of slots and including a pair of coil sides accommodated in the one pair of slots and a pair of coil ends formed integrally with the pair of coil sides and connecting respective same side end portions of the pair of coil sides; and
a mover including:
a mover iron core movably supported relative to the stator; and
at least a pair of mover magnetic poles provided at the mover iron core, wherein
the plurality of unit coils included in the stator coil is apportioned, per slot unit opposing to the pair of mover magnetic poles, into:
a first pole coil having one of the plurality of unit coils or the plurality of unit coils which coil pitch between the pair of coil sides is different from one another and the one of the plurality of unit coils or the plurality of unit coils being concentrically wound and electrically connected in series; and
a second pole coil having one of the plurality of unit coils or the plurality of unit coils which coil pitch between the pair of coil sides is different from one another and the one of the plurality of unit coils or the plurality of unit coils being concentrically wound and electrically connected in series; wherein, when the first pole coil opposes to one polarity of one of the pair of mover magnetic poles, the second pole coil opposes to the other polarity of the other of the pair of mover magnetic poles; and wherein adjacently arranged said first pole coil and said second pole coil opposing to the pair of mover magnetic poles are electrically connected in series to form a pole paired coil;

the stator coil includes a plurality of phase coils which has one pole paired coil or a plurality of the pole paired coils which is electrically connected by at least one of an in-series connection and a parallel connection;

with respect to an occupying state of the plurality of slots, each of the pole paired coils forming the plurality of phase coils includes two types of the unit coils which are;

a full-coil in which when the pair of coil sides of the one of the plurality of unit coils is accommodated in the pair of slots, the pair of coil sides occupies an entirety of the pair of slots; and a half-coil in which when the pair of coil sides of the one of the plurality of unit coils is accommodated in the pair of slots, one coil side of the pair of coil sides occupies a half of the one of the pair of slots and the other coil side of the pair of coil sides occupies a half of the other of the pair of slots; and wherein in said each of the pole paired coils, a coil pitch between the pair of coil sides of the plurality of unit coils which forms the pole paired coil is different from one another and said each of the pole paired coils includes one said half-coil.

2. The rotating electrical machine according to claim 1, wherein the coil pitch between the pair of coil sides of the half-coil is a minimum value among the plurality of unit coils forming the pole paired coil.

3. The rotating electrical machine according to claim 1, wherein in the plurality of unit coils forming said each of the pole paired coils, most adjacently arranged unit coils are electrically connected with each other.

4. The rotating electrical machine according to claim 1 wherein assuming that a moving direction of the mover relative to the stator is defined to be a first direction, a depth direction of the slots is defined to be a second direction and that a direction orthogonal to both of the first direction and the second direction is defined to be a third direction, the pair of coil ends of the plurality of unit coils included in the stator coil is arranged at both end portions of the third direction, in the second direction or the third direction at every phase coil and is formed in a multi-layered structure.

5. The rotating electrical machine according to claim 1, wherein in said each of the pole paired coils, said one of the plurality of unit coils or the plurality of unit coils forming the first pole coil and said one of the plurality of unit coils or the plurality of unit coils forming the second pole coil are continuously and forwardly wound via a pole coil connecting portion which guides a winding from the first pole coil at a winding start side to the second pole coil at a winding end side and are connected in-series with each other, said each of the pole paired coils includes a pair of coil leading portions formed by a first coil leading portion which is the one of the plurality of unit coils forming the first pole coil and led out from the one coil side of the unit coil at a winding start and a second coil leading portion which is the one of the plurality of unit coils forming the second pole coil and led out from the one coil side of the unit coil at a winding end, and wherein in said each of the phase coils, the one pole paired coil or the plurality of pole paired coils forming the phase coil is electrically connected via the pair of coil leading portions.

6. The rotating electrical machine according to claim 5, wherein assuming that the depth direction of the slots is defined to be the second direction and a direction toward a slot bottom portion side from a slot opening portion side in the second direction is defined to be a second direction slot bottom portion side, any of each winding advancing direction of the plurality of unit coils forming said each of the pole paired coils is defined to be the second direction slot bottom portion side.

7. The rotating electrical machine according to claim 6, wherein said each of the pole paired coils includes the half-coil at the second pole coil, and assuming that the moving direction of the mover relative to the stator is defined to be the first direction and a direction from the second pole coil side to the first pole coil side in the first direction is defined to be a first direction first pole coil side, the first coil leading portion is led out from the coil side of the first direction first pole coil side of the unit coil which coil pitch between the pair of coil sides is a minimum value among the one of the plurality of unit coils or the plurality of unit coils forming the first pole coil, the second coil leading portion is led out from the coil side of the first direction first pole coil side of the unit coil which coil pitch between the pair of coil sides is a minimum value among the one of the plurality of unit coils or the plurality of unit coils forming the second pole coil.

8. The rotating electrical machine according to claim 7, wherein the number of slots per every pole and every phase is equal to or more than 2.5 and the half-coil is wound concentrically together with another one or the plurality of full-coils to form the second pole coil.

9. The rotating electrical machine according to claim 7, wherein assuming that a portion of a slot corresponding to a half thereof occupied by one coil side of the pair of coil sides of the half-coil which is arranged at the slot bottom portion side is defined to be a first half slot portion; and assuming that a portion of a slot corresponding to a half thereof occupied by the other coil side of the pair of coil sides of the half-coil which is arranged at the slot opening portion side is defined to be a second half slot portion; and the half-coil which has both the first half slot portion and the second half slot portion is defined to be a both-side occupying half-coil; and wherein assuming that one end side portion of each crossover line which connects between the plurality of unit coils forming said each of the pole paired coils and which is arranged at the slot bottom portion side is defined to be a first crossover line end portion and the other end side portion of the crossover line which is provided at the slot opening portion side is defined to be a second crossover line end portion;

an angle formed by a first vector which has one point in the first half slot portion of the both-side occupying half-coil as a start point and one point in the second half slot portion of the both-side occupying half-coil as an end point and a second vector which has the first crossover line end portion of the crossover line as a start point and the second crossover line end portion as an end point is set to be an acute angle which is smaller than a mechanical angle of 90 degrees.

10. A method for manufacturing a rotating electrical machine according to claim 9, wherein the method comprising:

assuming that a direction from the first pole coil side towards the second pole coil side in the first direction is defined to be the first direction second pole coil side and the plurality of phase coils is arranged sequentially such that each phase retards towards the first direction second pole coil side sequentially, a first mounting process for mounting one phase coil among the plurality of phase coils in the plurality of slots;

a second phase advance mounting process for mounting a remaining one of the phase coils among the plurality of phase coils which phase advances by an in-between phase minimum difference worth which is obtained by dividing an electric angle of 360 degrees by the number of phases, compared to the one phase coil which has been mounted at the first mounting process in the plurality of slots by deviating by the in-between phase minimum difference worth in the first direction first pole coil side relative to the one phase coil which has been mounted at the first mounting process; and a third phase advance mounting process for mounting the phase coil which phase advances by the in-between phase minimum difference worth compared to the phase coil which has been lastly mounted in the plurality of slots by deviating by the in-between phase minimum difference worth in the first direction first pole coil side relative to the phase coil lastly mounted, until all of the plurality of phase coils is mounted in the plurality of slots.

11. The rotating electrical machine according to claim 6, wherein the number of slots per every pole and every phase is 1.5, said each of the pole paired coils includes the half-coil at the first pole coil, and assuming that the moving direction of the mover relative to the stator is defined to be the first direction and a direction from the second pole coil side to the first pole coil side in the first direction is defined to be a first direction first pole coil side, the first coil leading portion is led out from the coil side of the first direction first pole coil side of the half-coil forming the first pole coil, the second coil leading portion is led out from the coil side of the first direction first pole coil side of the one full-coil forming the second pole coil.

12. The rotating electrical machine according to claim 5, wherein assuming that the depth direction of the slots is defined to be the second direction and a direction toward a slot opening portion side from a slot bottom portion side in the second direction is defined to be a second direction slot opening portion side, any of each winding advancing direction of the plurality of unit coils forming said each of the pole paired coils is defined to be the second direction slot opening portion side.

13. The rotating electrical machine according to claim 12, wherein said each of the pole paired coils includes the half-coil at the first pole coil, and assuming that the moving direction of the mover relative to the stator is defined to be the first direction and a direction from the first pole coil side to the second pole coil side in the first direction is defined to be a first direction second pole coil side, the first coil leading portion is led out from the coil side of the first direction second pole coil side of the unit coil which coil pitch between the pair of coil sides is a minimum value among the one of the plurality of unit coils or the plurality of unit coils forming the first pole coil, the second coil leading portion is led out from the coil side of the first direction second pole coil side of the unit coil which coil pitch between the pair of coil sides is a minimum value among the one of the plurality of unit coils or the plurality of unit coils forming the second pole coil.

14. The rotating electrical machine according to claim 13, wherein the number of slots per every pole and every phase is equal to or more than 2.5 and the half-coil is wound concentrically with another one full coil or the plurality of full-coils to form the first pole coil.

15. The rotating electrical machine according to claim 13, wherein assuming that a portion of a slot corresponding to a half thereof occupied by one coil side of the pair of coil sides of the half-coil which is arranged at the slot bottom side is defined to be a first half slot portion; and assuming that a portion of a slot corresponding to a half thereof occupied by the other coil side of the pair of coil sides of the half-coil which is arranged at the slot opening side is defined to be a second half slot portion; and the half-coil which has both the first half slot portion and the second half slot portion is defined to be a both-side occupying half-coil; and wherein assuming that one end side portion of each crossover line which connects between the plurality of unit coils forming said each of the pole paired coils and which is arranged at the slot bottom side is defined to be a first crossover line end portion and the other end side portion of the crossover line which is provided at the slot opening side is defined to be a second crossover line end portion;

an angle formed by a first vector which has one point in the first half slot portion of the both-side occupying half-coil as a start point and one point in the second half slot portion of the both-side occupying half-coil as an end point and a second vector which has the first crossover line end portion of the crossover line as a start point and the second crossover line end portion as an end point is set to be an acute angle which is smaller than a mechanical angle of 90 degrees.

16. The method for manufacturing a rotating electrical machine according to claim 15, wherein the method comprising:

when the plurality of phase coils is arranged sequentially such that each phase retards towards the first direction second pole coil side sequentially, a first mounting process for mounting one phase coil among the plurality of phase coils in the plurality of slots;

a second phase retard mounting process for mounting a remaining one of the phase coils among the plurality of phase coils which phase retards by an in-between phase minimum difference worth which is obtained by dividing an electric angle of 360 degrees by the number of phases, compared to the one phase coil which has been mounted at the first mounting process in the plurality of slots by deviating by the in-between phase minimum difference worth in the first direction second pole coil side relative to the one phase coil which has been mounted at the first mounting process; and a third phase retard mounting process for mounting the phase coil which phase retards by the in-between phase minimum difference worth compared to the phase coil which has been lastly mounted in the plurality of slots by deviating by the in-between phase minimum difference worth in the first direction second pole coil side relative to the phase coil lastly mounted, until all of the plurality of phase coils is mounted in the plurality of slots.

17. The rotating electrical machine according to claim 12, wherein the number of slots per every pole and every phase is 1.5, said each of the pole paired coils includes the half-coil at the second pole coil, and assuming that the moving direction of the mover relative to the stator is defined to be the first direction and a direction from the first pole coil side to the second pole coil side in the first direction is defined to be a first direction second pole coil side, the first coil leading portion is led out from the coil side of the first direction second pole coil side of the full-coil forming the first pole coil, the second coil leading portion is led out from the coil side of the first direction second pole coil side of the half-coil forming the second pole coil.

* * * * *